(12) United States Patent
Malia et al.

(10) Patent No.: US 12,741,197 B2
(45) Date of Patent: Sep. 22, 2026

(54) DEVICES, METHODS, AND GRAPHICAL USER INTERFACES FOR DEPTH-BASED ANNOTATION

(71) Applicant: Apple Inc., Cupertino, CA (US)

(72) Inventors: Joseph A. Malia, Kingston upon Thames (GB); Mark K. Hauenstein, Richmond (GB); Praveen Sharma, Brooklyn, NY (US); Matan Stauber, San Francisco, CA (US); Julian K. Missig, Burlingame, CA (US); Jeffrey T. Bernstein, San Francisco, CA (US); Lukas Robert Tom Girling, Stoke Bishop (GB); Matthaeus Krenn, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 100 days.

(21) Appl. No.: 18/929,122

(22) Filed: Oct. 28, 2024

(65) Prior Publication Data

US 2025/0080830 A1 Mar. 6, 2025

Related U.S. Application Data

(63) Continuation of application No. 18/388,176, filed on Nov. 8, 2023, now Pat. No. 12,131,417, which is a (Continued)

(51) Int. Cl.

*H04N 23/63* (2023.01)
*G06F 3/04815* (2022.01)

(Continued)

(52) U.S. Cl.

CPC ....... *H04N 23/631* (2023.01); *G06F 3/04815* (2013.01); *G06F 3/0484* (2013.01);

(Continued)

(58) Field of Classification Search

CPC ... G06T 13/60; G06T 19/006; G06T 2200/24; G06F 3/04815; G06F 3/0484

See application file for complete search history.

(56) References Cited

U.S. PATENT DOCUMENTS 9,330,500 B2 5/2016 Karsch et al.
9,830,532 B1 * 11/2017 Lina .................... G06V 10/761

(Continued)

FOREIGN PATENT DOCUMENTS

JP 2013-229672 A 11/2013

OTHER PUBLICATIONS

Office Action, dated Dec. 23, 2024, received in Indian Patent Application No. 202118009402 (7559IN01), which corresponds with U.S. Appl. No. 16/574,029, 3 pages.

(Continued)

*Primary Examiner* — Hung H Lam

(74) *Attorney, Agent, or Firm* — Morgan, Lewis & Bockius LLP

(57) ABSTRACT

A computer system displays virtual objects overlaid on a view of a physical environment as a virtual effect. The computer system displays respective animated movements of the virtual objects over the view of the physical environment, wherein the respective animated movements are constrained in accordance with a direction of simulated gravity associated with the view of the physical environment. If current positions of virtual objects during the respective animated movement of the virtual objects corresponds to different surfaces at different heights detected in the view of the physical environment, the computer constrains the respective animated movements of the virtual objects in accordance with the different surfaces detected in the view of the physical environment.

34 Claims, 155 Drawing Sheets

Related U.S. Application Data continuation of application No. 18/107,381, filed on Feb. 8, 2023, now Pat. No. 11,818,455, which is a continuation of application No. 17/716,984, filed on Apr. 8, 2022, now Pat. No. 11,632,600, which is a continuation of application No. 16/997,860, filed on Aug. 19, 2020, now Pat. No. 11,303,812, which is a continuation of application No. 16/574,029, filed on Sep. 17, 2019, now Pat. No. 10,785,413.

(60) Provisional application No. 62/739,178, filed on Sep. 29, 2018.

(51) Int. Cl.

| | |
|---|---|
| ***G06F 3/0484*** | (2022.01) |
| ***G06T 11/00*** | (2006.01) |
| ***G06T 13/60*** | (2011.01) |
| ***G06T 19/00*** | (2011.01) |
| *G06F 3/0488* | (2022.01) |

(52) U.S. Cl.

CPC .............. *G06T 11/00* (2013.01); *G06T 13/60* (2013.01); *G06T 19/006* (2013.01); *H04N 23/633* (2023.01); *G06F 3/0488* (2013.01); *G06T 2200/24* (2013.01)

(56) References Cited

U.S. PATENT DOCUMENTS

| | | | | |
|---|---|---|---|---|
| 9,952,820 | B2 * | 4/2018 | Anderson | G06T 19/006 |
| 10,438,262 | B1 * | 10/2019 | Helmer | G06Q 30/0643 |
| 10,972,680 | B2 | 4/2021 | Wigdor et al. | |
| 2016/0004300 | A1 * | 1/2016 | Baic | G06F 3/0346 345/419 |
| 2016/0163063 | A1 * | 6/2016 | Ashman | G06T 19/006 345/633 |
| 2019/0369722 | A1 * | 12/2019 | Lehtiniemi | G06F 3/0304 |

OTHER PUBLICATIONS

Office Action, dated Jan. 16, 2025, received in Chinese Patent Application No. 202210629947.3 (7639CN01), which corresponds with U.S. Appl. No. 17/030,209, 2 pages.

Office action, dated Sep. 30, 2024, received in Indian Patent Application No. 202014041448 (7659IN), which corresponds with U.S. Appl. No. 17/018,958, 8 pages.

Patent, dated Feb. 27, 2025, received in Indian Patent Application No. 202014041448 (7659IN), which corresponds with U.S. Appl. No. 17/018,958, 6 pages.

Notice of Allowance, dated Dec. 5, 2024, received in Korean Patent Application No. 2020-0123687 (7738KR), which corresponds with U.S. Appl. No. 17/018,980, 3 pages.

Patent, dated Sep. 23, 2024, received in Indian Patent Application No. 202014041104 (7739IN), which corresponds with U.S. Appl. No. 17/018,994, 6 pages..

Final Office Action, dated Jan. 17, 2025, received in U.S. Appl. No. 18/219,627 (7975), 19 pages.

Notice of Allowance, dated Nov. 7, 2024, received in Korean Patent Application No. 2023-7019367 (7794KR), which corresponds with U.S. Appl. No. 17/307,957, 3 pages.

Patent, dated Feb. 6, 2025, received in Korean Patent Application No. 2023-7019367 (7794KR), which corresponds with U.S. Appl. No. 17/307,957, 4 pages.

Office Action, dated Nov. 5, 2024, received in Japanese Patent Application No. 2022-077644 (7859JP), which corresponds with U.S. Appl. No. 17/716,984, 17 pages.

Office Action, dated Sep. 23, 2024, received in Korean Patent Application No. 2023-7012345 (7859KR), which corresponds with U.S. Appl. No. 17/716,984, 5 pages.

Intent to Grant, dated Oct. 14, 2024, received in European Patent Application No. 24151350.6 (7877EP), 11 pages.

Decision to Grant, dated Feb. 20, 2025, received in European Patent Application No. 24151350.6 (7877EP), 7 pages.

Notice of Allowance, dated Jan. 10, 2025, received in U.S. Appl. No. 18/382,444 (8007), 6 pages.

Office Action, dated Aug. 14, 2024, received in U.S. Appl. No. 18/412,251 (8029), 10 pages.

Office Action, dated Feb. 27, 2025, received in U.S. Appl. No. 18/656,318 (8064), 15 pages.

* cited by examiner 5000
5003
5012
5014
5016
5002a
5001a
VIDEO
PHOTO

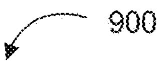

902
Display, via the display generation component, a first user interface region that includes a representation of a field of view of the one or more cameras that is updated with changes in the field of view of the one or more cameras over time 904
While displaying the first user interface region including the representation of the field of view of the one or more cameras, receive, via the one or more input devices, a first request to add an annotation to the displayed representation of the field of view of the one or more cameras 906
In response to the first request to add an annotation to the displayed representation of the field of view of the one or more cameras:
replace display of the representation of the field of view of the one or more cameras in the first user interface region with a still image of the field of view of the one or more cameras captured at a time corresponding to the receiving of the first request to add the annotation 908
While displaying the still image in the first user interface region, receive, via the one or more input devices, a first annotation on a first portion of the still image, wherein the first portion of the still image corresponds to a first portion of a physical environment captured in the still image 910
While displaying the first annotation on the first portion of the still image in the first user interface region, receiving, via the one or more input devices, a request to re-display the representation of the field of view of the one or more cameras in the first user interface region

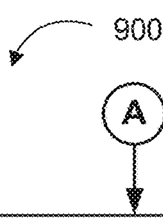

910

In response to receiving the request to re-display the representation of the field of view of the one or more cameras in the first user interface region:

replace display of the still image with the representation of the field of view of the one or more cameras in the first user interface region;

in accordance with a determination that the first portion of the physical environment captured in the still image is currently outside of the field of view of the one or more cameras, display, concurrently with the representation of the field of view of the one or more cameras, an indication of a current spatial relationship of the device relative to first portion of the physical environment captured in the still image; and in accordance with a determination that the first portion of the physical environment captured in the still image is currently within the field of view of the one or more cameras, forgo display of the indication

912

Displaying the indication of the current spatial relationship of the one or more camera relative to the first portion of the physical environment captured in the still image includes:

displaying an indicator in proximity to an edge of the representation of the field of view of the one or more cameras; and moving the indicator along the edge in accordance with movement of the one or more cameras relative to the physical environment

Figure 9B

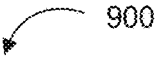

914

While displaying the indication of the current spatial relationship of the one or more camera relative to the first portion of the physical environment captured in the still image, detecting first movement of the one or more cameras; and in response to detecting the first movement of the one or more cameras:

update the representation of the field of view of the one or more cameras in accordance with changes in the field of view of the one or more cameras caused by the first movement; and in accordance with a determination that the first portion of the physical environment captured in the still image is currently outside of the field of view of the one or more cameras, update the indication of the current spatial relationship of the one or more cameras relative to the first portion of the physical environment captured in the still image in accordance with the first movement of the one or more cameras; and in accordance with a determination that the first portion of the physical environment captured in the still image is currently within the field of view of the one or more cameras, cease to display the indication

Figure 9C

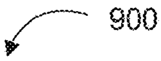

916
In response to receiving the first request to re-display the representation of the field of view of the one or more cameras in the first user interface region: in accordance with the determination that the first portion of the physical environment captured in the still image is currently within the field of view of the one or more cameras, display the first annotation at the first portion of the physical environment captured within the representation of the field of view of the one or more cameras 918
The first annotation is displayed as a two-dimensional object on a first depth plane in the first portion of the physical environment captured within the representation of the field of view of the one or more cameras 920
The first annotation is displayed as a two-dimensional object on a first depth plane in the first portion of the physical environment captured within the representation of the field of view of the one or more cameras 922
The first annotation is displayed at a location in space in the first portion of the physical environment captured within the representation of the field of view of the one or more cameras 924
In response to receiving the first request to re-display the representation of the field of view of the one or more cameras in the first user interface region: in accordance with the determination that the first portion of the physical environment captured in the still image is currently within the field of view of the one or more cameras, display a visual representation of the first annotation drawn on the first portion of the still image, concurrently with the representation of the field of view of the one or more cameras in the first user interface region

Figure 9D

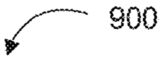

926
The first annotation shown in the representation of the field of view has a first viewing perspective that is based on the current spatial relationship of the one or more cameras relative to the first portion of the physical environment captured in the still image, and is different from a second viewing perspective of the first annotation shown on the still image 928
In response to receiving the first request to re-display the representation of the field of view of the one or more cameras in the first user interface region: in accordance with the determination that the first portion of the physical environment captured in the still image is currently outside of the field of view of the one or more cameras, display a visual representation of the first annotation drawn on the first portion of the still image, concurrently with the representation of the field of view of the one or more cameras in the first user interface region, wherein the visual representation of the first annotation drawn on the first portion of the still image is transformed into the indication of the current spatial relationship of the one or more cameras relative to the first portion of the physical environment captured in the still image.

Figure 9E

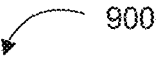

930
While displaying the first user interface region that includes the representation of the field of view of the one or more cameras, and prior to detecting the first request to add an annotation to the displayed representation of the field of view, display an indication of a current spatial relationship of the one or more cameras relative to a second portion of the physical environment to which a previously received, second annotation previously was added 932
After receiving the first request to re-display the representation of the field of view of the one or more cameras in the first user interface region: in accordance with a determination that both the first portion of the physical environment and the second portion of the physical environment are outside of the field of view of the one or more cameras, concurrently display the indication of the current spatial relationship of the one or more cameras relative to the first portion of the physical environment and the indication of the current spatial relationship of the one or more cameras relative to the second portion of the physical environment 934
While concurrently displaying the indication of the current spatial relationship of the one or more cameras relative to the first portion of the physical environment and the indication of the current spatial relationship of the one or more cameras relative to the second portion of the physical environment, detect second movement of the one or more cameras relative to the physical environment; and in response to detecting the second movement of the one or more cameras relative to the physical environment: in accordance with a determination that both the first portion of the physical environment and the second portion of the physical environment are outside of the field of view of the one or more cameras, respectively update the indications of the current spatial relationships of the one or more cameras relative to the first and second portions of the physical environment, in accordance with the second movement of the one or more cameras relative to the physical environment 936
The indication of the current spatial relationship of the one or more cameras relative to the first portion of the physical environment and the indication of the current spatial relationship of the one or more cameras relative to the second portion of the physical environment are displayed in accordance with a determination that the first portion and second portion of the physical environment are within a predefined range of the one or more cameras

Figure 9F

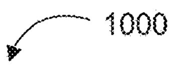

1002
Display, via the display generation component, a user interface that includes a video playback region 1004
While displaying playback of a first portion of a video in the video playback region, receiving, via the one or more input devices, a request to add an annotation to the video playback 1006
In response to receiving the request to add the annotation:
pause playback of the video at a first position in the video; and
display a still image that corresponds to the first, paused position of the video 1008
While displaying the still image, receive, via the one or more input devices, an annotation on a first portion of a physical environment captured in the still image 1010
After receiving the annotation, display, in the video playback region, a second portion of the video that corresponds to a second position in the video, distinct from the first position in the video, wherein the first portion of the physical environment is captured in the second portion of the video and the annotation is displayed in the second portion of the video 1012
The video was captured by a camera during relative movement of the camera and the physical environment; a third portion of the video was captured between the first portion and the second portion of the video, and does not include the first portion of the physical environment, during the relative movement of the camera and the physical environment; the annotation received on the still image is directed to a first object located in the first portion of the physical environment, and is displayed at a location corresponding to the first object in the second portion of the video; and the annotation is not displayed in the third portion of the video that does not include the first object

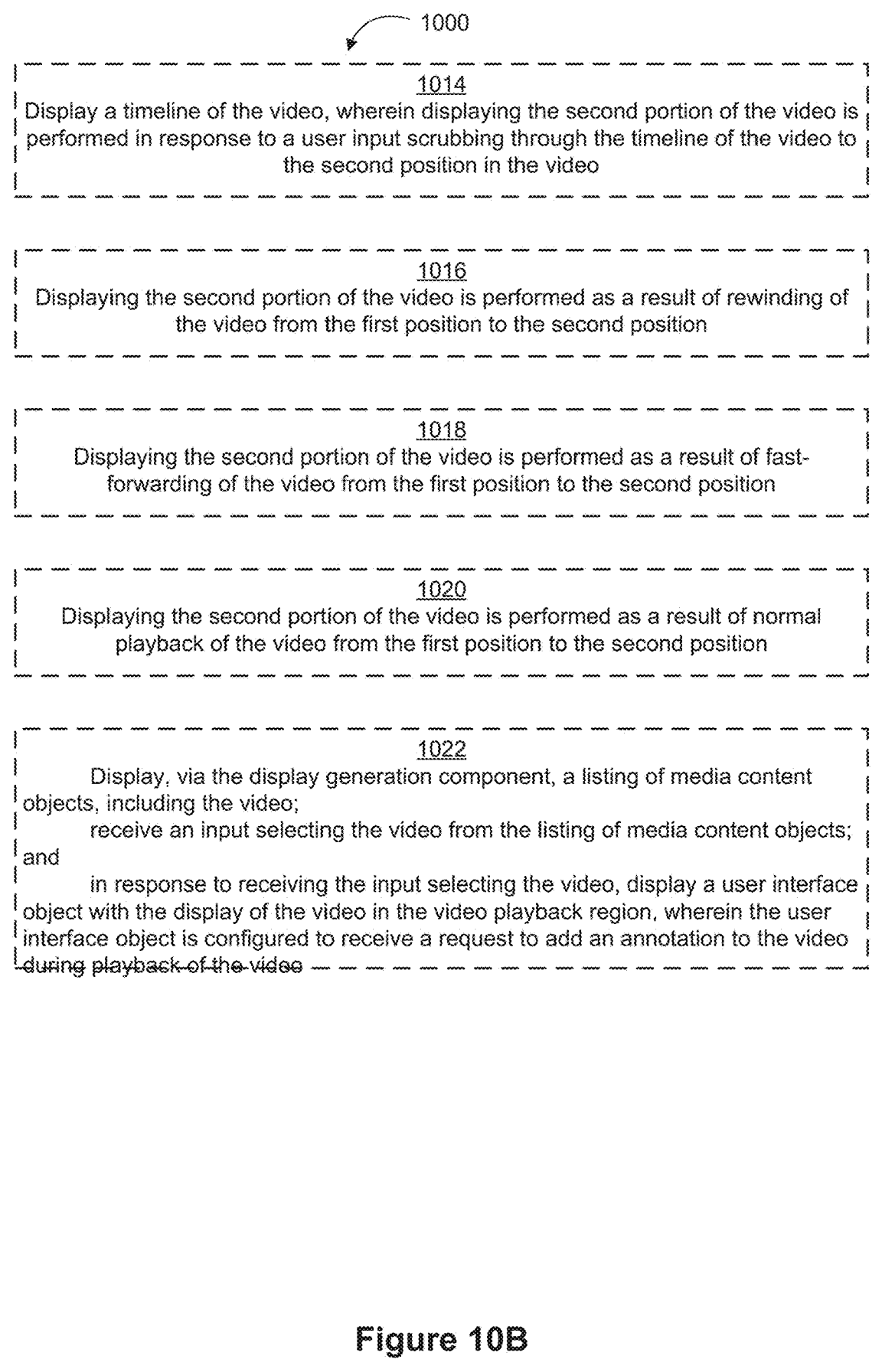

1014
Display a timeline of the video, wherein displaying the second portion of the video is performed in response to a user input scrubbing through the timeline of the video to the second position in the video 1016
Displaying the second portion of the video is performed as a result of rewinding of the video from the first position to the second position 1018
Displaying the second portion of the video is performed as a result of fast-forwarding of the video from the first position to the second position 1020
Displaying the second portion of the video is performed as a result of normal playback of the video from the first position to the second position 1022
Display, via the display generation component, a listing of media content objects, including the video;
receive an input selecting the video from the listing of media content objects; and
in response to receiving the input selecting the video, display a user interface object with the display of the video in the video playback region, wherein the user interface object is configured to receive a request to add an annotation to the video during playback of the video

Figure 10B

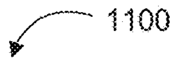

1102
Display, via the display generation component, a first previously captured media object including one or more first images, wherein the first previously captured media object was recorded and stored with first depth data corresponding to a first physical environment captured in each of the one or more first images 1104
While displaying the first previously captured media object, receiving a first user request, via the one or more input devices, to add a first virtual object to the first previously captured media object 1106
In response to the first user request to add the first virtual object to the first previously captured media object, display the first virtual object over at least a portion of a respective image in the first previously captured media object, wherein the first virtual object is displayed with at least a first position or orientation that is determined using the first depth data that corresponds to the respective image in the first previously captured media object 1108
Displaying the first virtual object over at least a portion of a respective image in the first previously captured media object includes: after the first virtual object is placed on a respective one of the one or more first images, displaying first movement of the first virtual object relative to a first physical surface captured in the first previously captured media object, wherein the first movement of the first virtual object is constrained by a first simulated surface corresponding to the first physical surface that is determined based on the depth data and a simulated direction of gravity 1110
Displaying the first virtual object over at least a portion of a respective image in the first previously captured media object includes: after the first virtual object is placed on a respective one of the one or more first images, displaying a change in shape of the first virtual object in accordance with a first physical surface captured in the first previously captured media object, wherein the change in shape of the first virtual object is constrained by a first simulated surface corresponding to the first physical surface that is determined based on the first depth data

Figure 11A

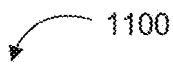

1112

While displaying the first virtual object over at least a portion of a respective image in the first previously captured media object, detect a second user request to switch from displaying the first previously captured media object to displaying a second previously captured media object, wherein the second previously captured media object includes one or more second images, and the second previously captured media object was recorded and stored with second depth data corresponding to a second physical environment captured in each of the one or more second images;

In response to receiving the second user request to switch from displaying the first previously captured media object to displaying the second previously captured media object:

replace display of the first previously captured media object with display of the second previously captured media; and display the first virtual object over at least a portion of a respective image in the second previously captured media object, wherein the first virtual object is displayed with at least a second position or orientation that is determined based on the first position or orientation of the first virtual object in the respective image of the first previously captured media object, and based on the second depth data that corresponds to the respective image in the second previously captured media object

1114

The first user request is a request to add multiple instances of a first type of virtual objects to the previously captured media object over time, and the first virtual object is one of the multiple instances of the first type of virtual objects added to the first previously captured media object, and the method further includes:

in response to receiving the second user request to switch from displaying the first previously captured media object to displaying the second previously captured media object:

display a second virtual object over at least a portion of a respective image in the second previously captured media object, wherein:

the second virtual object is an instance of the first type of virtual objects that is distinct from the first virtual object and that was not added to the first previously captured media object, and the second virtual object is displayed with at least a third position or orientation that is determined using the second depth data that corresponds to the respective image in the second previously captured media object

1116

The first previously captured media object and the second previously captured media object are two distinct still images recorded and stored with different depth data corresponding to different physical environments and/or different views of the same physical environment

Figure 11B

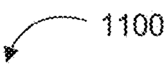

1118

The first previously captured media object is a video including a sequence of consecutive image frames, and displaying the first virtual object over at least a portion of a respective image in the first previously captured media object includes:

during playback of the first previously captured media object:

while displaying a first image frame of the first previously captured media object, displaying the first virtual object over a first portion of the first image frame, wherein the first virtual object is displayed with a position or orientation that is determined in accordance with a portion of the first depth data that corresponds to the first image frame of the first previously captured media object; and while displaying a second image frame of the first previously captured media object immediately after displaying the first image frame, display the first virtual object over a second portion of the second image frame, wherein the first virtual object is displayed with a position or orientation that is determined in accordance with the position or orientation of the first virtual object in the first image frame and in accordance with a portion of the first depth data that corresponds to the second image frame of the first previously captured media object

1120

Displaying the first previously captured media object includes playing the video in accordance with a first timeline that includes at least one of looping, fast forward, or reversal of the sequence of consecutive image frames; and displaying the first virtual object over at least a portion of a respective image in the first previously captured media object includes:

during playback of the video in accordance with the first timeline, displaying changes in position or orientation of the first virtual object in accordance with a forward timeline that is associated with an actual order of the sequence of image frames displayed during the playback of the video

1122

Displaying the first virtual object over at least a portion of a respective image in the first previously captured media object includes: while the first virtual object is placed on a respective one of the one or more first images, displaying a shadow of the first virtual object in accordance with a first physical surface captured in the first previously captured media object, wherein the shadow of the first virtual object is constrained by a first simulated surface corresponding to the first physical surface that is determined based on the first depth data

Figure 11C

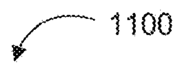

1124
The first user request is a user request to place a virtual first textual object at a first location in a respective image in the first previously captured media object 1126
Receive a user input to update the virtual first textual object, including adding a first virtual letter to the virtual first textual object; and in response to receiving the user input, display the first virtual letter at a second location in the respective image in the first previously captured media object adjacent to a preceding virtual letter in the virtual first textual object and in accordance with a portion of the first depth data corresponding to the second location in the respective image 1128
Displaying the first virtual object over at least a portion of a respective image in the first previously captured media object includes:

in accordance with a determination that a simulated surface proximate to a current location of the first virtual object in the respective image is a horizontal surface, displaying the first virtual object on top of the horizontal surface; and in accordance with a determination that a simulated surface proximate to the current location of the first virtual object in the respective image is a vertical surface, displaying the first virtual object in front of the vertical surface 1130
Displaying the first virtual object over at least a portion of a respective image in the first previously captured media object includes: in accordance with a determination that the respective image includes a first simulated surface and a second simulated surface with different depths in proximity to a current location of the first virtual object in the respective image, displaying the first virtual object at a depth between the first simulated surface and the second simulated surface

Figure 11D

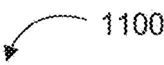

1132

Detect an object positioning input by a contact on a touch-sensitive surface that is directed to the first virtual object, the object positioning input specifies a placement location for the first virtual object on the respective image corresponding to a final location of the contact on the touch-sensitive surface;

in response to detecting the object positioning input, place the first virtual object at the placement location on the respective image in accordance with the object positioning input;

while the first virtual object is displayed at the placement location on the respective image, detecting termination of the object positioning input, including detecting lift-off of the contact from the touch-sensitive surface; and in response to detecting the termination of the object positioning input, move the first virtual object from the placement location to a final location in accordance with the depth data corresponding to a portion of the physical environment surrounding the placement location and in accordance with one or more simulated physical properties of the portion of the physical environment and the first virtual object

1134

The first virtual object includes a simulated spotlight, and displaying the first virtual object over at least a portion of a respective image in the first previously captured media object includes:

displaying, in the respective image, a simulated light beam with a simulated three-dimensional shape, wherein the simulated three-dimensional shape remains constant with movement of the simulated light beam in the respective image; and displaying, in the respective image, a simulated illumination spot with a two-dimensional shape, wherein the two-dimensional shape changes in accordance with the movement of the simulated light beam in the respective image and in accordance with relative spatial relationship between the simulated light beam and a simulated intersecting surface corresponding to a physical surface in the physical environment as determined based on the first depth data

1136

The first virtual object includes a graphical object, and displaying the first virtual object over at least a portion of a respective image in the first previously captured media object includes displaying the graphical object at a location in the respective image that corresponds to free space in the physical environment

Figure 11E

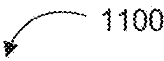

1138
Detect two concurrent contacts on the touch-sensitive surface; and in response to detecting the two concurrent contacts, displaying a first measurement object with two respective ends located at respective locations on the respective image corresponding to respective locations of the two concurrent contacts on the touch-sensitive surface 1140
Displaying the first measurement object includes: in accordance with a determination that the two respective ends of the first measurement object are located on two sides of a simulated foreground surface corresponding to a physical surface captured in the respective image, displaying a first portion of the first measurement object located on a first side of the simulated foreground surface with a first appearance, and displaying a second portion, distinct from the first portion, of the first measurement object located on a second side, distinct from the first side, of the simulated foreground surface with a second appearance, wherein the second appearance is different from the first appearance 1142
Displaying the first measurement object includes:

while displaying the first measurement object with a first end and a second end in the respective image, detecting a positioning input by a contact on the touch-sensitive surface, wherein the positioning input specifies a new end location of the first measurement object in the respective image; and in response to detecting the positioning input by the contact, moving one of the first and second ends of the first measurement object that is closer to the new end location to the new end location in the respective image as specified by the positioning input

Figure 11F

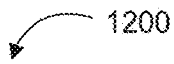

1202
Send a request to a remote device to initiate a shared annotation session with a second device that includes a second display generation component, a second set of one or more input devices, and a second set of one or more cameras 1204
In response to sending the request to initiate the shared annotation session with the second device, receive an indication of acceptance of the request to initiate the shared annotation session 1206
In response to receiving the indication of acceptance of the request to initiate the shared annotation session, display, via the first display generation component, a first prompt to move the first device toward the second device 1208
After displaying the first prompt, in accordance with a determination that connection criteria for the first device and the second device are met, display a representation of a field of view of the first set of cameras in the shared annotation session with the second device, wherein:

the connection criteria require that at least a portion of the field of view of the first device and a portion of a field of view of the second device correspond to a same portion of physical environment surrounding the first and second devices, and during the shared annotation session, one or more first virtual annotations corresponding to annotation input directed to a respective location in the physical environment by the first device is displayed via the first display generation component and one or more second virtual annotations corresponding to annotation input directed to the respective location in the physical environment by the second device is displayed via the first display generation component, provided that the respective location is included in the field of view of the first set of cameras

Figure 12A

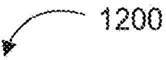

1210
During the shared annotation session, the one or more first virtual annotations corresponding to the annotation input directed to the respective location in the physical environment by the first device is displayed via the second display generation component and the one or more second virtual annotations corresponding to the annotation input directed to the respective location in the physical environment by the second device is displayed via the second display generation component, provided that the respective location is included in the field of view of the second set of cameras 1212
During the shared annotation session, the one or more first virtual annotations corresponding to the annotation input directed to the respective location in the physical environment by the first device is displayed via the second display generation component and not via the first display generation component, provided that the respective location is included in the field of view of the second set of cameras and not included in the field of view of the first set of cameras 1214
After displaying the first prompt, in accordance with a determination that the connection criteria for the first device and the second device are met, displaying a notification in the representation of the field of view of the first set of cameras that the shared annotation session with the second device has been established 1216
The first prompt includes an animation illustrating representations of the first and second devices moving toward each other 1218
After displaying the first prompt, in accordance with a determination that the connection criteria for the first device and the second device are met, replace display of the first prompt with the representation of the field of view of the first set of cameras

Figure 12B

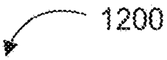

1220
During the shared annotation session: while displaying, via the first display generation component, the representation of the field of view of the first set of cameras, in accordance with a determination that a first annotation input directed to a portion of the physical environment captured in the field of view of the first set of cameras is received from the second device, display an avatar of the second device at a location in the representation of the field of view of the first set of cameras that corresponds to a location to which the first annotation input is directed 1222
During the shared annotation session:
while displaying, via the first display generation component, the representation of the field of view of the first set of cameras, displaying a virtual object in the representation of the field of view of the first set of cameras with a location that corresponds to a current location of the second device, including:
detect movement of the second device from a first location to a second location in the physical environment; and
display movement of the virtual object in the representation of the field of view of the first set of cameras that corresponds to the movement of the second device from the first location to the second location in the physical environment, provided that the first location and the second location are within the field of view of the first set of cameras during the movement of the second device from the first location to the second location in the physical environment 1224
During the shared annotation session, the first device displays the representation of the field of view of the first set of cameras via the first display generation component and the second device displays the representation of the field of view of the first set of cameras via the second display generation component 1226
During the shared annotation session, the first device displays the representation of the field of view of the first set of cameras via the first display generation component and the second device displays the representation of the field of view of the second set of cameras via the second display generation component

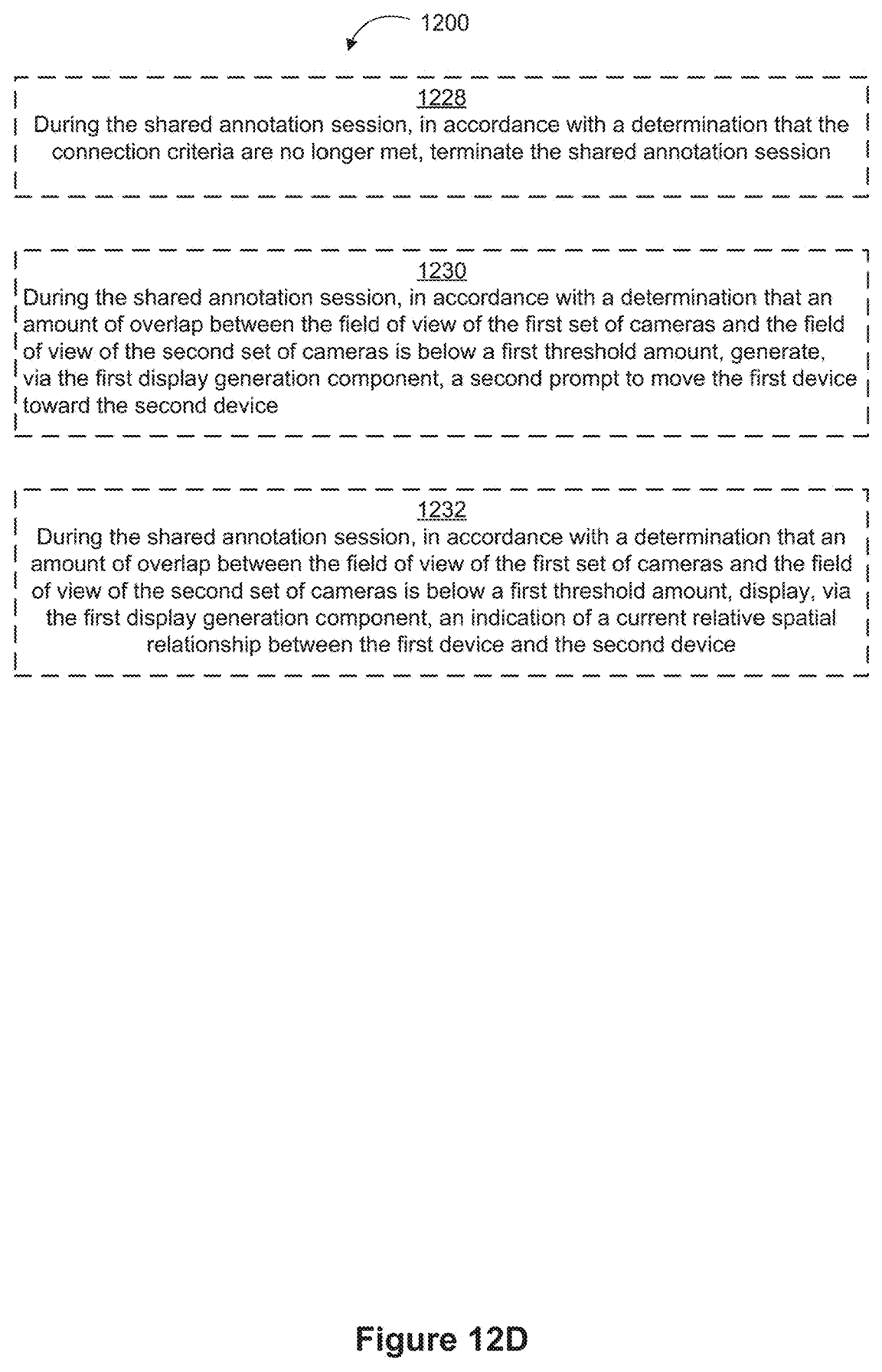

1228
During the shared annotation session, in accordance with a determination that the connection criteria are no longer met, terminate the shared annotation session 1230
During the shared annotation session, in accordance with a determination that an amount of overlap between the field of view of the first set of cameras and the field of view of the second set of cameras is below a first threshold amount, generate, via the first display generation component, a second prompt to move the first device toward the second device 1232
During the shared annotation session, in accordance with a determination that an amount of overlap between the field of view of the first set of cameras and the field of view of the second set of cameras is below a first threshold amount, display, via the first display generation component, an indication of a current relative spatial relationship between the first device and the second device

Figure 12D

DEVICES, METHODS, AND GRAPHICAL USER INTERFACES FOR DEPTH-BASED ANNOTATION

RELATED APPLICATION

This application is a continuation of U.S. application Ser. No. 18/388,176, filed Nov. 8, 2023, which is a continuation of U.S. application Ser. No. 18/107,381, filed Feb. 8, 2023, now U.S. Pat. No. 11,818,455, which is a continuation of U.S. application Ser. No. 17/716,984, filed Apr. 8, 2022, now U.S. Pat. No. 11,632,600, which is a continuation of U.S. application Ser. No. 16/997,860, filed Aug. 19, 2020, now U.S. Pat. No. 11,303,812, which is a continuation of U.S. application Ser. No. 16/574,029, filed Sep. 17, 2019, now U.S. Pat. No. 10,785,413, which claims priority to U.S. Provisional Application No. 62/739,178, filed Sep. 29, 2018, which are incorporated by reference in their entirety.

TECHNICAL FIELD

This relates generally to electronic devices that display images of a physical environment, including but not limited to electronic devices that display an annotation at a spatial location in an image that corresponds to a spatial location in a physical environment captured in an image.

BACKGROUND

The development of computer systems for augmented media has increased significantly in recent years. Examples of augmented media include augmented reality environments that include at least some virtual elements that replace or augment the physical world and augmented stored media that include at least some virtual elements that replace or augment stored media, such as image and video content. Input devices, such as touch-sensitive surfaces, for computer systems and other electronic computing devices are used to augment media. Example touch-sensitive surfaces include touchpads, touch-sensitive remote controls, and touch-screen displays. Such surfaces are used to manipulate user interfaces and objects therein on a display. Example user interface objects include digital images, video, text, icons, and control elements such as buttons and other graphics.

But methods and interfaces for augmenting media are cumbersome, inefficient, and limited. For example, augmentations such as user-input annotations that have a fixed spatial position relative to a portion of physical environment may be difficult for a user to locate when a current camera view of the user's device does not correspond to the portion of the physical environment. Searching for an augmentation creates a significant cognitive burden on a user, and detracts from the experience with the augmented media. Additionally, providing augmentation input for stored media (e.g., a previously captured video) is time intensive when augmentation input must be provided separately for various portions of the stored media. In addition, these methods take longer than necessary, thereby wasting energy. This latter consideration is particularly important in battery-operated devices.

SUMMARY

Accordingly, there is a need for computer systems with improved methods and interfaces for augmenting media data. Such methods and interfaces optionally complement or replace conventional methods for augmenting media data. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with interfaces for augmenting media data with virtual objects and/or annotation input are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system having a display generation component, one or more input devices, and one or more cameras. The method includes displaying, via the display generation component, a first user interface region that includes a representation of a field of view of the one or more cameras that is updated with changes in the field of view of the one or more cameras over time. The method further includes, while displaying the first user interface region including the representation of the field of view of the one or more cameras, receiving, via the one or more input devices, a first request to add an annotation to the displayed representation of the field of view of the one or more cameras. The method further includes, in response to the first request to add an annotation to the displayed representation of the field of view of the one or more cameras: replacing display of the representation of the field of view of the one or more cameras in the first user interface region with a still image of the field of view of the one or more cameras captured at a time corresponding to the receiving of the first request to add the annotation. The method further includes, while displaying the still image in the first user interface region, receiving, via the one or more input devices, a first annotation on a first portion of the still image, wherein the first portion of the still image corresponds to a first portion of a physical environment captured in the still image. The method further includes, while displaying the first annotation on the first portion of the still image in the first user interface region, receiving, via the one or more input devices, a first request to re-display the representation of the field of view of the one or more cameras in the first user interface region. The method further includes, in response to receiving the first request to re-display the representation of the field of view of the one or more cameras in the first user interface region: replacing display of the still image with the representation of the field of view of the one or more cameras in the first user interface region. The method further includes, in accordance with a determination that the first portion of the physical environment captured in the still image is currently outside of the field of view of the one or more cameras, displaying, concurrently with the representation of the field of view of the one or more cameras, an indication of a current spatial relationship of the one or more cameras relative to the first portion of the physical environment captured in the still image; and in accordance with a determination that the first portion of the physical environment captured in the still image is currently within the field of view of the one or more cameras, forgoing display of the indication.

In accordance with some embodiments, a method is performed at a computer system having a display generation component and one or more input devices. The method includes displaying, via the display generation component, a user interface that includes a video playback region. The method further includes, while displaying playback of a first portion of a video in the video playback region, receiving, via the one or more input devices, a request to add an annotation to the video playback. The method further includes, in response to receiving the request to add the annotation: pausing playback of the video at a first position in the video; and displaying a still image that corresponds to the first, paused position of the video. The method further includes, while displaying the still image, receiving, via the one or more input devices, an annotation on a first portion of a physical environment captured in the still image. The method further includes, after receiving the annotation, displaying, in the video playback region, a second portion of the video that corresponds to a second position in the video, distinct from the first position in the video, wherein the first portion of the physical environment is captured in the second portion of the video and the annotation is displayed in the second portion of the video.

In accordance with some embodiments, a method is performed at a computer system having a display generation component and one or more input devices. The method includes displaying, via the display generation component, a first previously captured media object including one or more first images, wherein the first previously captured media object was recorded and stored with first depth data corresponding to a first physical environment captured in each of the one or more first images. The method further includes, while displaying the first previously captured media object, receiving a first user request, via the one or more input devices, to add a first virtual object to the first previously captured media object. The method further includes, in response to the first user request to add the first virtual object to the first previously captured media object, displaying the first virtual object over at least a portion of a respective image in the first previously captured media object, wherein the first virtual object is displayed with at least a first position or orientation that is determined using the first depth data that corresponds to the respective image in the first previously captured media object.

In accordance with some embodiments, a method is performed at a computer system having a display generation component, a first set of one or more input devices, and a first set of one or more cameras. The method includes sending a request to a remote device to initiate a shared annotation session with a second device that includes a second display generation component, a second set of one or more input devices, and a second set of one or more cameras. The method further includes, in response to sending the request to initiate the shared annotation session with the second device, receiving an indication of acceptance of the request to initiate the shared annotation session. The method further includes, in response to receiving the indication of acceptance of the request to initiate the shared annotation session, displaying, via the first display generation component, a first prompt to move the first device toward the second device. The method further includes, after displaying the first prompt, in accordance with a determination that connection criteria for the first device and the second device are met, displaying a representation of a field of view of the first set of cameras in the shared annotation session with the second device, wherein: the connection criteria require that at least a portion of the field of view of the first device and a portion of a field of view of the second device correspond to a same portion of physical environment surrounding the first and second devices. The method further includes displaying, during the shared annotation session, one or more first virtual annotations corresponding to annotation input directed to a respective location in the physical environment by the first device is displayed via the first display generation component and one or more second virtual annotations corresponding to annotation input directed to the respective location in the physical environment by the second device is displayed via the first display generation component, provided that the respective location is included in the field of view of the first set of cameras.

In accordance with some embodiments, an electronic device includes a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, optionally one or more attitude sensors for detecting changes in attitude, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors, cause the device to perform or cause performance of the operations of any of the methods described herein. In accordance with some embodiments, a graphical user interface on an electronic device with a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors for detecting changes in attitude; and means for performing or causing performance of the operations of any of the methods described herein. In accordance with some embodiments, an information processing apparatus, for use in an electronic device with a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors for detecting changes in attitude includes means for performing or causing performance of the operations of any of the methods described herein.

Thus, electronic devices with display generation components, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors, are provided with improved methods and interfaces for displaying virtual objects in a variety of contexts, thereby increasing the effectiveness, efficiency, and user satisfaction with such devices. Such methods and interfaces may complement or replace conventional methods for displaying virtual objects in a variety of contexts.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9F are flow diagrams of a process for relocalizing an annotation, in accordance with some embodiments.

FIGS. 10A-10B are flow diagrams of a process for receiving an annotation on a portion of a physical environment captured in a still image that corresponds to a paused position of a video, in accordance with some embodiments.

FIGS. 11A-11F are flow diagrams of a process for adding a virtual object to a previously captured media object, in accordance with some embodiments.

FIGS. 12A-12D are flow diagrams of a process for initiating a shared annotation session, in accordance with some embodiments.

DESCRIPTION OF EMBODIMENTS

Conventional methods of augmenting media often require multiple separate inputs (e.g., individual annotation of multiple frames and/or placement of augmentations relative to objects in media) to achieve an intended outcome (e.g., annotating a portion of a stored video or a live video feed and/or displaying virtual objects at positions that correspond to surfaces of physical objects in stored media). The embodiments herein provide an intuitive way for a user to augment media such as stored content, still images, and/or live video captured by one or more cameras of a device (e.g., by using depth data stored and/or captured in conjunction with image data to place augmentations and to maintain a fixed spatial relationship between augmentations and portions of a physical environment in a field of view of a camera).

The systems, methods, and GUIs described herein improve user interface interactions for augmenting media in multiple ways. For example, they make it easier to: relocalize an annotation, annotate a video, add virtual objects to previously captured media, and initiate a shared annotation session.

Figure 2:
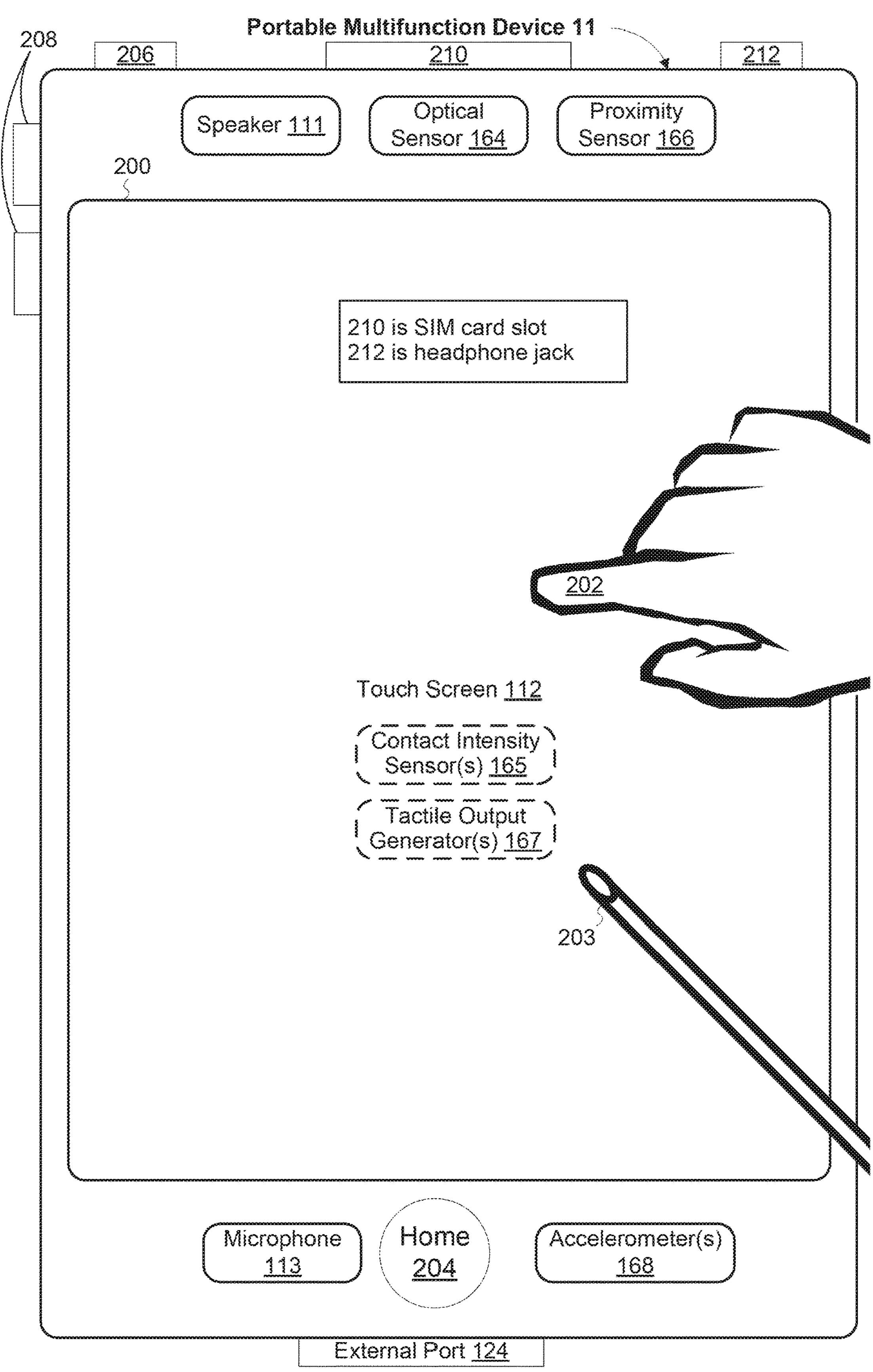
FIG. 2 illustrates a portable multifunction device having a touch screen, in accordance with some embodiments.
Figure 3:
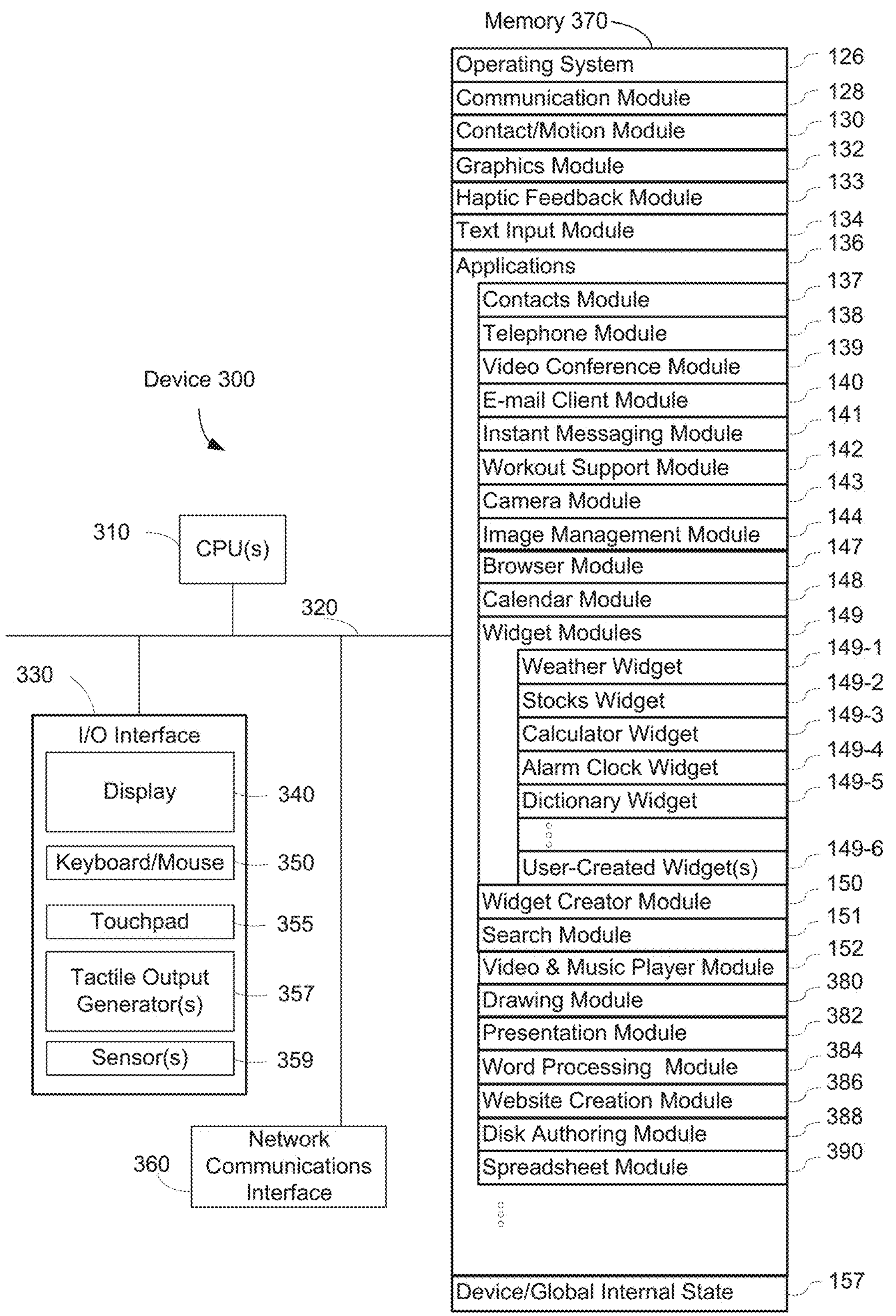
FIG. 3 is a block diagram of an example multifunction device with a display and a touch-sensitive surface, in accordance with some embodiments.
Figure 4A:
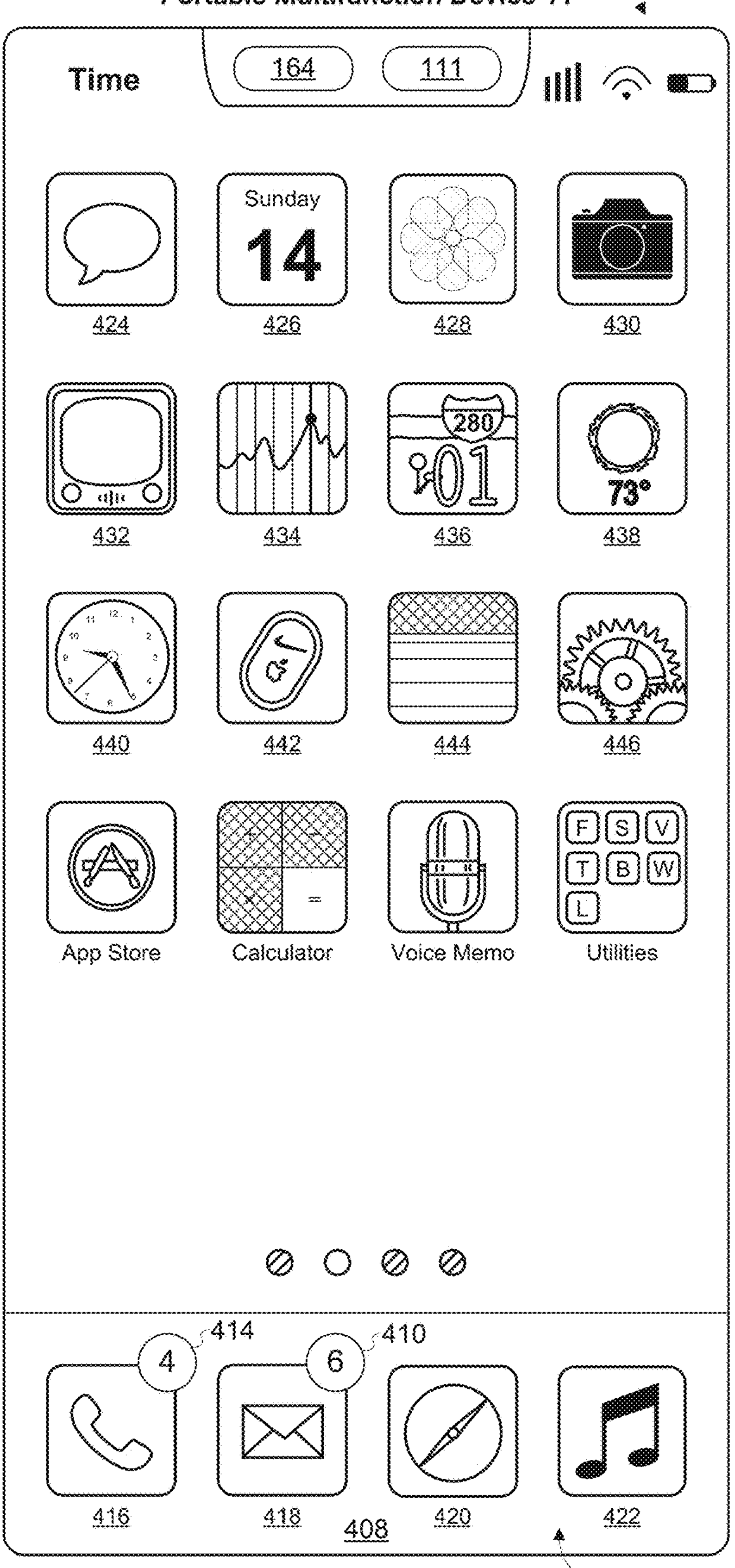
FIG. 4A illustrates an example user interface for a menu of applications on a portable multifunction device, in accordance with some embodiments.
Figure 4B:
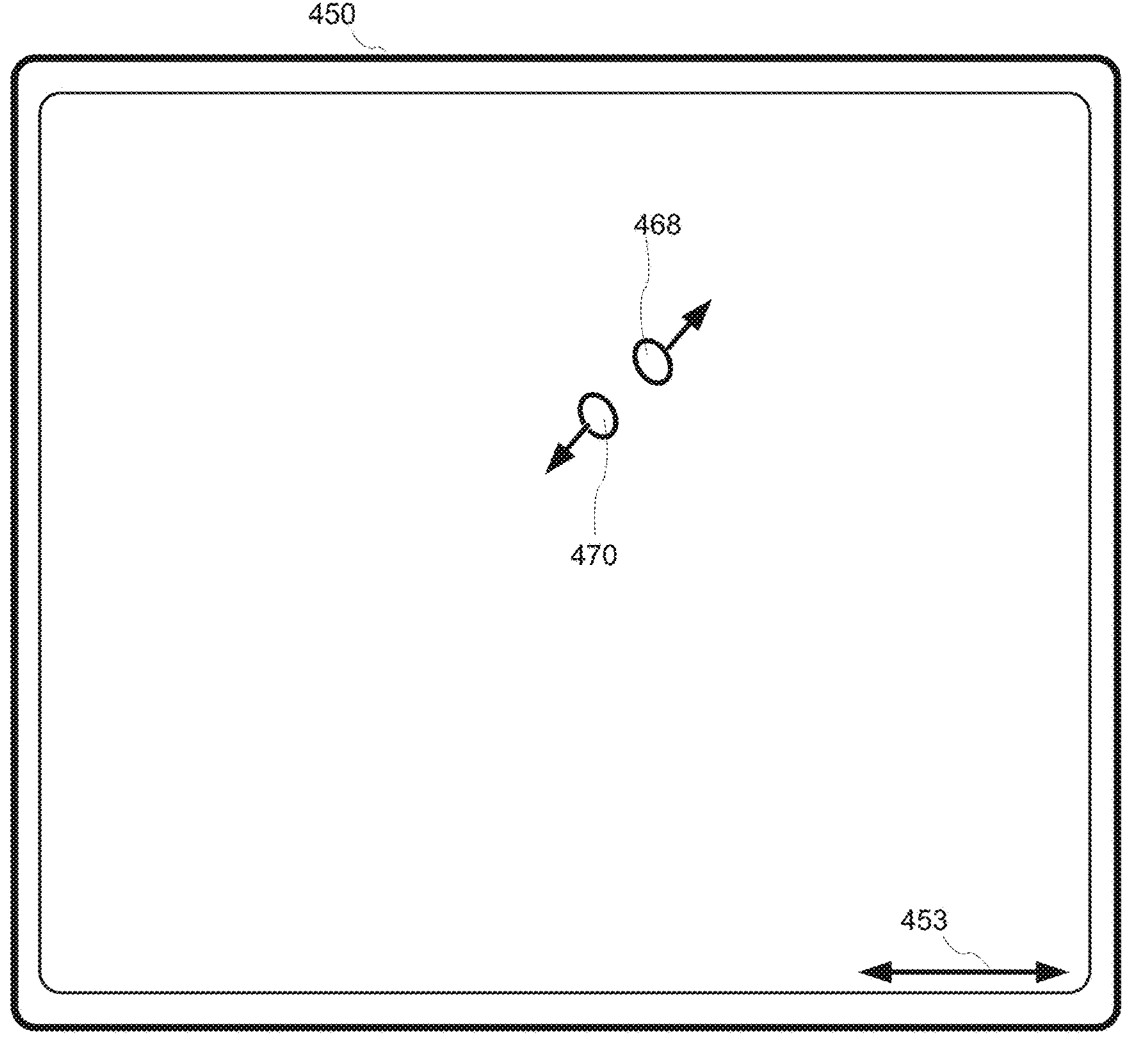
FIG. 4B illustrates an example user interface for a multifunction device with a touch-sensitive surface that is separate from the display, in accordance with some embodiments.
Figure 4B:
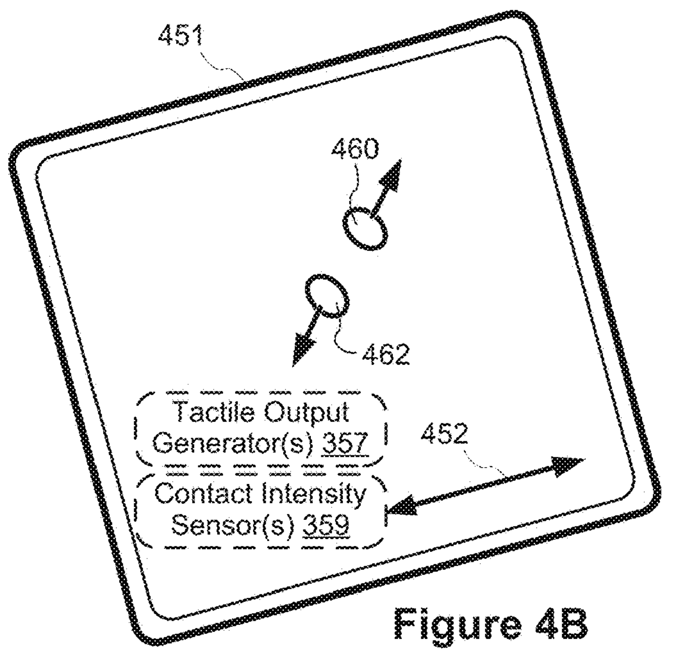
Figure 5A:
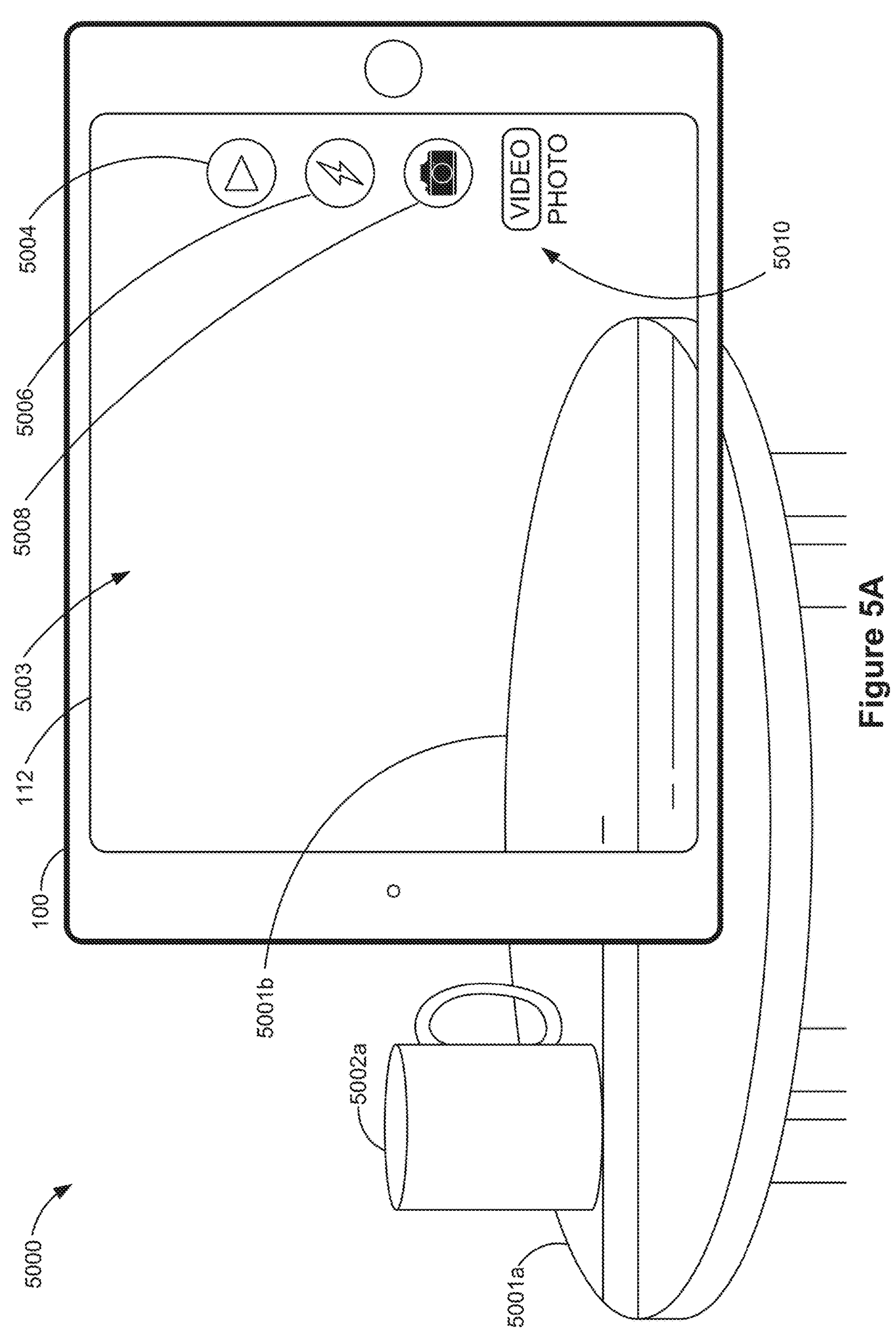
FIGS. 5A-5AF illustrate example user interfaces for relocalizing an annotation, in accordance with some embodiments.

Below, FIGS. 1A-1C, 2, and 3 provide a description of example devices. FIGS. 4A-4B, 5A-5AF, 6A-6N, 7A-7BF, and 8A-8W illustrate example user interfaces for displaying virtual objects in a variety of contexts. FIGS. 9A-9F illustrate a process for relocalizing an annotation. FIGS. 10A-10B illustrate a process for receiving an annotation on a portion of a physical environment captured in a still image that corresponds to a paused position of a video. FIGS. 11A-11F illustrate a process for adding a virtual object to a previously captured media object. FIGS. 12A-12D illustrate a process for initiating a shared annotation session. The user interfaces in 5A-5AF, 6A-6N, 7A-7BF, and 8A-8W are used to illustrate the processes in FIGS. 9A-9F, 10A-10B, 11A-11F, and 12A-12D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
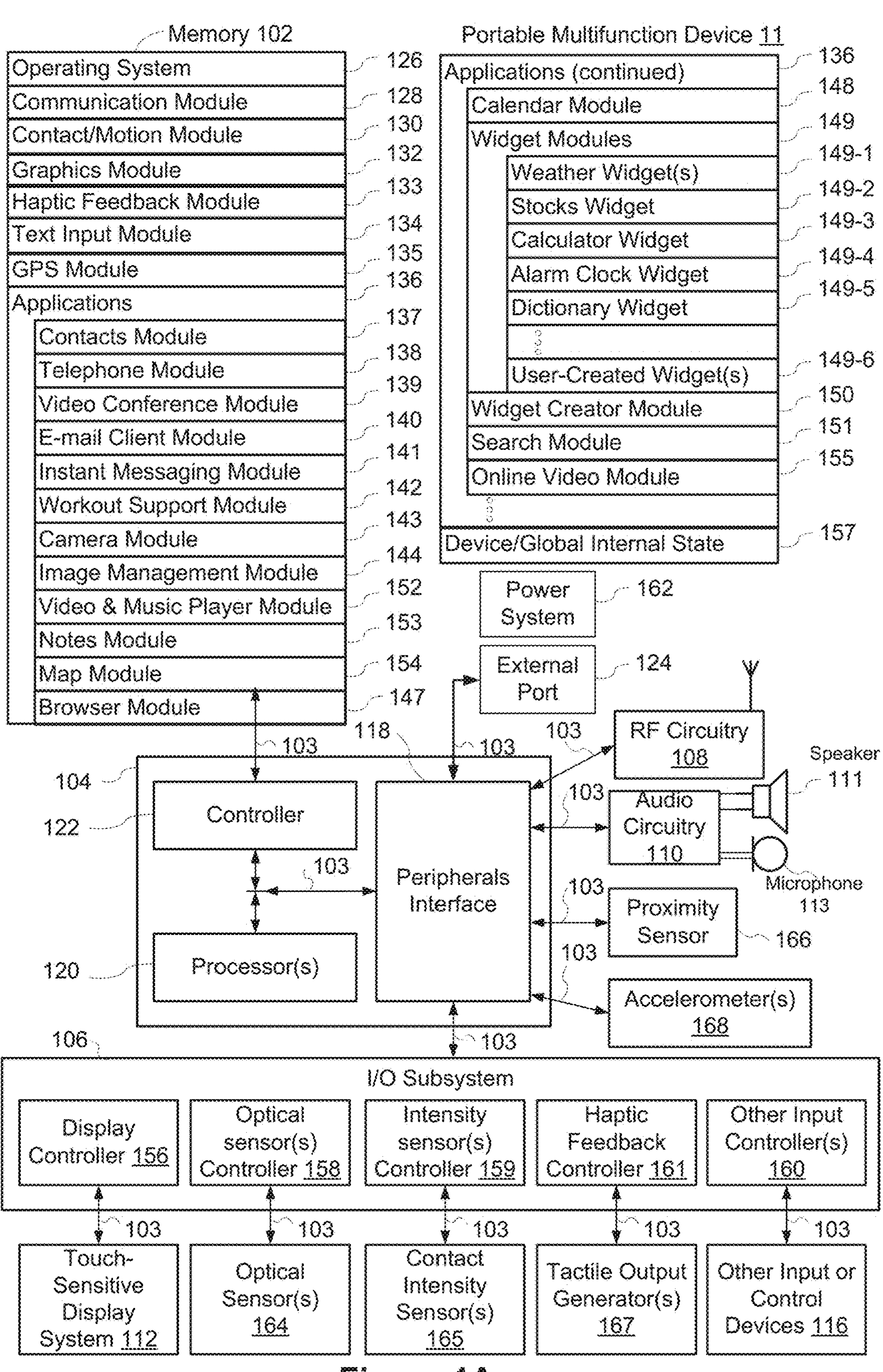
FIG. 1A is a block diagram illustrating a portable multifunction device with a touch-sensitive display, in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
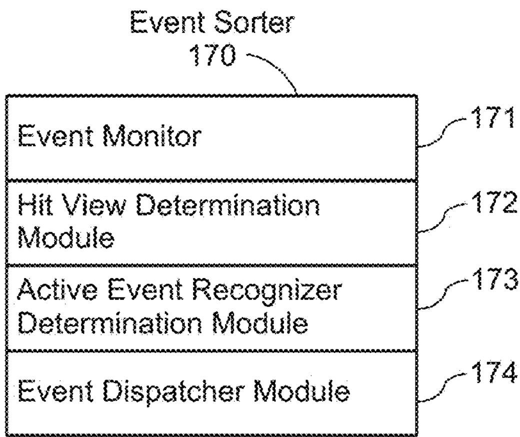
FIG. 1B is a block diagram illustrating example components for event handling, in accordance with some embodiments.
Figure 1B:
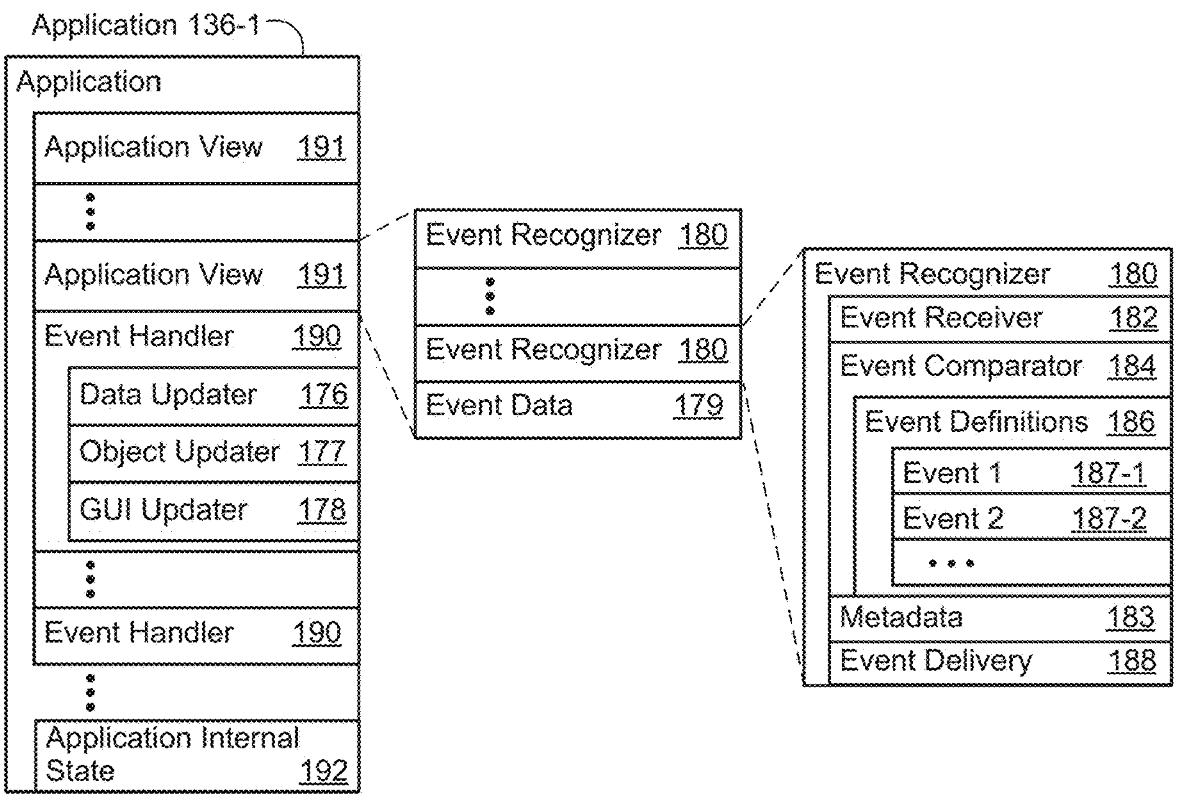

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
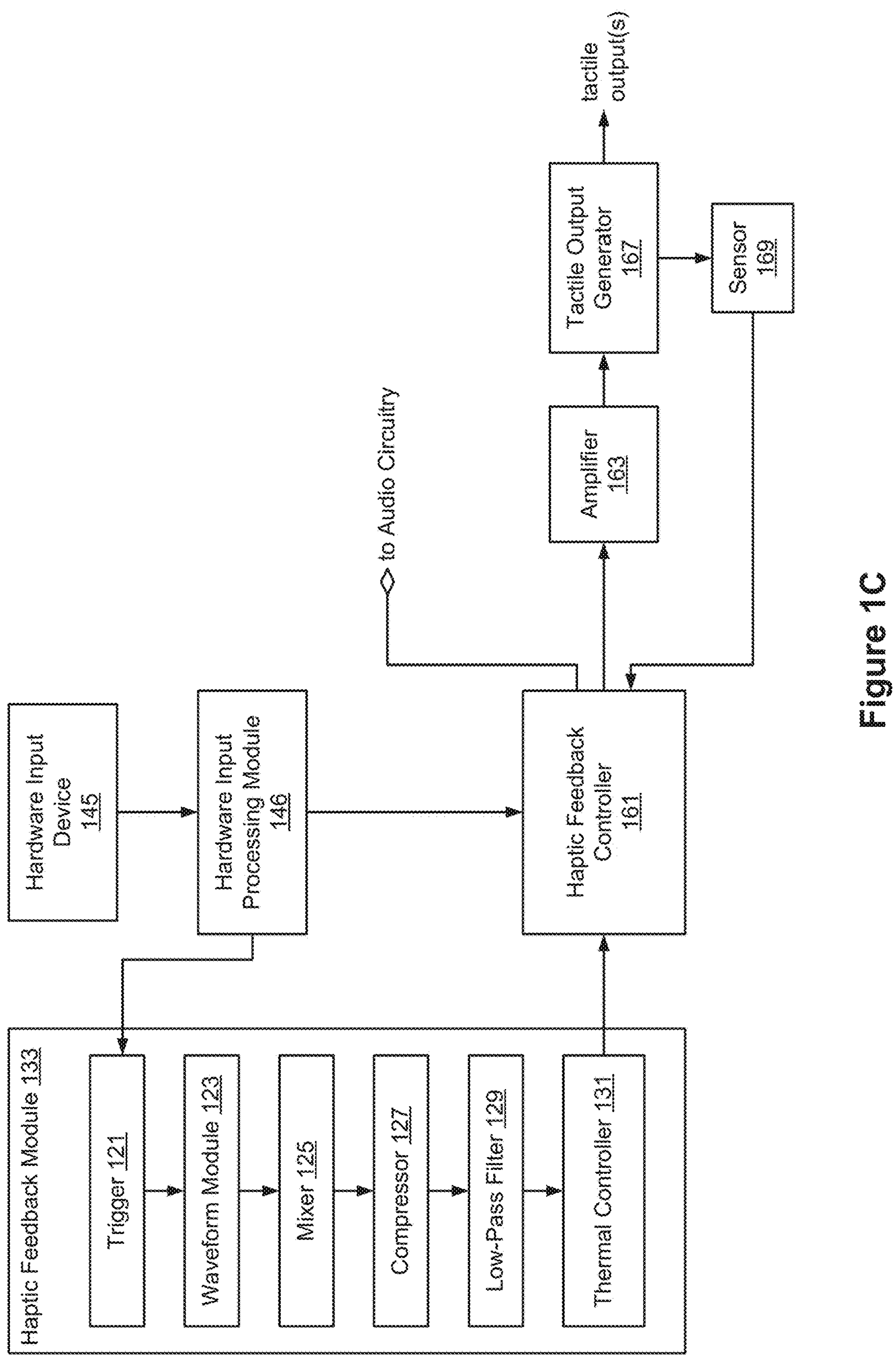
FIG. 1C is a block diagram illustrating a tactile output module, in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, labeled "Music;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
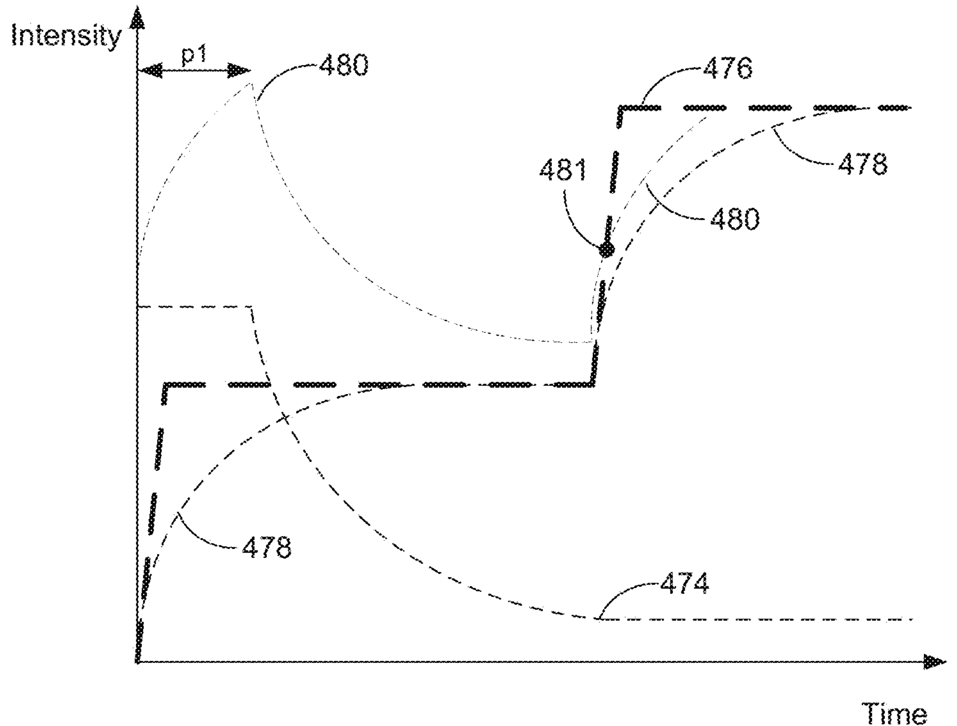
FIGS. 4C-4E illustrate examples of dynamic intensity thresholds, in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
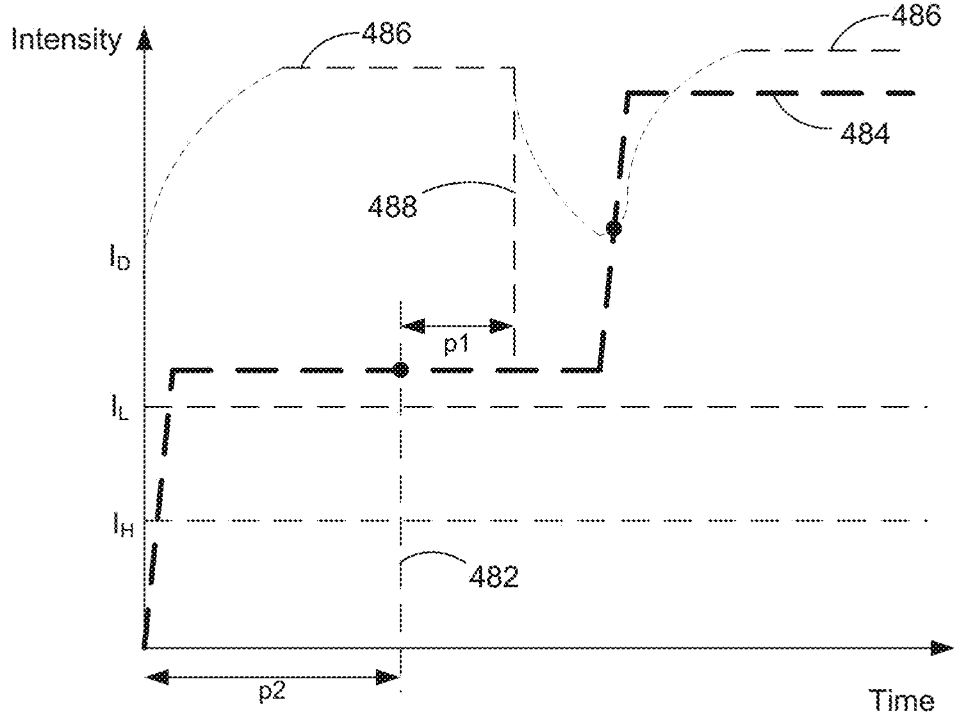

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
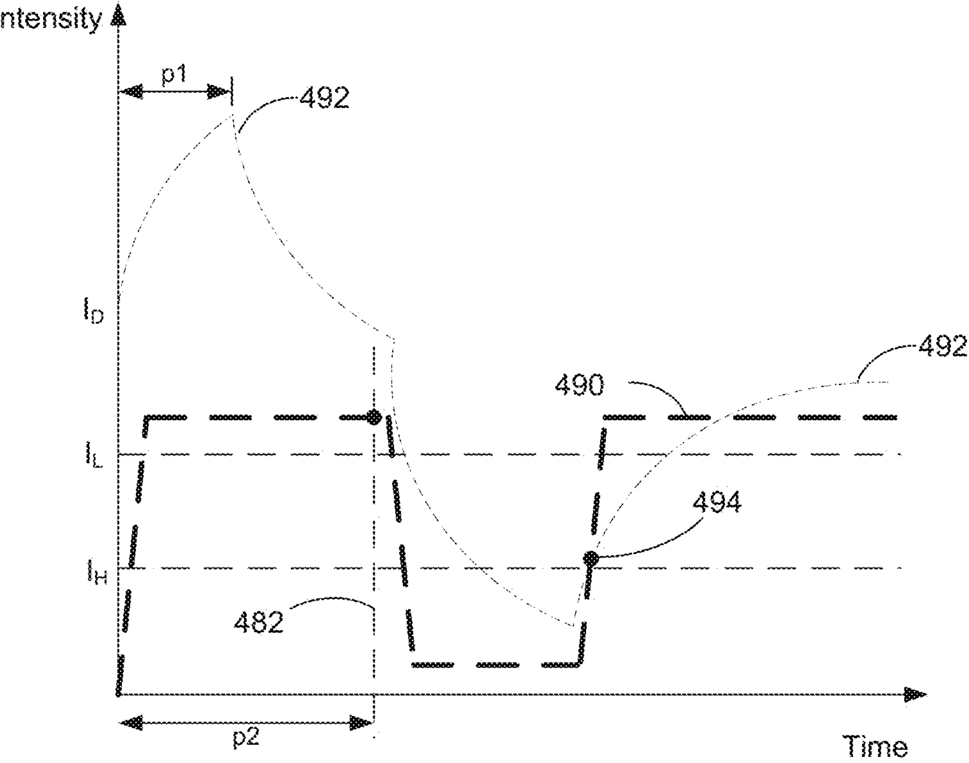

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5AF illustrate example user interfaces for relocalizing an annotation, in accordance with some embodiments. The user interfaces in these figures are used to illustrate the processes described below, including the processes in FIGS. 9A-9F, 10A-10B, 11A-11F, and 12A-12D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5A illustrates an annotation user interface 5003 displayed on touch screen display 112 of the device 100. The user interface displays a field of view of a camera of device 100 as it captures the physical environment 5000 of device 100. Table 5001*a* and mug 5002*a* are located in the physical environment 5000. The camera view, as displayed in user interface 5003, includes visual representation 5001*b* of physical table 5001*a*. User interface 5003 includes a control 5004 for toggling between a still image mode and a video mode, a control 5006 for controlling a camera flash setting, a control 5008 for accessing camera settings, and a mode indicator 5010 that indicates a current mode.

Figure 5B:
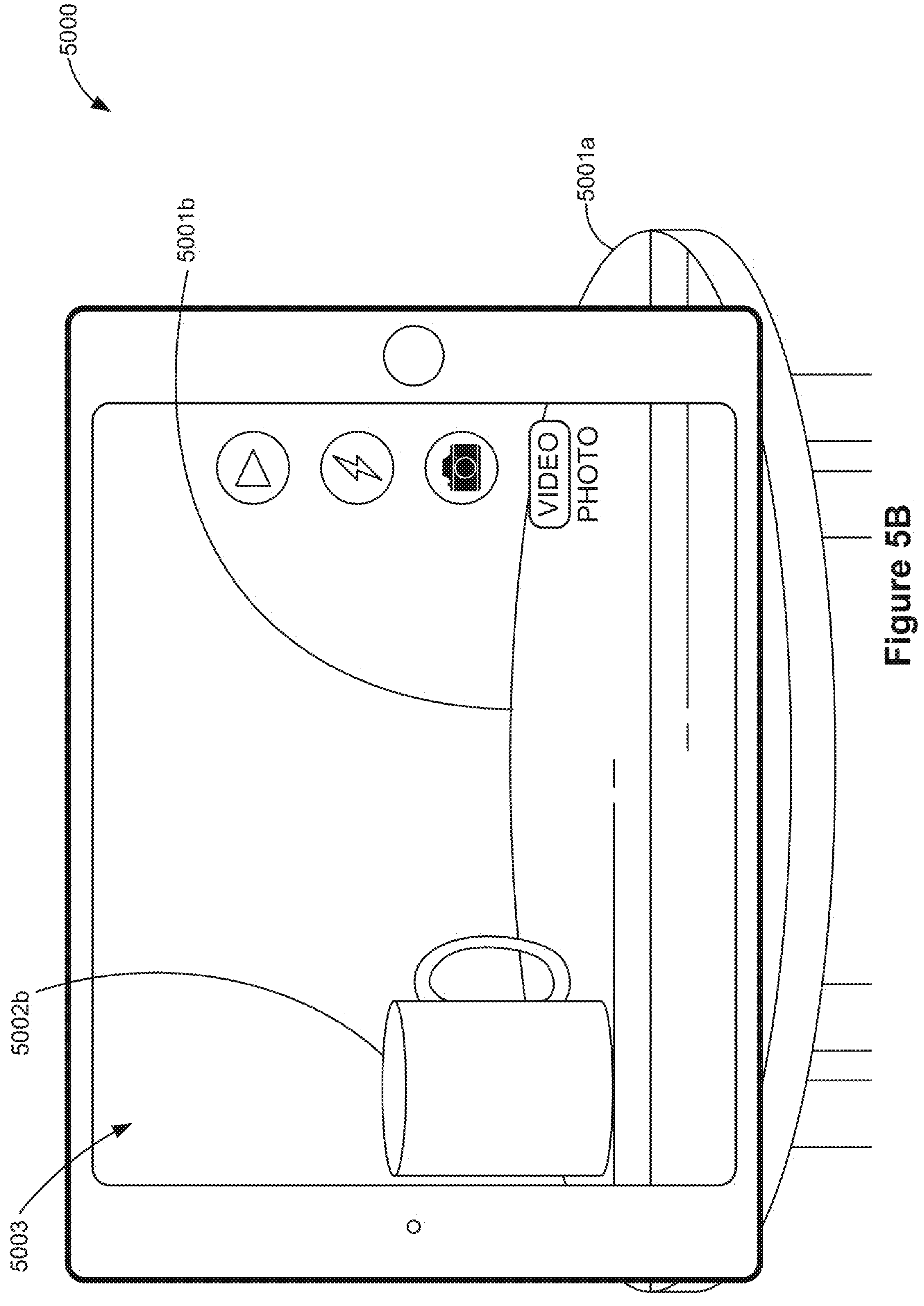

From FIG. 5A to FIG. 5B, the device 100 has moved relative to the physical environment such that the portion of table 5001*b* visible in the field of view camera has changed and such that visual representation 5002*b* of physical mug 5002*a* is now visible in the field of view of the camera.

Figure 5C:
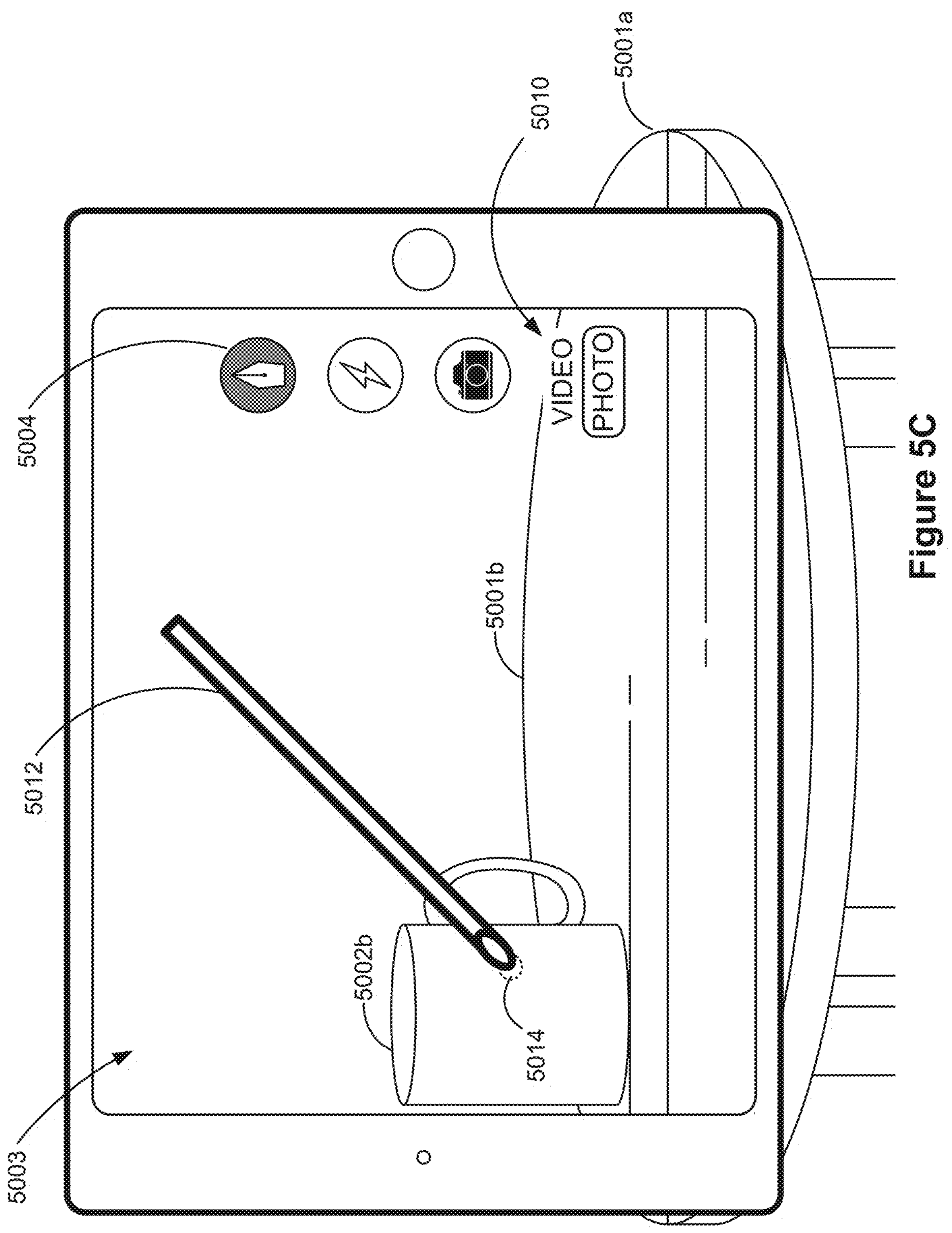

In FIG. 5C, a stylus 5012 has touched down on touchscreen display 112 at a point in the annotation user interface 5003 indicated by contact 5014. In response to detection of the contact 5014, a still image of the field of view of the camera is captured and displayed in user interface 5003. The states of mode control 5004 and mode indicator 5010 have changed to indicate that the active mode of the user interface has changed from a video mode to a still image mode. The transition to a still image mode that occurs in response to touchdown of the stylus (and/or in response to other types of input, as described further below) allows annotation input to be received relative to a view of the physical environment captured by camera(s) 143 without being affected by a change in the spatial relationship between device 100 and physical environment 5000 caused by the movement of device 100.

Figure 5D:
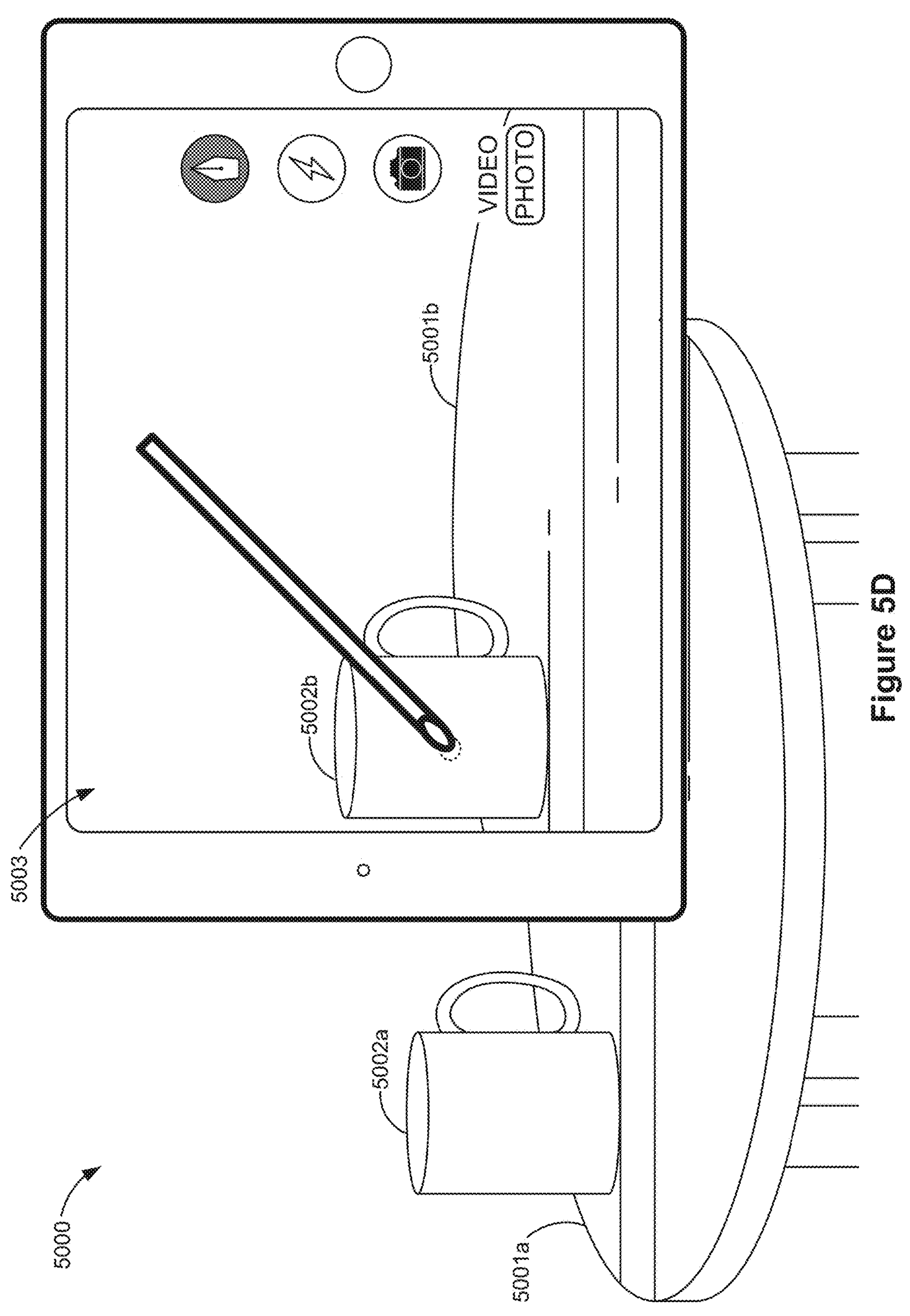

From FIG. 5C to FIG. 5D, the device 100 has moved relative to the physical environment 5000. Because the active mode of the user interface has changed from a video mode to a still image mode, the image displayed by touchscreen display 112 is unchanged from FIG. 5C to FIG. 5D.

Figure 5E:
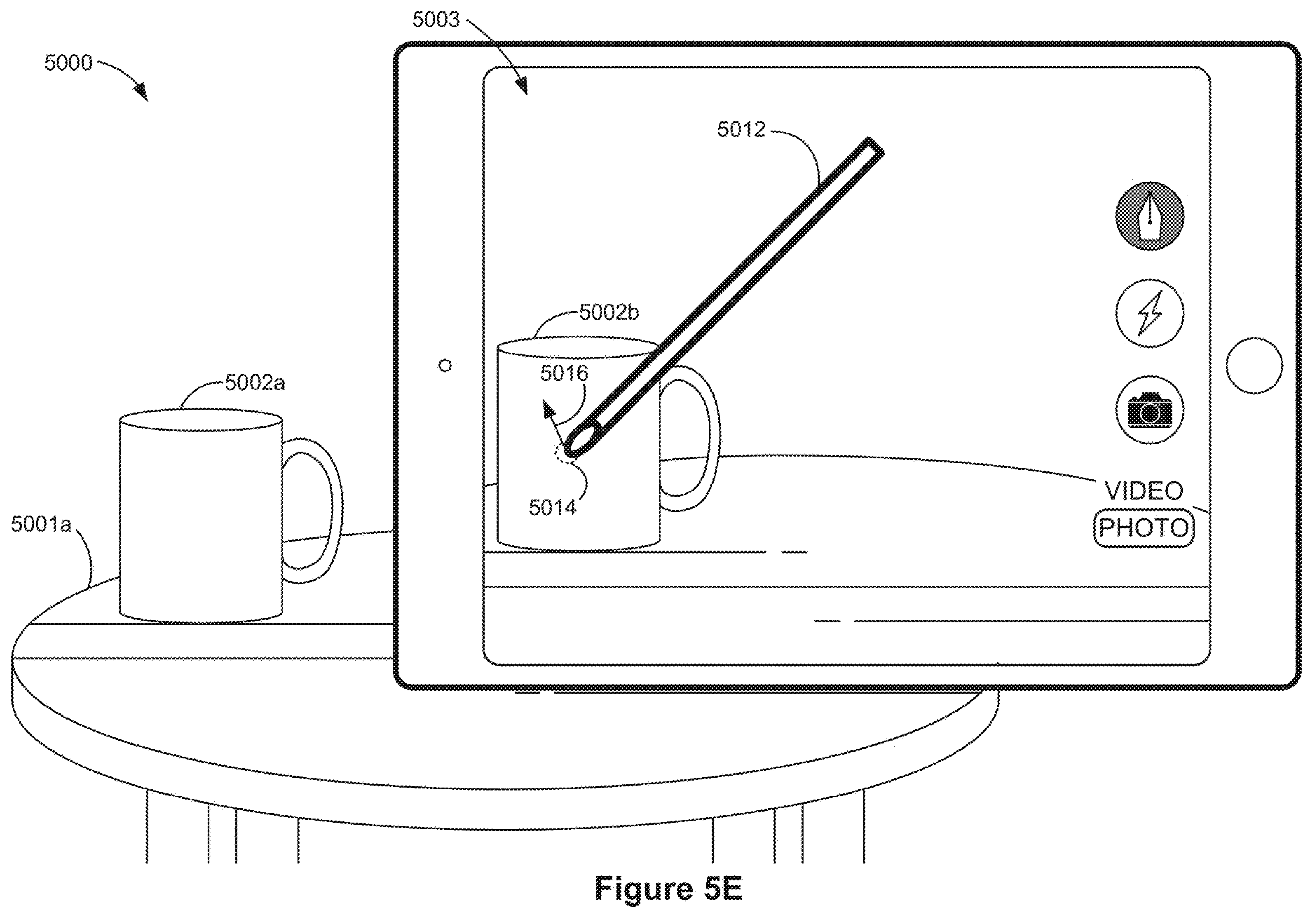
Figure 5F:
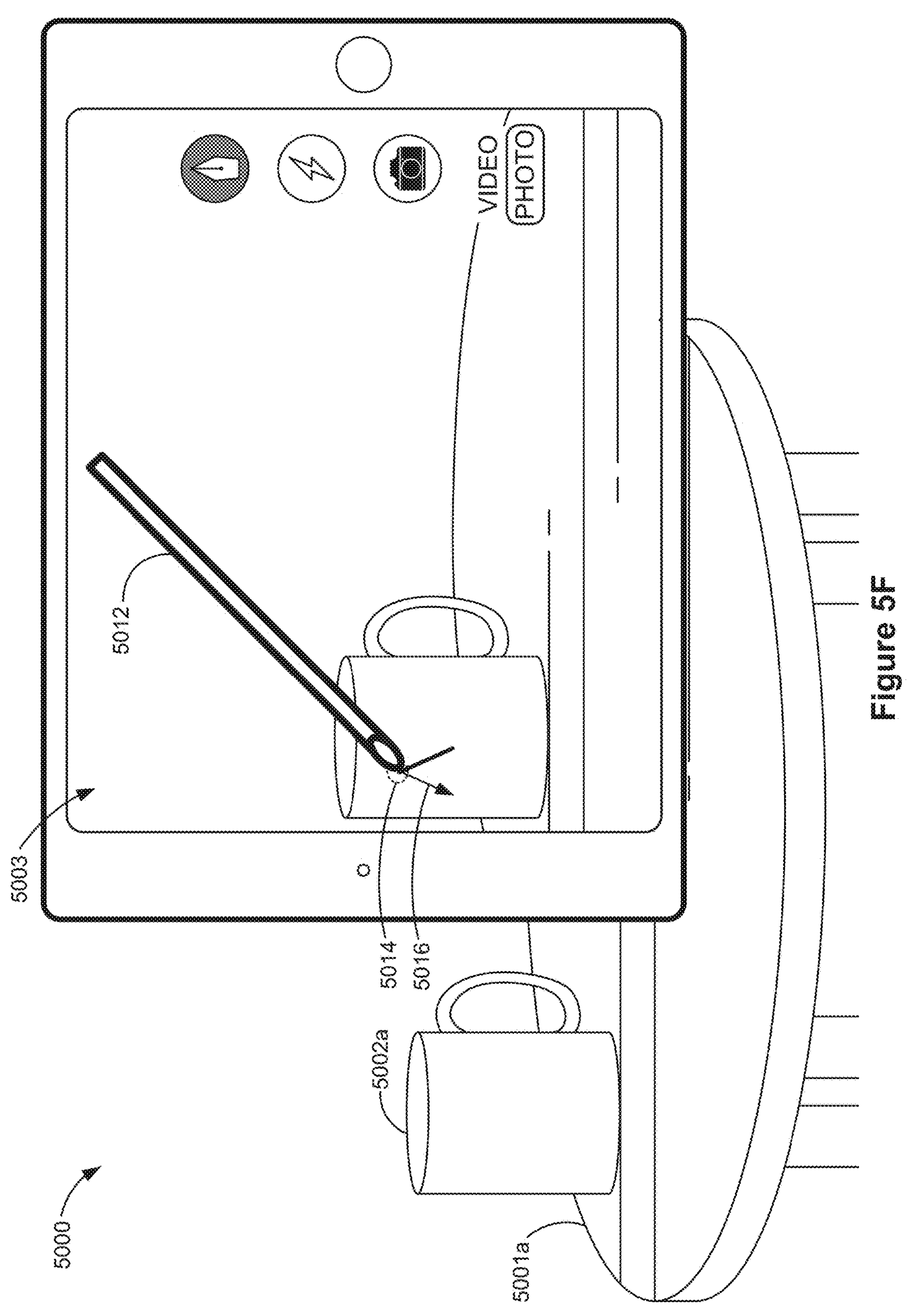
Figure 5G:
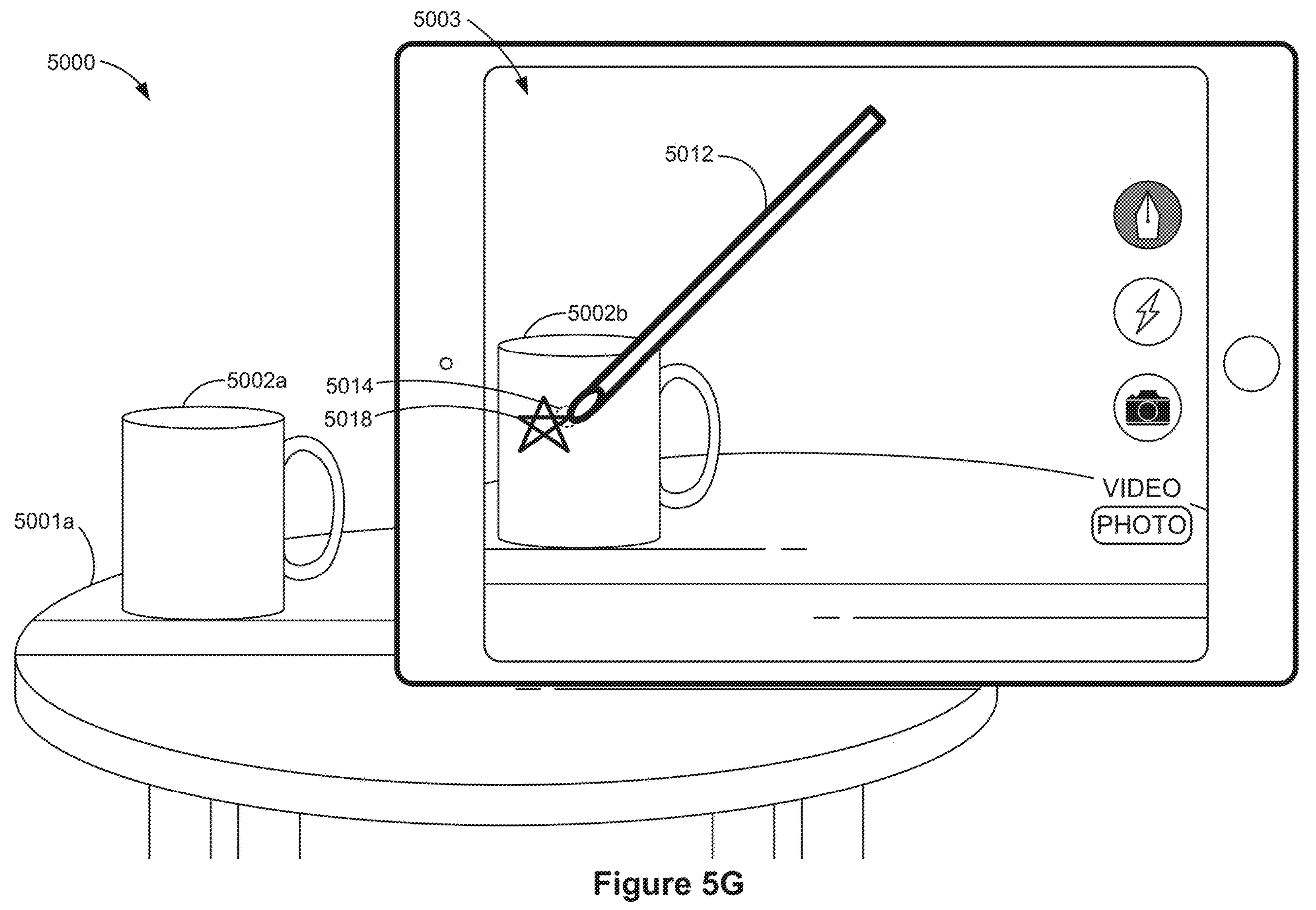

From FIG. 5E to FIG. 5G, contact 5014 moves along a path indicated by arrow 5016, creating a first annotation 5018 at a portion of the still image that includes visual representation 5002*b* of physical mug 5002*a*.

Figure 5H:
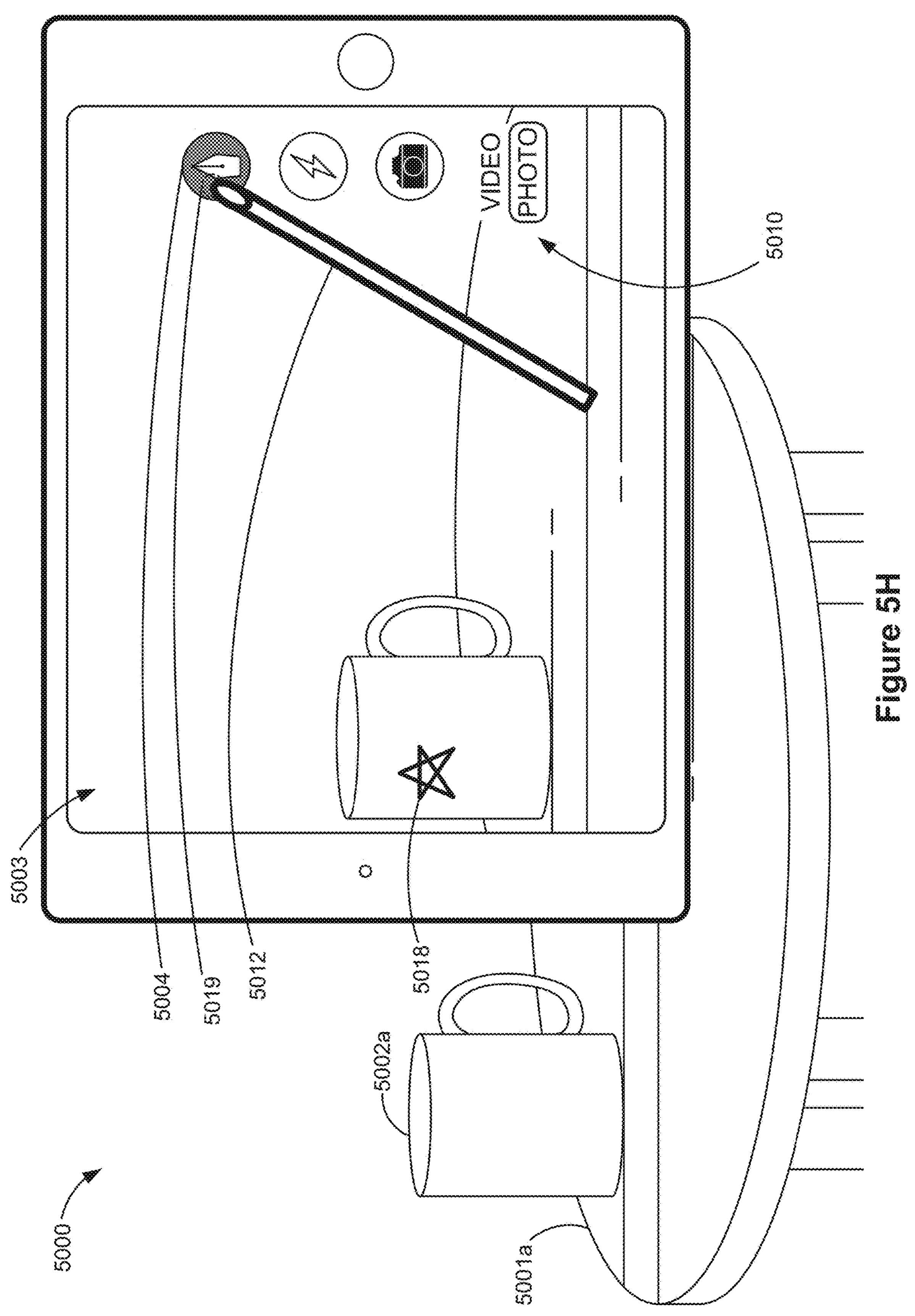
Figure 5I:
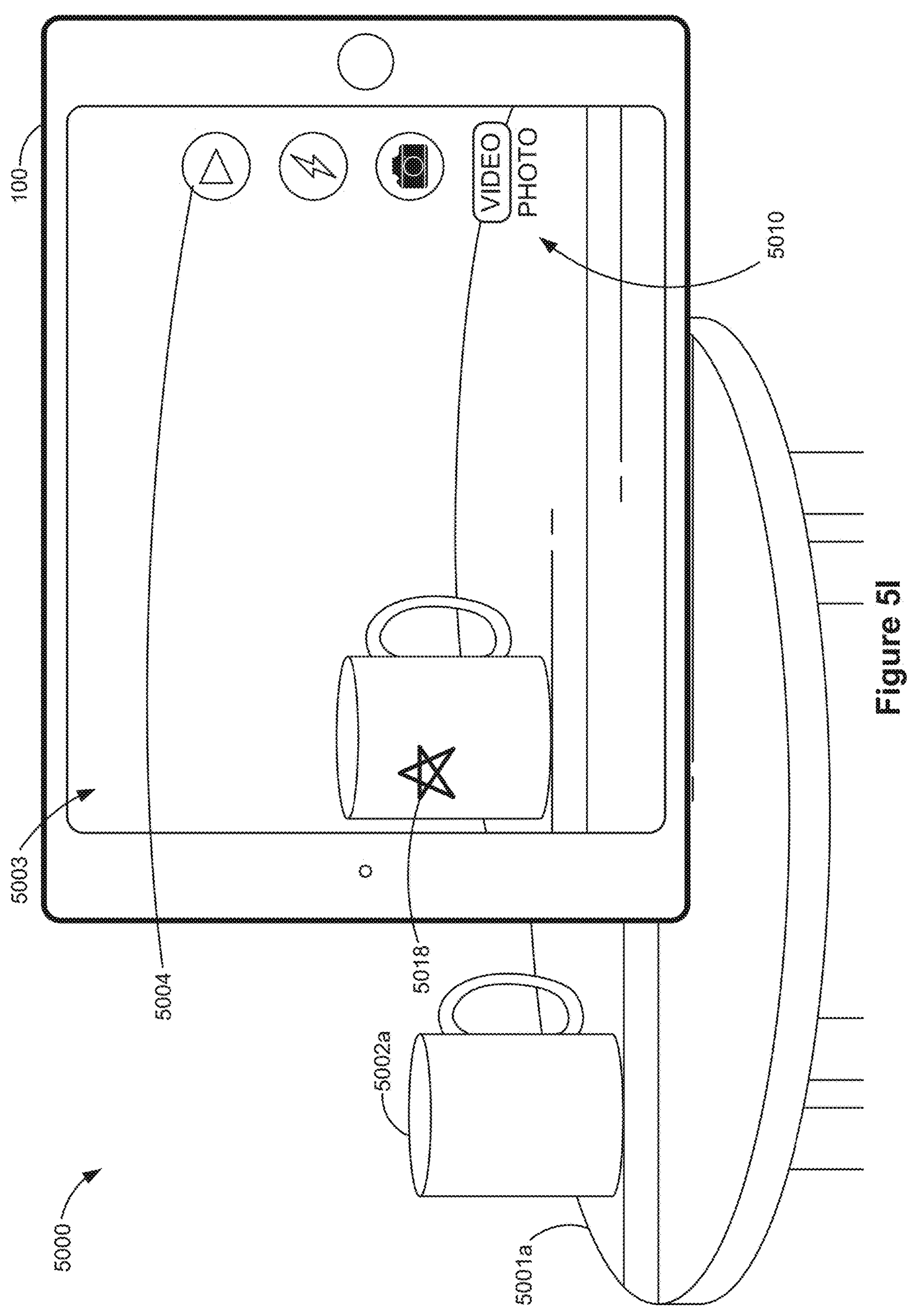

In FIG. 5H, stylus 5012 provides an input at a location that corresponds to mode control 5004, as indicated by contact 5019. In FIG. 5I, in response to the input by stylus 5012, the states of mode control 5004 and mode indicator 5010 have changed to indicate that the active mode of the annotation user interface 5003 has changed from the still image mode to the video mode.

Figure 5J:
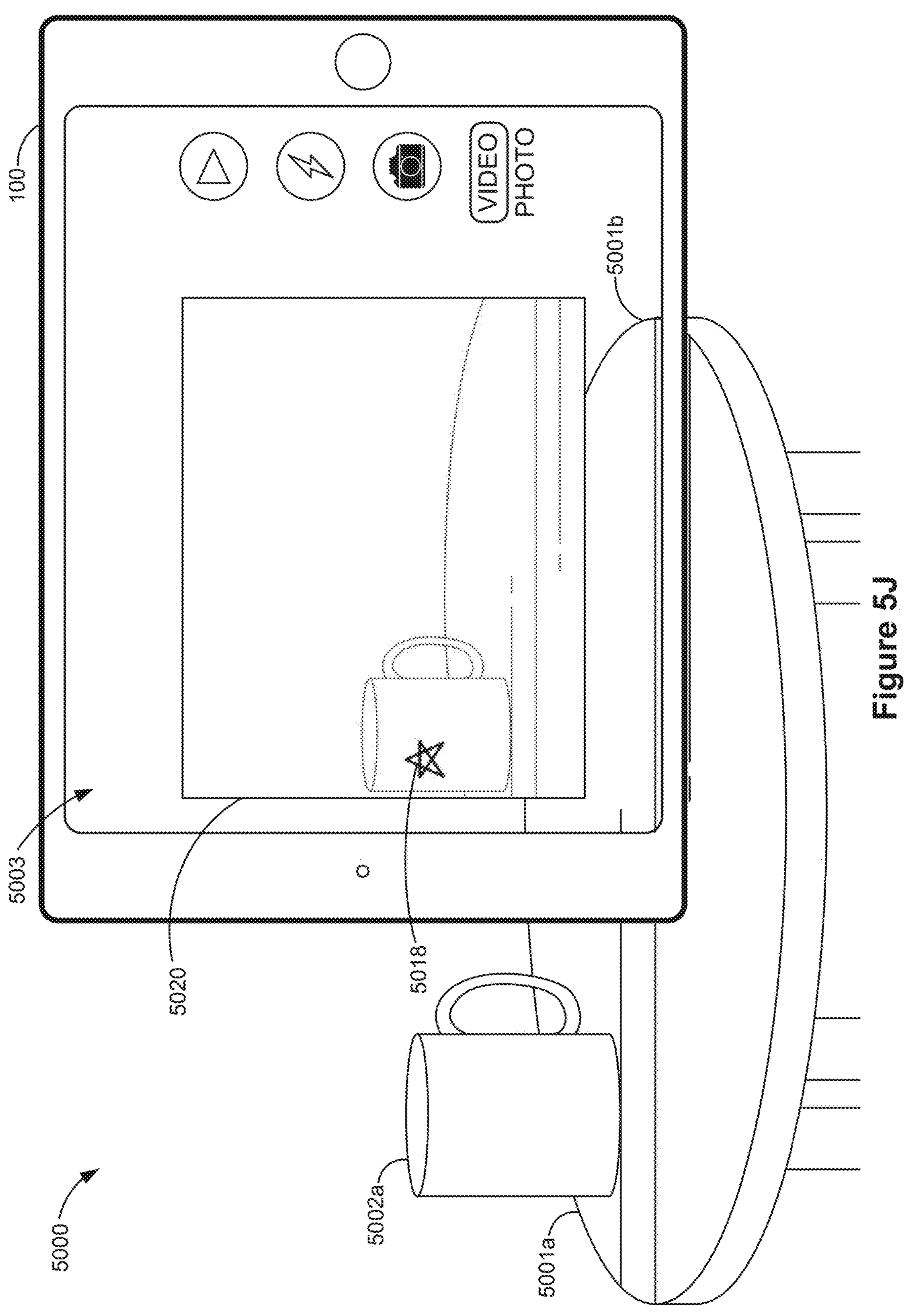
Figure 5K:
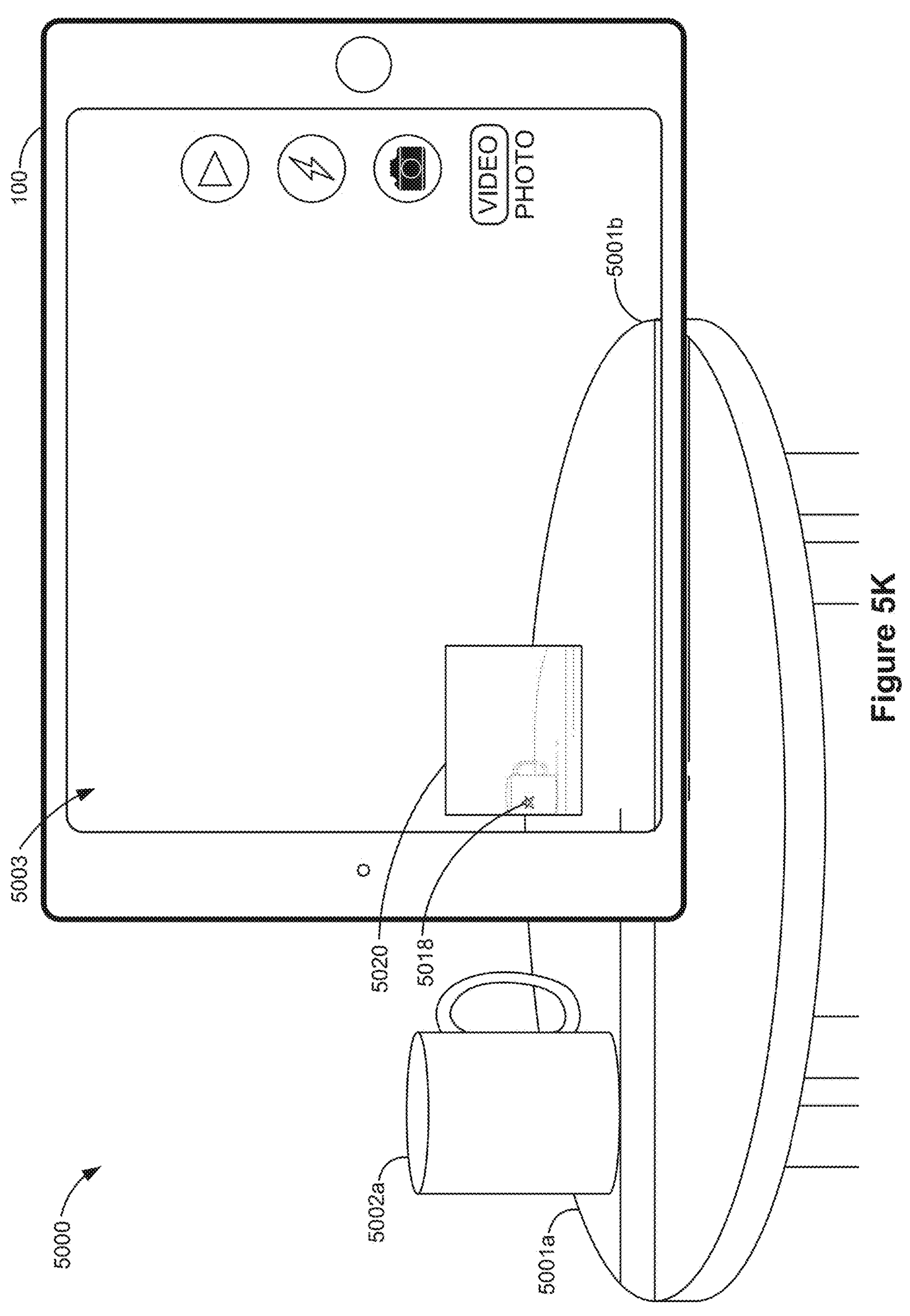
Figure 5L:
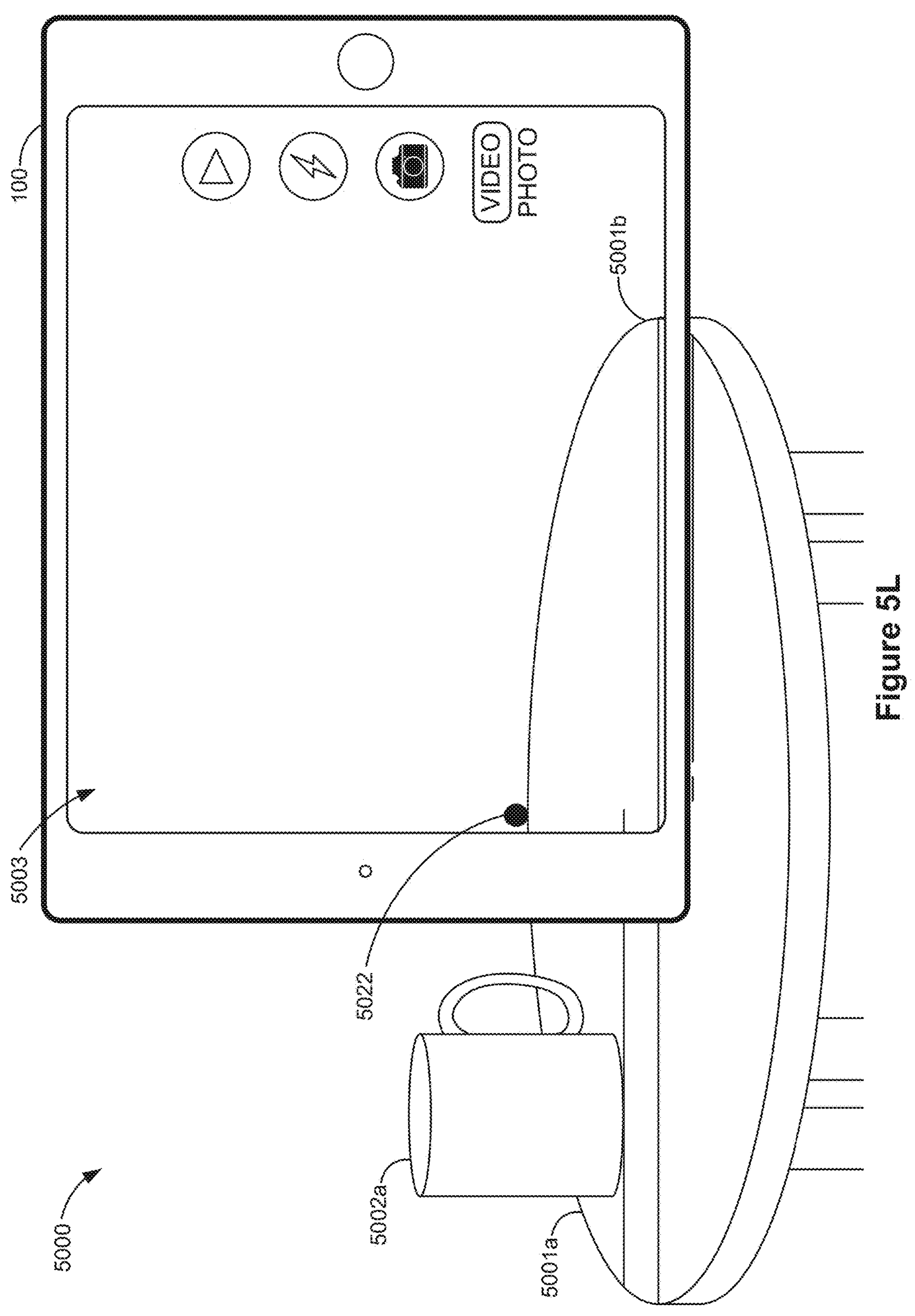

From FIG. 5I-5L, the still image displayed in FIG. 5I is gradually transitioned from a full size view of the still image (as shown in user interface 5003 in FIG. 5I), to a miniature view 5020 (as shown in user interface 5003 in FIGS. 5J-5K), to an indicator dot 5022 (as shown in user interface 5003 in FIG. 5L). In FIG. 5J, the miniature view 5020 of the still image that was shown in FIG. 5I is shown overlaying the current field of view of the camera. The size of miniature view 5020 is reduced from FIG. 5J to FIG. 5K (e.g., to provide an indication of the correspondence between the still image displayed by device 100 in FIG. 5I and the indicator dot 5022 displayed over video corresponding to the field of view of the device camera(s) in FIG. 5L).

Figure 5M:
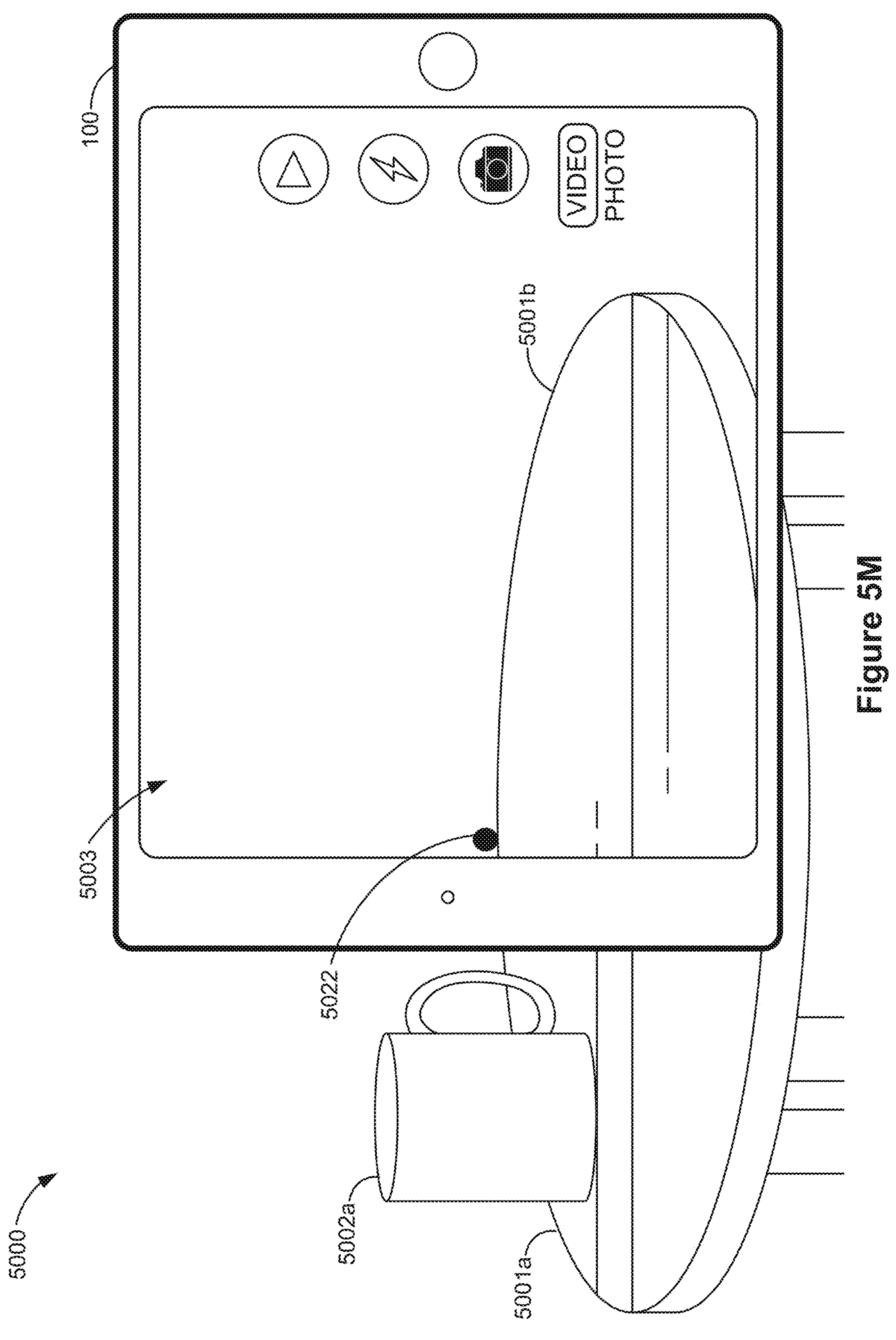

From FIG. 5L to FIG. 5M, the position of device 100 is changed relative to the physical environment 5000. As device 100 moves, the field of view of the camera of device 100 changes and the position of indicator 5022 in user interface 5003 changes. The movement of indicator 5022 within user interface 5003 provides an indication of a virtual spatial location of annotation 5018 relative to the current position of device 100. In this way, a user is provided with visual feedback indicating that movement of device 100 in a direction indicated by indicator 5022 is needed to redisplay annotation 5018.

Figure 5N:
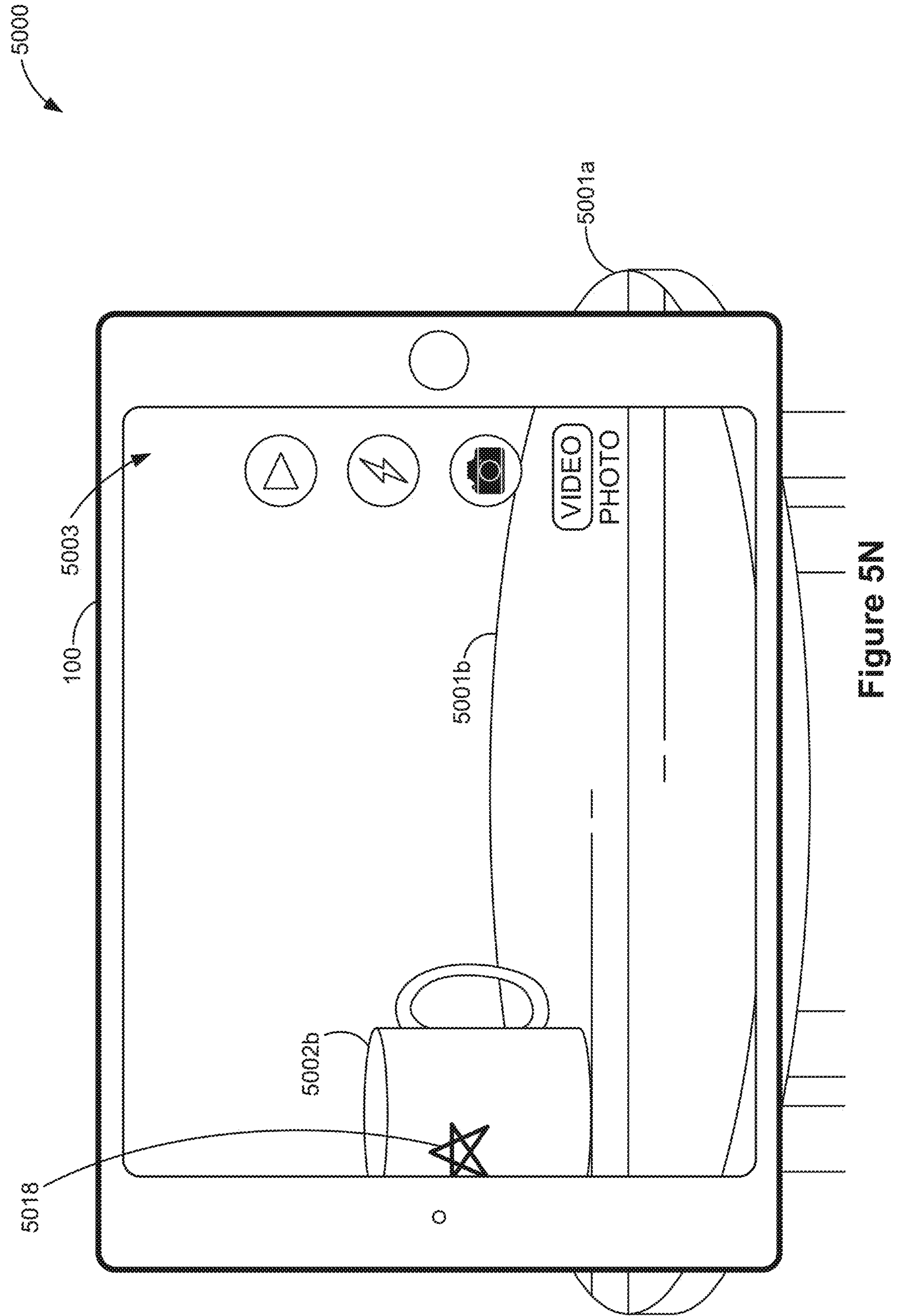

From FIG. 5M-FIG. 5N, the position of device 100 continues to be changed relative to the physical environment 5000. As a result of the movement of device 100, the field of view of the camera of device 100 is updated such that a portion of physical environment 5000 captured in the annotated still image of FIG. 5I is visible in the field of view of the camera. Annotation 5018 is displayed at a position in the video (e.g., in each image frame that included a visual representation of physical mug 5002*a*) that corresponds to a position in the still image at which annotation 5018 was received (e.g., at a position that corresponds to the position of visual representation 5002*b* of physical mug 5002*a* (e.g., as shown in the still image in FIG. 5I)). In some embodiments, when device 100 moves closer to the physical mug 5002*a*, visual representation 5002*b* of physical mug 5002*a* will appear larger in the video images, and annotation 5018 will also appear larger in accordance with the changed size of visual representation 5002*b*. In some embodiments, when device 100 is moved around the physical mug 5002*a*, visual representation 5002*b* of physical mug 5002*a* will be updated to reflect a different viewing angle of physical mug 5002*a*, and the appearance of annotation 5018 in the video images will also be updated (e.g., viewed from a different angle) in accordance with the changed viewing angle of the physical mug.

Figure 5O:
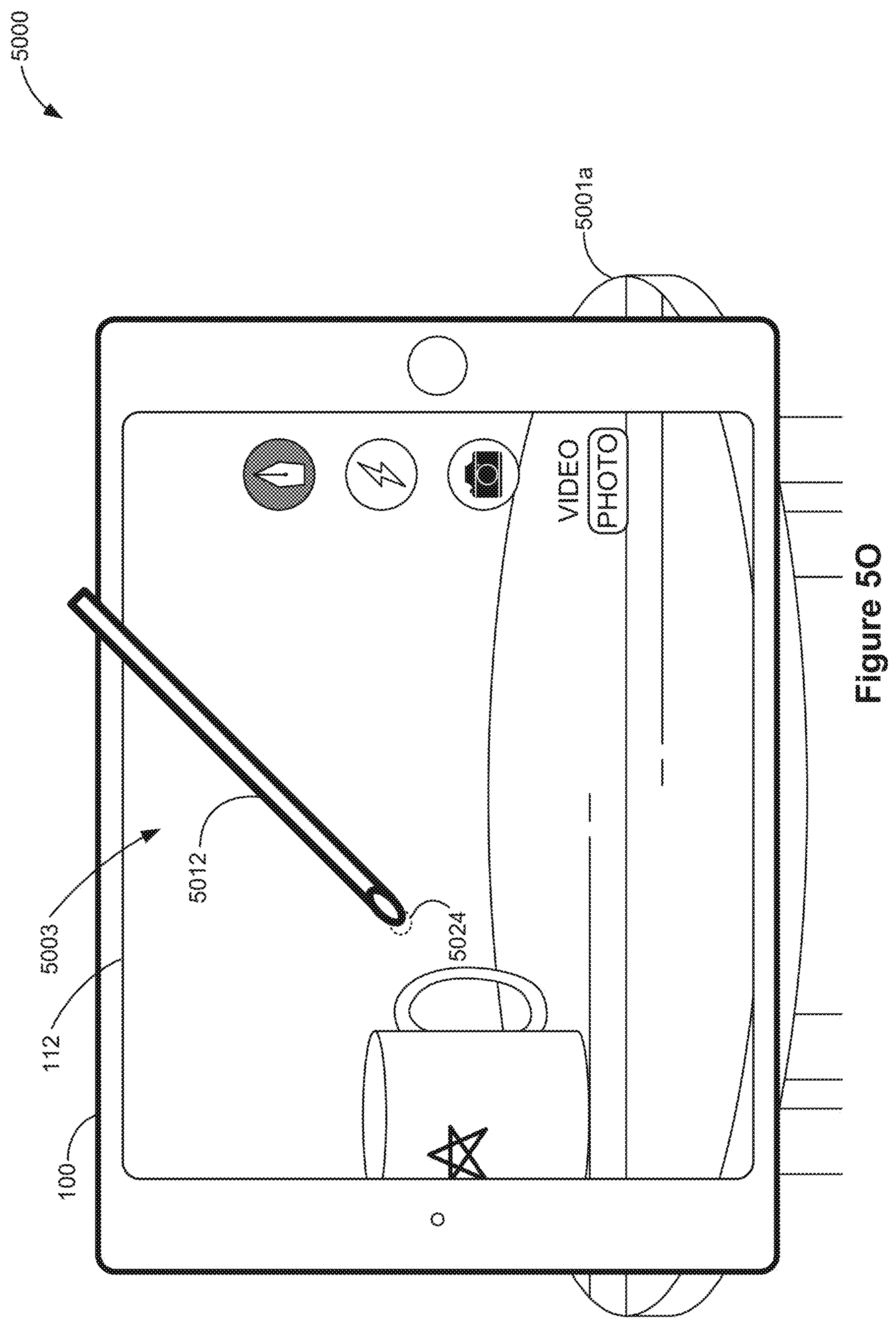

In FIG. 5O, stylus 5012 has touched down on touchscreen display 112 at a point in the annotation user interface 5003 indicated by contact 5024. In response to detection of the contact 5024, a second still image of the field of view of the camera is captured and displayed in user interface 5003.

Figure 5P:
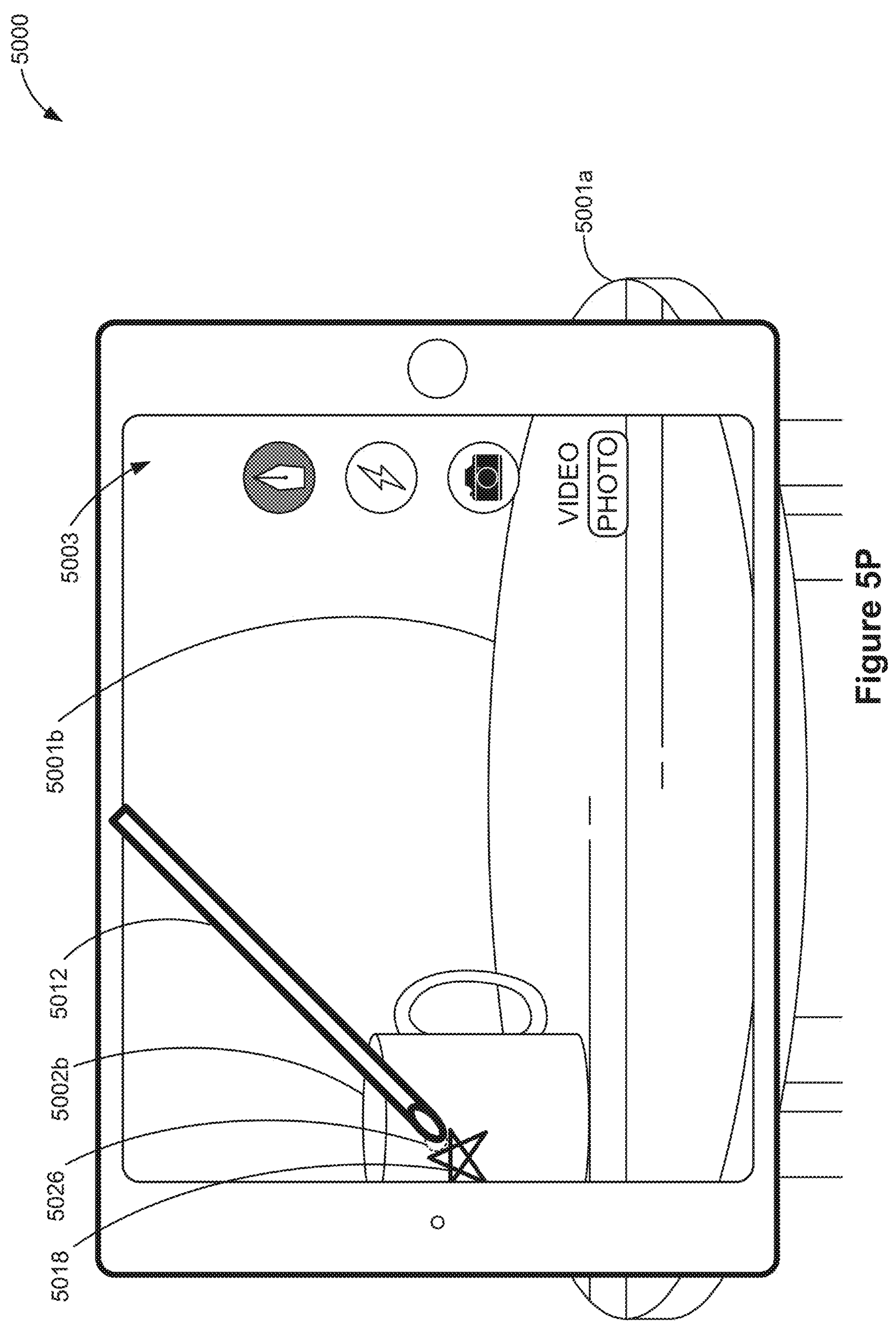
Figure 5Q:
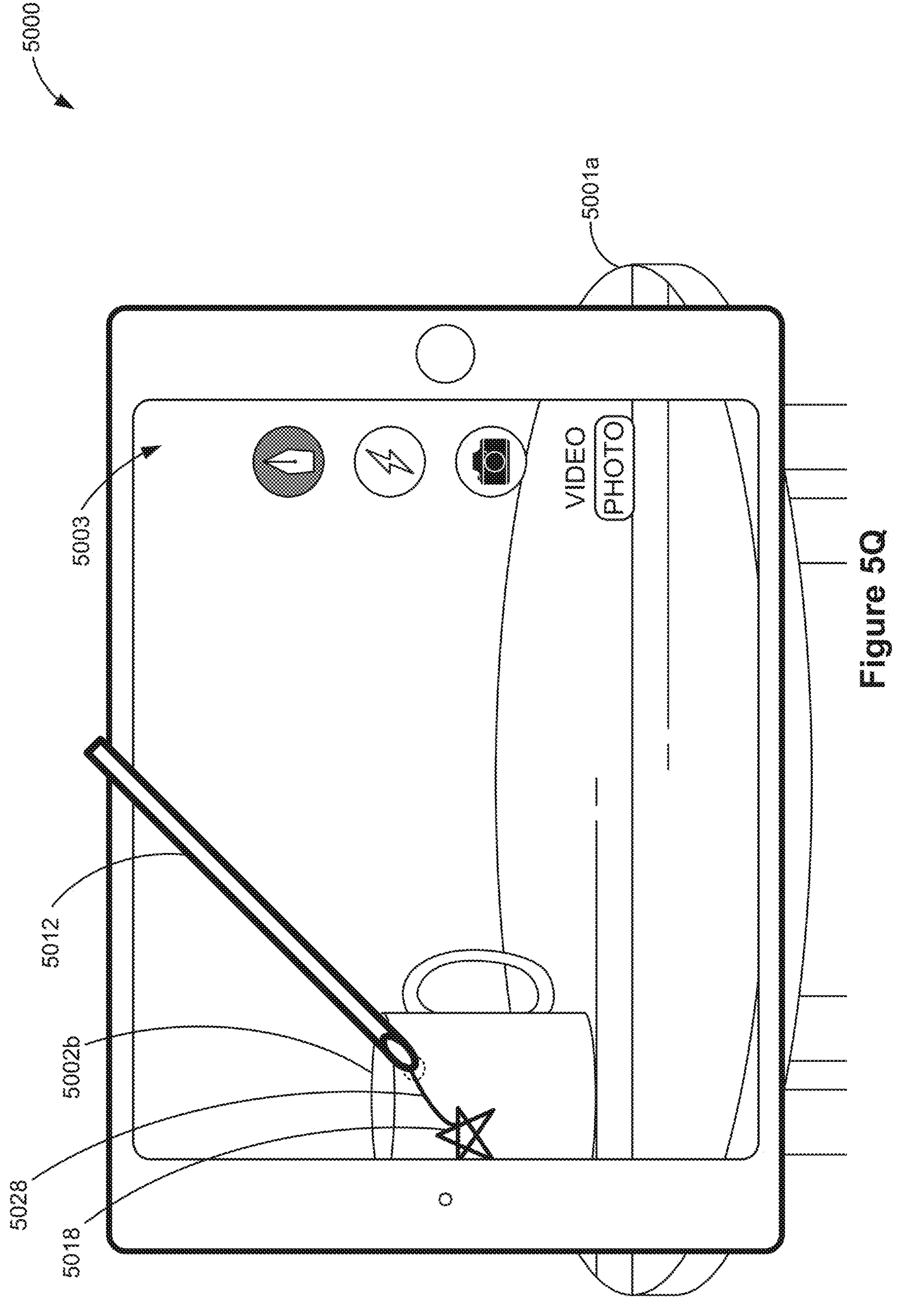
Figure 5R:
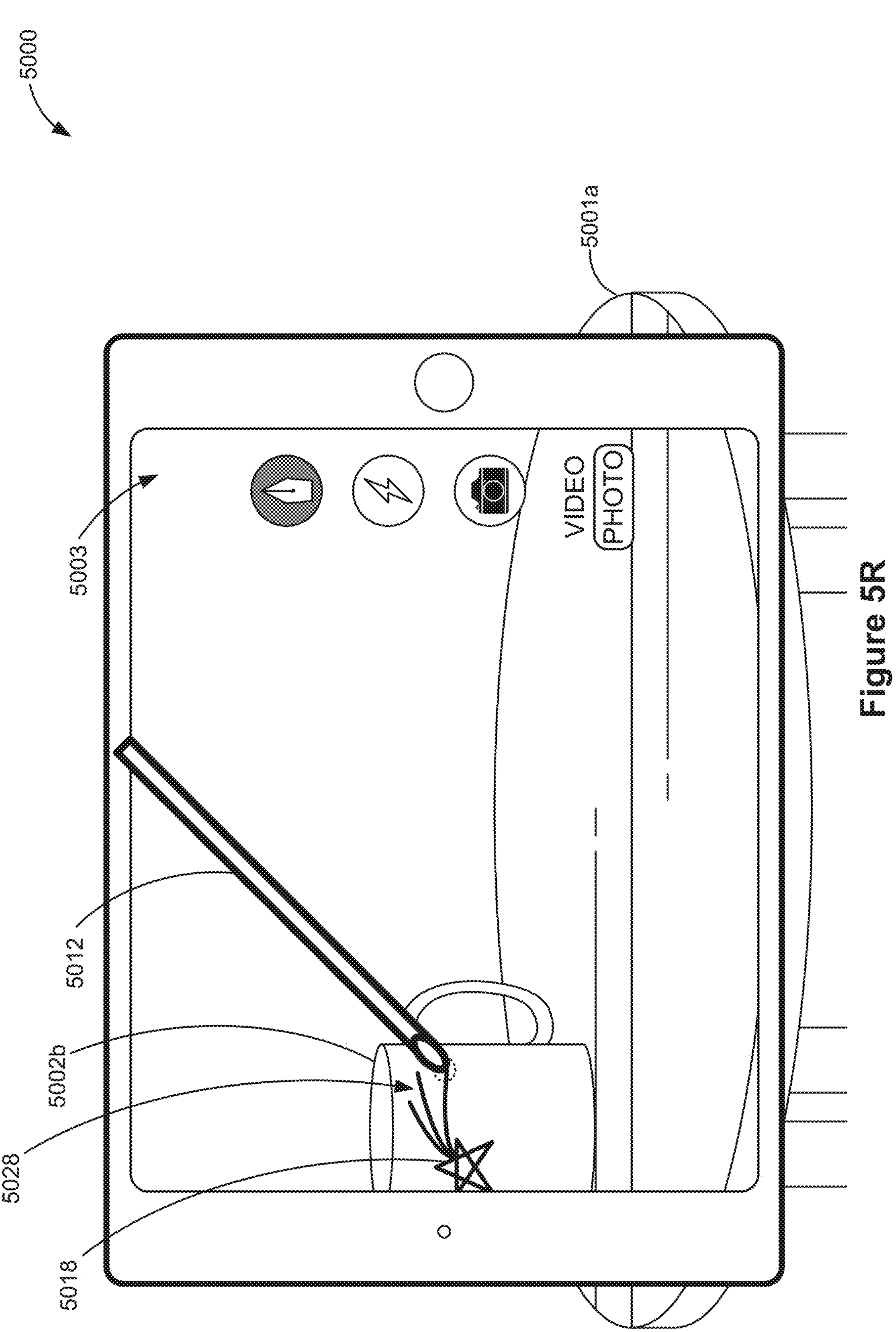
Figure 5S:
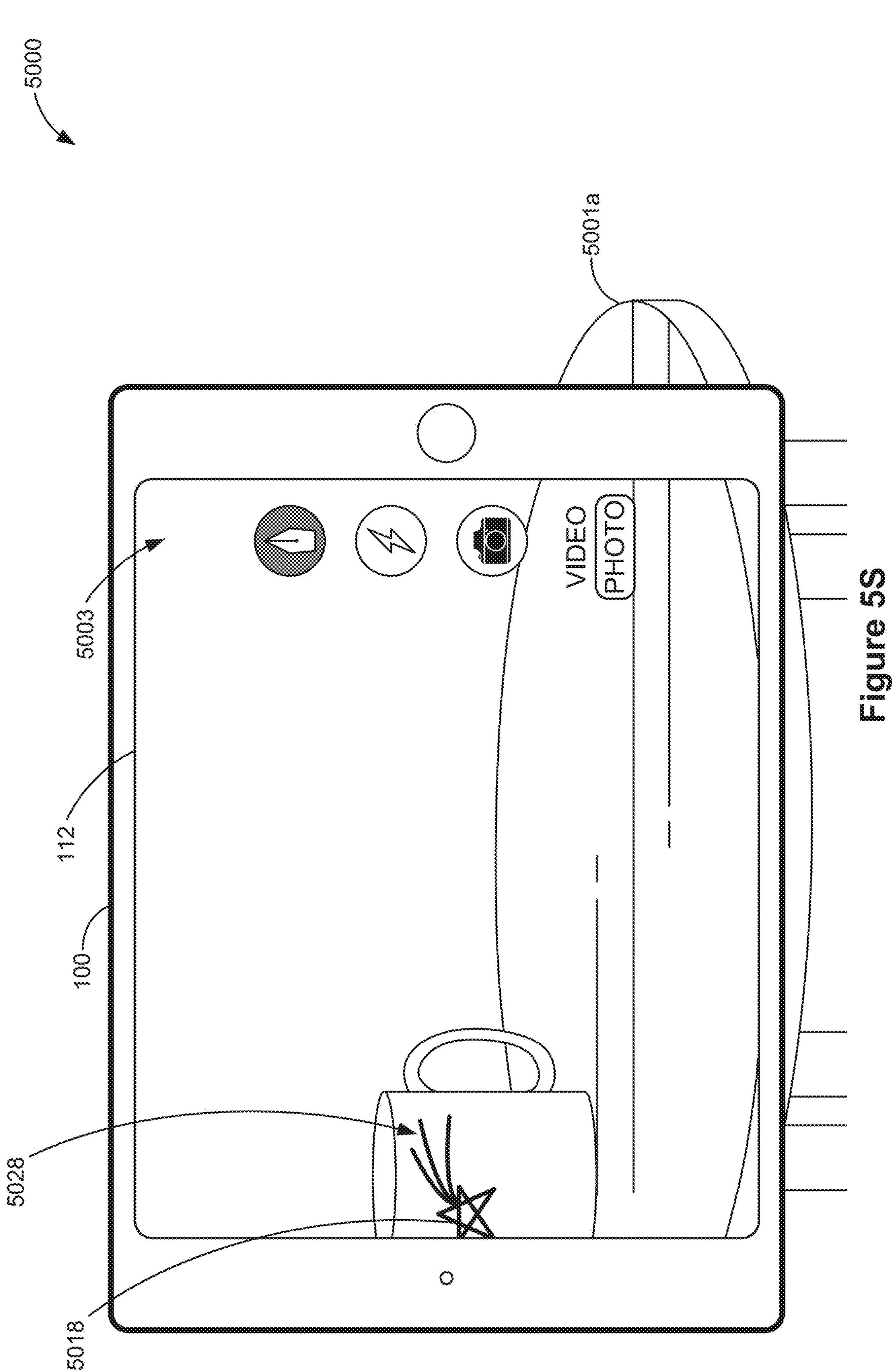

From FIG. 5P to FIG. 5R, while the second still image is displayed, an input by stylus 5012 is received at a location indicated by contact 5026. Movement of contact 5026 creates a second annotation 5028 at a portion of the still image that includes visual representation 5002*b* of physical mug 5002*a*. In FIG. 5S, stylus 5012 has lifted off of touch screen display 112.

Figure 5T:
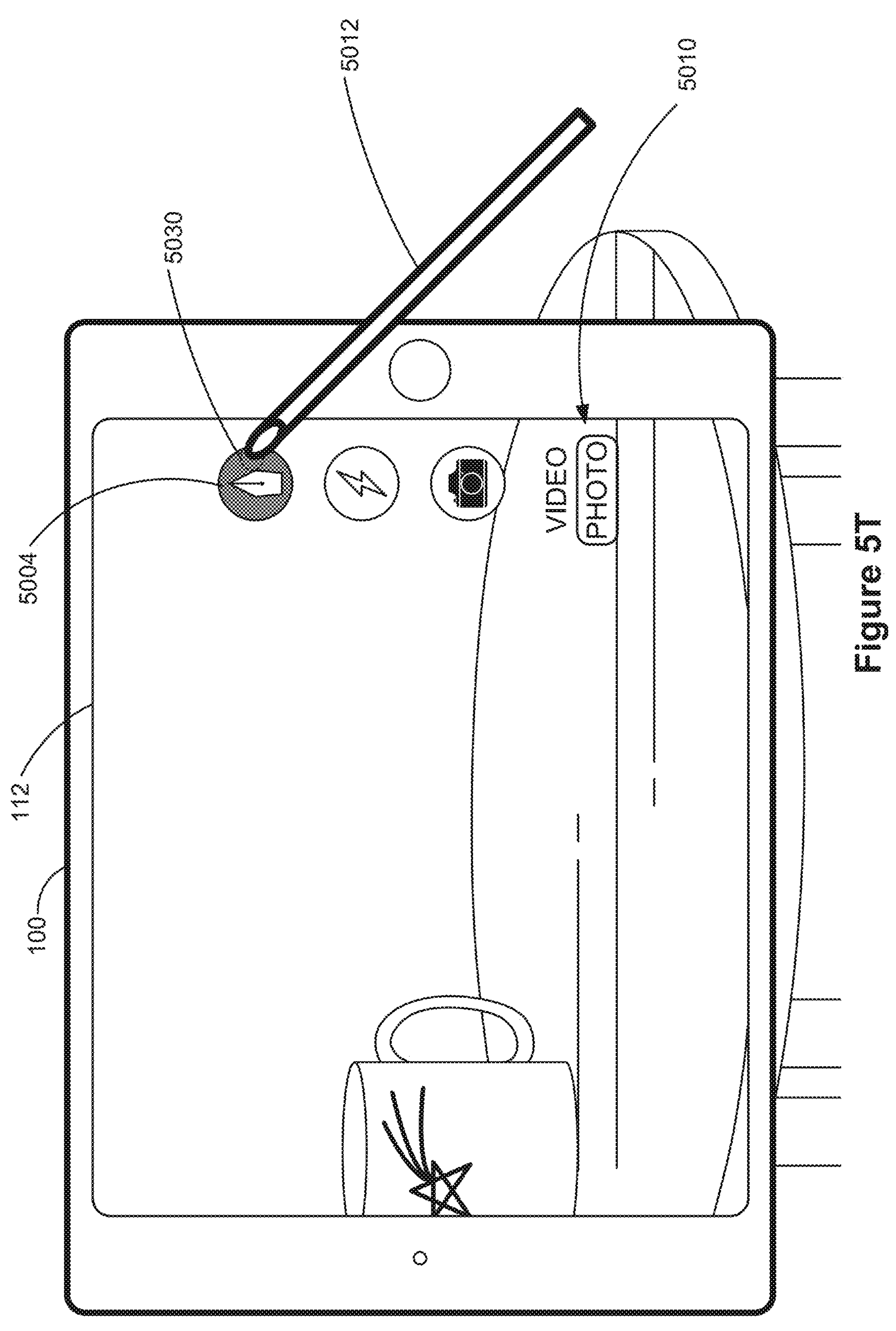
Figure 5U:
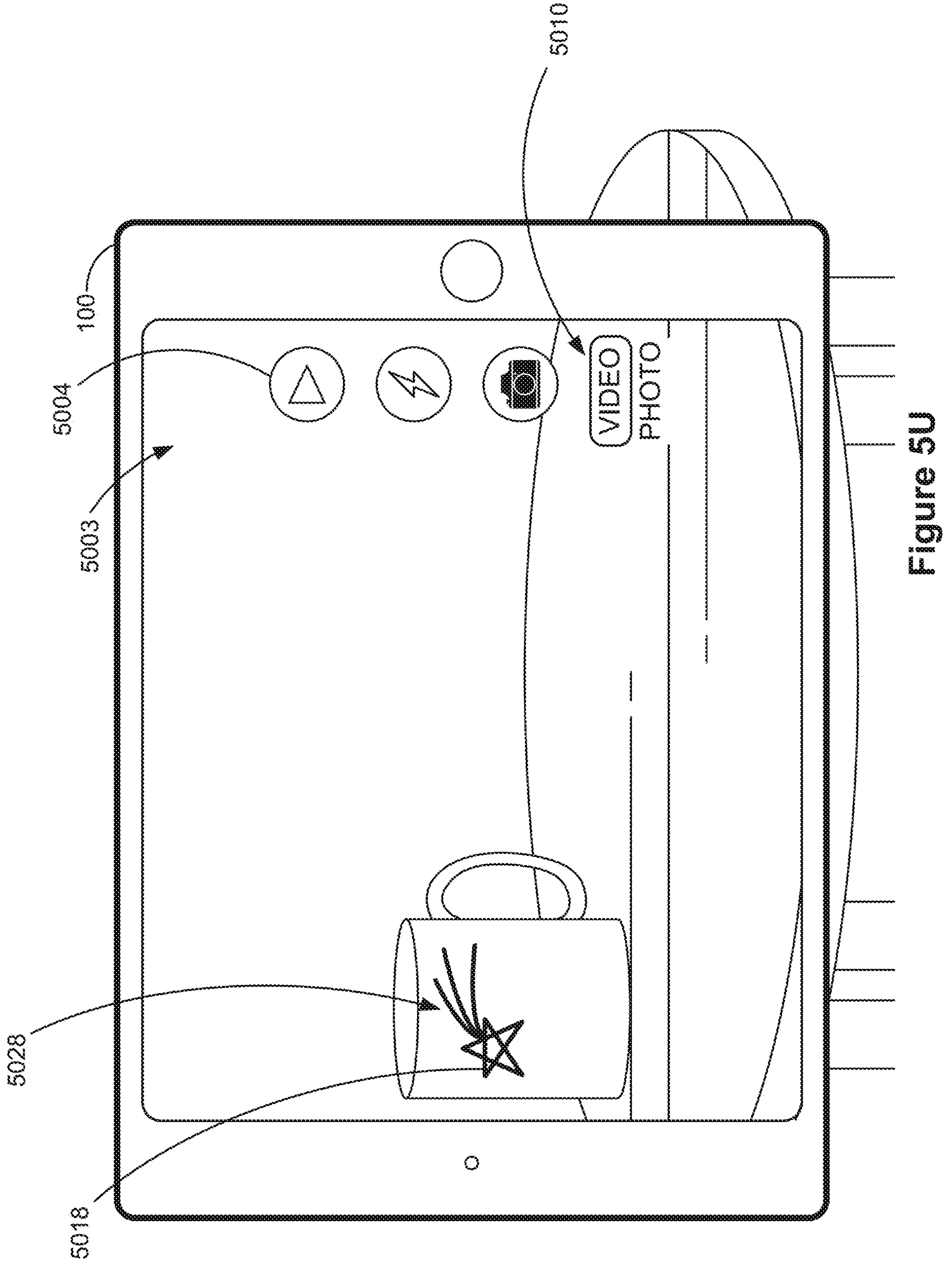

In FIG. 5T, an input is detected at a location on touch screen display 112 that corresponds to control 5004 for toggling between a still image mode and a video mode, as indicated by contact 5030. In FIG. 5U, in response to the input, the states of mode control 5004 and mode indicator 5010 have changed to indicate that the active mode of the annotation user interface 5003 has changed from the still image mode to the video mode. Because the portion of physical environment 5000 captured in the annotated still image of FIG. 5T is already visible in the field of view of the camera as displayed in the video mode of user interface 5003 in FIG. 5U, annotation 5018 and annotation 5028 are displayed at positions in the video that correspond to respective positions in the still images at which the annotations were received (e.g., at positions that correspond to the respective positions of visual representation 5002*b* of physical mug 5002*a* shown in FIGS. 5G and 5R).

Figure 5V:
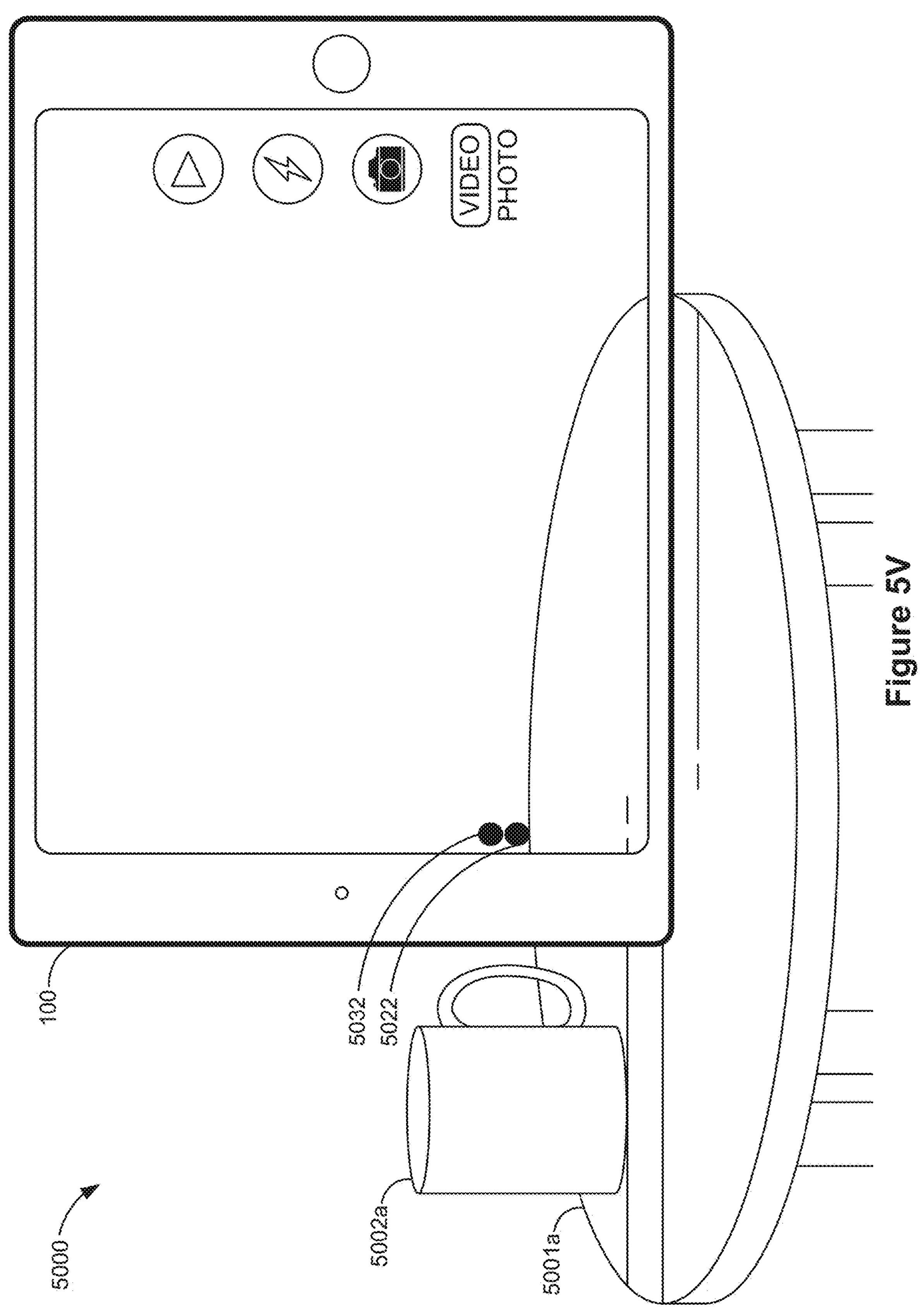

From FIG. 5U to FIG. 5V, the position of device 100 is changed relative to the physical environment 5000 such that the field of view of the device camera displayed in user interface 5003 does not include the portion of physical environment 5000 that includes mug 5002*a*. Indicator dot 5022 corresponding to annotation 5018 and indicator dot 5032 corresponding to annotation 5028 are displayed (e.g., indicator dots 5022 and 5032 are displayed at positions that indicate off-screen virtual spatial locations of annotations 5018 and 5028 (e.g., the side of physical mug 5002*a* that is shown in FIGS. 5G and 5R), respectively, relative to the physical environment 5000).

Figure 5W:
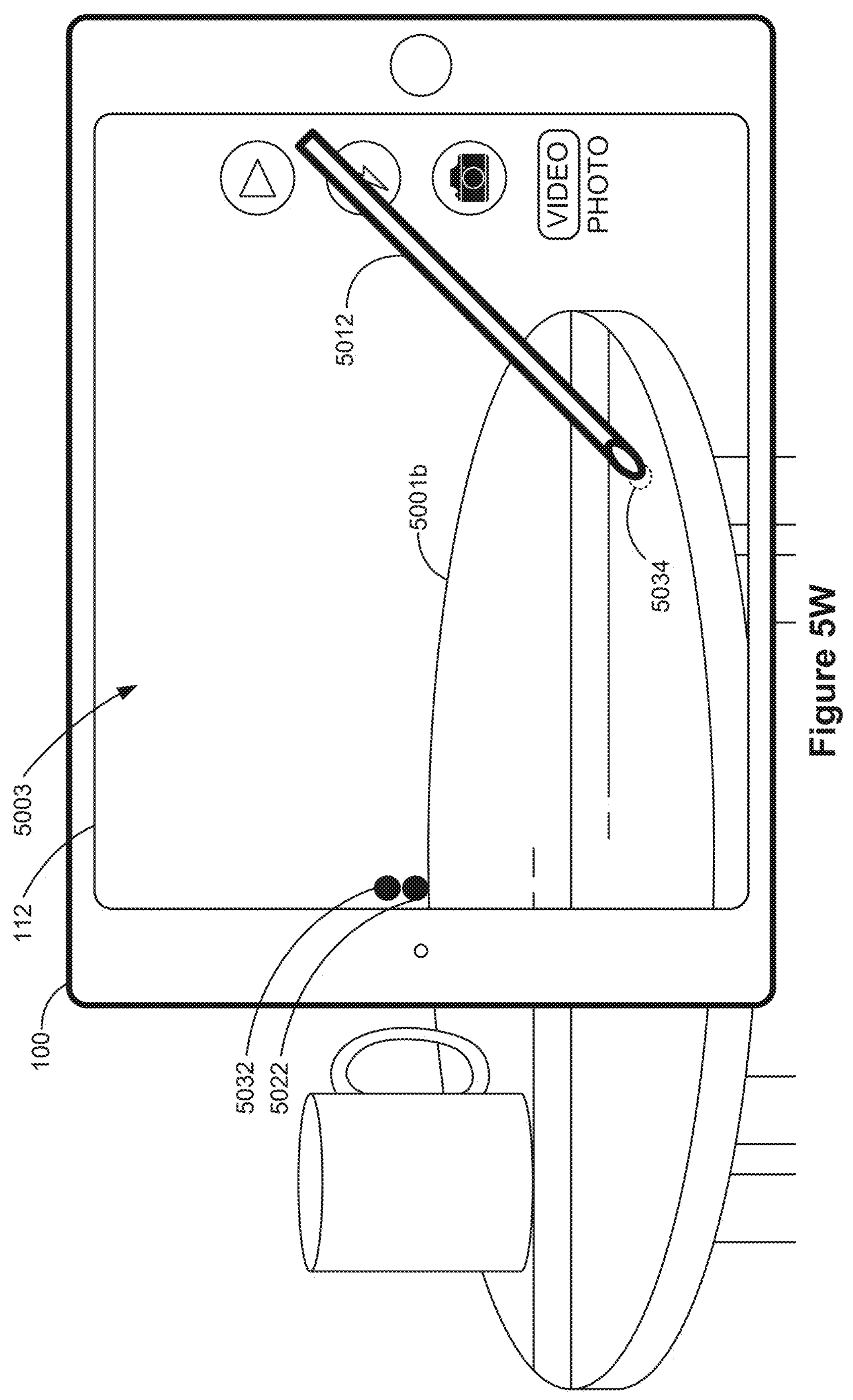

From FIG. 5V to FIG. 5W, the position of device 100 continues to change relative to the physical environment 5000. As device 100 moves downward, the field of view of the camera of device 100 changes and indicators 5022 and 5032 move upward in user interface 5003 (e.g., to indicate virtual spatial locations of annotations 5018 and 5028, respectively, relative to the current position of device 100). In FIG. 5W, stylus 5012 has touched down on touchscreen display 112 at a point in the annotation user interface 5003 indicated by contact 5034. In response to detection of the contact 5034, a third still image of the field of view of the camera is captured and displayed in user interface 5003.

Figure 5X:
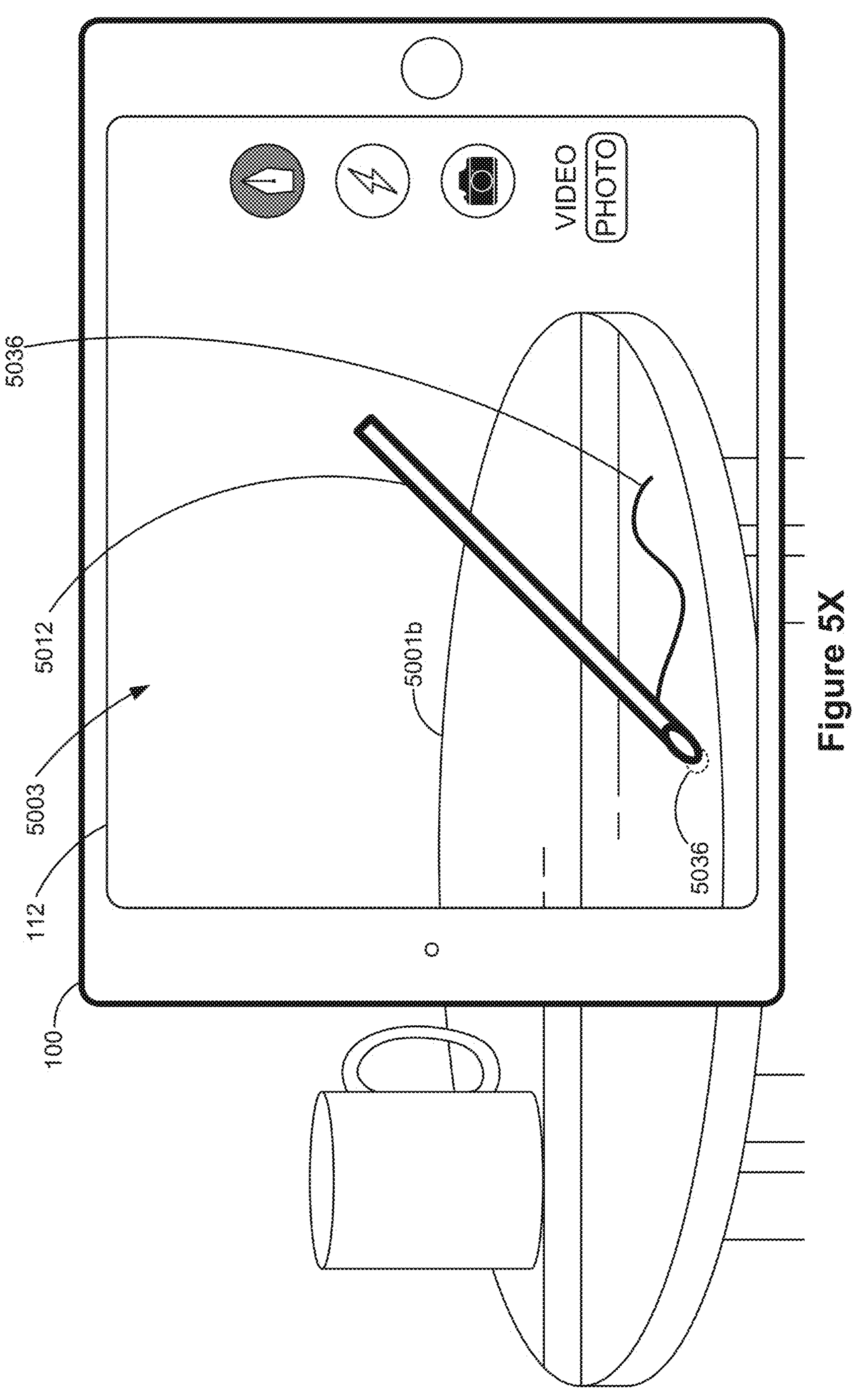

From FIG. 5W to FIG. 5X, while the third still image is displayed, contact 5034 moves along touch screen display 112 to create a third annotation 5036 at a portion of the third still image that includes the lower right surface of visual representation 5001*b* of physical table 5001*a*.

Figure 5Y:
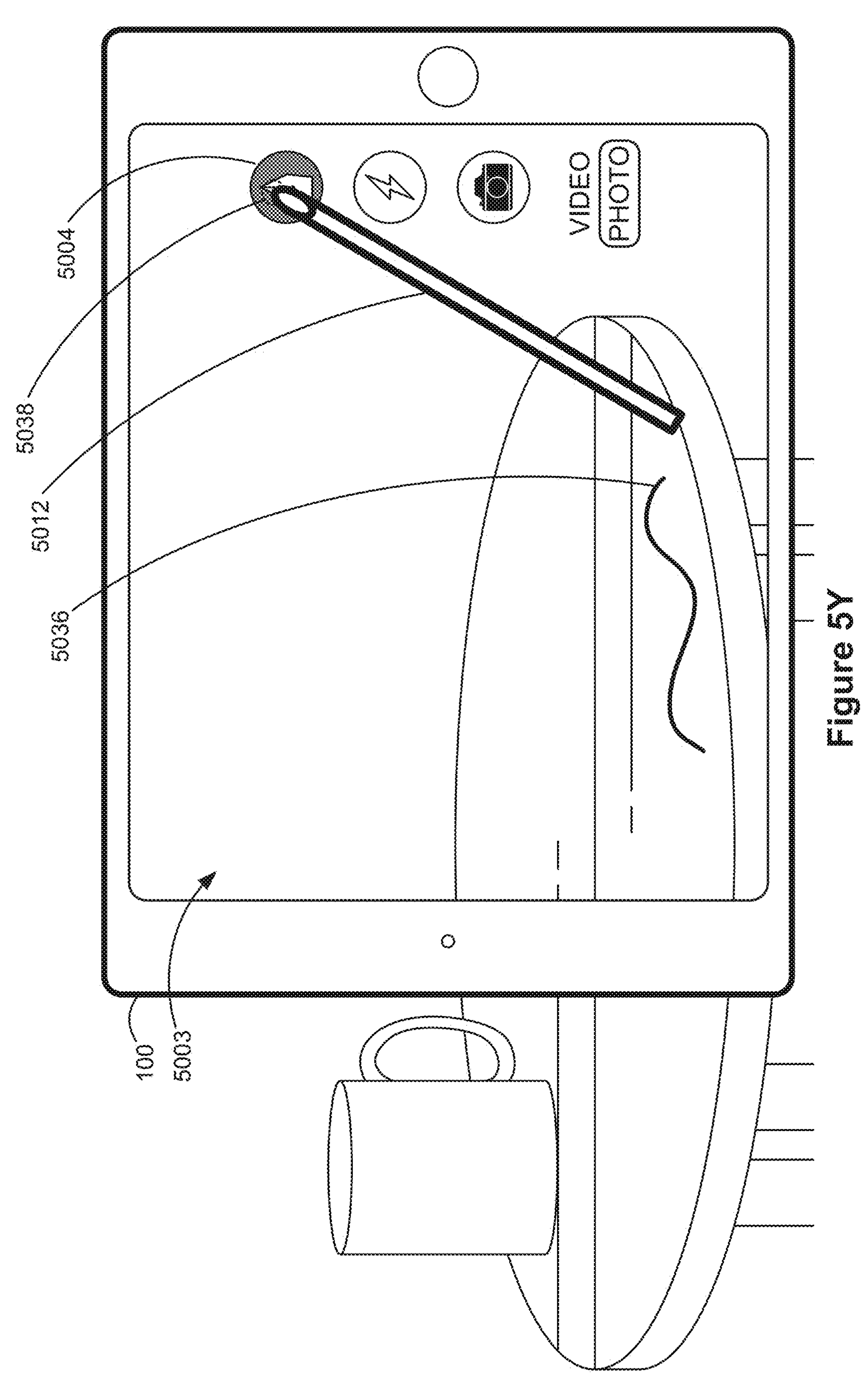
Figure 5Z:
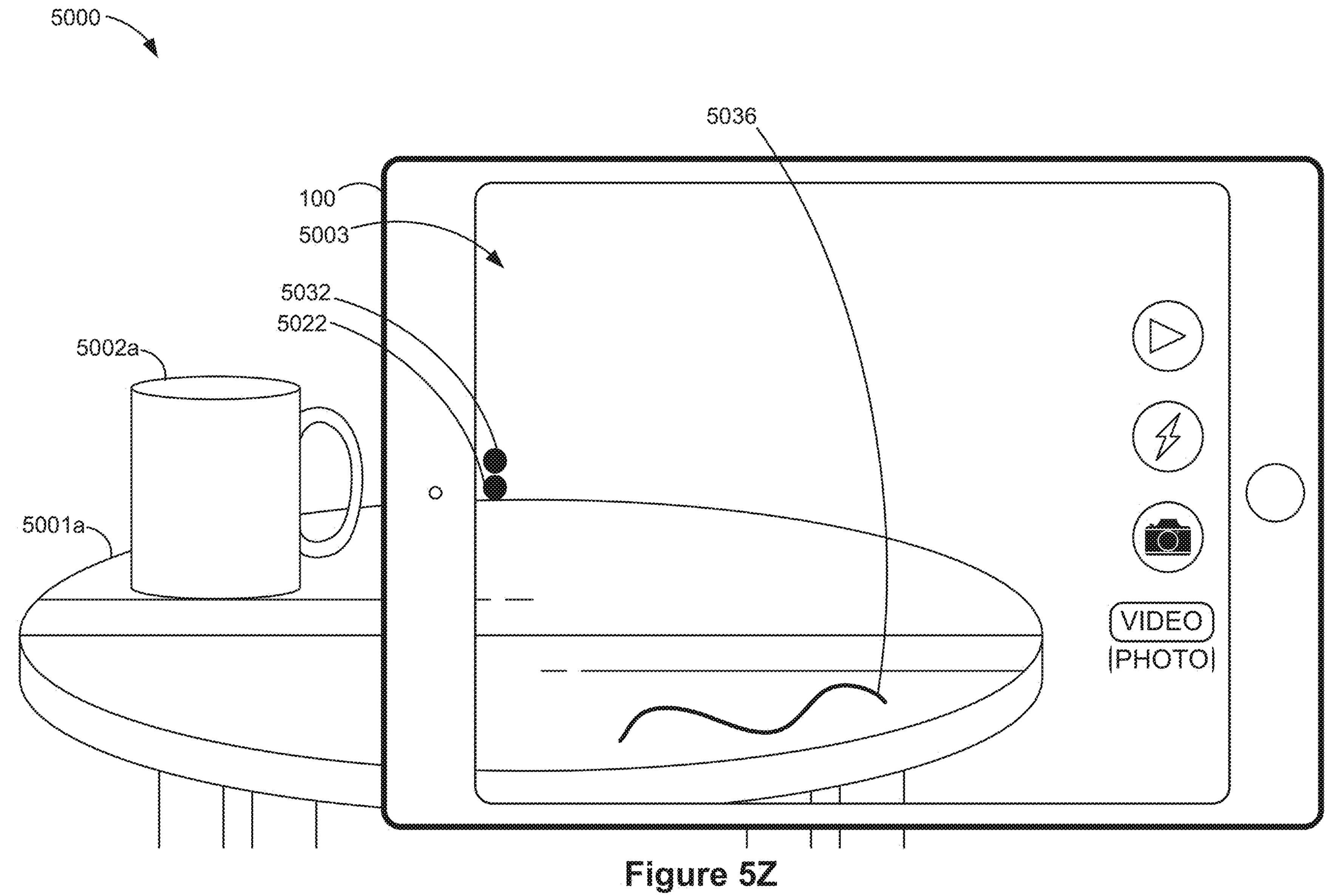
Figure 5A:
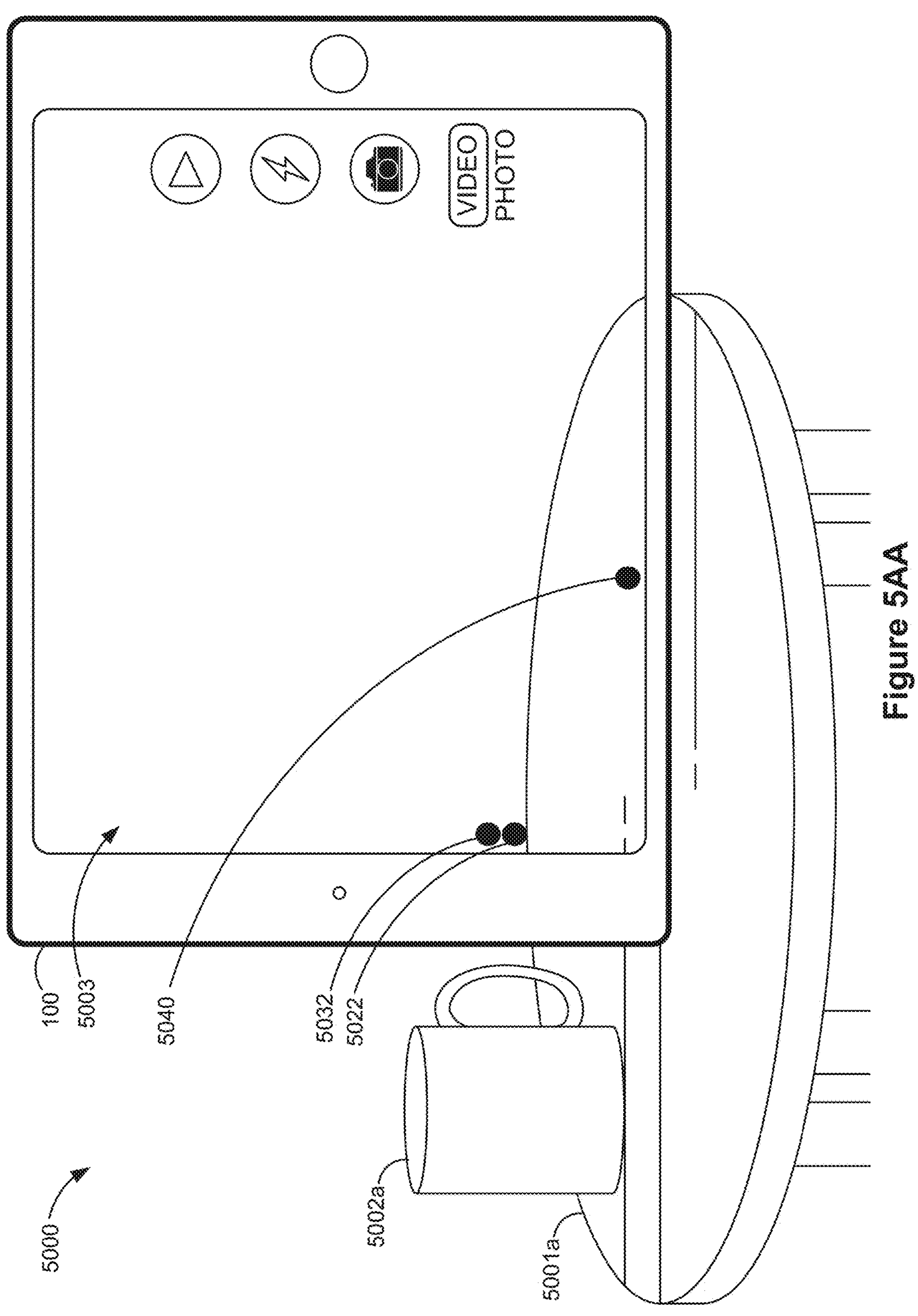
Figure 5A:
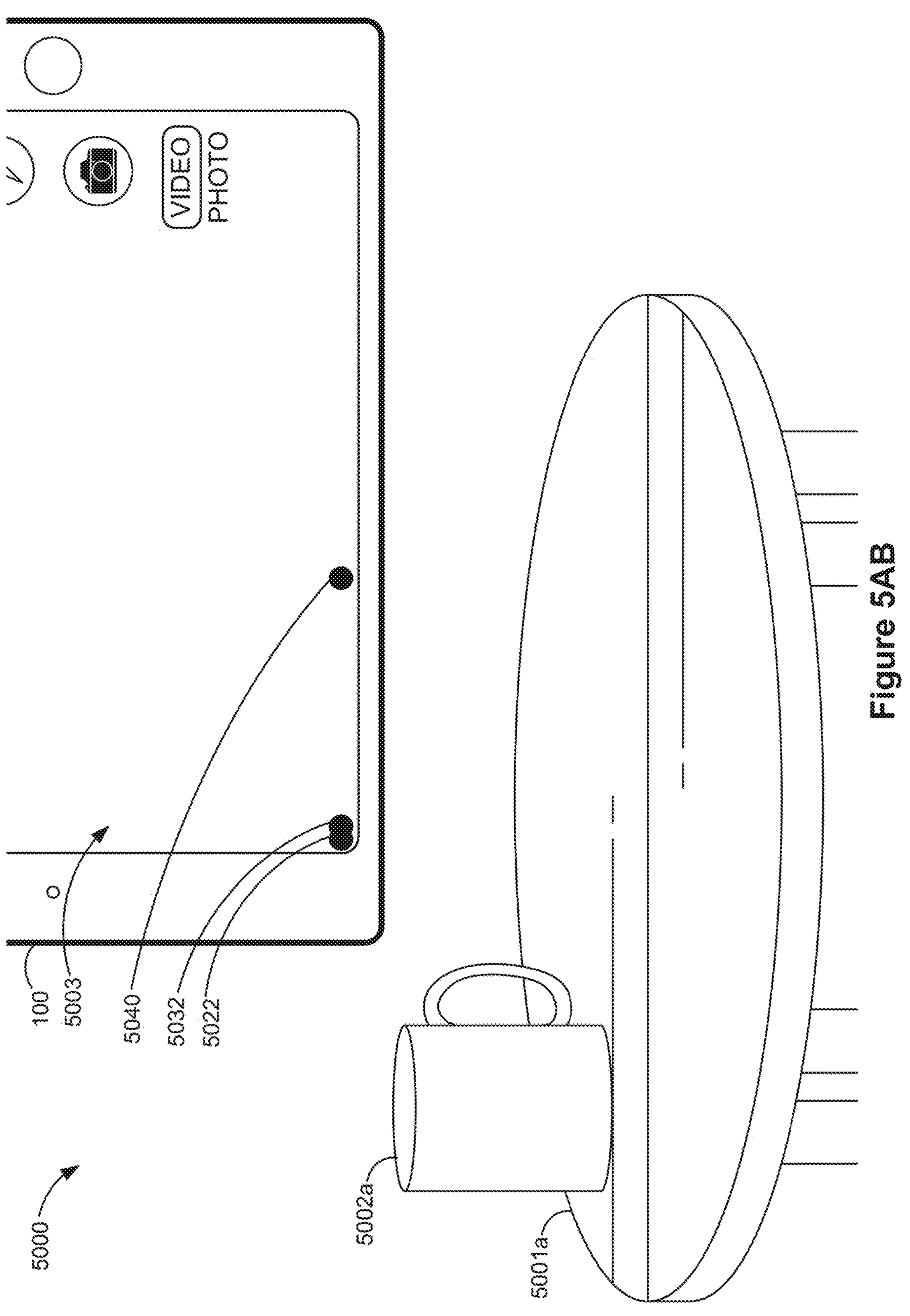
Figure 5A:
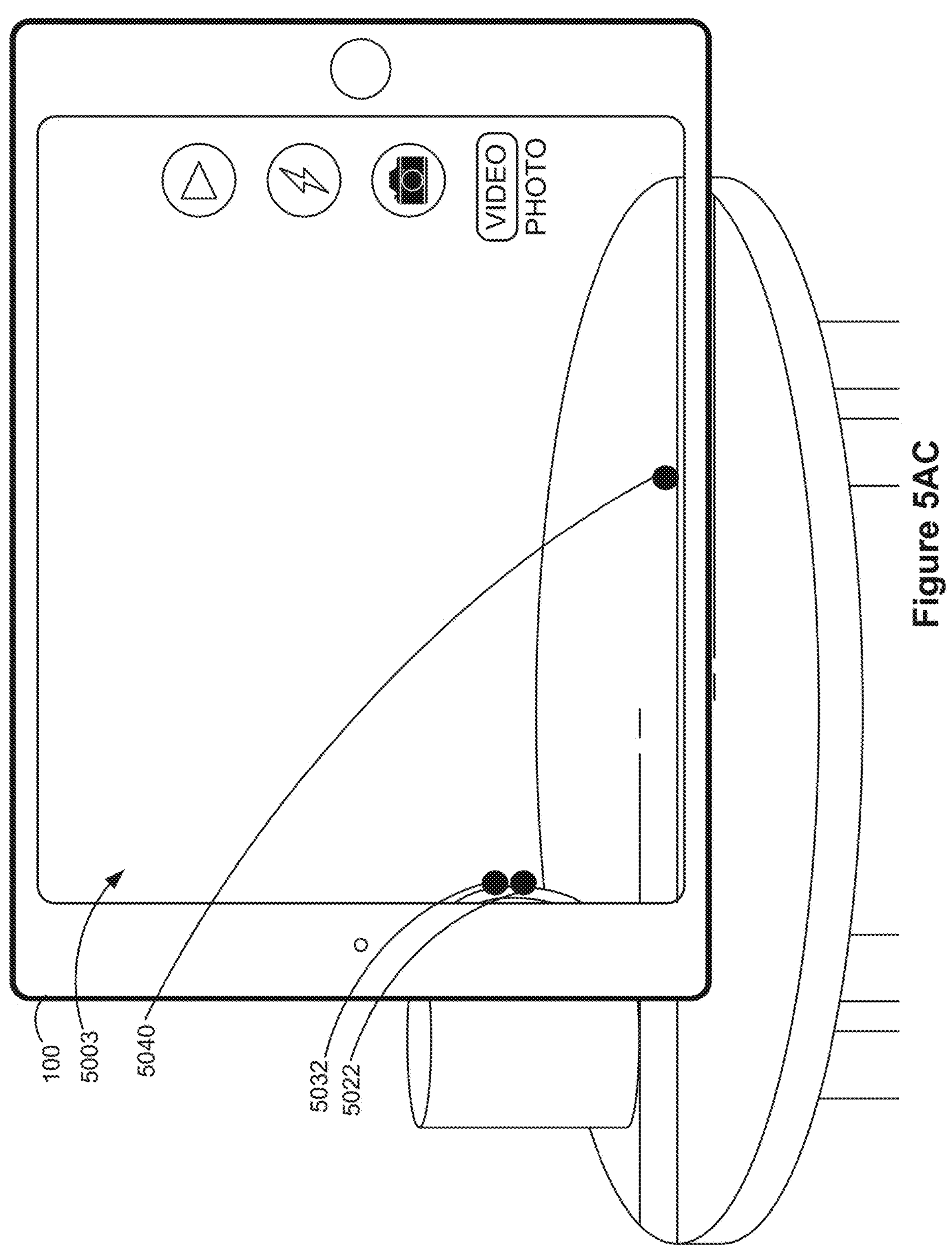
Figure 5A:
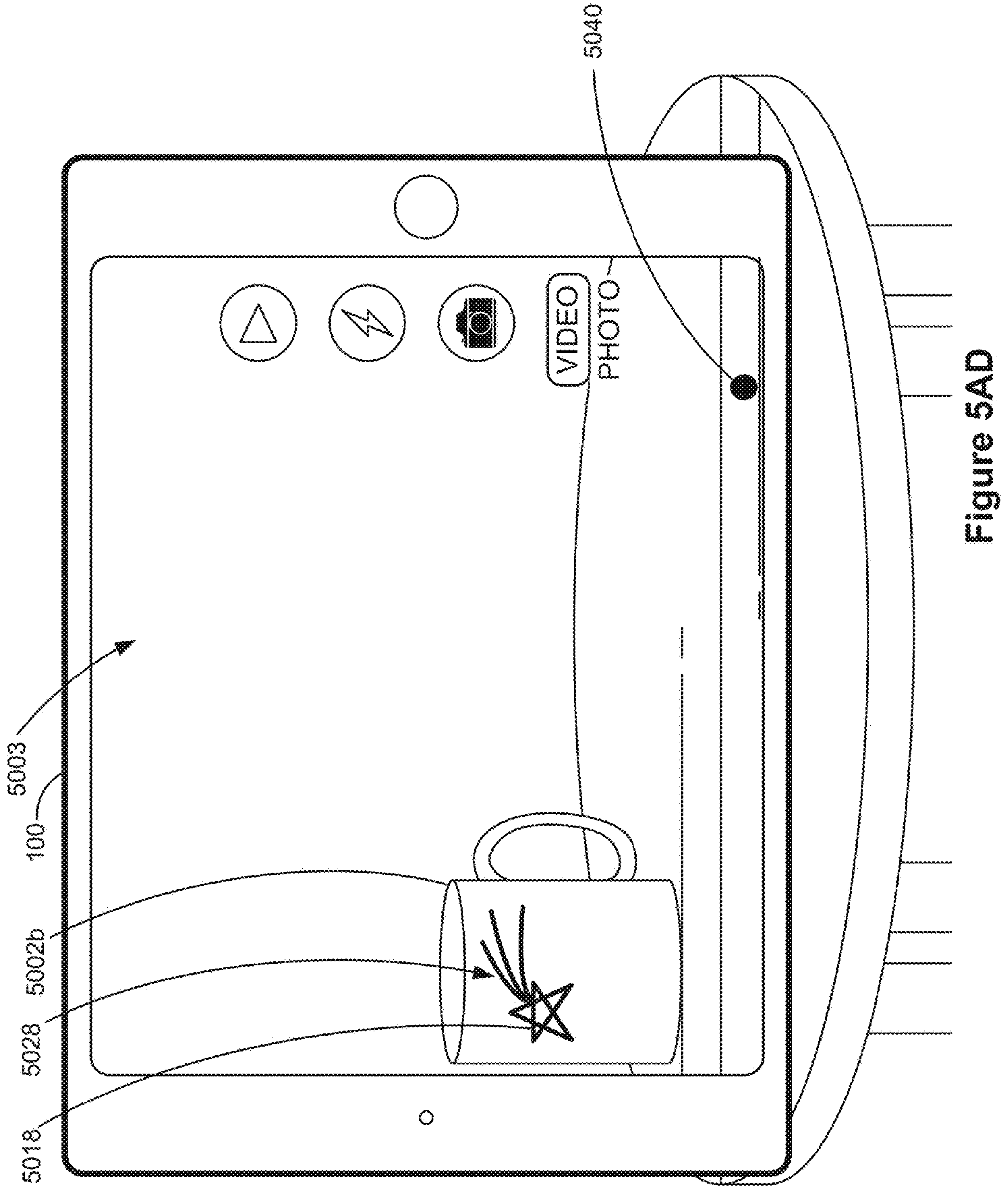
Figure 5A:
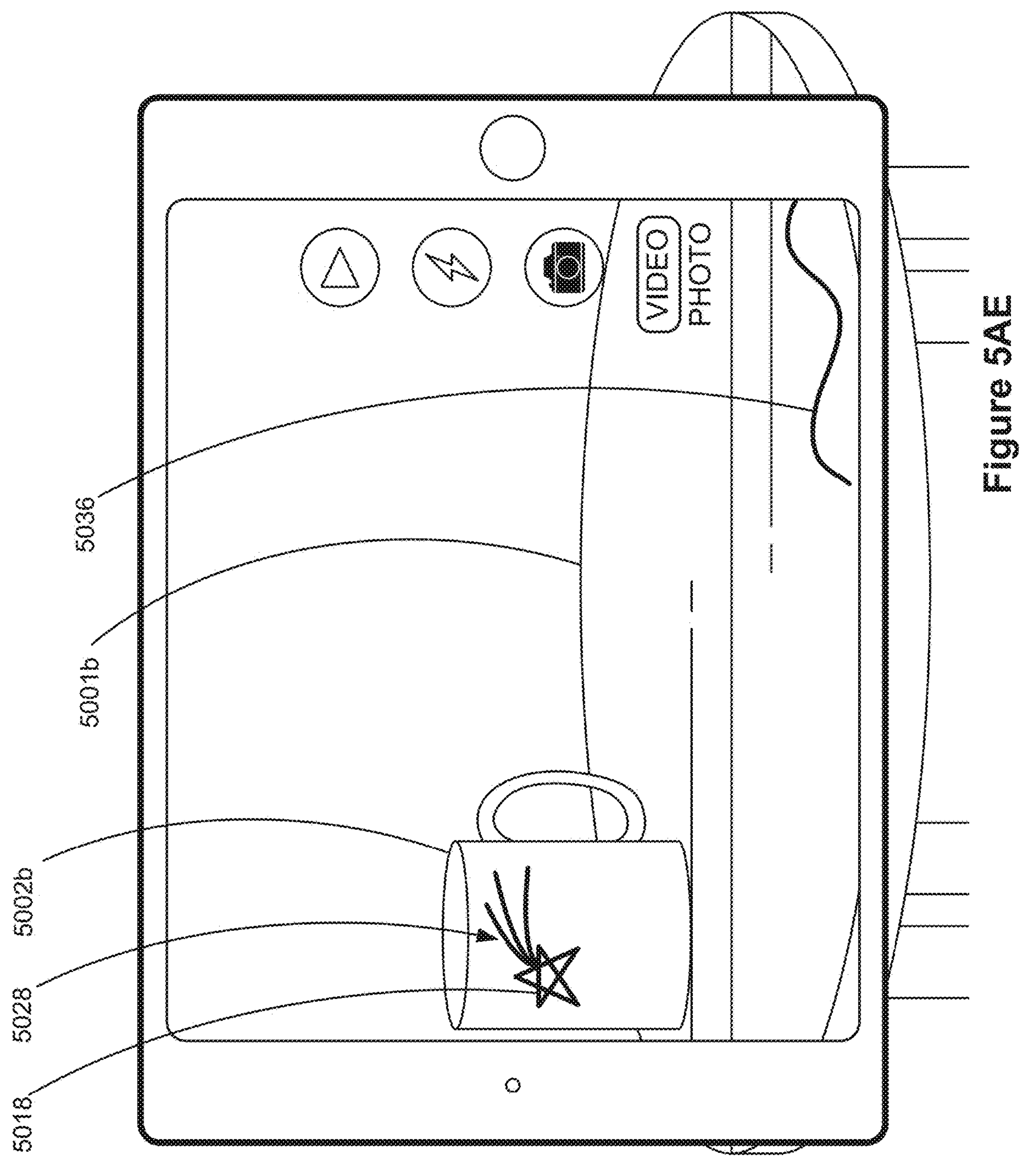
Figure 5A:
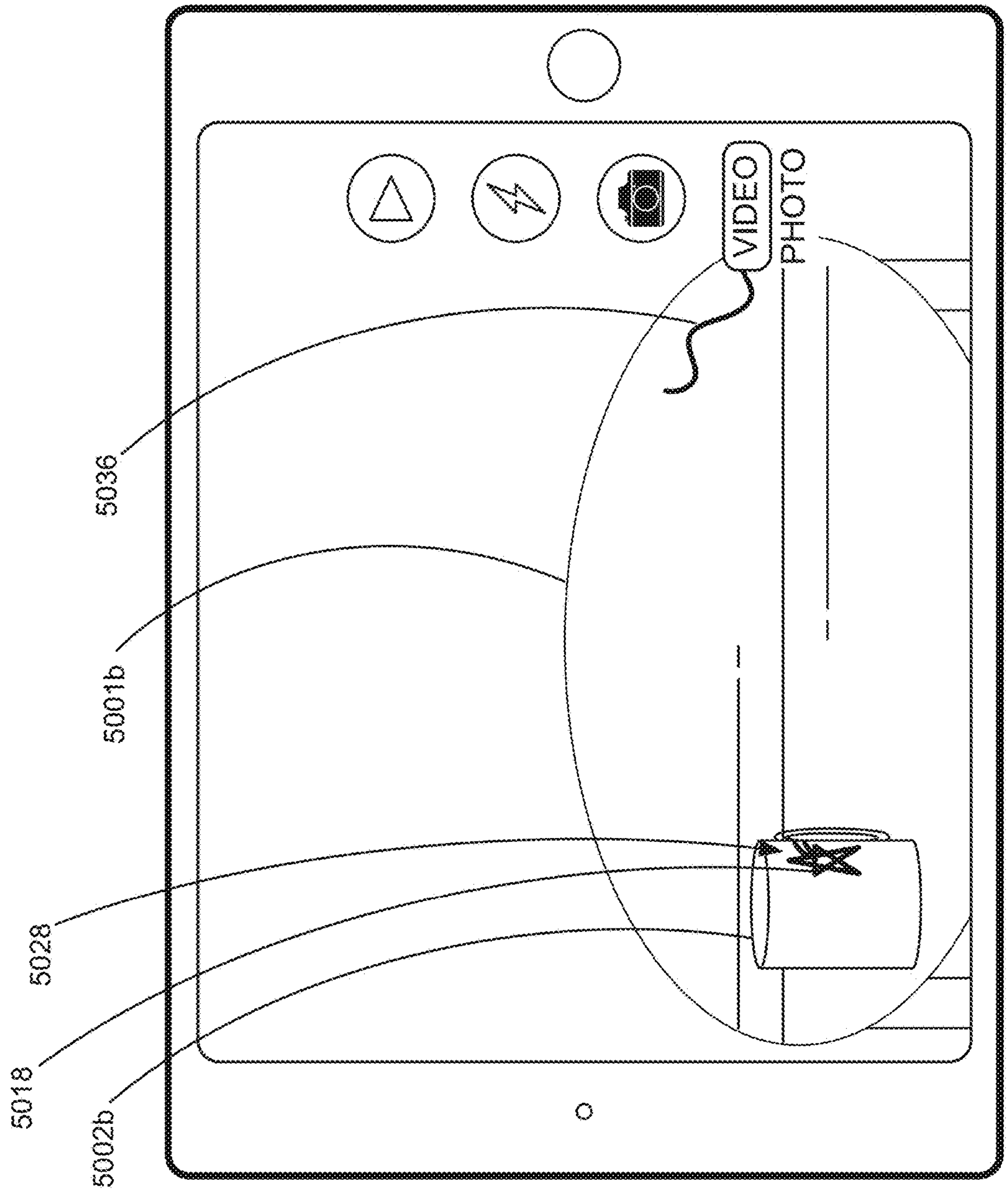

In FIG. 5Y, stylus 5012 provides an input at a location that corresponds to mode control 5004, as indicated by contact 5038. In FIG. 5Z, in response to the input by stylus 5012, the states of mode control 5004 and mode indicator 5010 have changed to indicate that the active mode of the annotation user interface 5003 has changed from the still image mode to the video mode. Because the lower right surface of table 5001*a* is visible in the field of view of the camera as displayed in the video mode of user interface 5003 in FIG. 5Z, annotation 5036 is displayed at a position in the video (e.g., in image frames that included the portion of table surface shown in FIG. 5X) that corresponds to the position in the still image at which the annotation 5036 was received (e.g., at a position that corresponds to the lower right surface of visual representation 5001*b* of physical table 5001*a*). Because the portion of physical environment 5000 visible in the field of view of the camera as displayed in the video mode of user interface 5003 does not include the portions of the physical environment that correspond to the spatial locations of annotations 5018 and 5028 (e.g., mug 5002*a* is not visible in the field of view of the camera), indicator dots 5022 and 5032 are displayed at positions that indicate off-screen virtual spatial locations of annotations 5018 and 5028, respectively, relative to the physical environment 5000.

From FIG. 5Z to FIG. 5AA, the position of device 100 changes relative to the physical environment 5000. As device 100 moves upward, the field of view of the camera of device 100 changes and indicators 5022 and 5032 move downward in user interface 5003. Because the lower right surface of table 5001*a* is no longer visible in the field of view of the camera as displayed in the video mode of user interface, indicator dot 5040 is displayed at a position in the video that corresponds to the position in the still image at which the annotation 5036 was received.

From FIG. 5AA to FIG. 5AB, the position of device 100 changes relative to the physical environment 5000. As device 100 continues to move upward, the field of view of the camera of device 100 changes and indicators 5022, 5032, and 5040 move downward in user interface 5003 to indicate off-screen virtual spatial locations of annotations 5018, 5028, and 5036, respectively, relative to the physical environment 5000.

From FIG. 5AB to FIG. 5AC, the position of device 100 changes, causing a change in the field of view of the camera of device 100 as displayed in user interface 5003. The positions of indicators 5022, 5032, and 5040 are updated based on the off-screen virtual spatial locations of annotations 5018, 5028, and 5036, respectively.

From FIG. 5AC to FIG. 5AD, the position of device 100 is changed relative to the physical environment 5000 such that the field of view of the device camera displayed in user interface 5003 includes the portion physical environment 5000 that includes mug 5002*a*. Annotations 5018 and 5028 are displayed in user interface 5003 and indicator dots 5022 and 5032 cease to be displayed.

From FIG. 5AD to FIG. 5AE, the position of device 100 is changed relative to the physical environment 5000 such that the field of view of the device camera displayed in user interface 5003 includes the portion physical environment 5000 that includes the lower right surface of table 5001*a*. Annotation 5036 is displayed in user interface 5003 and indicator dot 5040 ceases to be displayed.

From FIG. 5AE to FIG. 5AF, device 100 has moved around the perimeter and above table 5001*a* such that the positions and perspective of annotations 5018, 5028 and 5036 are changed.

Figure 6A:
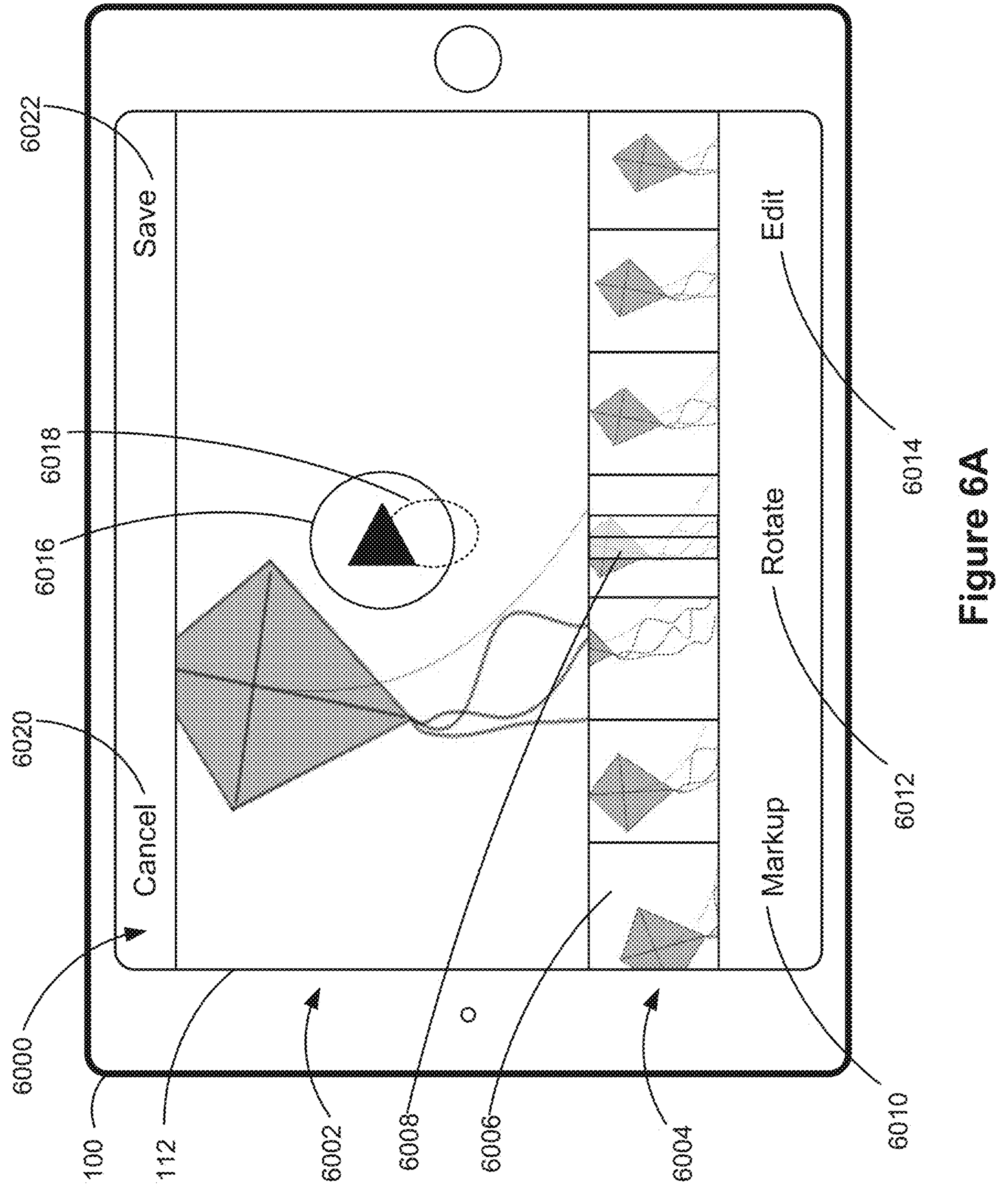
FIGS. 6A-6N illustrate example user interfaces for receiving an annotation on a portion of a physical environment captured in a still image that corresponds to a paused position of a video, in accordance with some embodiments.
Figure 6B:
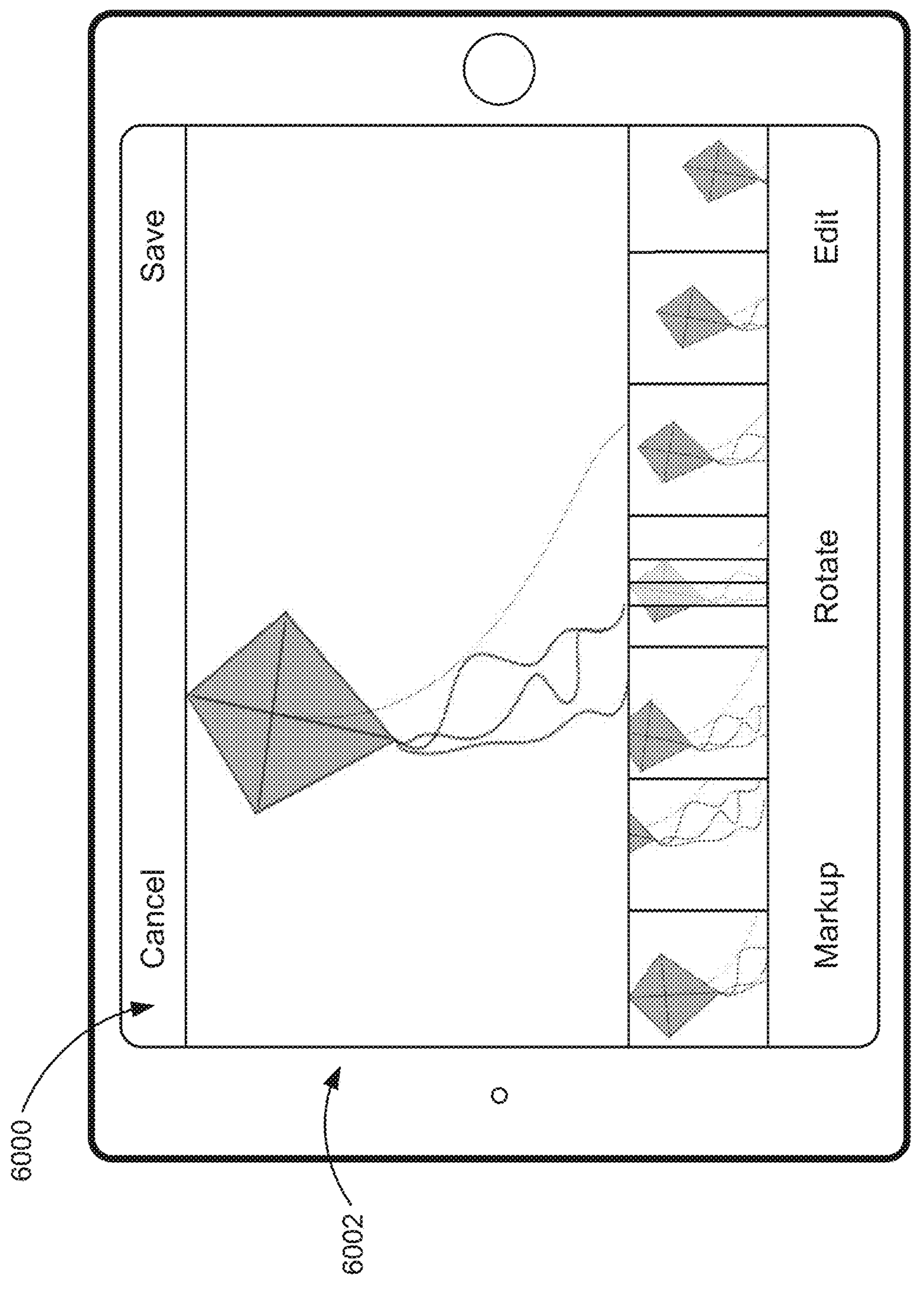
Figure 6C:
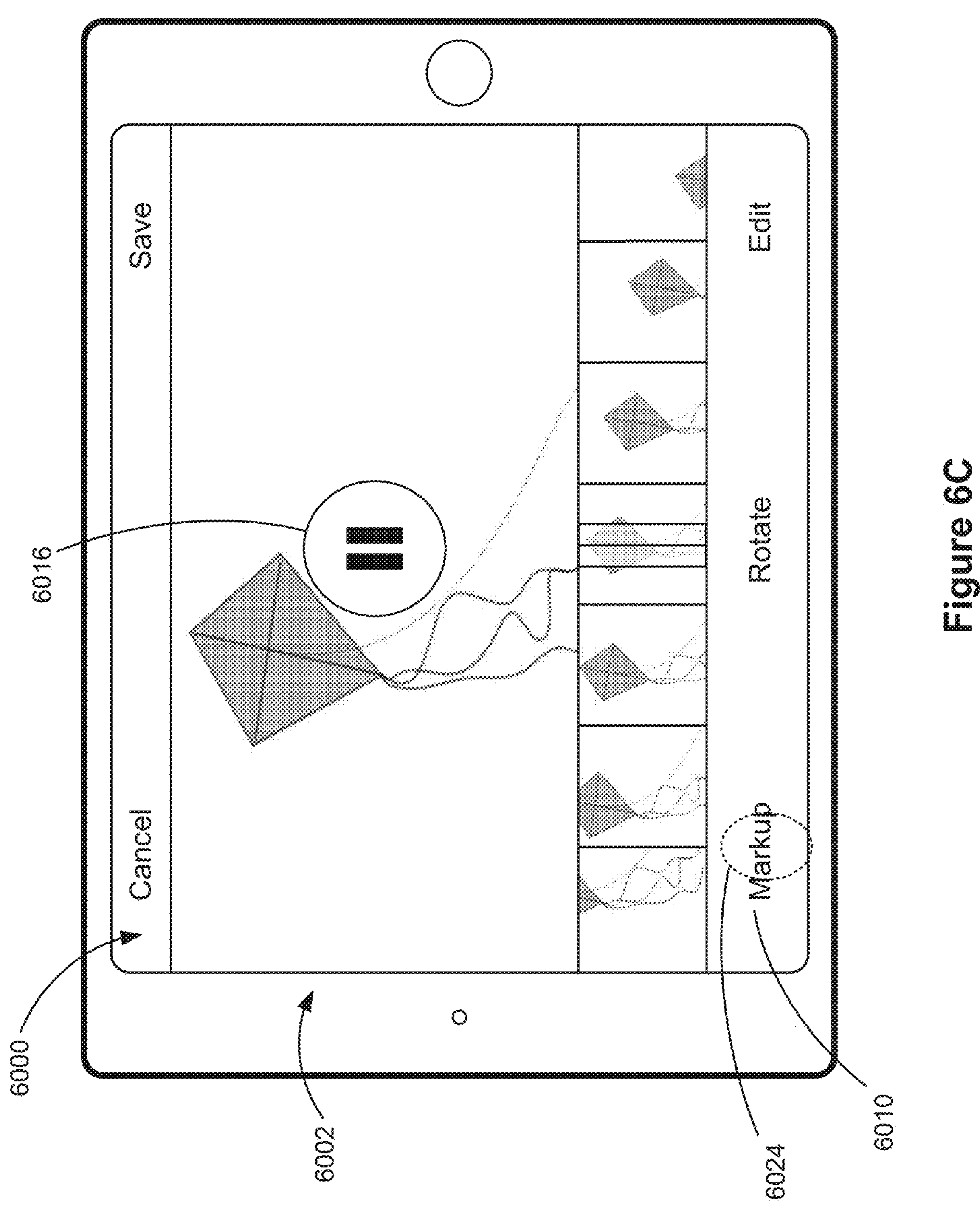
Figure 6D:
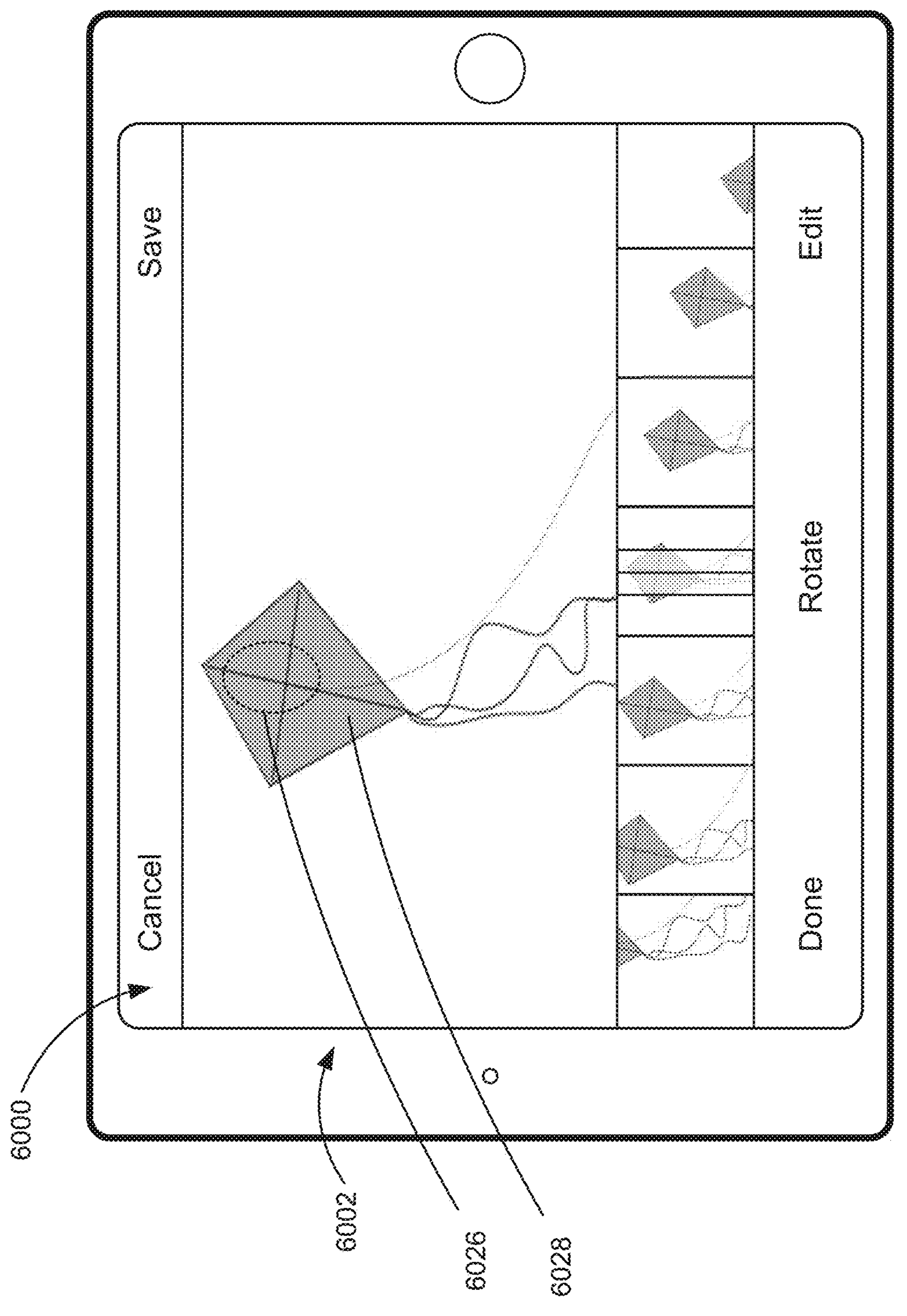
Figure 6E:
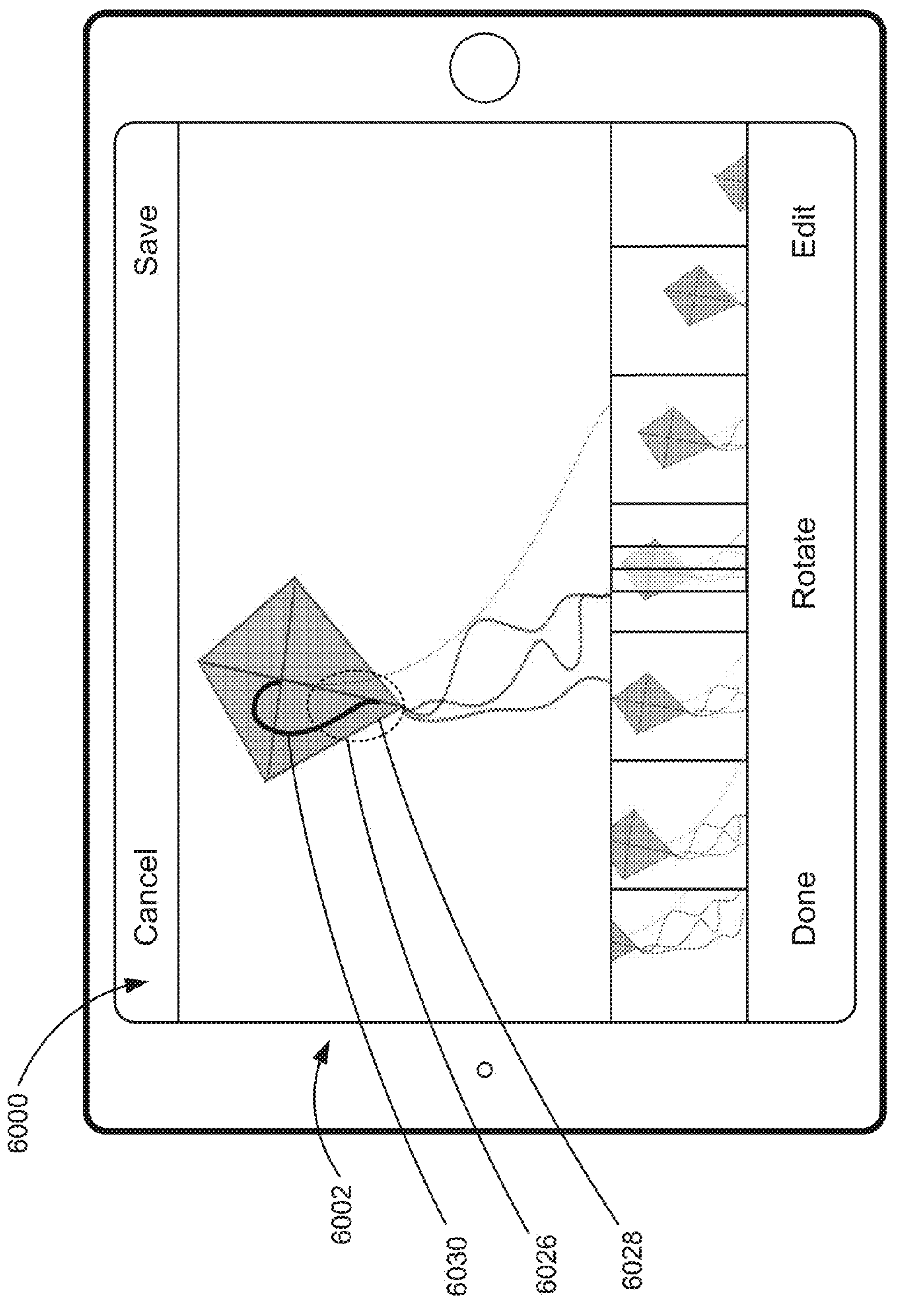
Figure 6F:
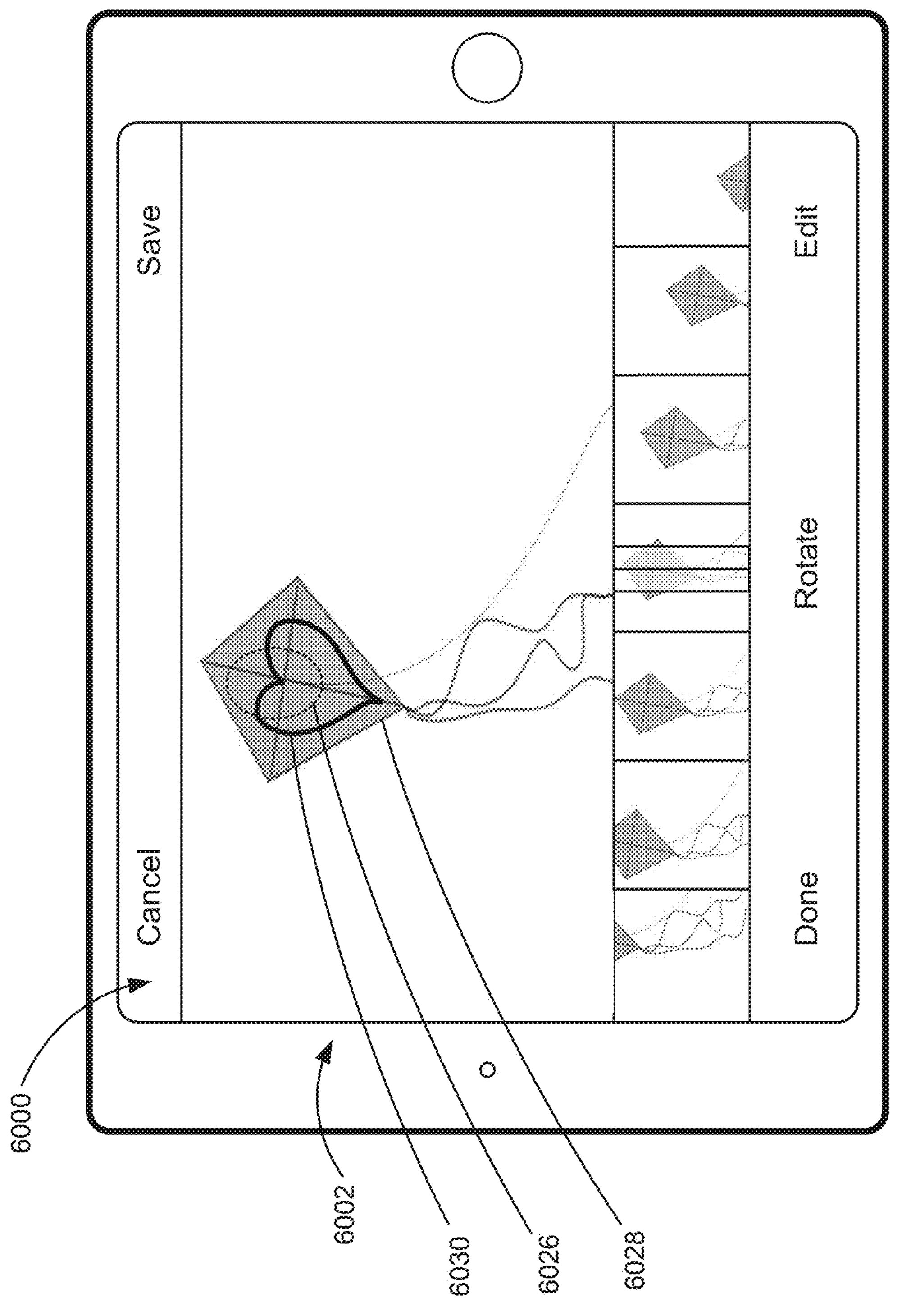
Figure 6G:
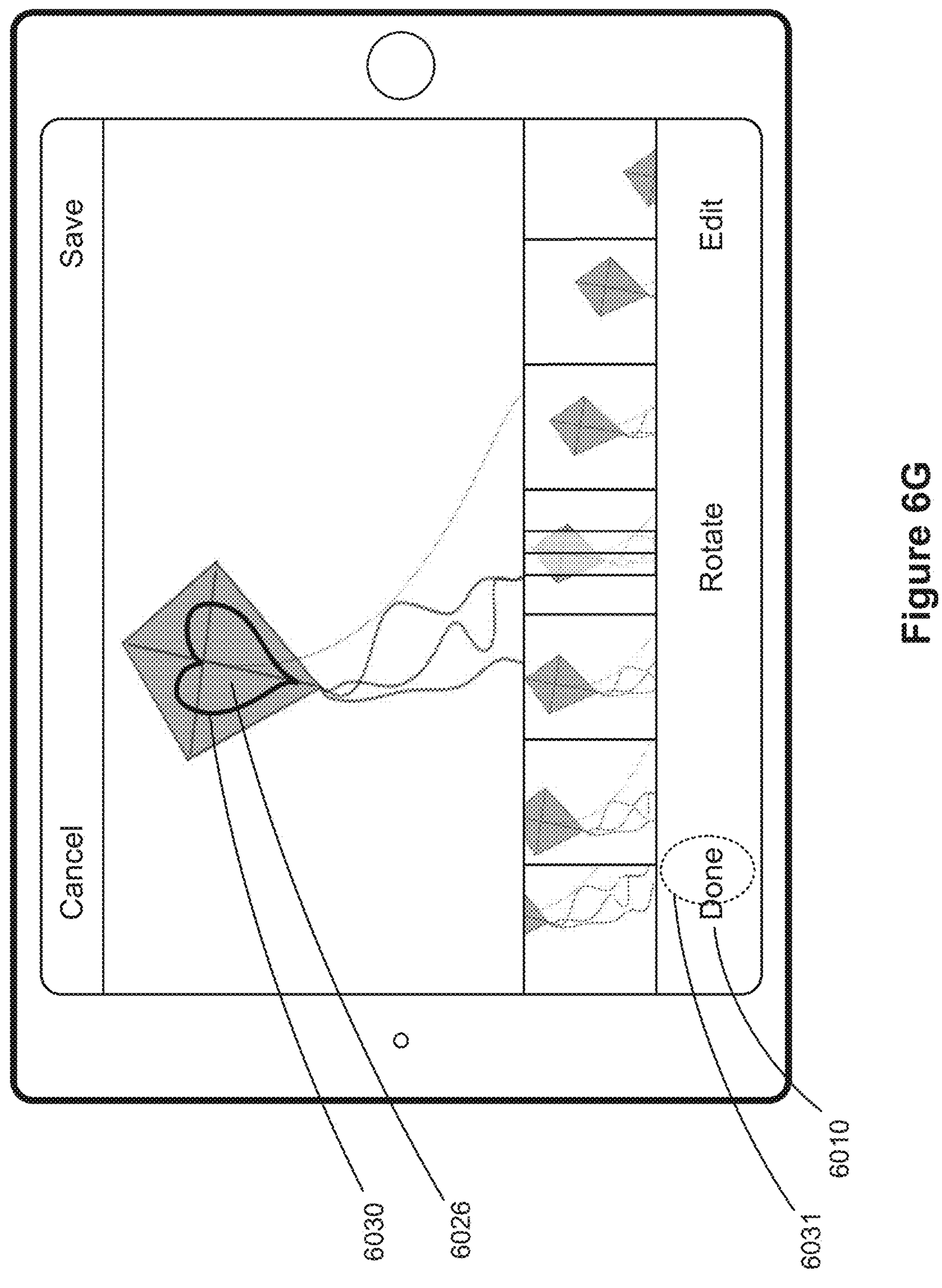
Figure 6H:
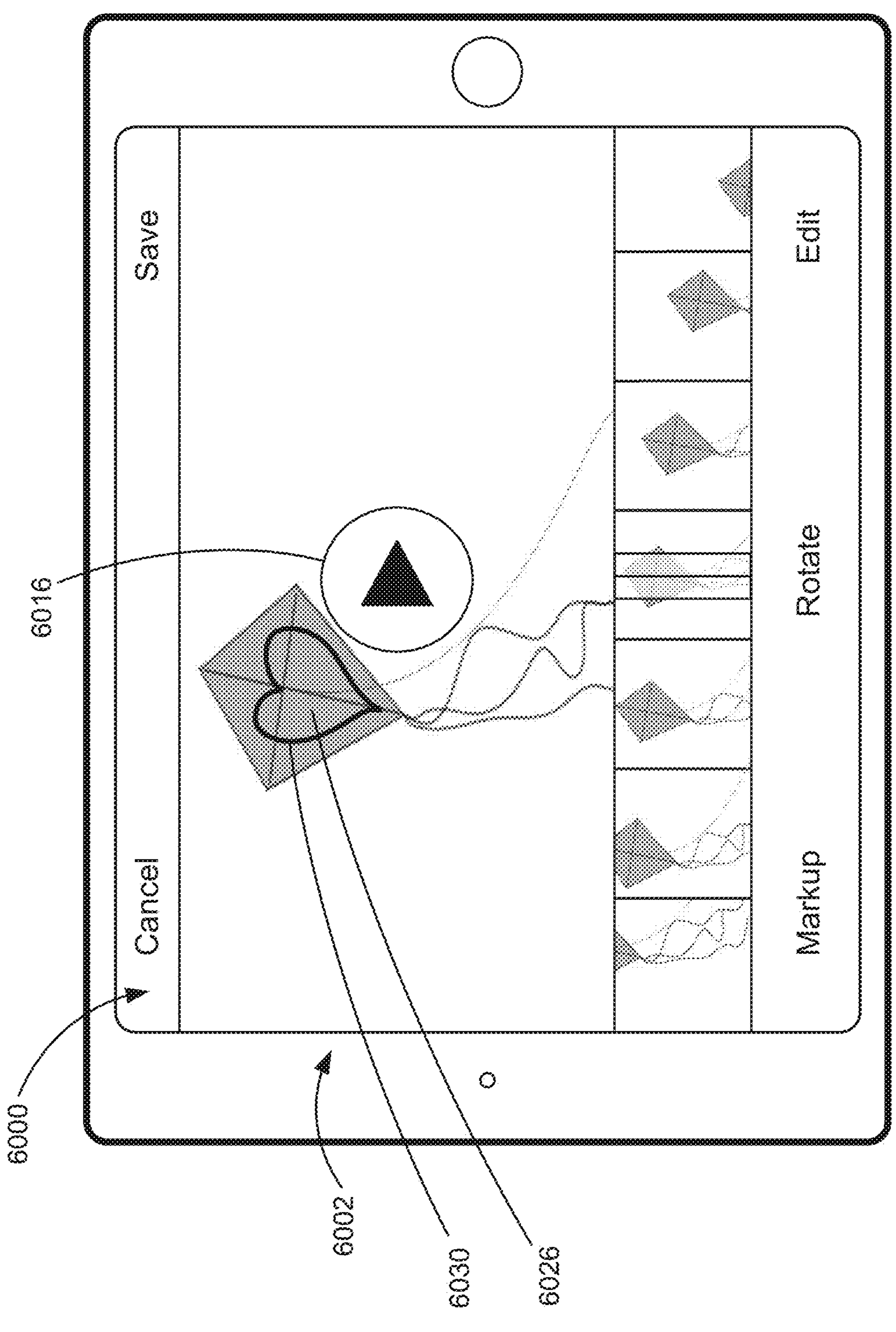
Figure 6I:
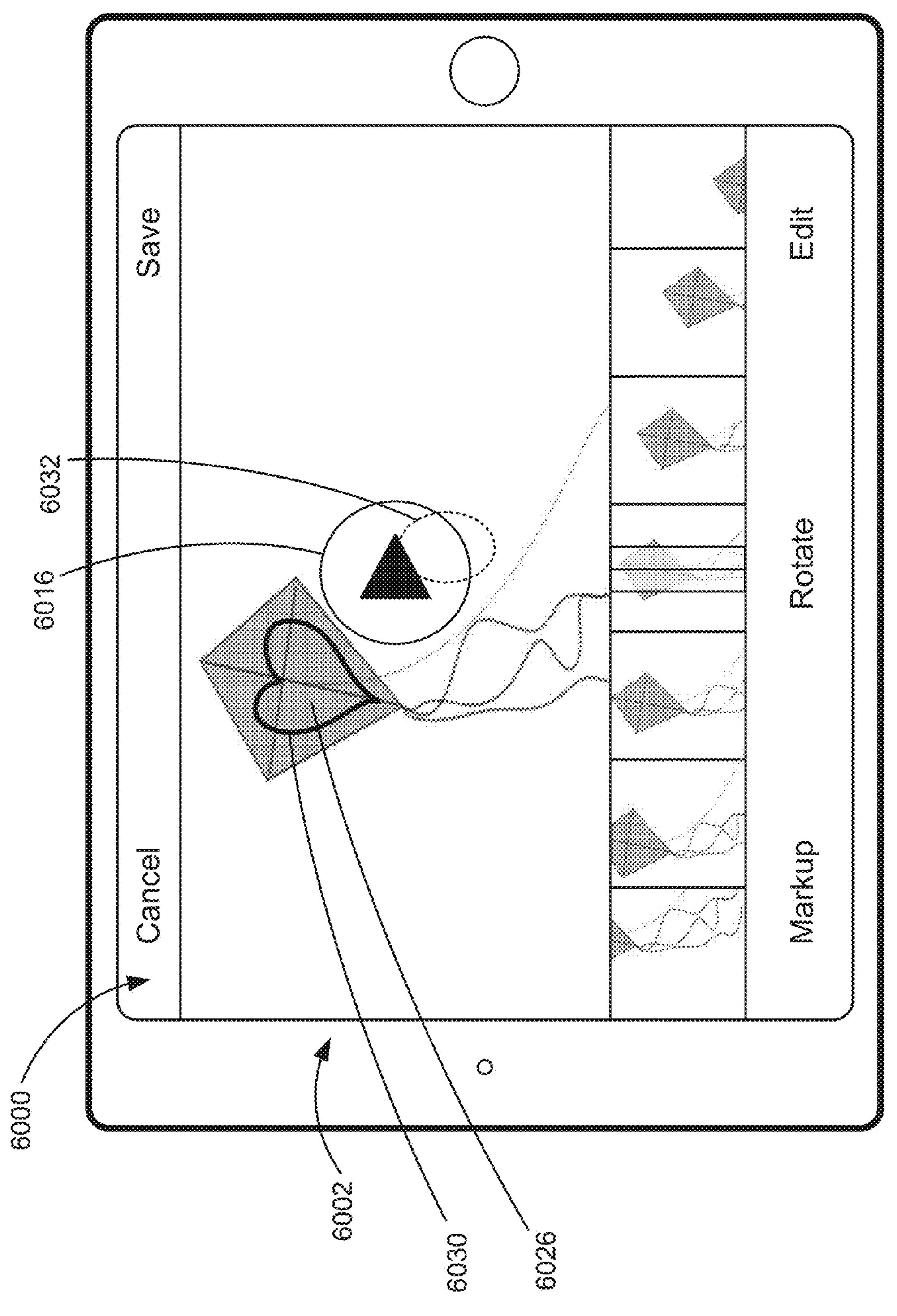
Figure 6J:
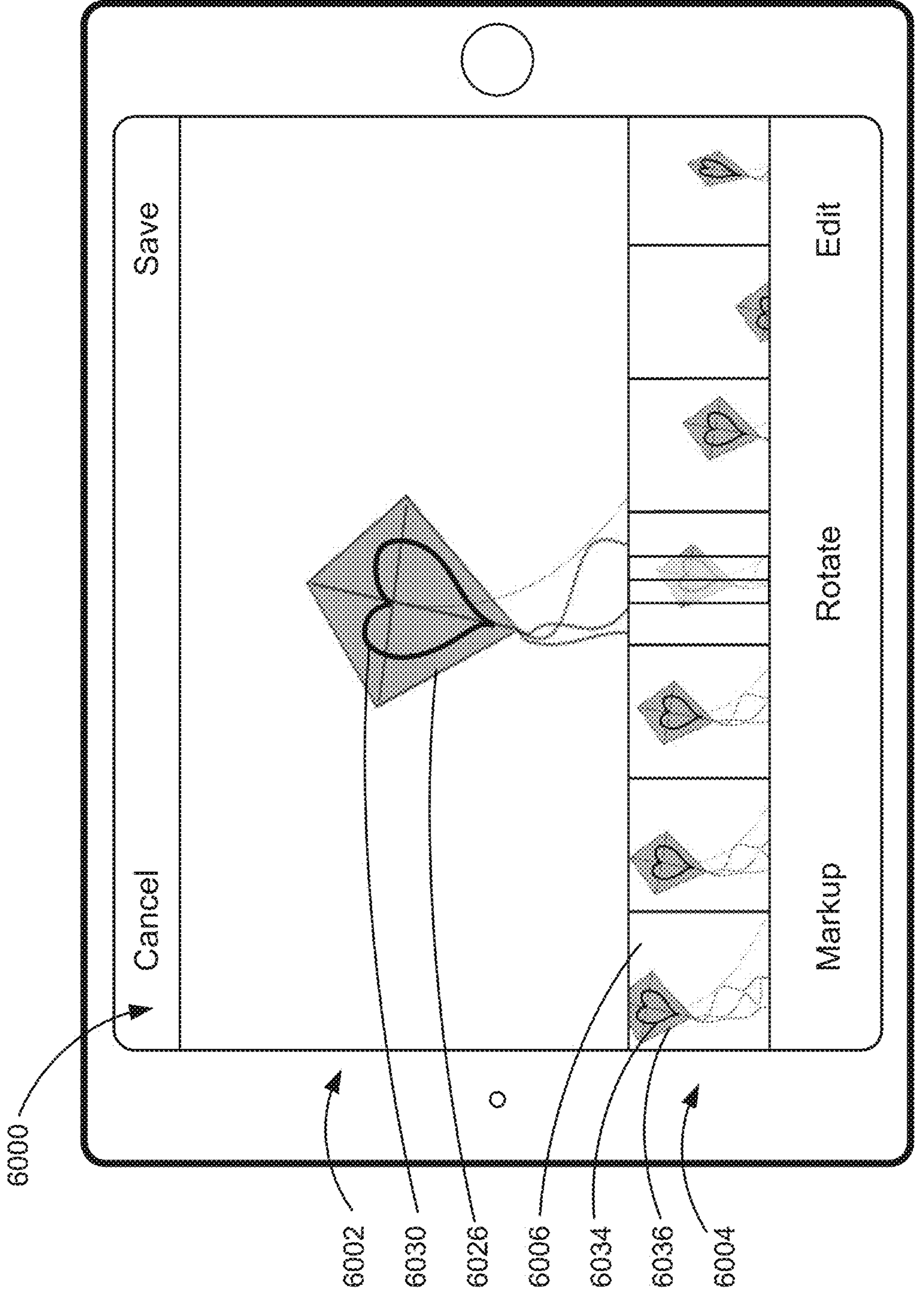
Figure 6K:
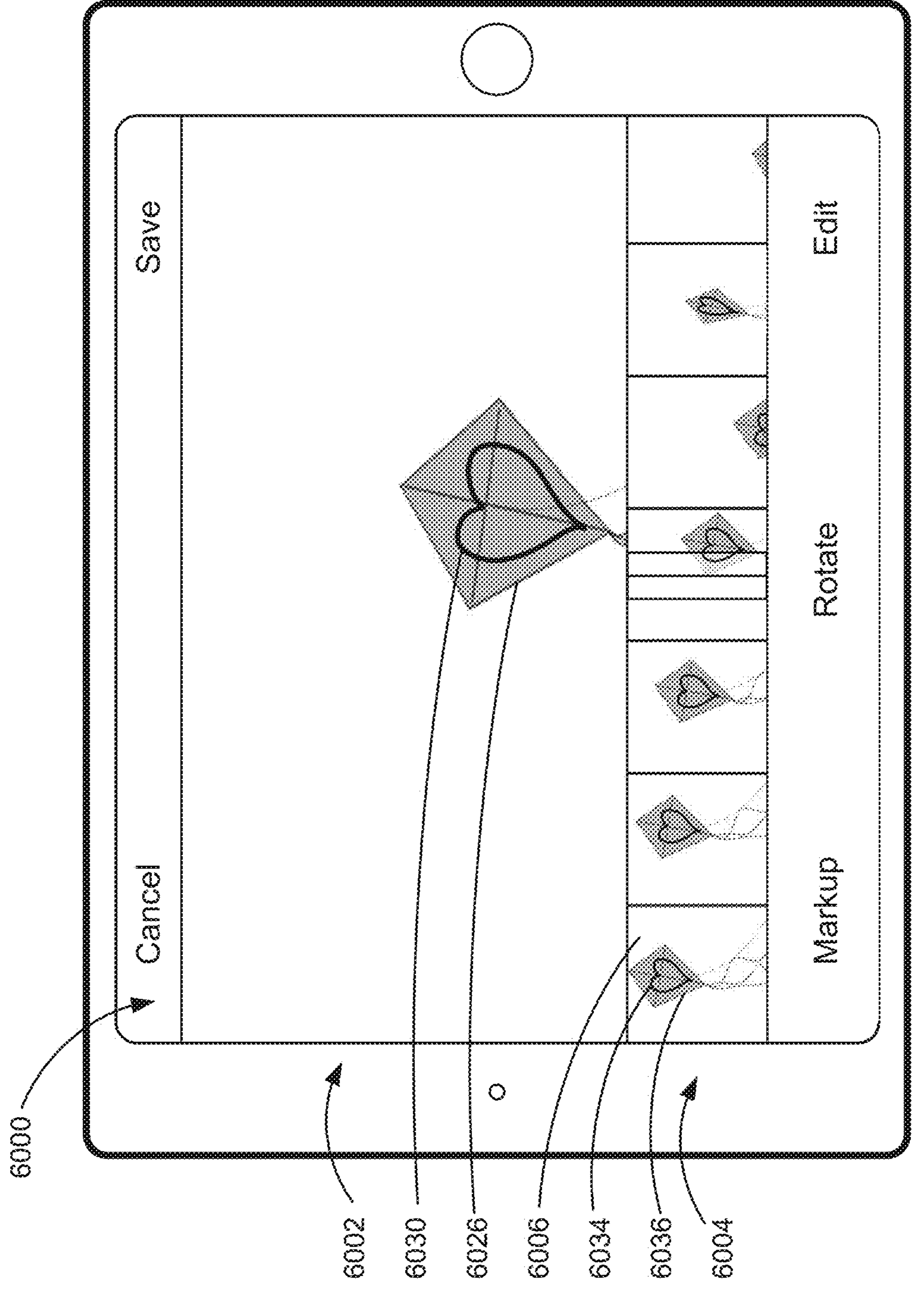
Figure 6L:
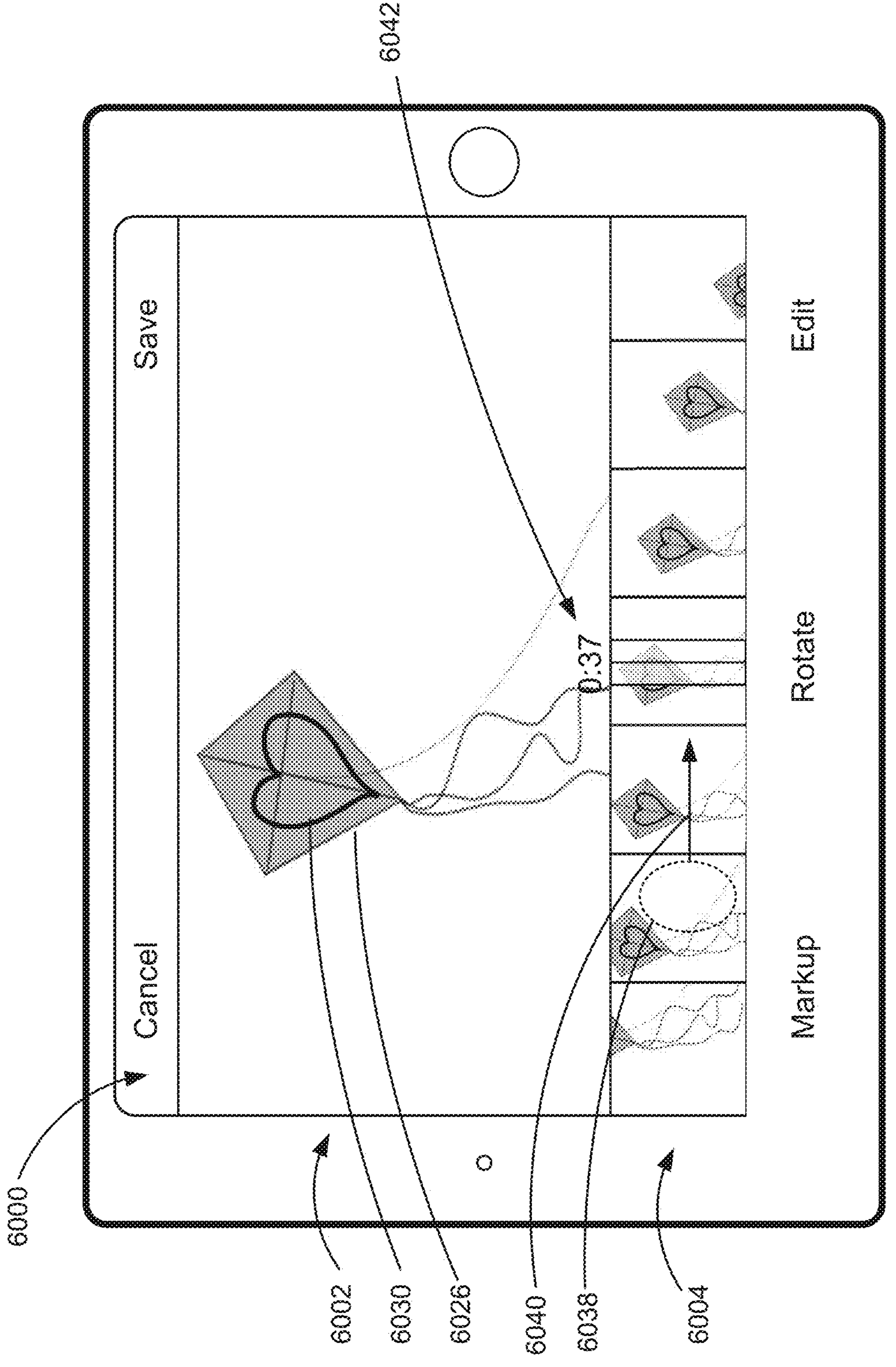
Figure 6M:
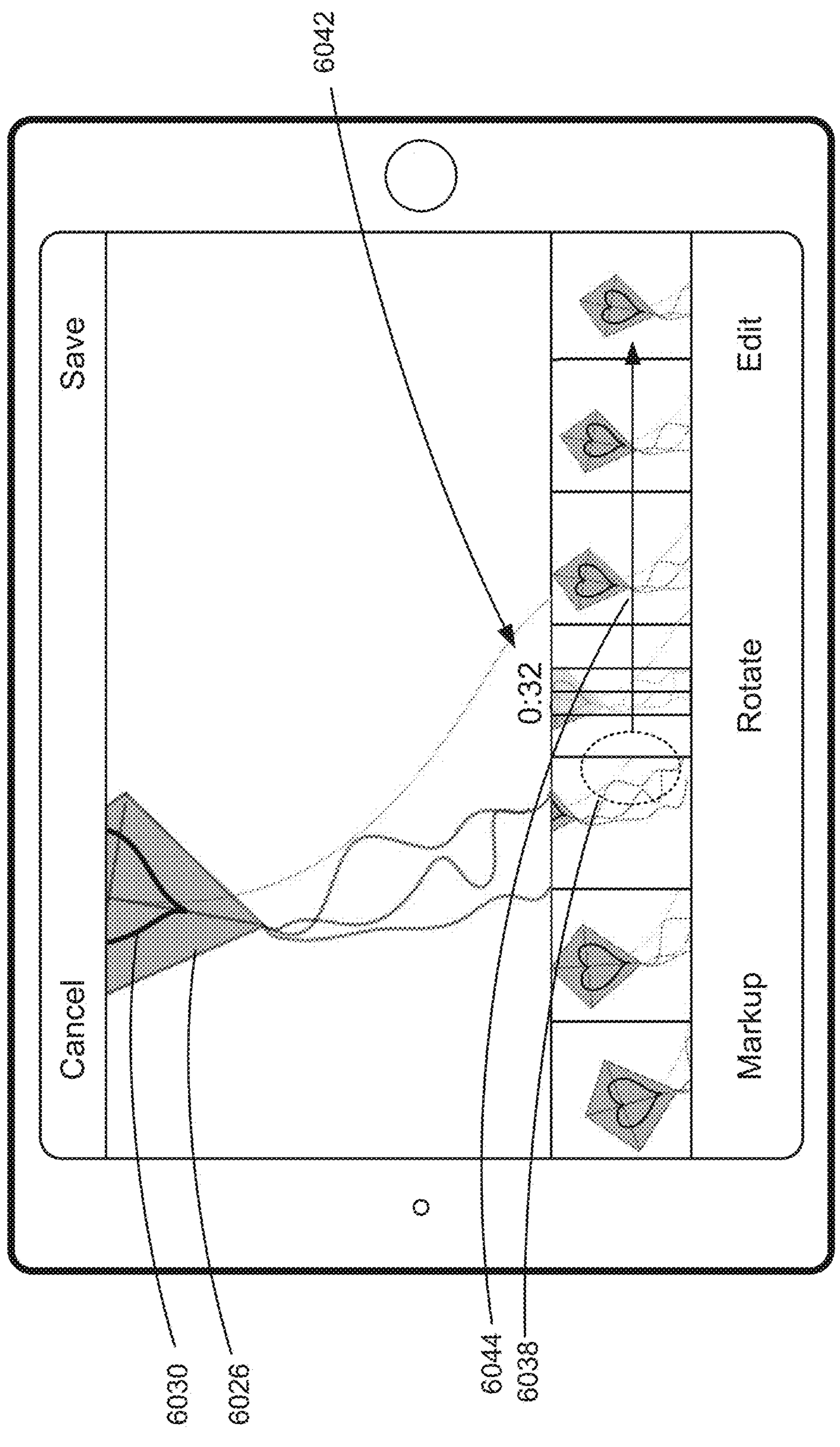
Figure 6N:
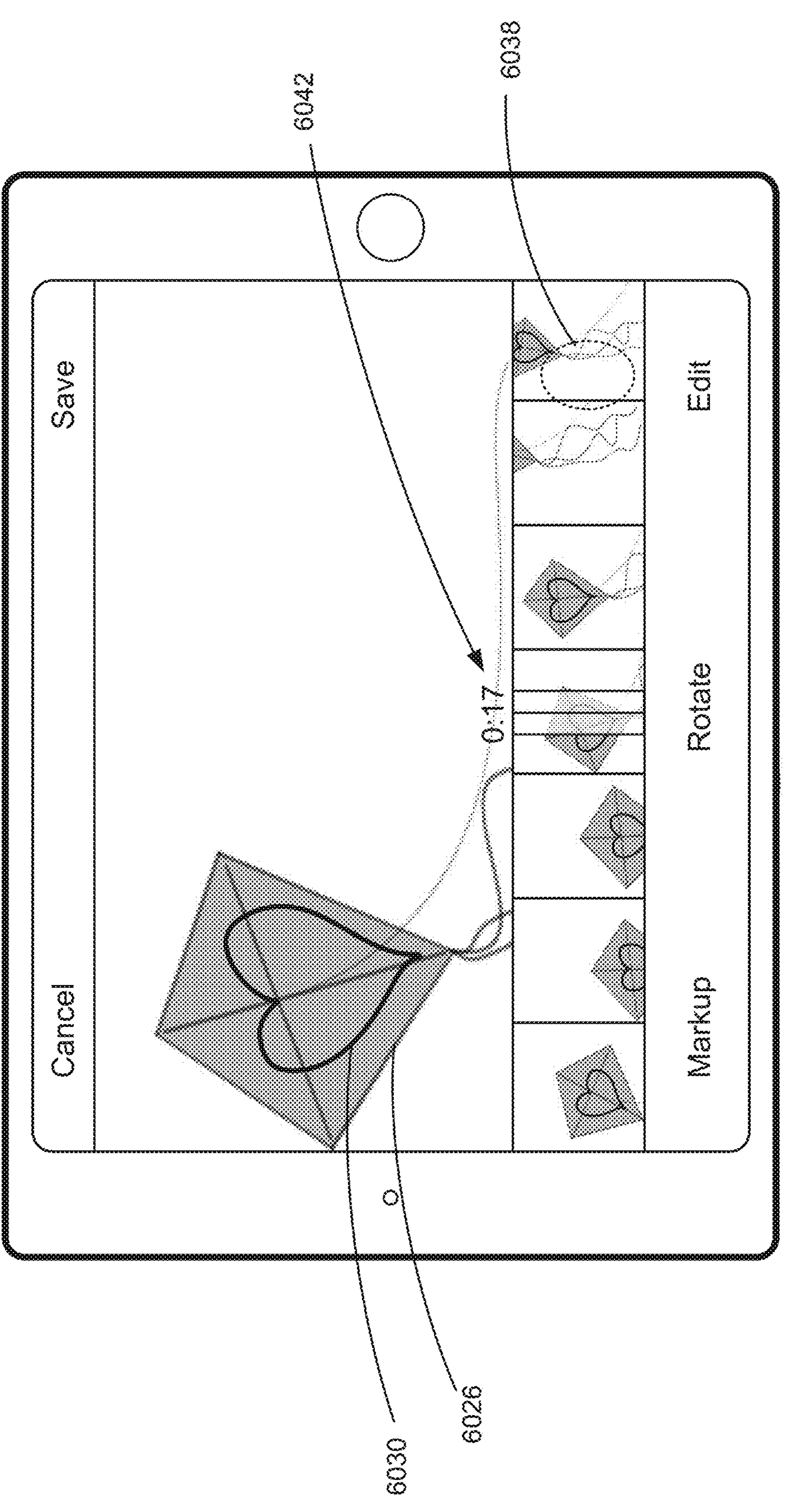

FIGS. 6A-6N illustrate example user interfaces for receiving an annotation on a portion of a physical environment captured in a still image that corresponds to a paused position of a video, in accordance with some embodiments. The user interfaces in these figures are used to illustrate the processes described below, including the processes in FIGS. 9A-9F, 10A-10B, 11A-11F, and 12A-12D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 6A illustrates a user interface 6000 that includes a video playback region 6002. In some embodiments, user interface 6000 is accessed via a listing of media content objects (e.g., in an image and/or video viewing application). In some embodiments, user interface 6000 also includes a timeline 6004 (e.g., a set of sample frames 6006 that correspond to consecutive segments of the video). Timeline 6004 includes a current position indicator 6008 that indicates a position on timeline 6004 that corresponds to a frame displayed in video playback region 6002. through the video displayed in video playback region 6002. In some embodiments, user interface includes markup control 6010 (e.g., for initiating a markup mode for marking up the video displayed in video playback region 6002), rotate control 6012 (e.g., for rotating the video displayed in video playback region 6002), edit control 6014 (e.g., for editing the video displayed in video playback region 6002), cancel control 6020 (e.g., for cancelling a current operation), rotate control 6022 (e.g., for rotating the video displayed in video playback region 6002), and play/pause toggle control 6016 (e.g., for playing back and pausing the video displayed in video playback region 6002). A contact 6018 with touch screen display 112 (e.g., an input by a user's finger) is detected at a location that corresponds to play/pause toggle control 6016.

In FIG. 6B, in response to the input detected at the location that corresponds to play/pause toggle control 6016, playback of a video is initiated in video playback region 6002.

In FIG. 6C, as the video continues to play back, an input is detected at a location that corresponds to markup control 6010, as indicated by contact 6024. In response to the input by contact 6024 at the location that corresponds to markup control 6010, playback of the video is paused, a still image that corresponds to the paused position of the video is displayed, a markup mode is initiated in which input received at a location that corresponds to video playback region 6002 will mark the video, and a state of markup control 6010 is changed such that the text "done" is displayed (e.g., to indicate that input to select control 6010 will terminate the markup mode).

In FIGS. 6D-6F, annotation input is detected at a location within video playback region 6002, as indicated by contact 6026. As the contact moves along a path as indicated in FIGS. 6D-6F, an annotation 6030 is received. In some embodiments, the annotation is received at a location that corresponds to an object in the video (e.g., kite 6028). In FIG. 6G, an input by contact 6031 is detected at a location that corresponds to markup control 6010 while a markup mode is active and the text "Done" is displayed. In response to the input by contact 6031 to terminate the markup session (and/or after time passed since the last input was received increases above a threshold amount of time), play/pause toggle control 6016 is redisplayed, as indicated in FIG. 6H.

In FIG. 6I, an input is detected at a location that corresponds to play/pause toggle control 6016, as indicated by contact 6032.

In FIGS. 6I-6K, in response to the input detected at the location that corresponds to play/pause toggle control 6016, the video resumes playback in video playback region 6002. As shown in FIG. 6J, the sample frames of timeline 6004 include markings at locations in the respective images that correspond to kite 6028. For example, sample frame 6006 includes a marking 6034 at a location that corresponds to kite 6036. Annotation 6030 that was applied to kite object 6028 in video playback region 6002 has been applied to sample frames in timeline 6004, including frames of the video that occur before a point in time in the video at which annotation 6030 was received (e.g., frames to the left of scrub control 6008 in timeline 6004, such as sample frame 6006) and frames of the video that occur after the point in time in the video at which annotation 6030 was received (e.g., frames to the right of scrub control 6008 in timeline 6004). In each of the sample frames of timeline 6004 in which kite object 6036 (corresponding to kite object 6028 to which annotation 6030 was applied in video playback region 6002) is visible, the marking (e.g., marking 6034, corresponding to annotation 6030) is shown at a location that corresponds to the changing locations of kite object 6036 within the sample frames. The marking is displayed with a size and orientation that is scaled in correspondence with the changing size and orientation of kite object 6036 within the sample frames. As the video displayed in video playback region 6002 plays forward to a frame that is later in the video than a frame at which the video was stopped for receiving annotation input, annotation 6030 is displayed with a size and orientation that is scaled in correspondence with the changing size and orientation of kite object 6026, as shown in FIG. 6K. In this way, an annotation that is received in video playback region 6002 is applied to an object (e.g., such that the annotation tracks the object) as the object moves and changes size (e.g., due to its changing distance from the camera) and orientation (e.g., in any direction in three-dimensional space) over the course of the video.

In FIG. 6L, an input is detected at a location that corresponds to timeline 6004, as indicated by contact 6038. As contact 6038 moves along a path indicated by arrows 6040 and 6044, the video displayed in video playback region 6002 rewinds, as illustrated in FIGS. 6L-6N. For example, as contact 6038 moves across timeline 6004, time indication 6042 associated with the currently displayed frame in video playback region 6002 decreases. As the video displayed in video playback region 6002 rewinds to a frame that is prior to a frame at which the video was stopped for receiving annotation input, annotation 6030 is displayed with a size and orientation that is scaled in correspondence with the changing size and orientation of kite object 6026.

Figure 7A:
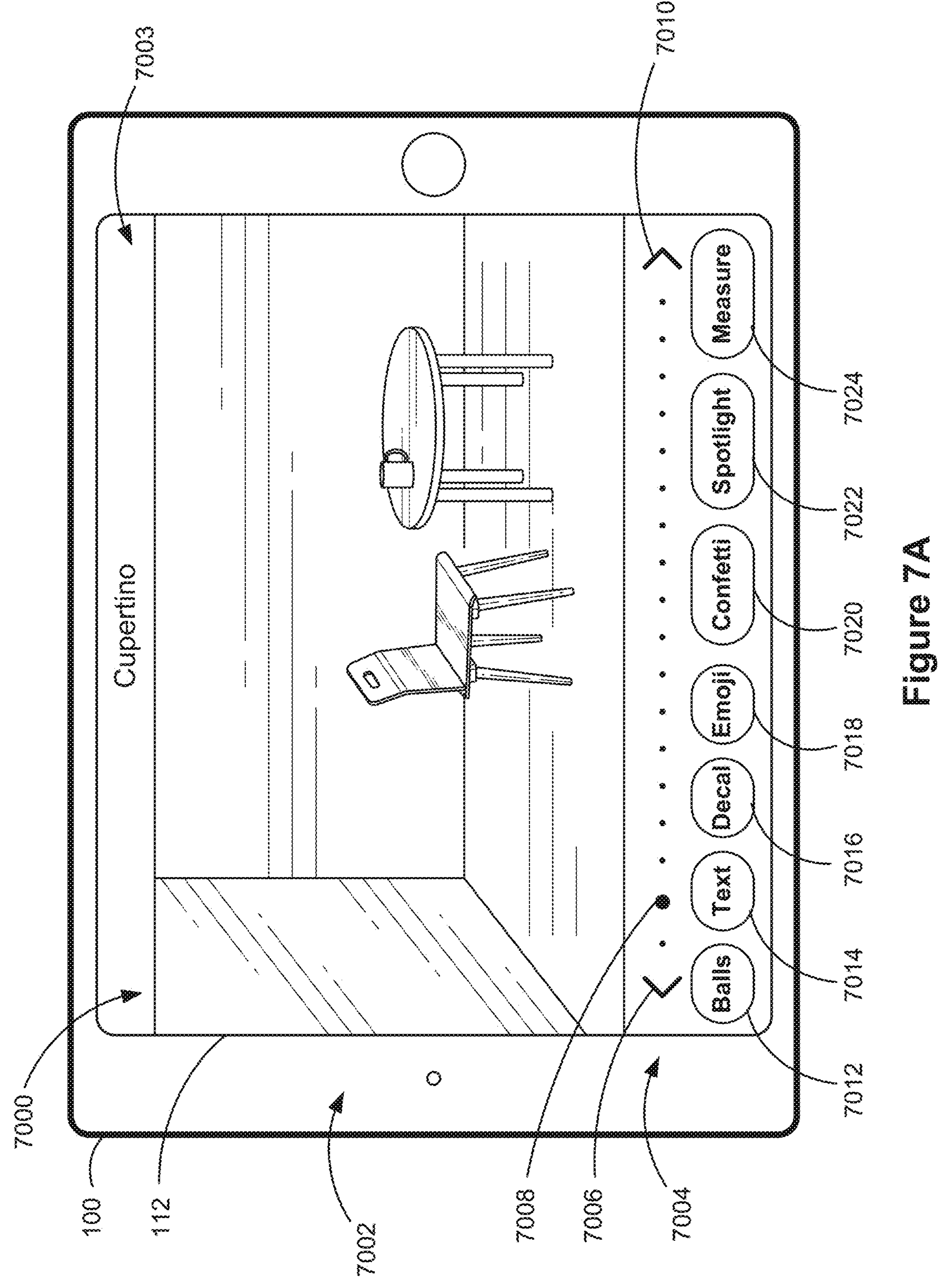
FIGS. 7A-7BF illustrate example user interfaces for adding a virtual object to a previously captured media object, in accordance with some embodiments.
Figure 7B:
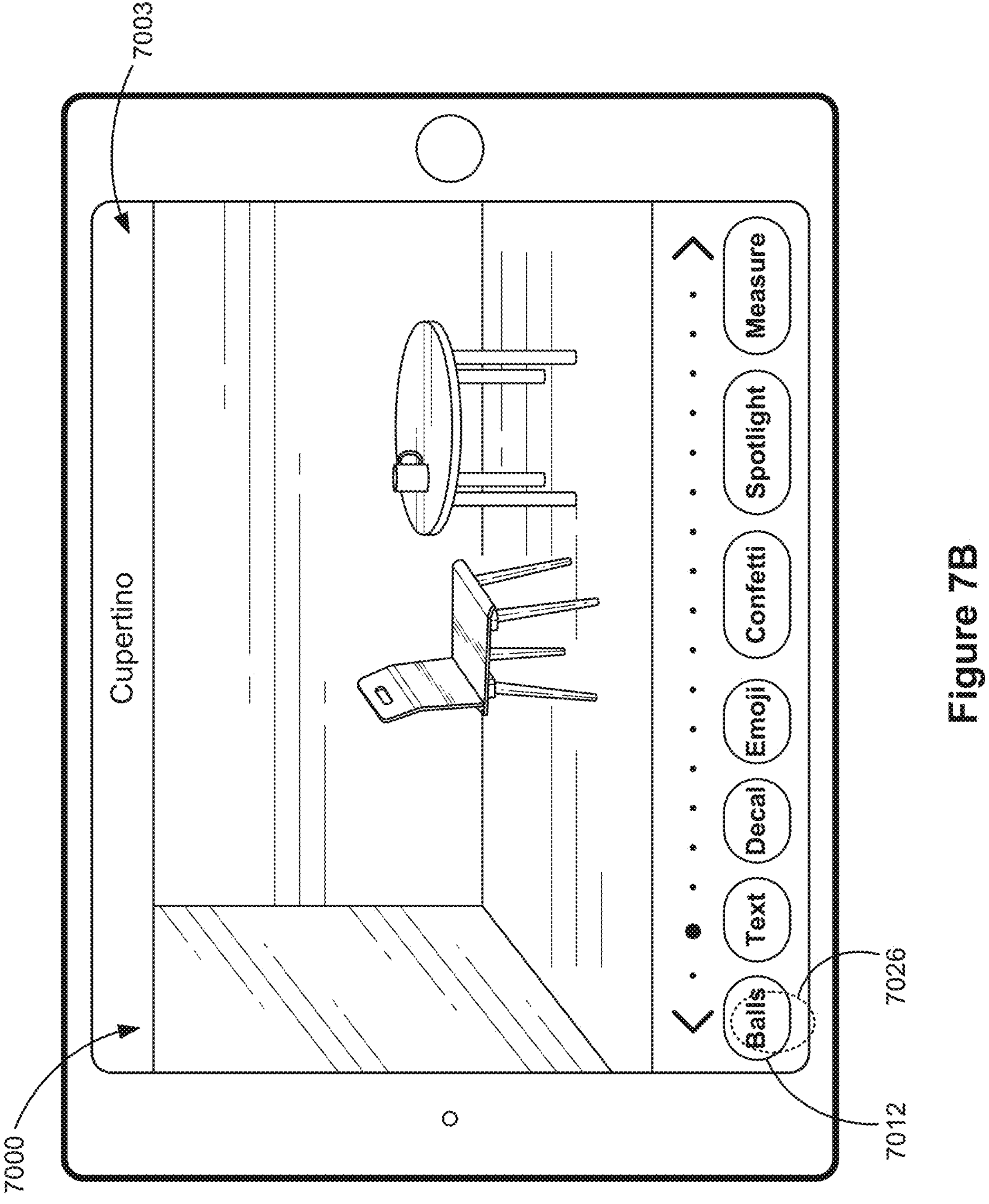

FIGS. 7A-7BF illustrate example user interfaces for adding a virtual object to a previously captured media object, in accordance with some embodiments. The user interfaces in these figures are used to illustrate the processes described below, including the processes in FIGS. 9A-9F, 10A-10B, 11A-11F, and 12A-12D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 7A illustrates a user interface 7000, displayed by touch screen display 112 of device 100, that includes a media object display region 7002 and a navigation region 7004. In some embodiments, user interface 7000 is accessed via a listing of media content objects (e.g., in an image and/or video viewing application). A previously captured image is displayed in media object display region. Information that corresponds to the previously captured image (e.g., a location where the image was captured, "Cupertino") is displayed in information region 7003. Navigation region 7004 includes a prior media object control 7006 (e.g., for navigating to a prior media object), a current media object indicator 7008 (e.g., that indicates a position (represented by an enlarged dot) of the previously captured image relative to other media objects (represented by non-enlarged dots) stored by device 100), and a subsequent media object control 7010 (e.g., for navigating to a subsequent media object. User interface 7000 includes controls 7012-7024 for adding various virtual objects to a previously captured image displayed in media object display region 7002, as discussed further below with regard to FIGS. 7B-7BG. The ways in which virtual objects are displayed relative to physical objects in previously captured images, as described in accordance with various embodiments herein, provide the user with an indication that depth data is stored for previously captured images and that virtual objects are able to interact with various surfaces in various images. The interaction of virtual objects with the physical objects in the physical environment captured in an image provides the user with an indication of the presence of detectable surfaces in the image.

FIGS. 7B-7L illustrate how virtual ball objects interface with surfaces of physical objects depicted in previously captured images displayed in media object display region 7002. For example, a captured image is stored with depth data that is used to determine the locations of surfaces (e.g., horizontal and/or vertical planes) that correspond to physical objects in a physical environment captured in an image.

Figure 7C:
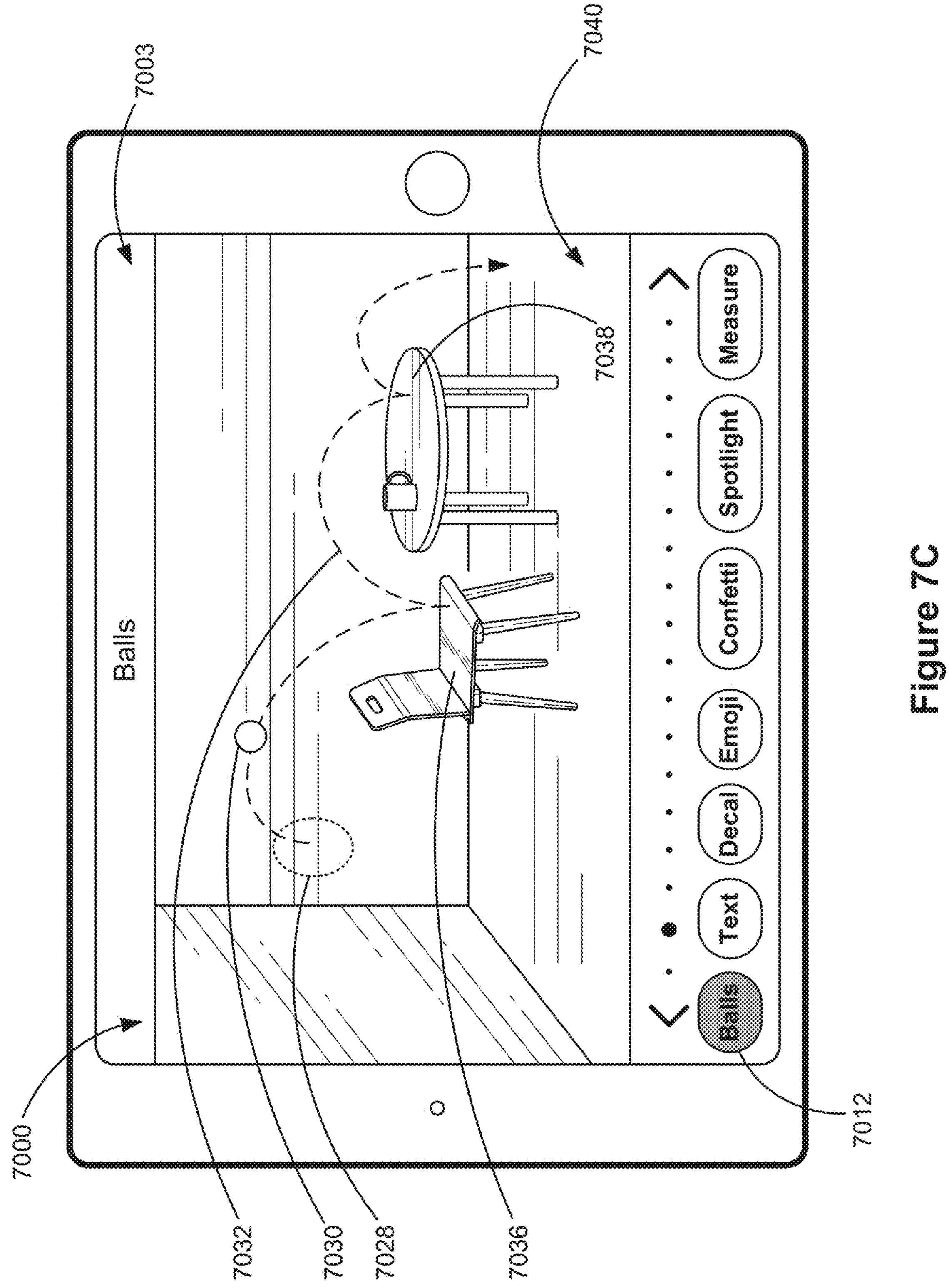

In FIG. 7B, an input (e.g., a tap input) by contact 7026 is received at a location that corresponds to Balls control 7012 for adding virtual balls to a previously captured image displayed in media object display region 7002. In FIG. 7C, in response to detecting the input that selects Balls control 7012, the mode of user interface 7000 is changed to a ball generation mode, as indicated by the "Balls" label in information region 7003 and by the altered visual state of Balls control 7012. An input (e.g., a tap input) is received at a location indicated by contact 7028. In response to detecting the contact, a virtual ball 7030 is added to the previously captured image displayed in media object display region 7002. For example, adding virtual ball 7030 to the previously captured image includes launching virtual ball 7030 with an upward trajectory from the point at which contact 7028 is detected and along a path indicated by dotted line 7032 (e.g., virtual ball 7030 falls under the influence of simulated gravity, bounces off of a surface of chair object 7036 in the previously captured image, bounces off of a surface of table object 7038 in the previously captured image, falls to floor surface 7040 in the previously captured image, and rolls along the floor surface 7040).

Figure 7D:
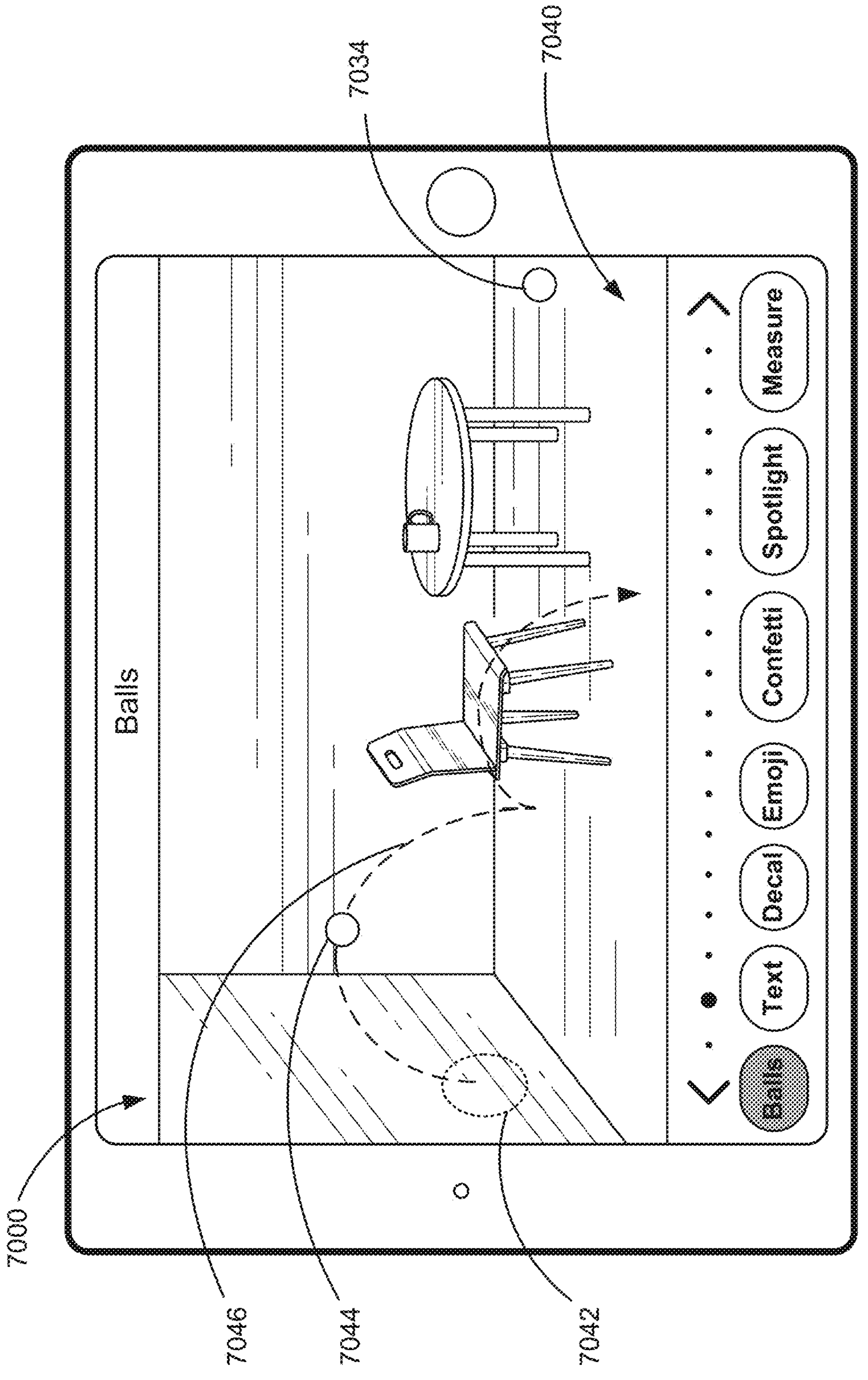

In FIG. 7D, an input (e.g., a tap input) is received at a location indicated by contact 7042. In response to detecting the contact, a virtual ball 7044 is added to the previously captured image displayed in media object display region 7002 and virtual ball 7044 moves along a path 7046 (e.g., bouncing of off of floor 7040 and landing on floor 7040).

Figure 7E:
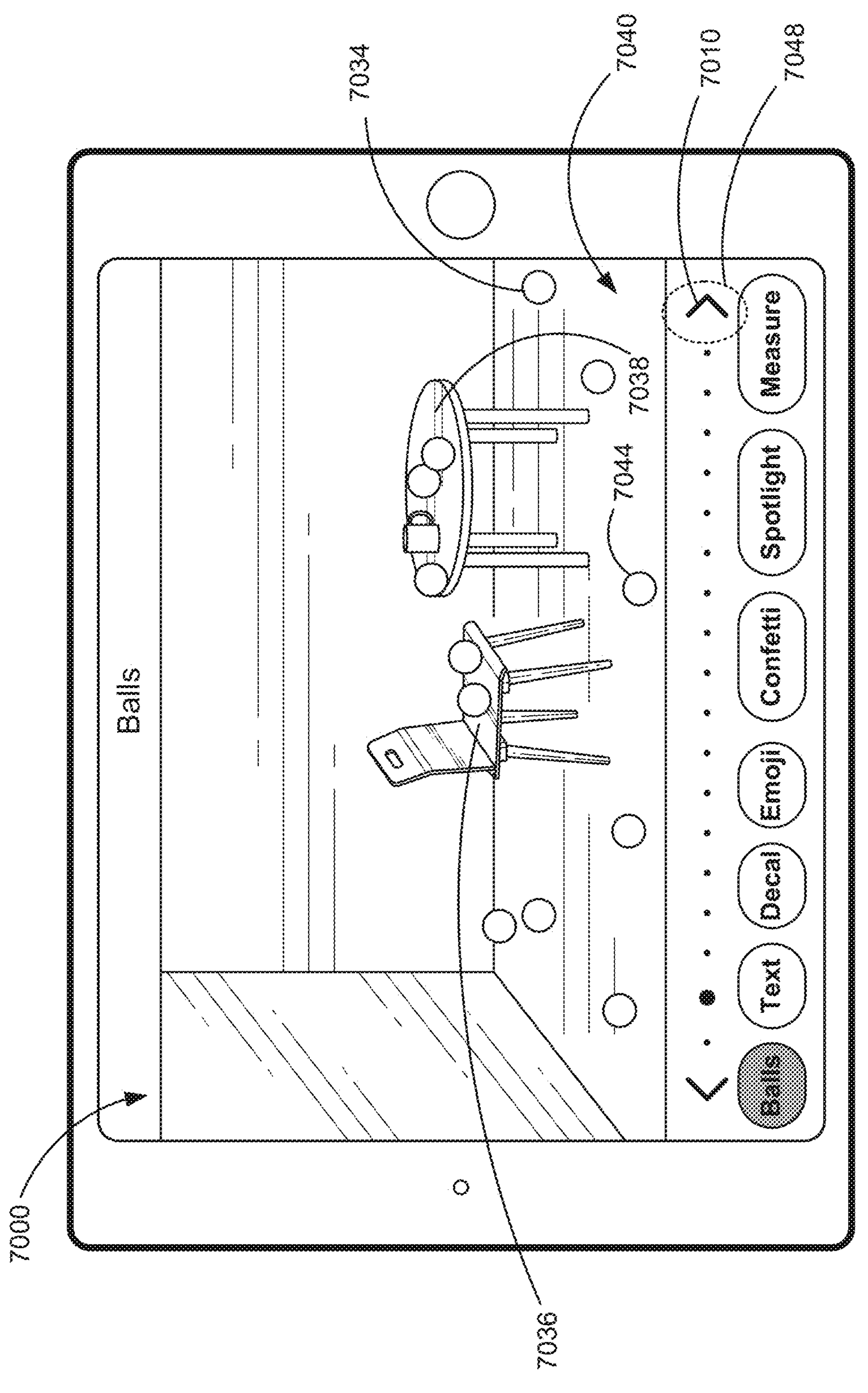
Figure 7F:
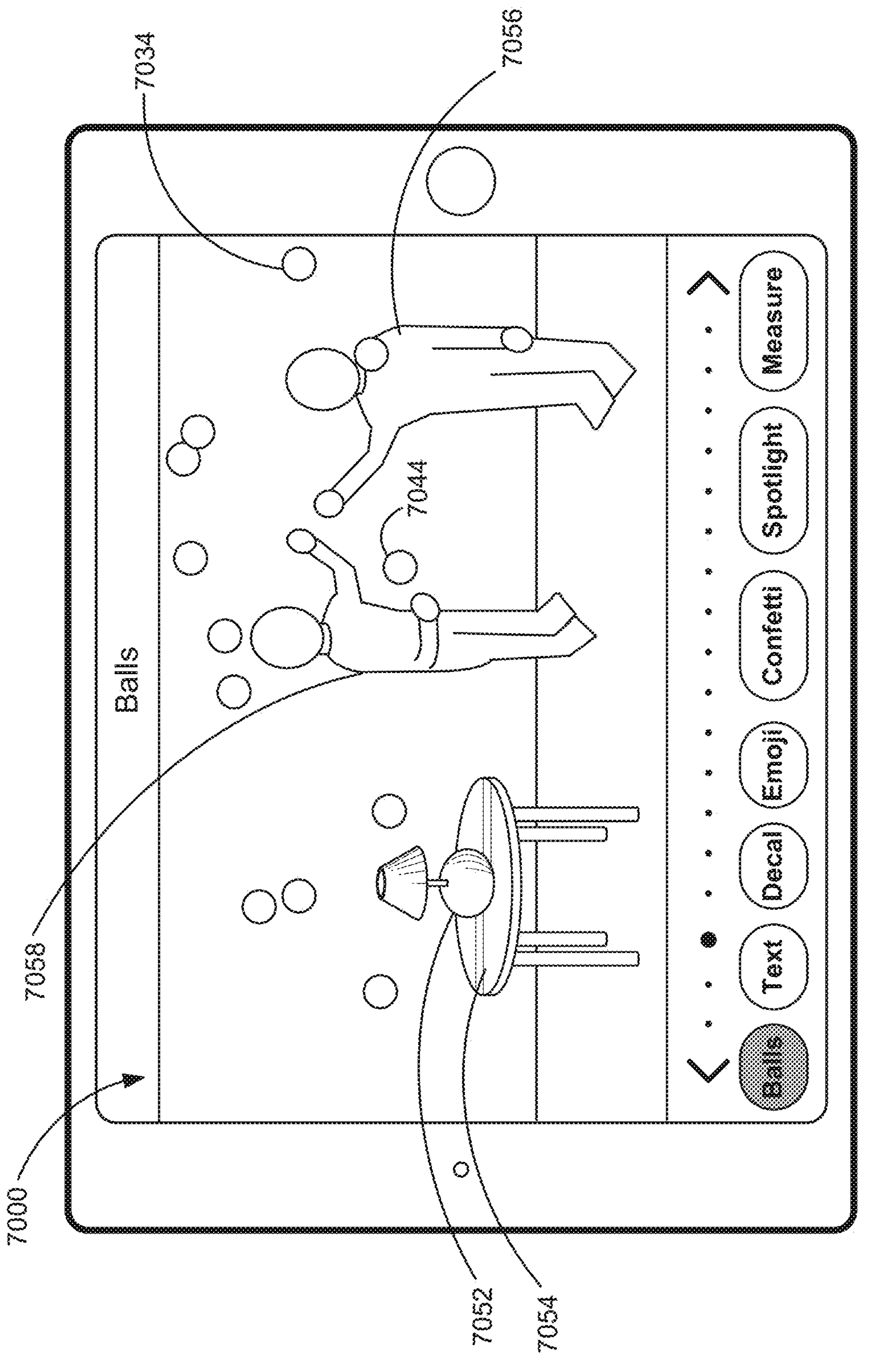
Figure 7G:
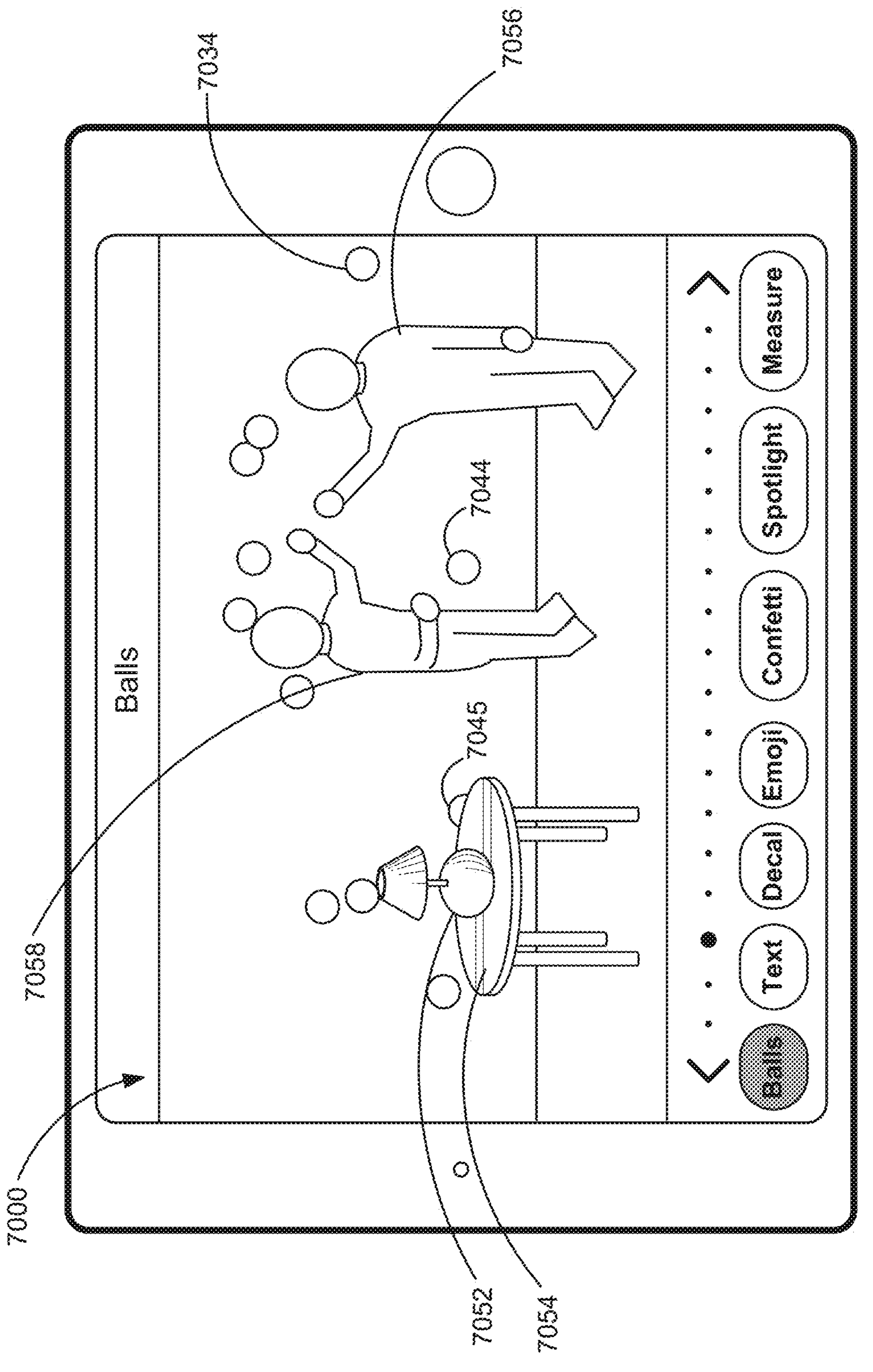
Figure 7H:
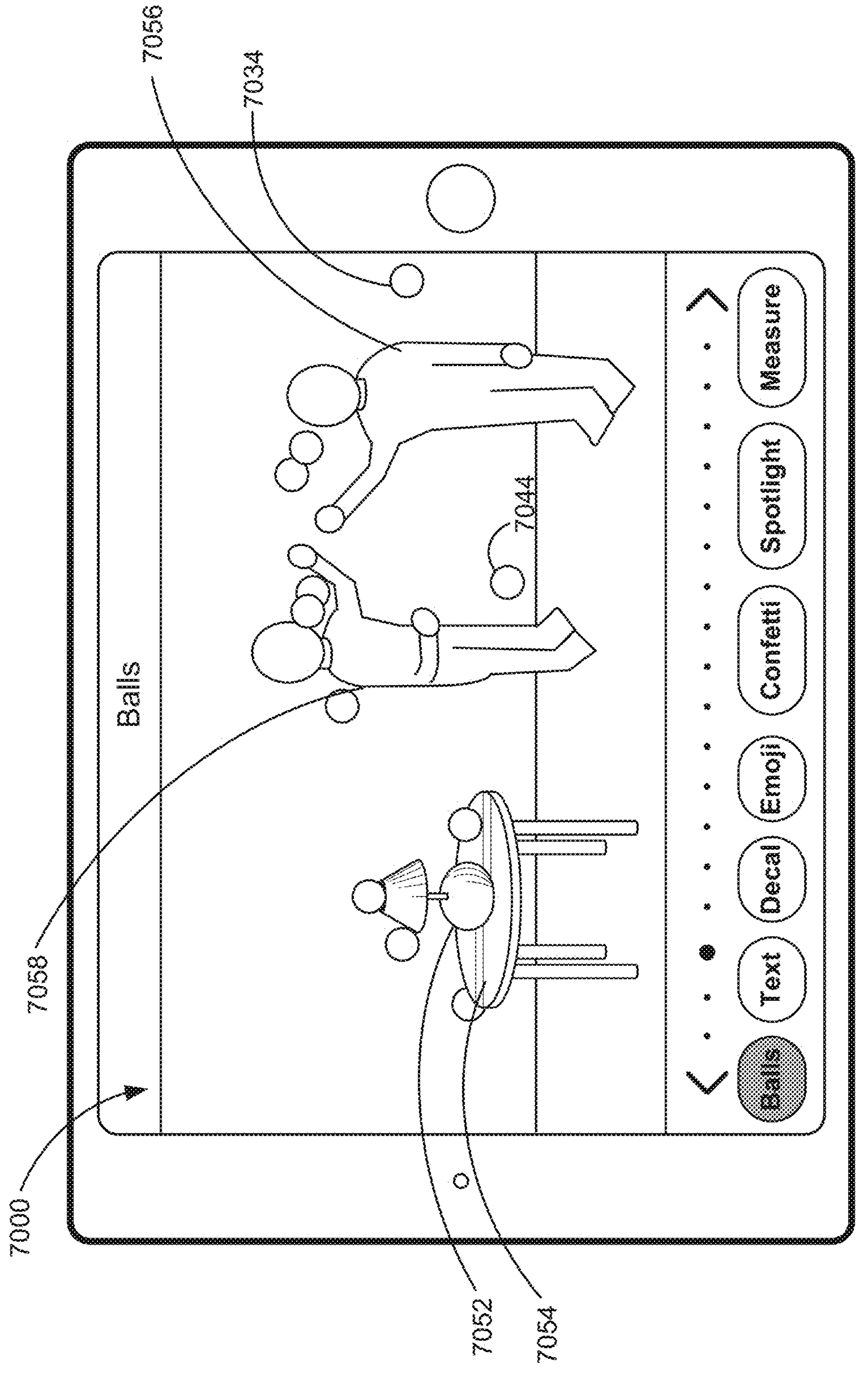
Figure 7I:
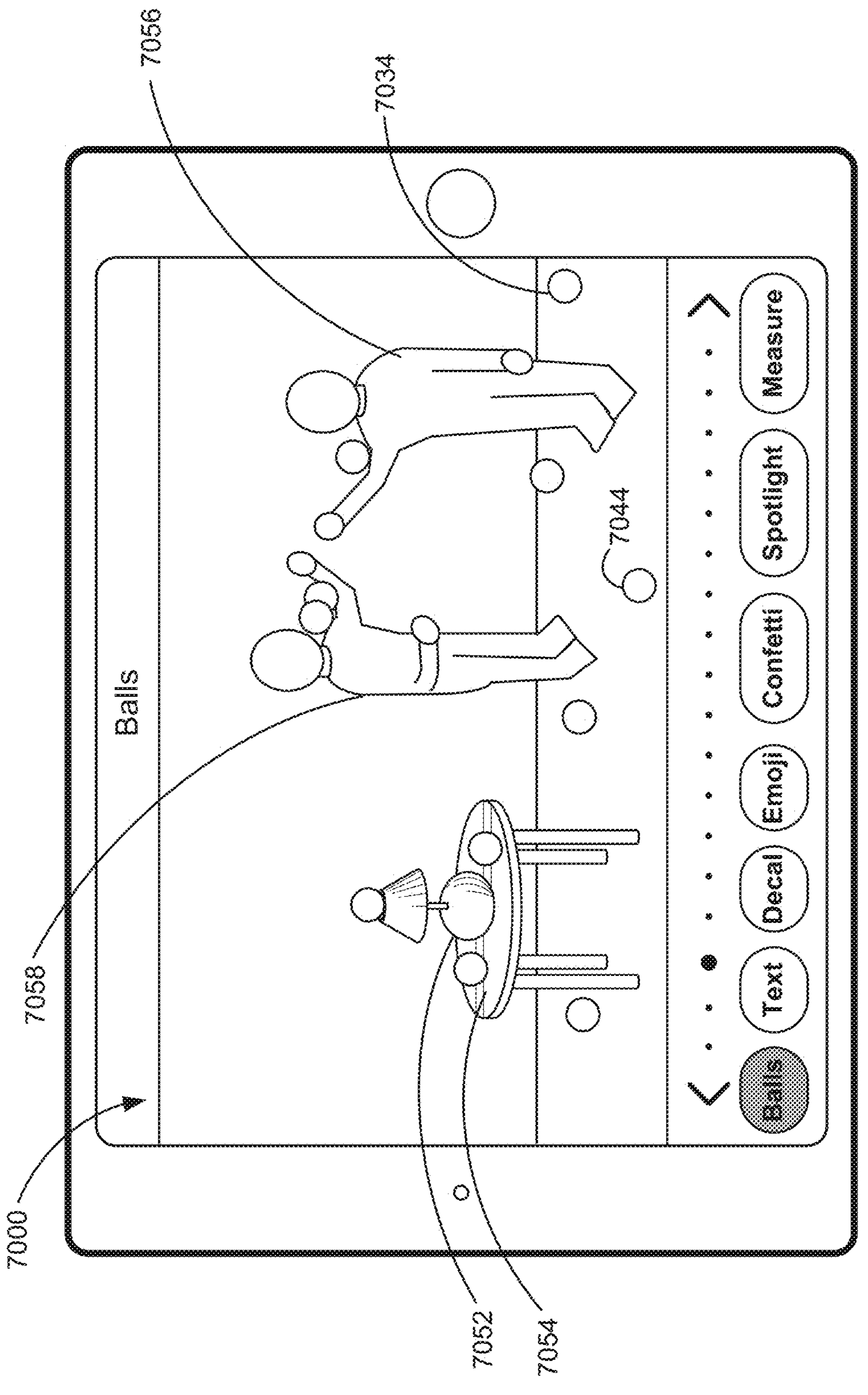

In FIG. 7E, several additional virtual balls have been added to the previously captured image displayed in media object display region 7002, some of which have landed and settled on the surfaces of chair object 7036 and table object 7038. An input (e.g., a tap input) is detected at a location on touch screen display 112 that corresponds to subsequent media object control 7010, as indicated by contact 7048. In response to the input, display of the first previously captured image shown in FIG. 7E is replaced by a second previously captured image as shown in FIG. 7F. The virtual balls that were added to the previously captured image displayed in media object display region 7002 are added to the second previously captured image as shown in FIG. 7F (e.g., animated such that the virtual balls appear to "fall" under the influence of simulated gravity from the floor surface 7040 in first previously captured image of FIG. 7E into the top of the physical environment of the second previously captured image, as shown in FIGS. 7F-7I). As the virtual balls fall, the virtual balls settle on surfaces in the physical environment captured in the second previously captured image, such as the surface of lamp 7052 and table 7054 and in the crooks of the arms of people 7056 and 7058. In some embodiments, virtual objects have a depth that is compared with depth data that corresponds to physical objects in the previously captured images to determine placement of the virtual objects relative to the physical objects (e.g., to determine whether a physical object will occlude a virtual object or vice versa). For example, in FIG. 7G, virtual ball 7045 is partially occluded by physical table 7054.

Figure 7J:
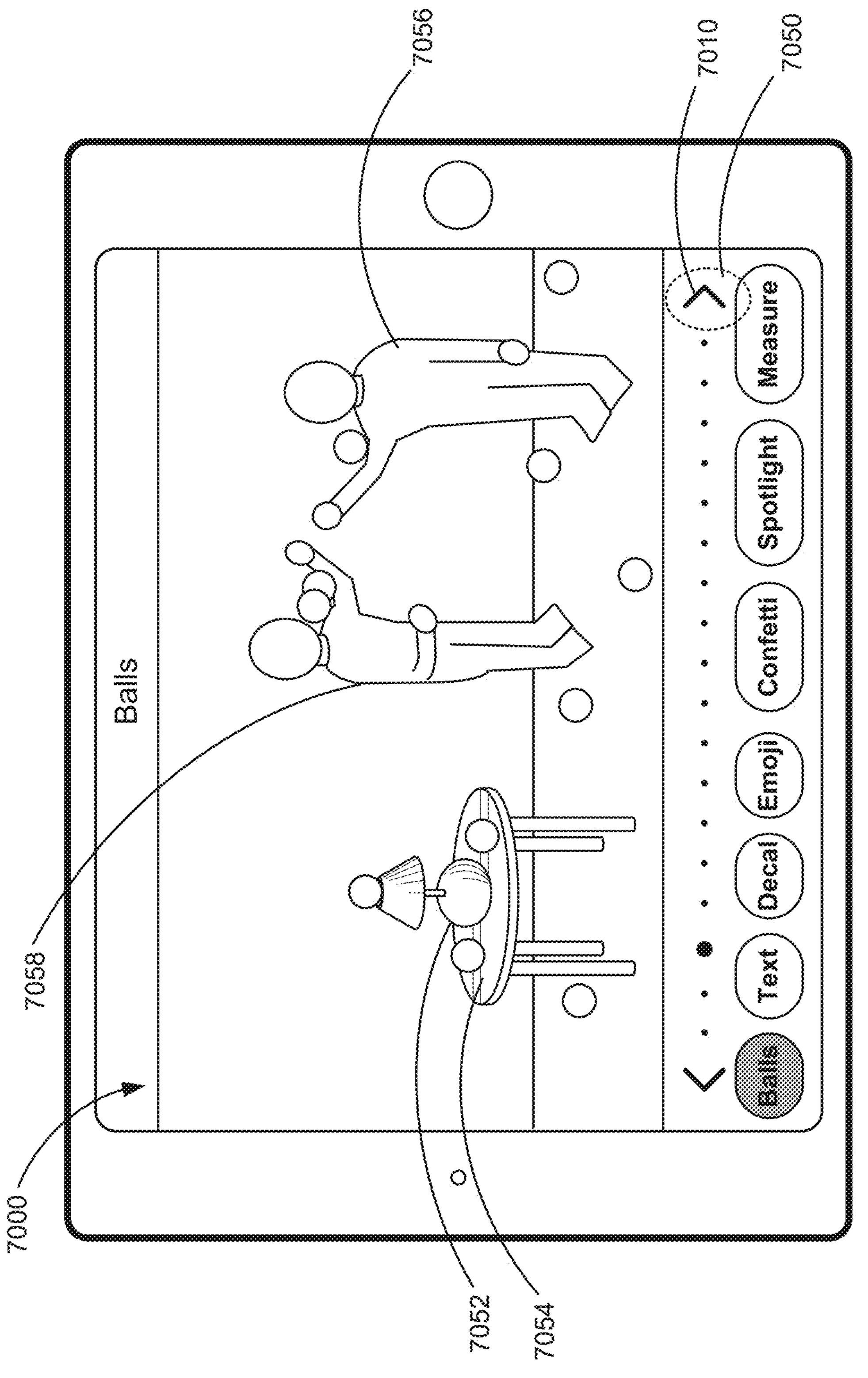
Figure 7K:
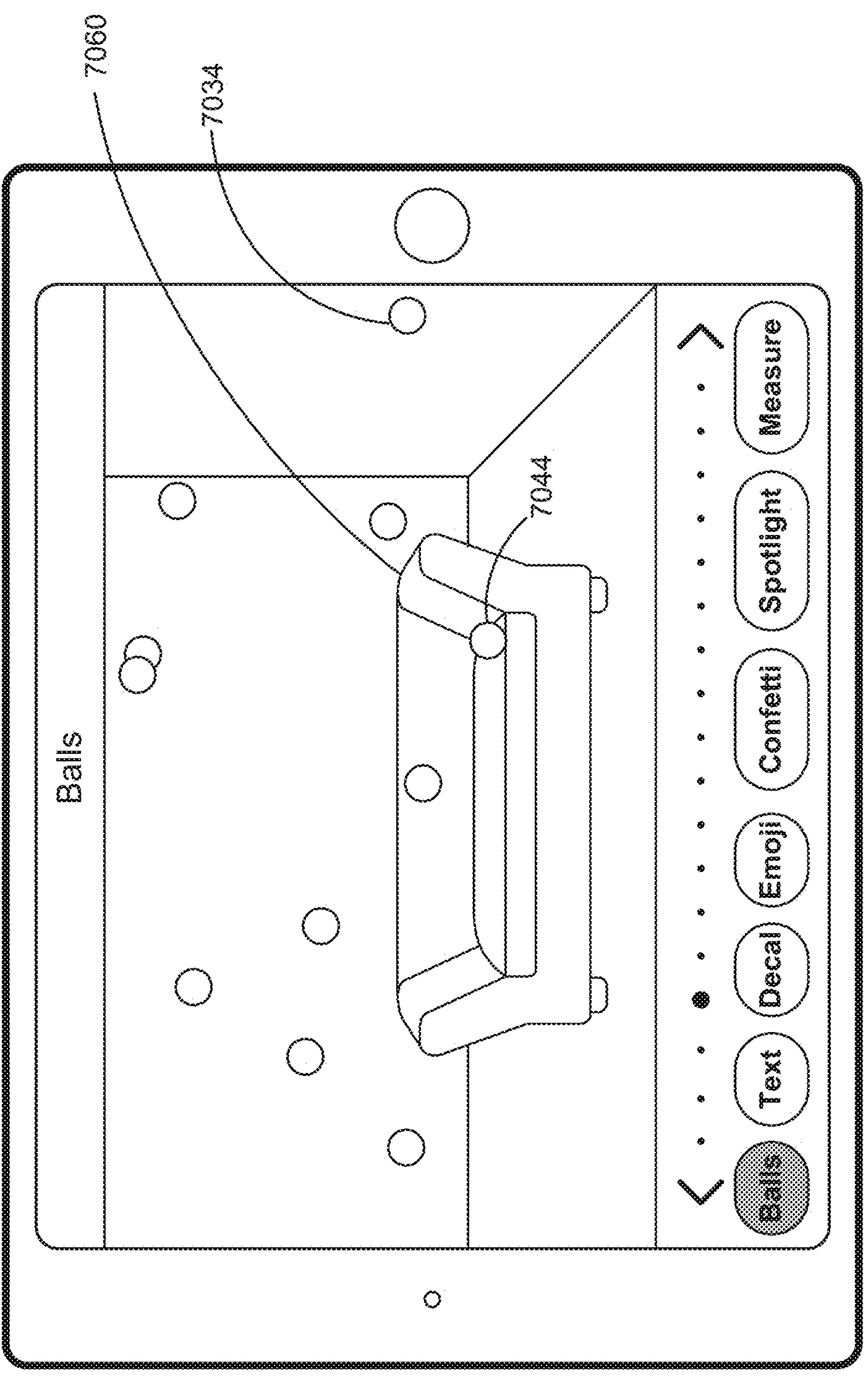
Figure 7L:
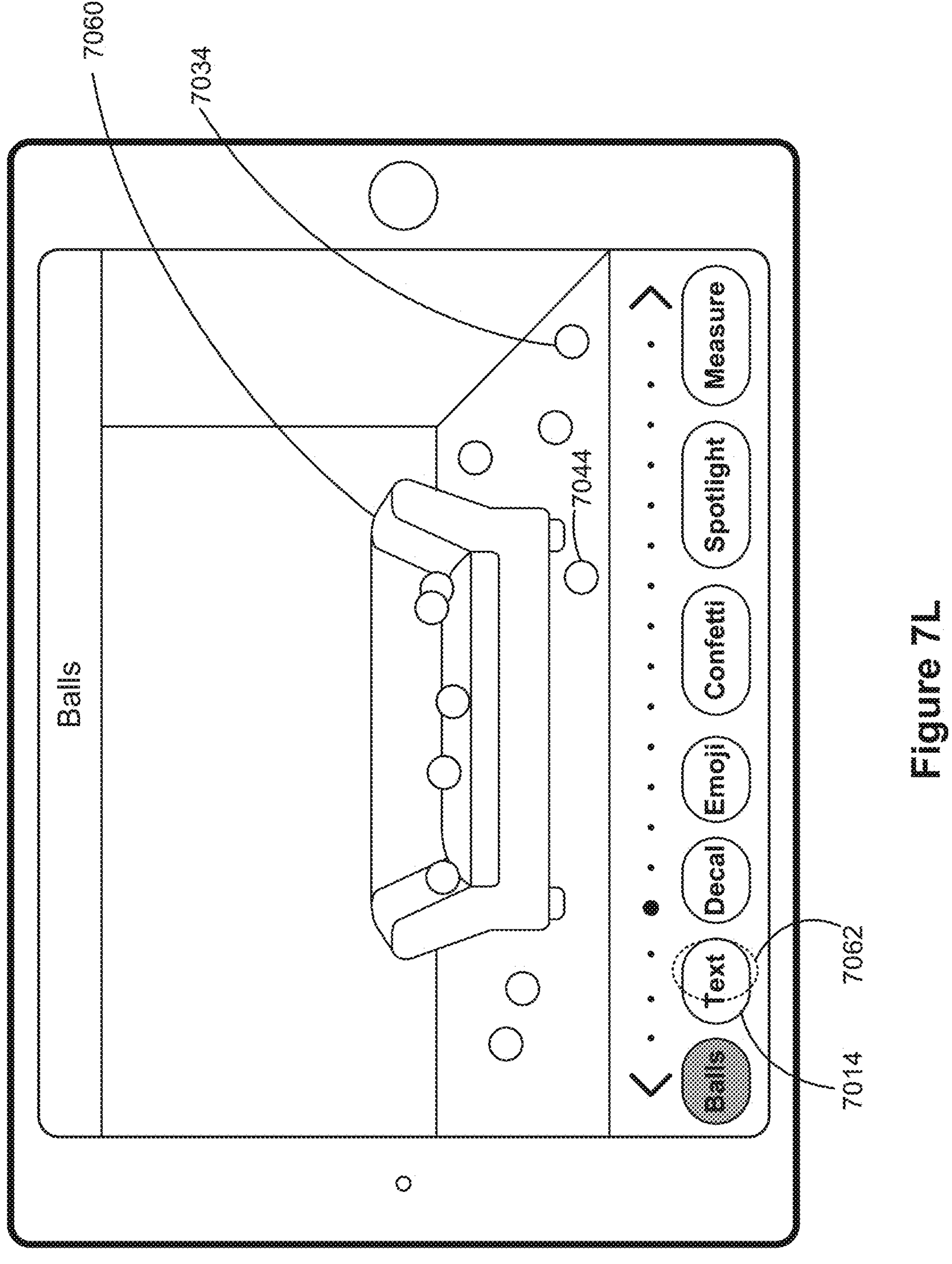

In FIG. 7J, an input (e.g., a tap input) is detected at a location on touch screen display 112 that corresponds to subsequent media object control 7010, as indicated by contact 7050. In response to the input, display of the second previously captured image shown in FIG. 7J is replaced by a third previously captured image as shown in FIG. 7K. The virtual balls that were added to the second previously captured image displayed in media object display region 7002 are added to the first previously captured image as shown in FIG. 7K (e.g., animated such that the virtual balls appear to "fall" under the influence of simulated gravity from the surfaces in the second previously captured image of FIG. 7J into the top of the physical environment of the third previously captured image, as shown in FIGS. 7K-7L). As the virtual balls fall, the virtual balls settle on surfaces in the physical environment captured in the third previously captured image, such as the surfaces of sofa 7060.

In FIG. 7L, an input (e.g., a tap input) is detected at a location on touch screen display 112 that corresponds to text insertion control 7014, as indicated by contact 7062. In response to the input, the virtual balls (e.g., ball 7034 and 7044) cease to be displayed and a text object 7064 is added to the third previously captured image as shown in FIG. 7M.

FIGS. 7M-7T illustrate how virtual text object 7064 interfaces with surfaces of a physical object depicted in a previously captured image displayed in media object display region 7002.

Figure 7M:
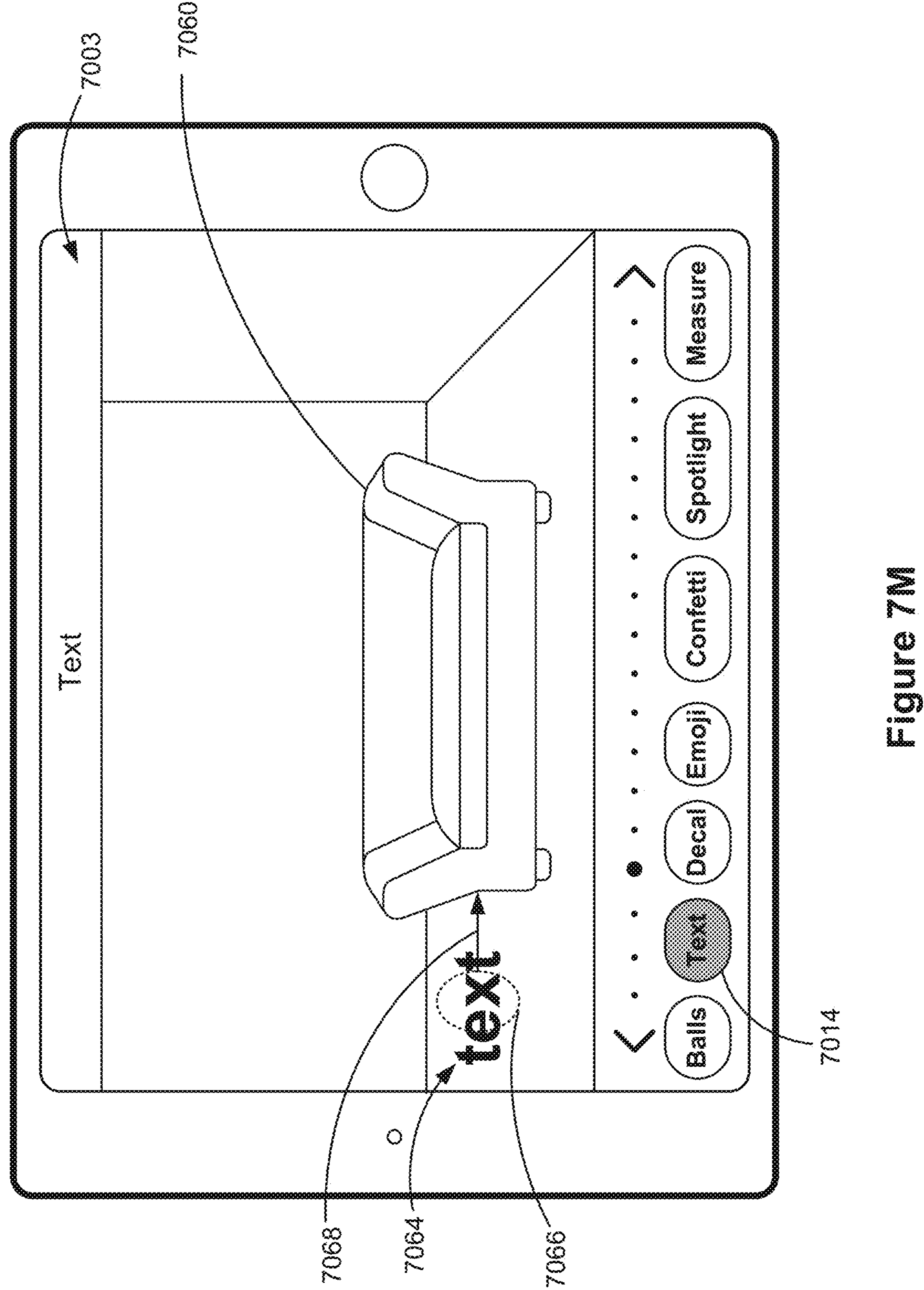

In FIG. 7M, an input by contact 7066 is detected at a location on touch screen display 112 that corresponds to text object 7064. From FIG. 7M to FIG. 7P, contact 7066 moves along a path indicated by arrows 7068, 7070, and 7072. As the contact 7066 moves, text object 7064 is "dragged" by contact 7066 such that movement of text object 7064 corresponds to movement of contact 7066. As text object 7064 is dragged to a position that corresponds to sofa 7060, text object 7064 interacts with a detected surface of sofa

Figure 7N:
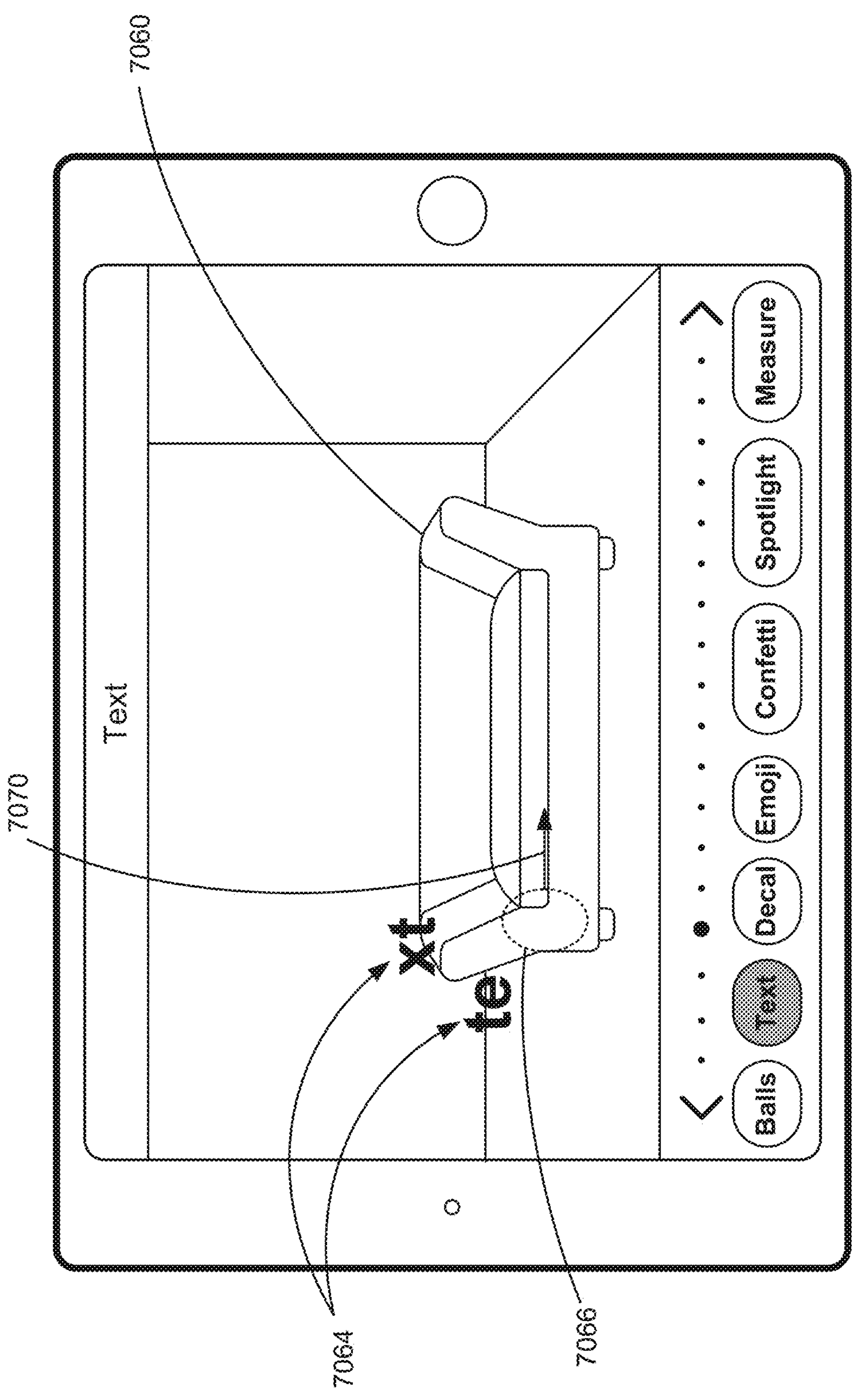
Figure 7O:
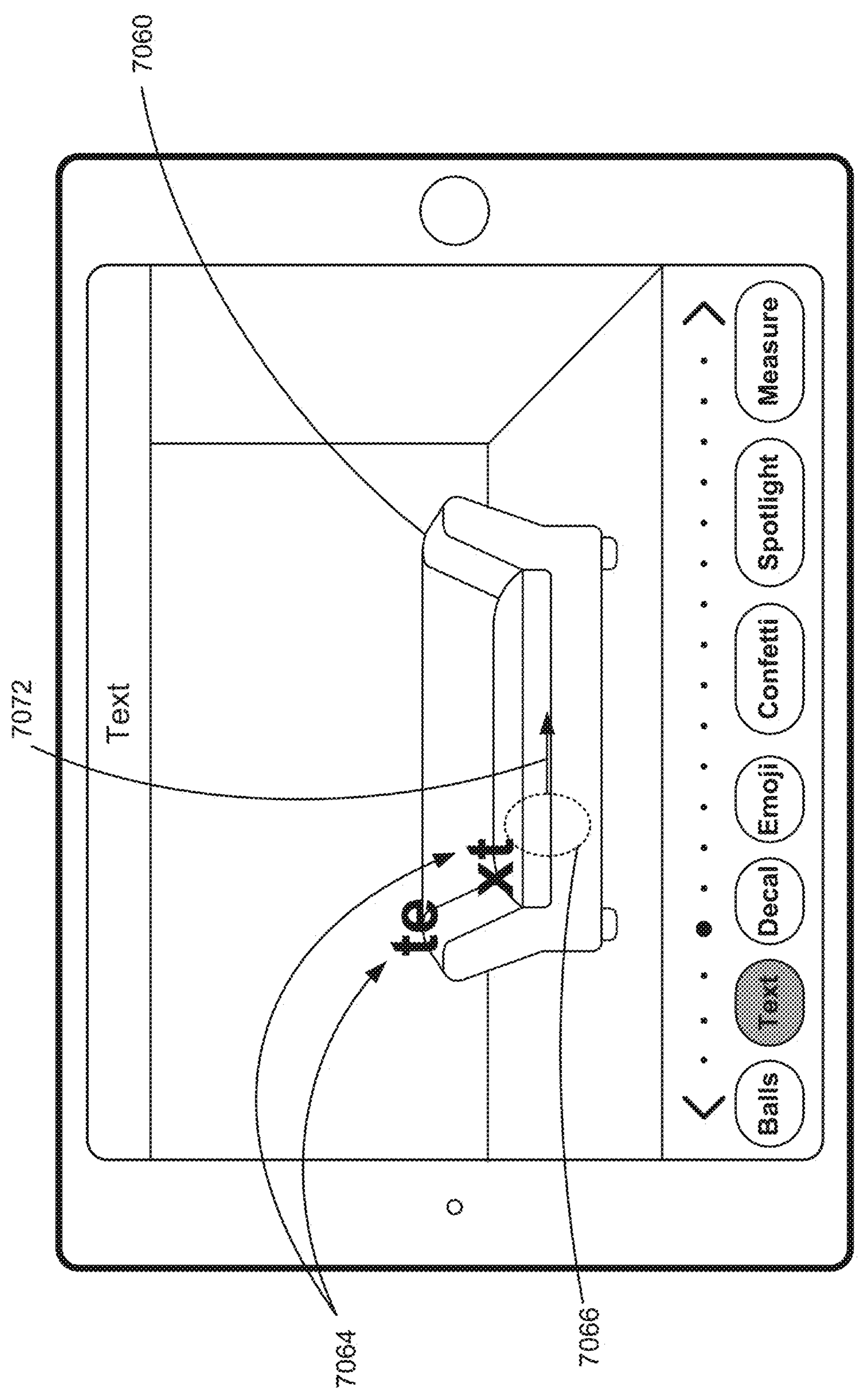
Figure 7P:
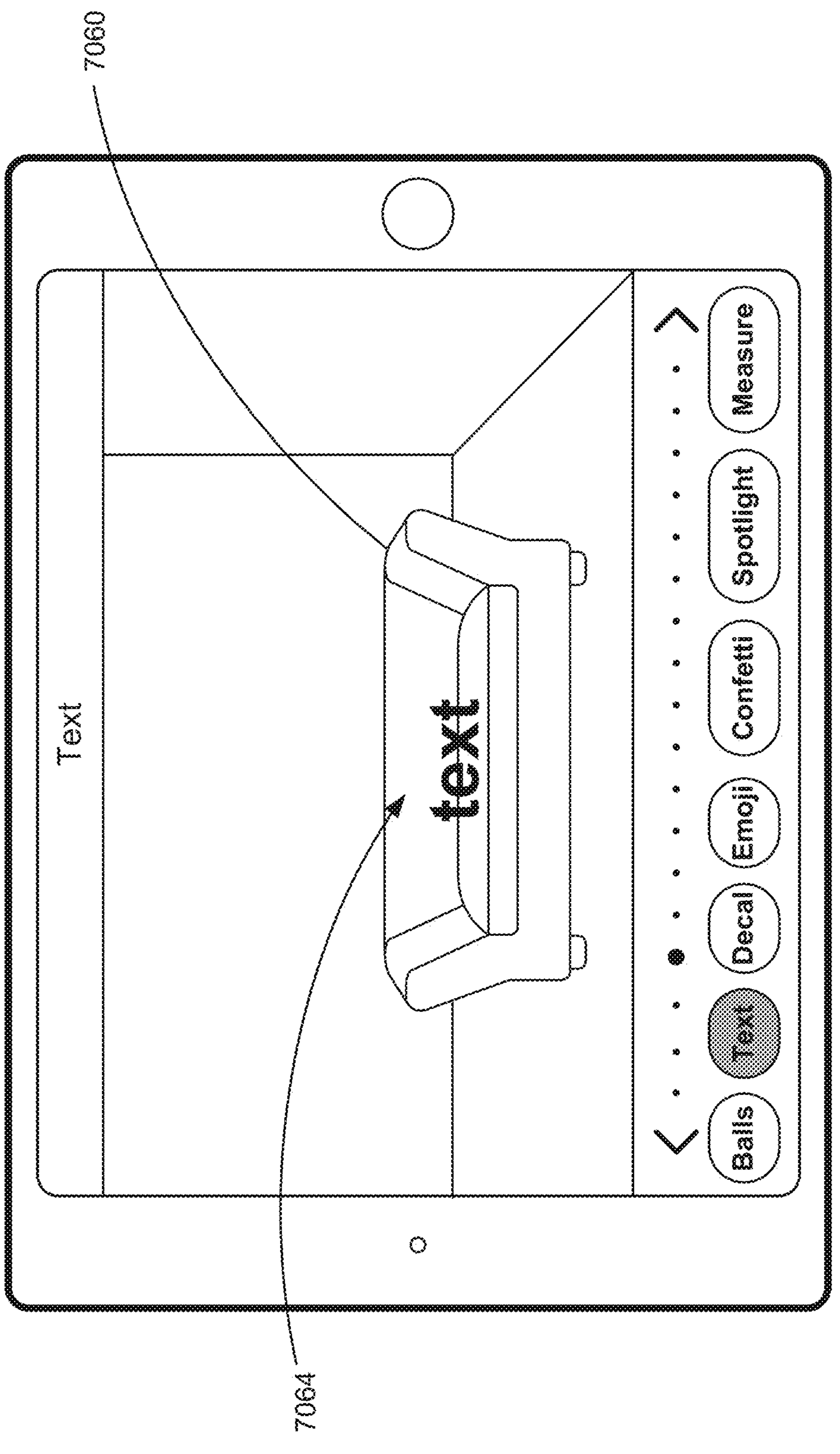

7060 by "marching" over the arm of sofa 7060 as indicated at FIG. 7N-FIG. 7O. For example, in FIG. 7O, as text object 7064 is dragged to an area of the third previously captured image that corresponds to sofa 7060, a first portion of text object 7064 is adjacent to a first surface of sofa 7060 (above the arm of the sofa) and a second portion of text object 7064 is adjacent to a second surface of sofa 7060 (e.g., above the seat of sofa 7060).

Figure 7Q:
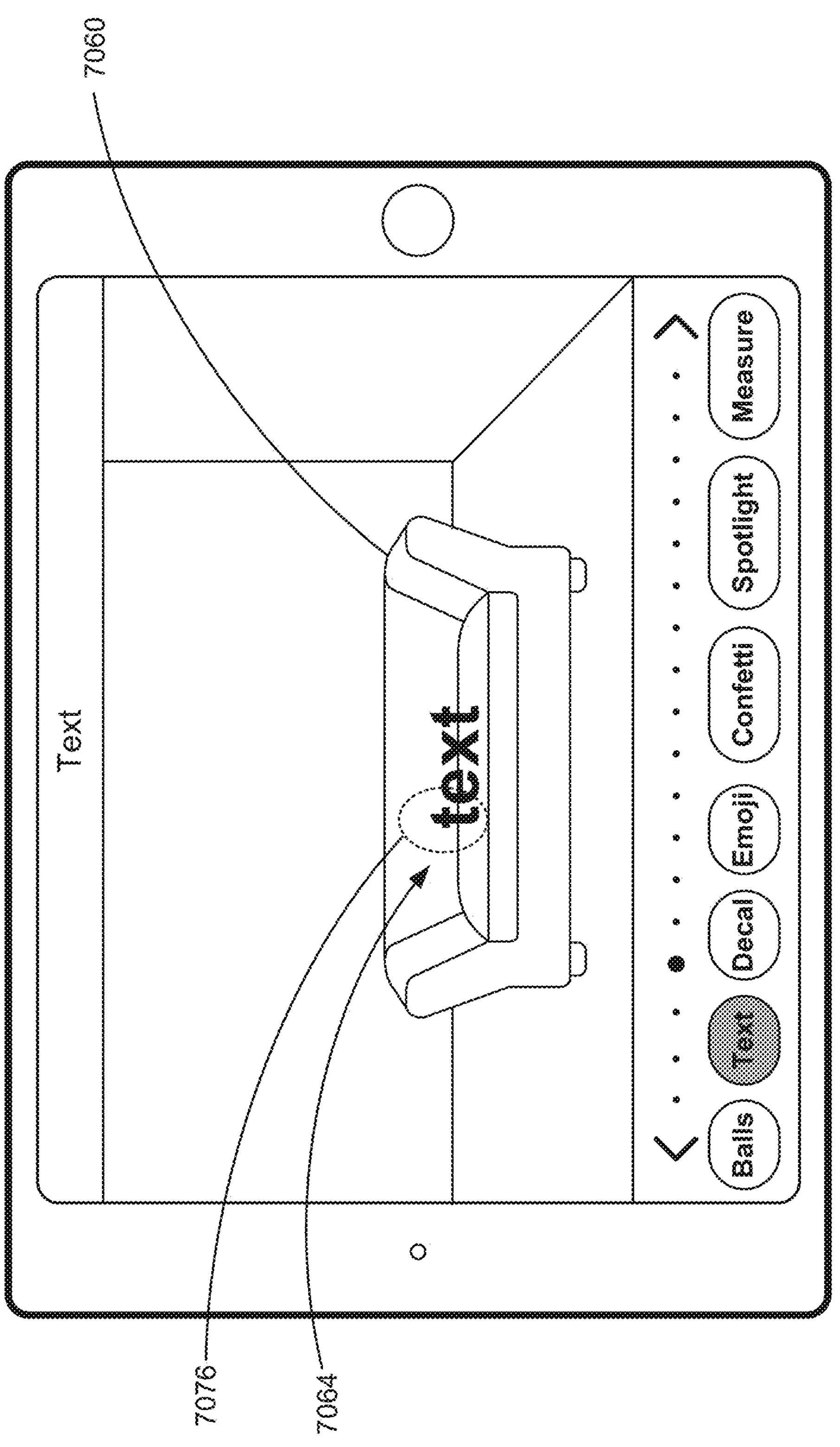
Figure 7R:
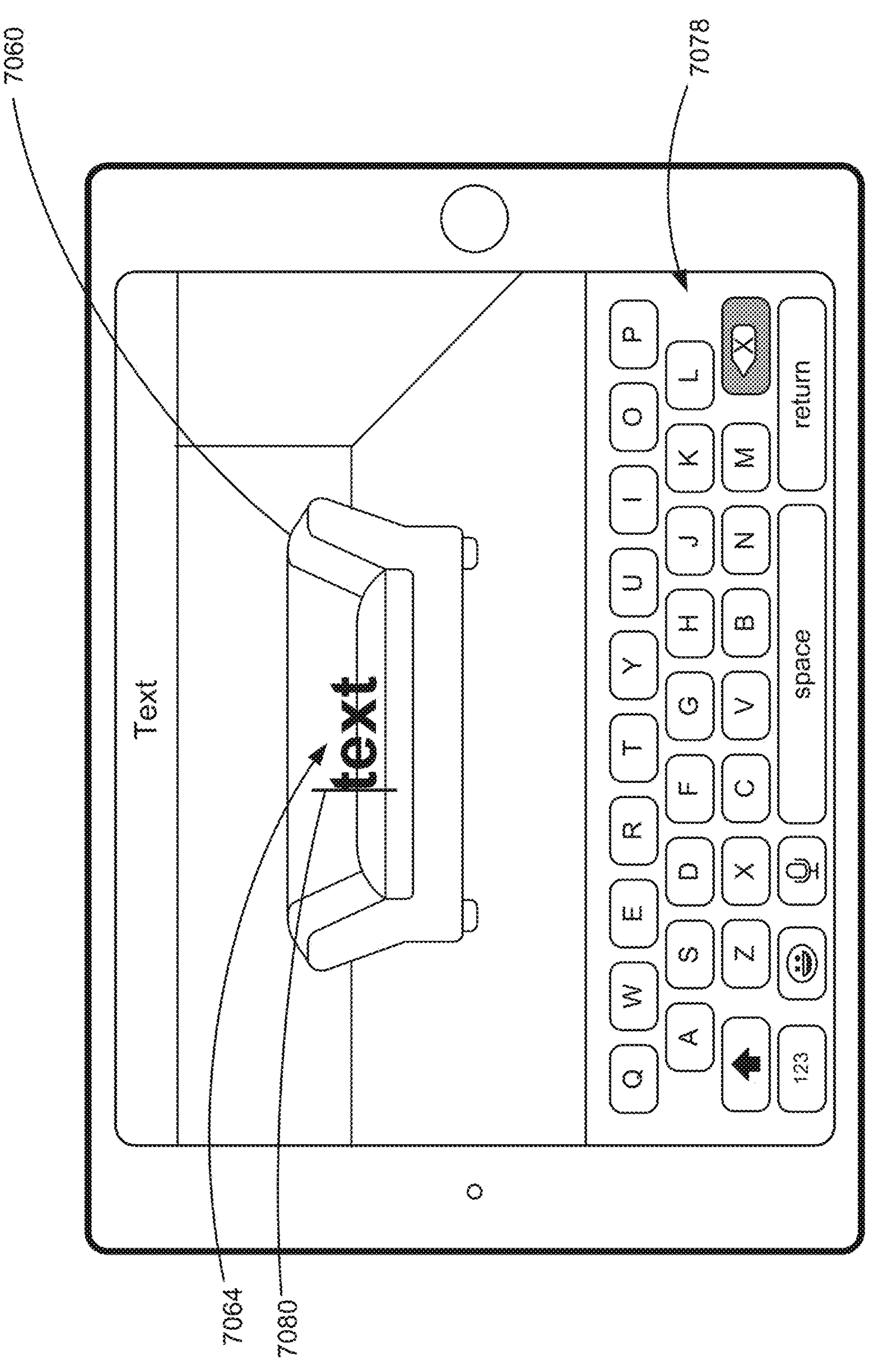
Figure 7S:
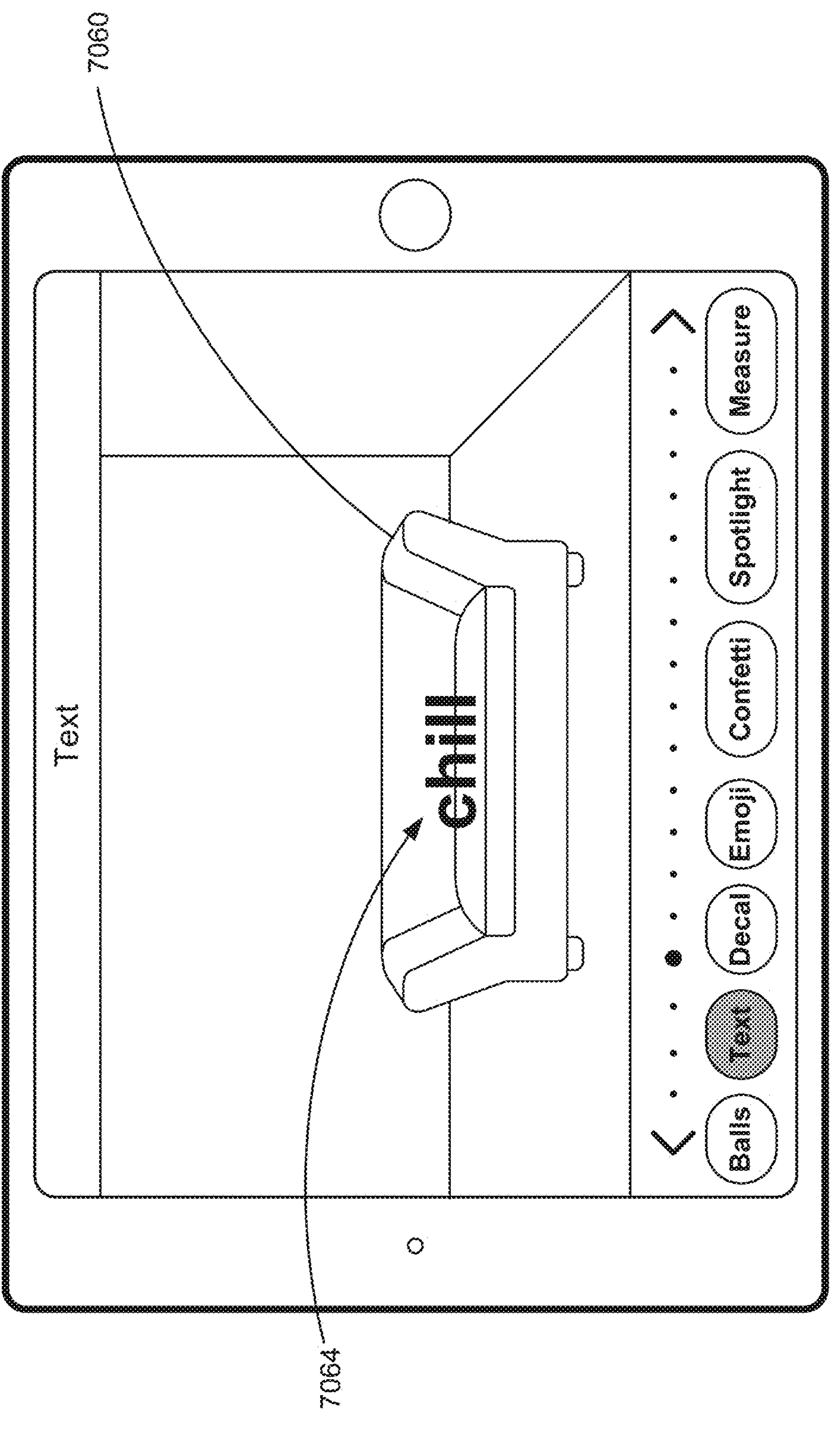

In FIG. 7Q, an input (e.g., a tap input) is detected at a location on touch screen display 112 that corresponds to text object 7064, as indicated by contact 7062. In response to the input, a text editing mode of text object 7064 is initiated, as indicated by display of cursor 7080 and keyboard 7078 in FIG. 7R. In FIG. 7S, input provided via keyboard 7078 has changed the text of text object 7064 from the word "text" to the word "chill."

Figure 7T:
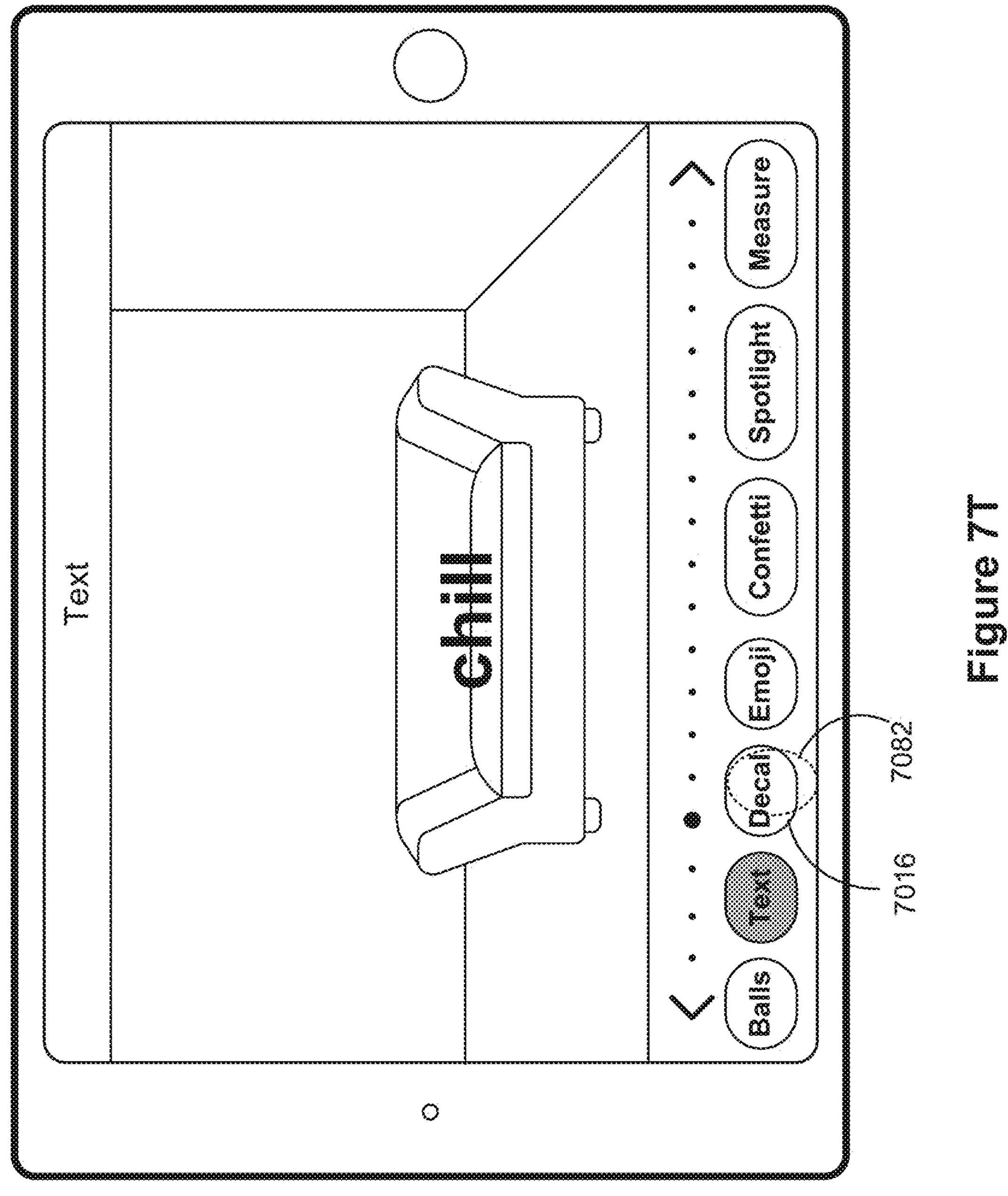

In FIG. 7T, an input (e.g., a tap input) is detected at a location on touch screen display 112 that corresponds to decal insertion control 7016, as indicated by contact 7082. In response to the input, text object 7064 ceases to be displayed and a decal object 7084 is added to the third previously captured image as shown in FIG. 7U.

FIGS. 7U-7Y illustrate how virtual decal object 7084 interfaces with surfaces of a physical object depicted in a previously captured image displayed in media object display region 7002.

Figure 7U:
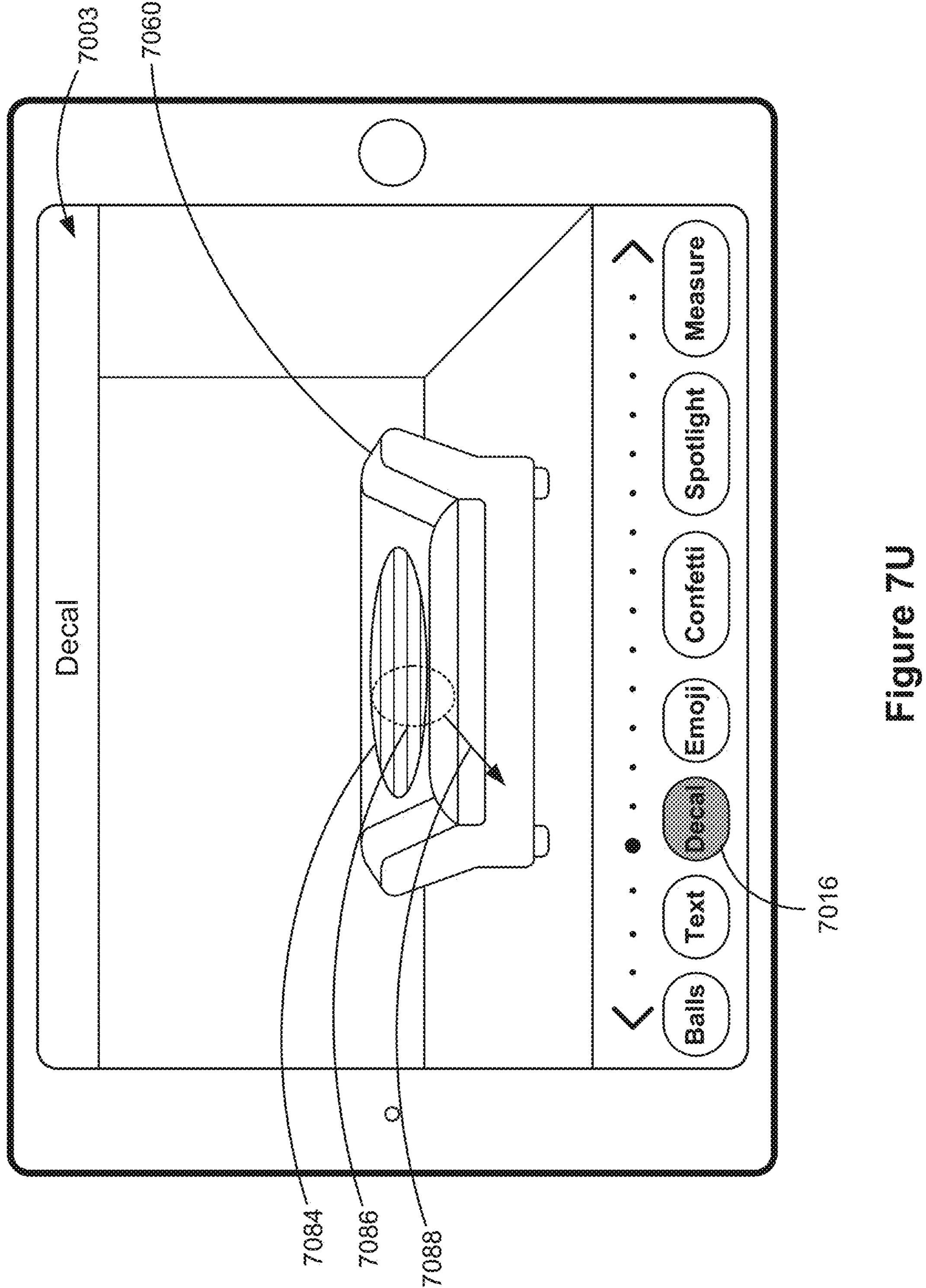
Figure 7V:
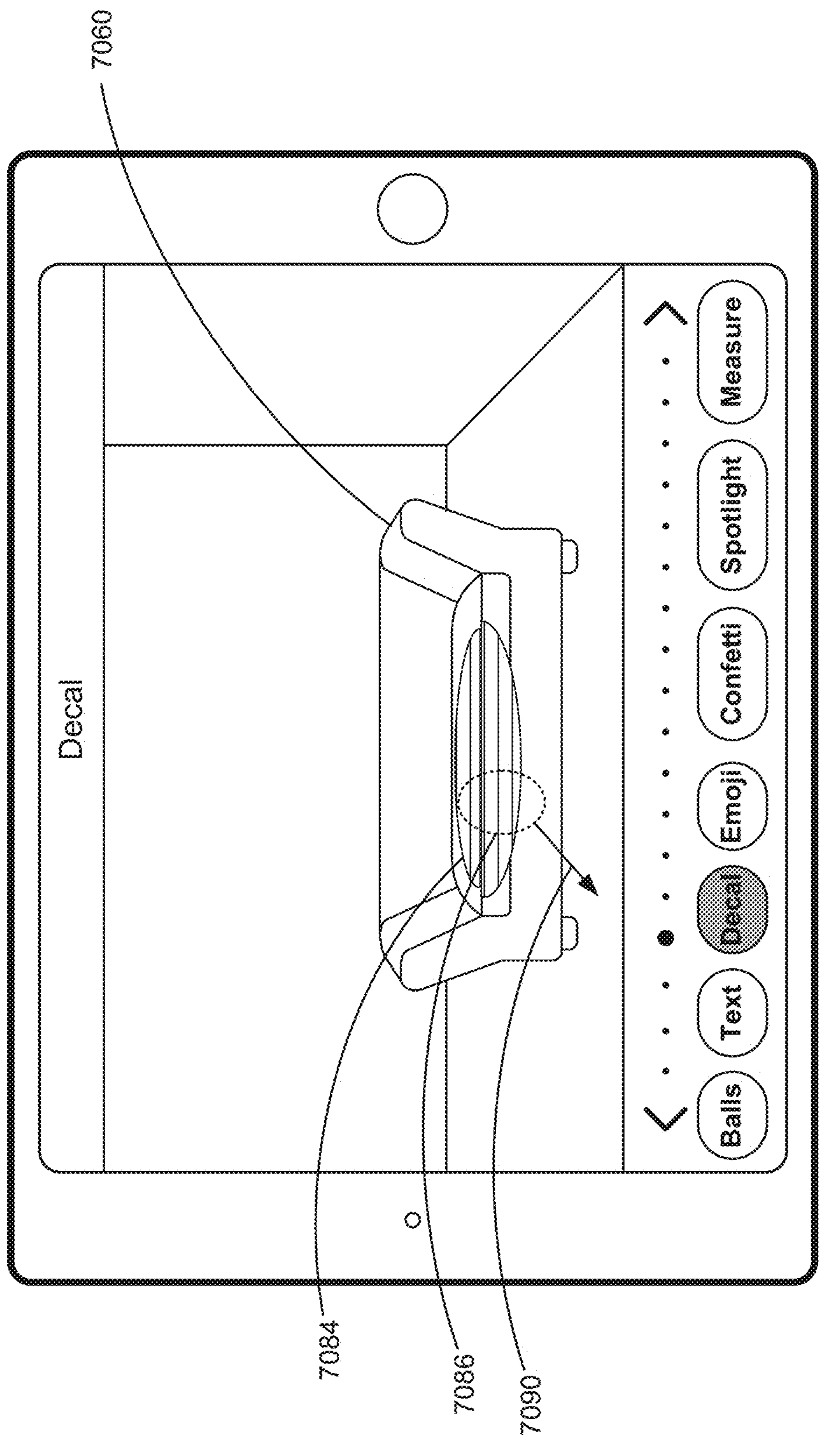
Figure 7W:
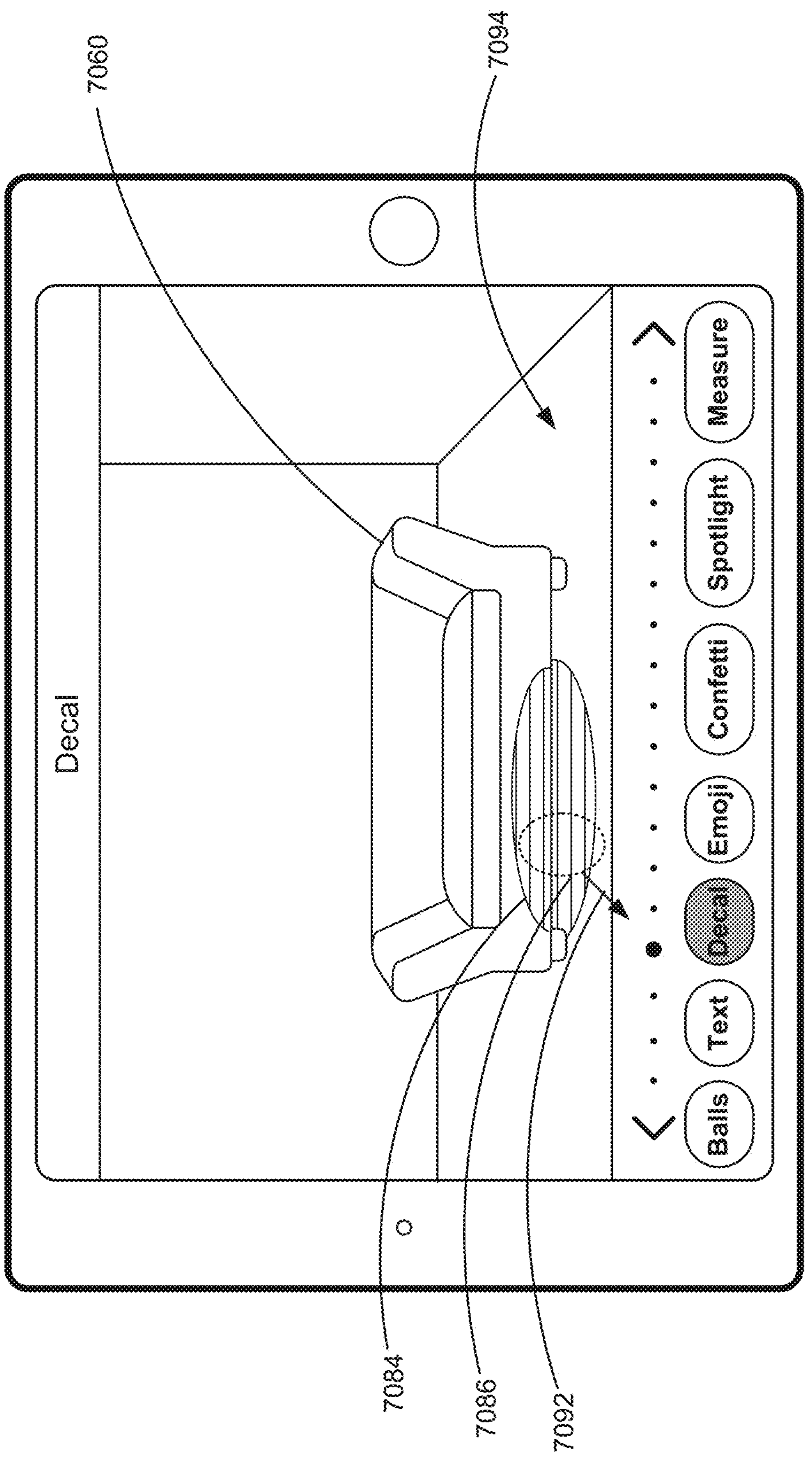
Figure 7X:
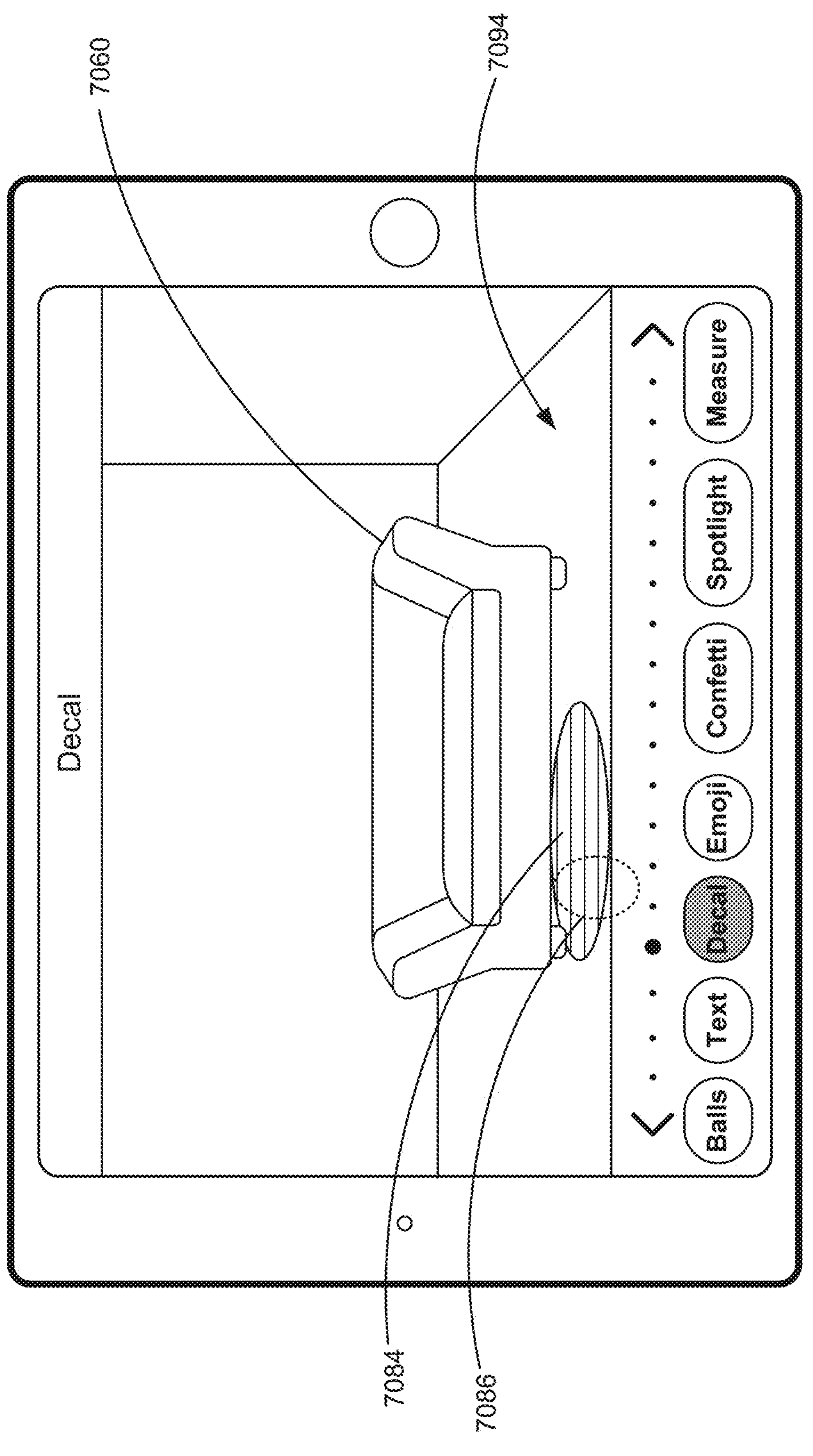

In FIG. 7U, an input by contact 7086 is detected at a location on touch screen display 112 that corresponds to decal object 7084. From FIG. 7U to FIG. 7X, contact 7086 moves along a path indicated by arrows 7088, 7090, and 7092. As the contact 7086 moves, decal object 7084 is "dragged" by contact 7086 such that movement of decal object 7084 corresponds to movement of contact 7086. As decal object 7084 is dragged over the surface of sofa 7060, decal object 7064 conforms to detected horizontal and vertical surfaces of sofa 7060 and floor 7094 as indicated at FIG. 7U-FIG. 7X. For example, in FIG. 7V, as decal object 7084 is dragged over sofa 7060, a first portion of decal object 7084 is adjacent to a first surface of sofa 7060 (flat on the seat of the sofa) and a second portion of decal object 7084 is adjacent to a second surface of sofa 7060 (e.g., draped over the front of sofa 7060). In FIG. 7X, when decal object 7084 has been dragged onto floor 7094, decal object 7084 is partially occluded by sofa 7060.

Figure 7Y:
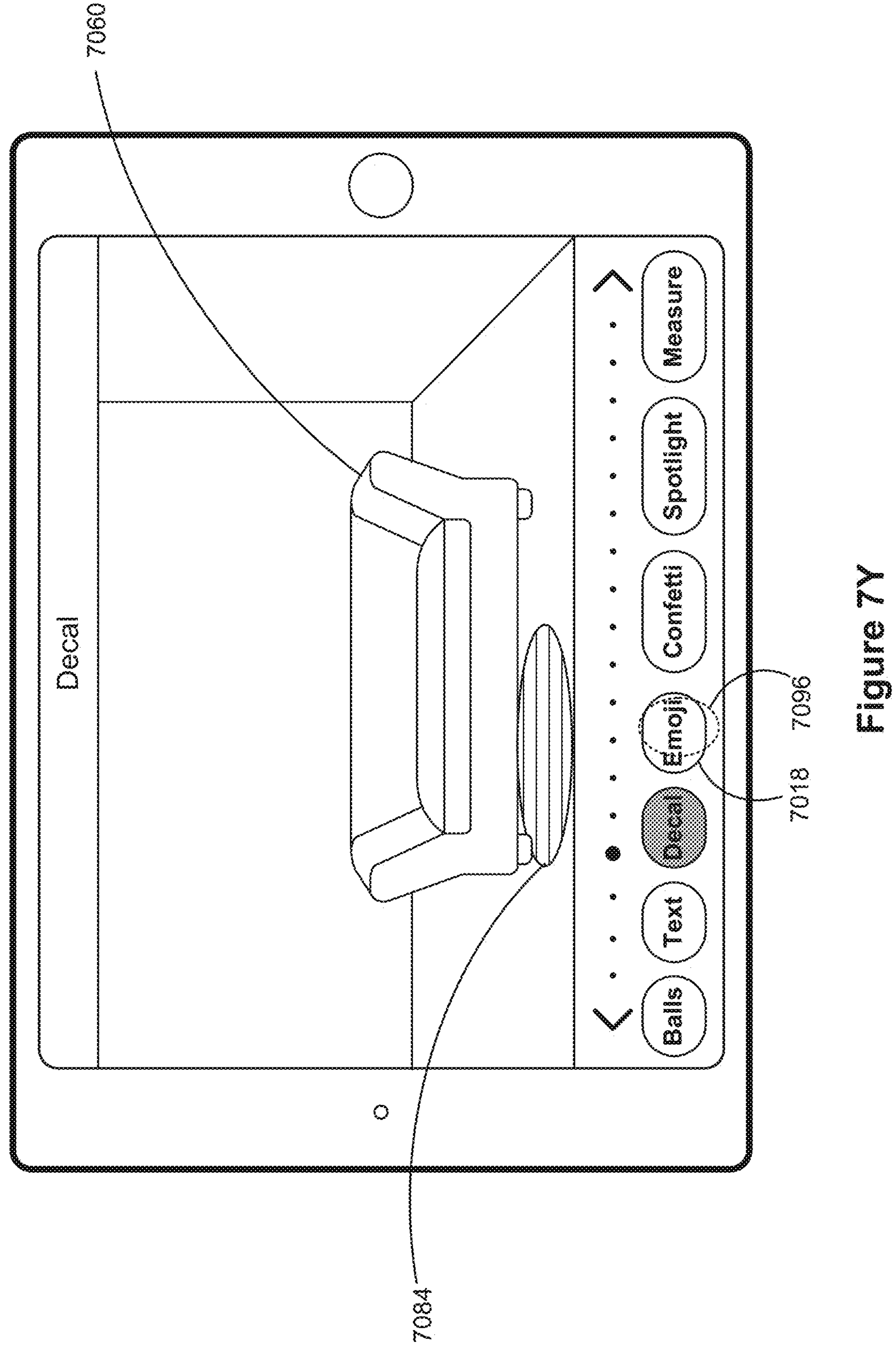

In FIG. 7Y, an input (e.g., a tap input) is detected at a location on touch screen display 112 that corresponds to emoji insertion control 7018, as indicated by contact 7096. In response to the input, decal object 7084 ceases to be displayed and an emoji object 7098 is added to the third previously captured image as shown in FIG. 7Z.

Figure 7Z:
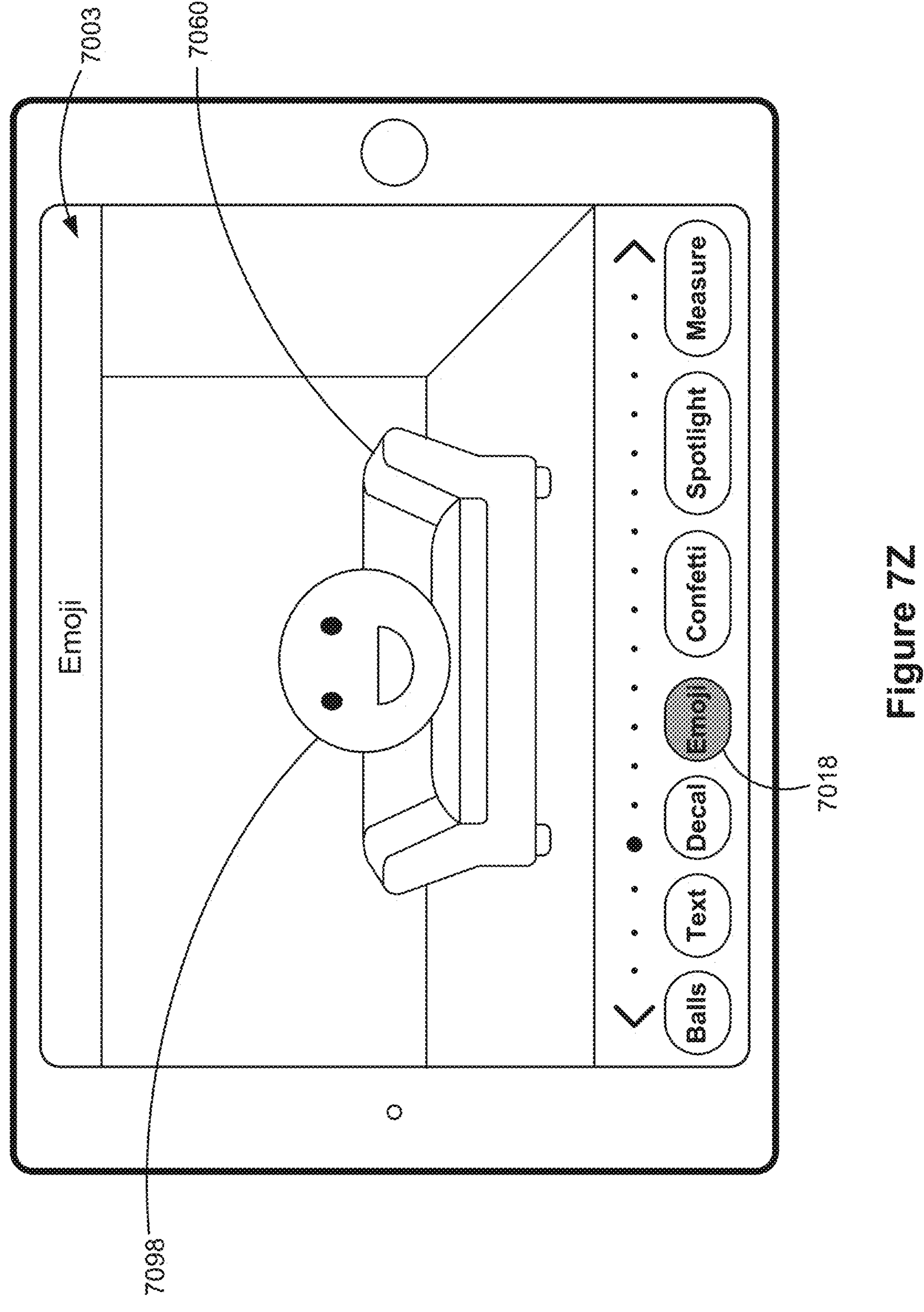
Figure 7A:
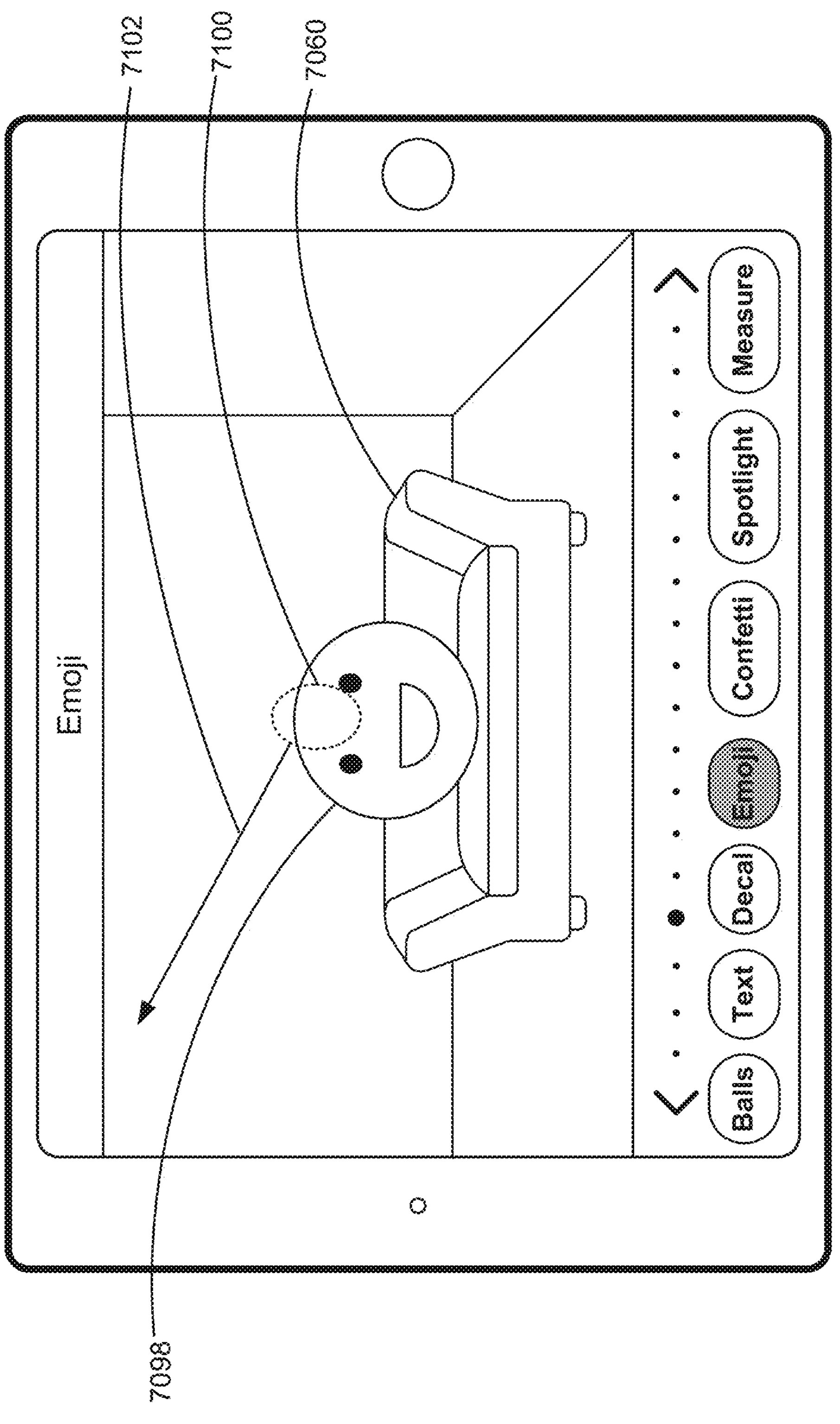
Figure 7A:
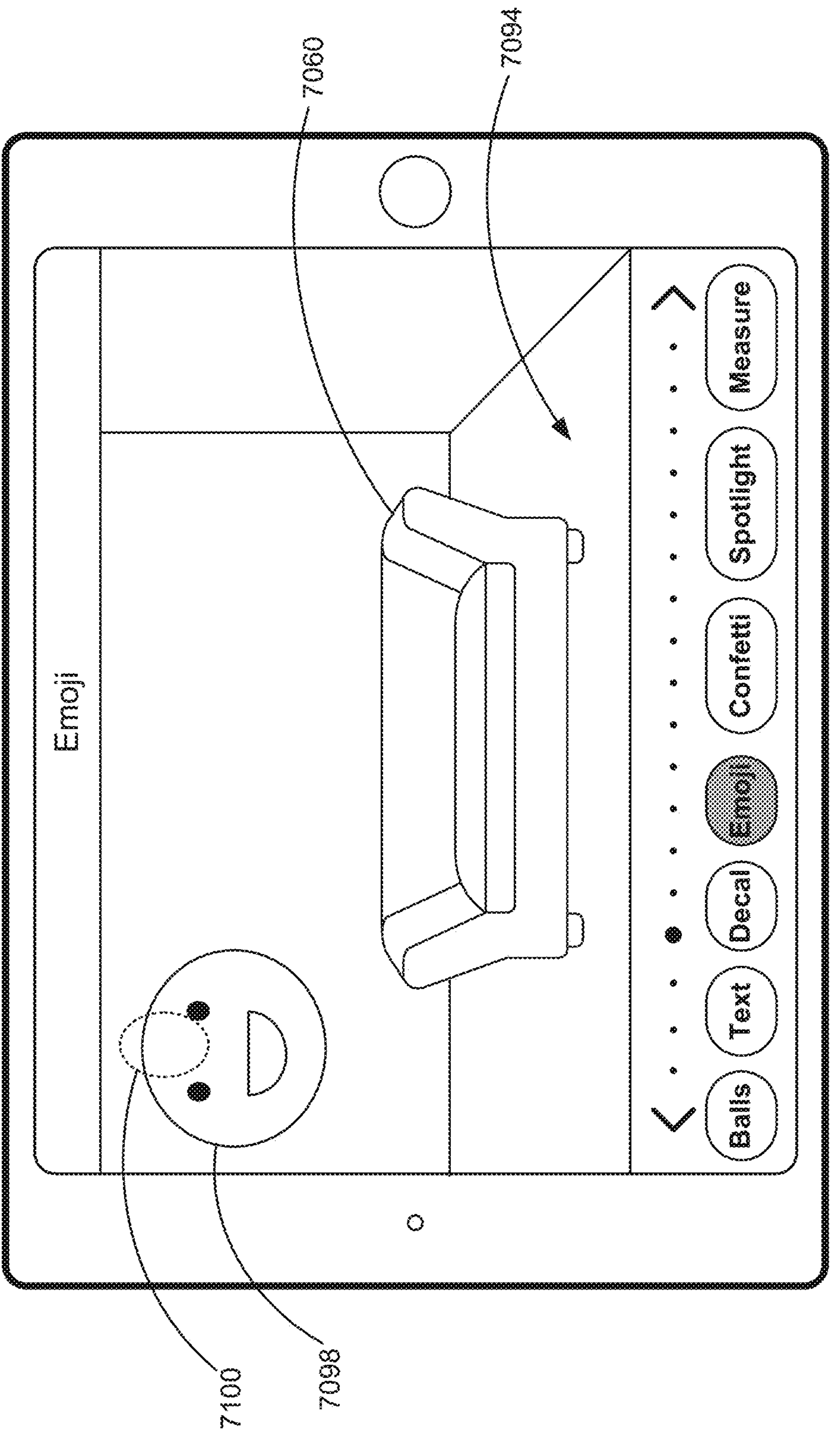
Figure 7A:
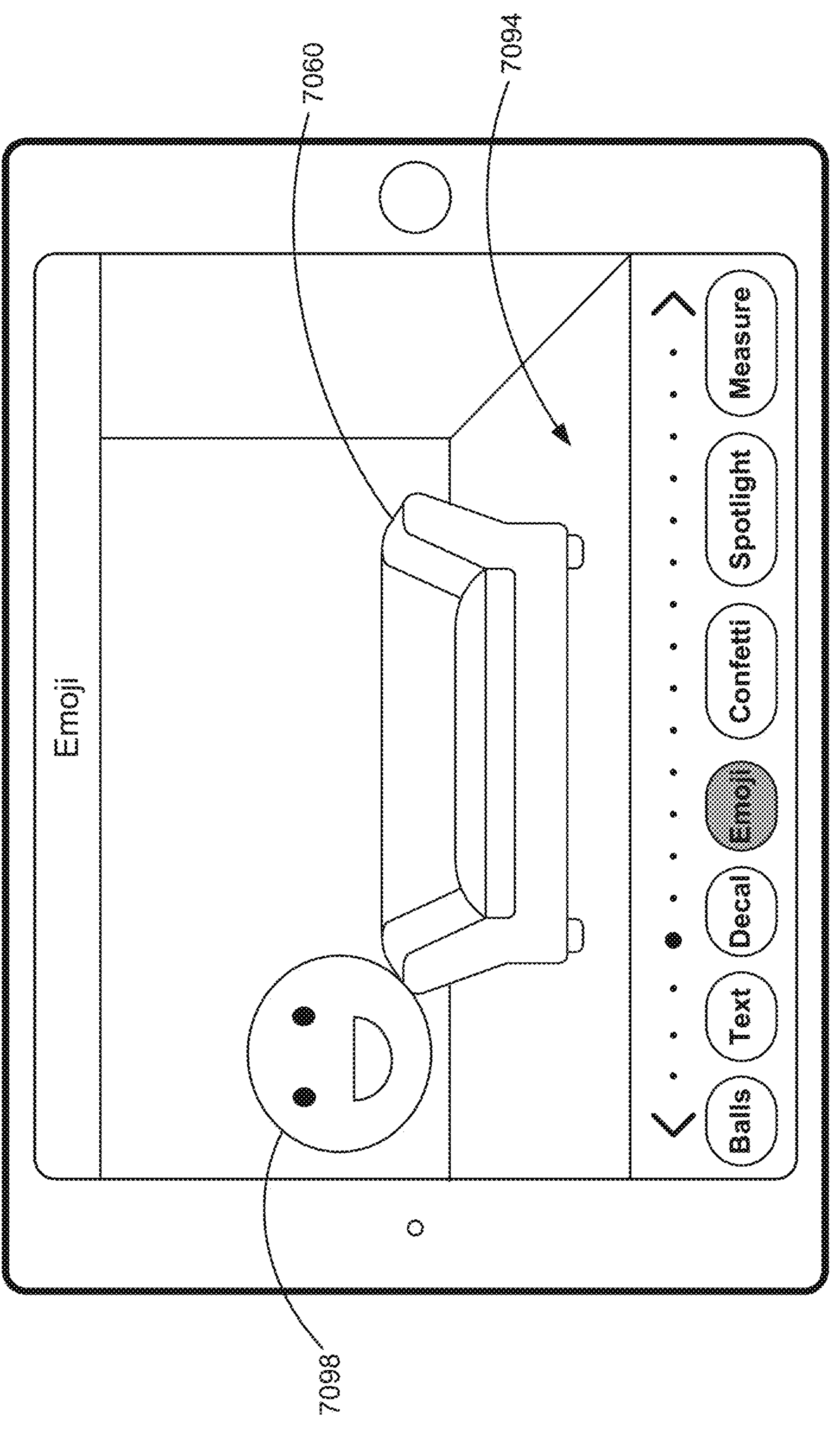
Figure 7A:
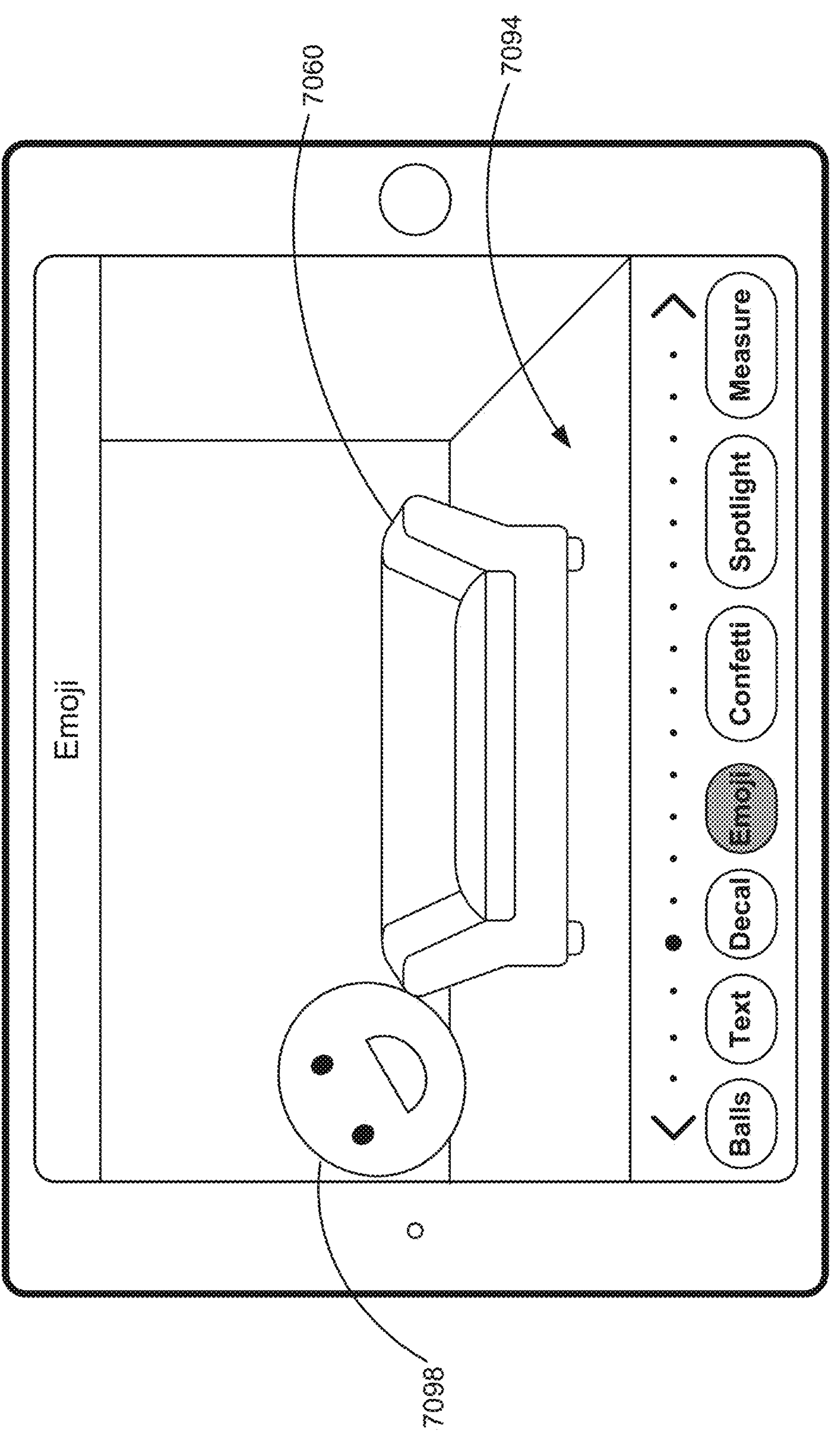
Figure 7A:
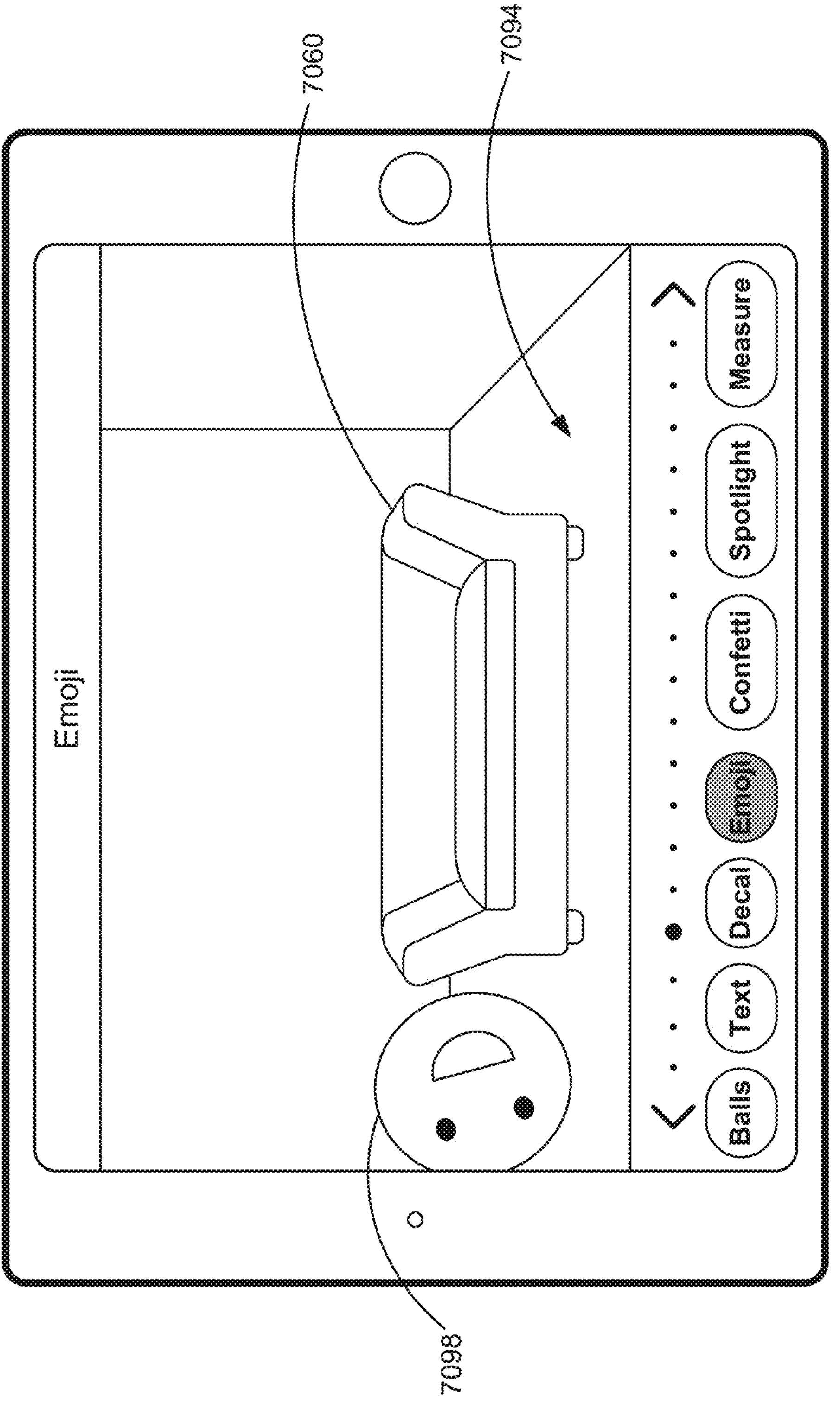
Figure 7A:
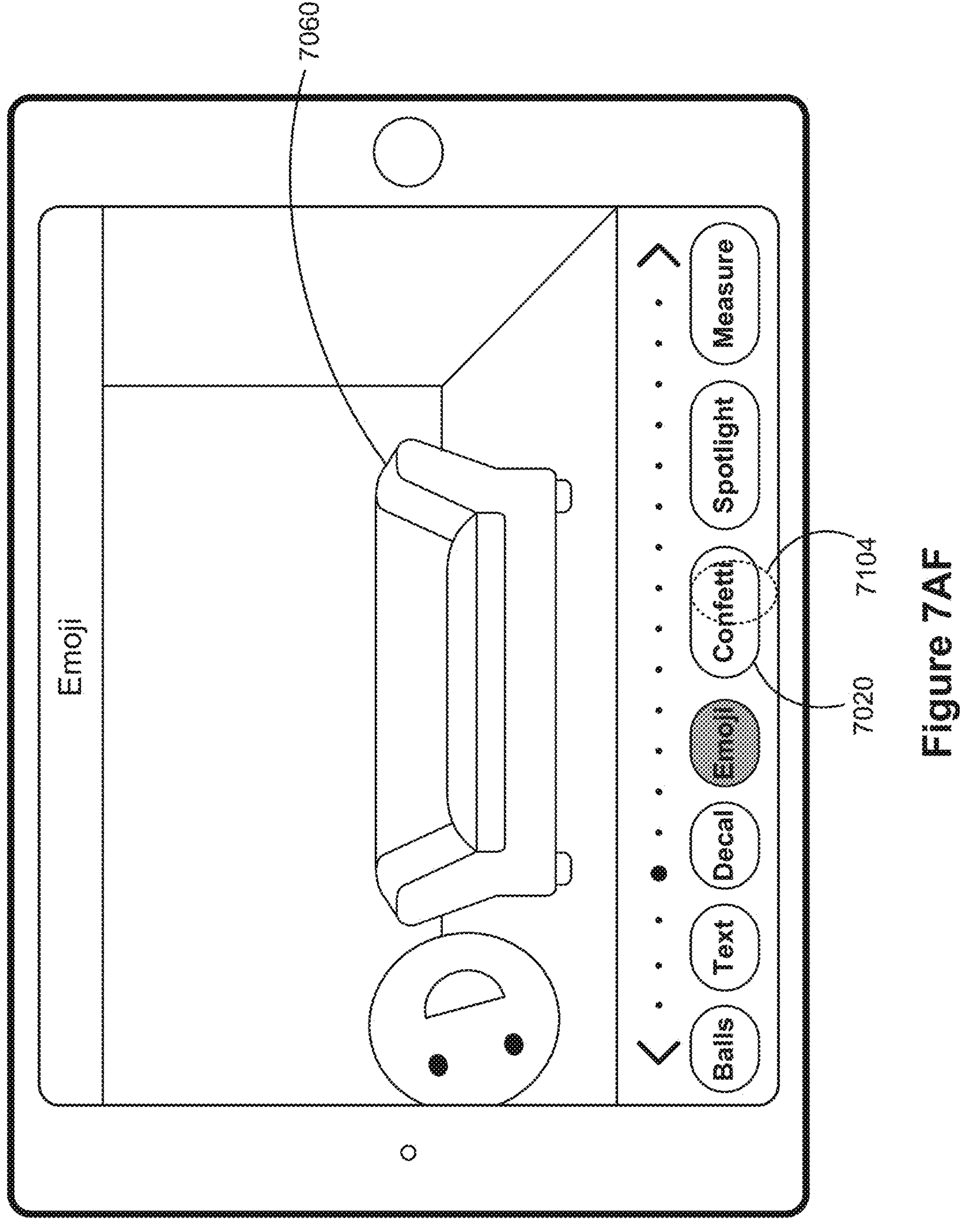
Figure 7A:
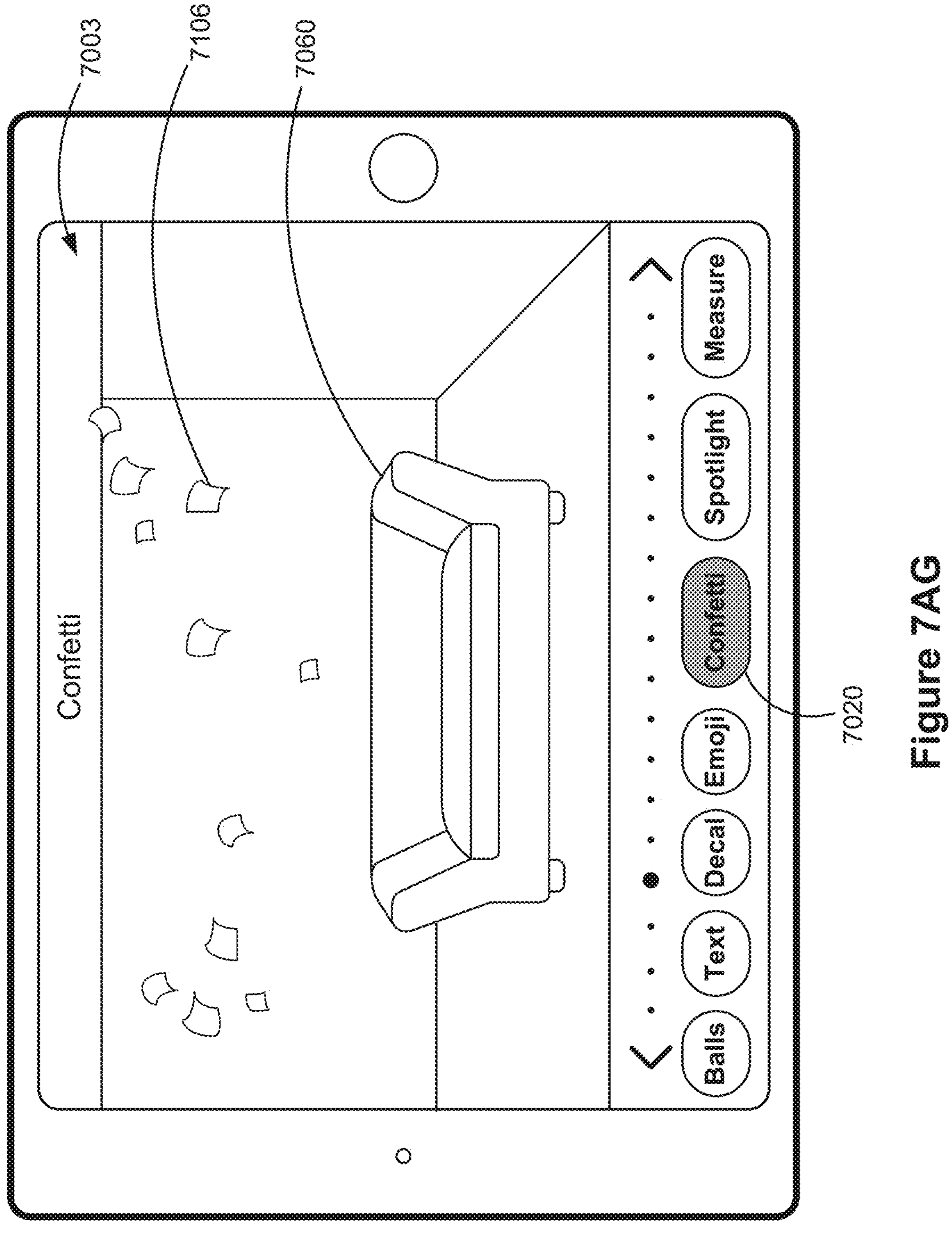
Figure 7A:
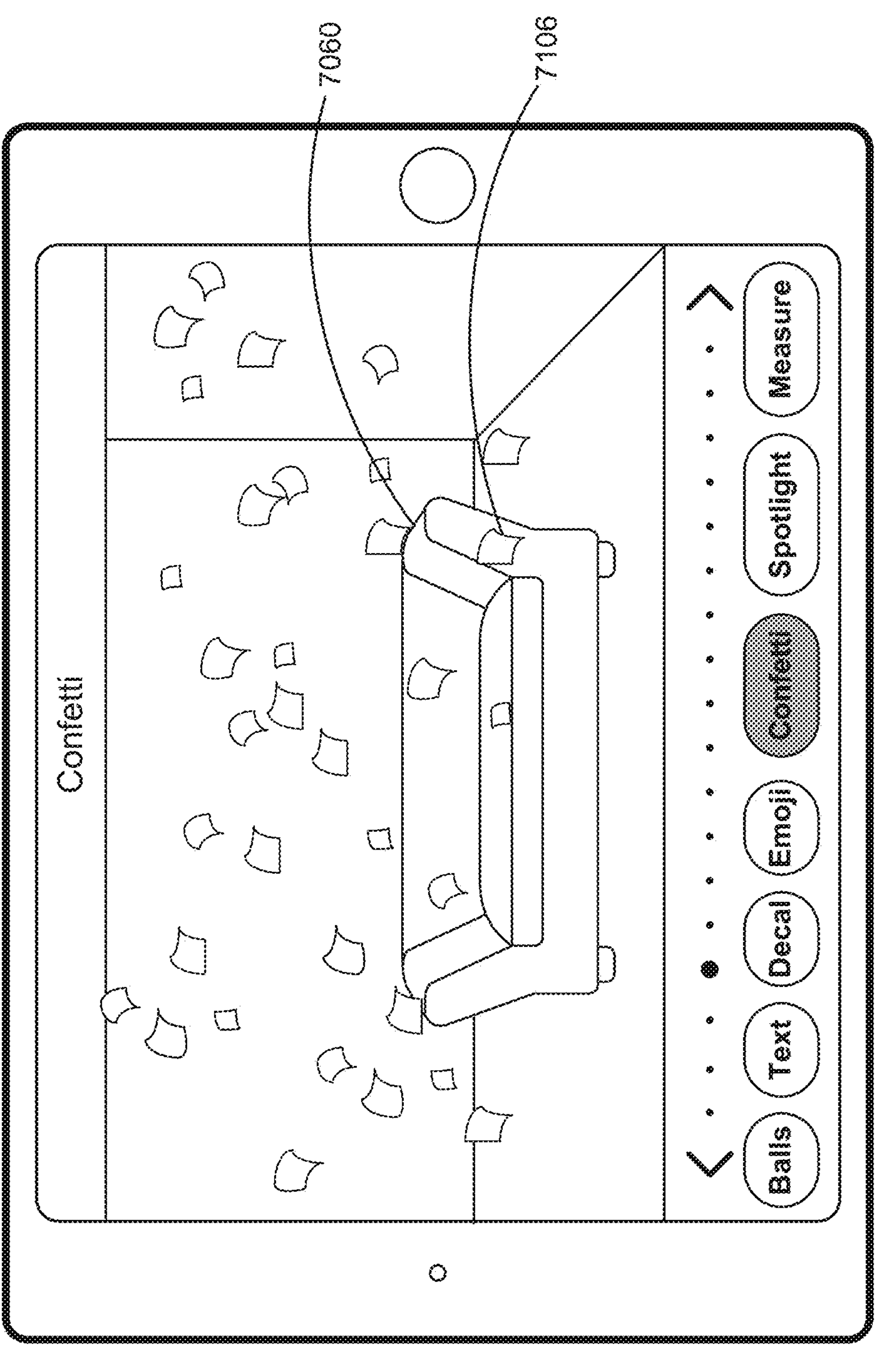
Figure 7A:
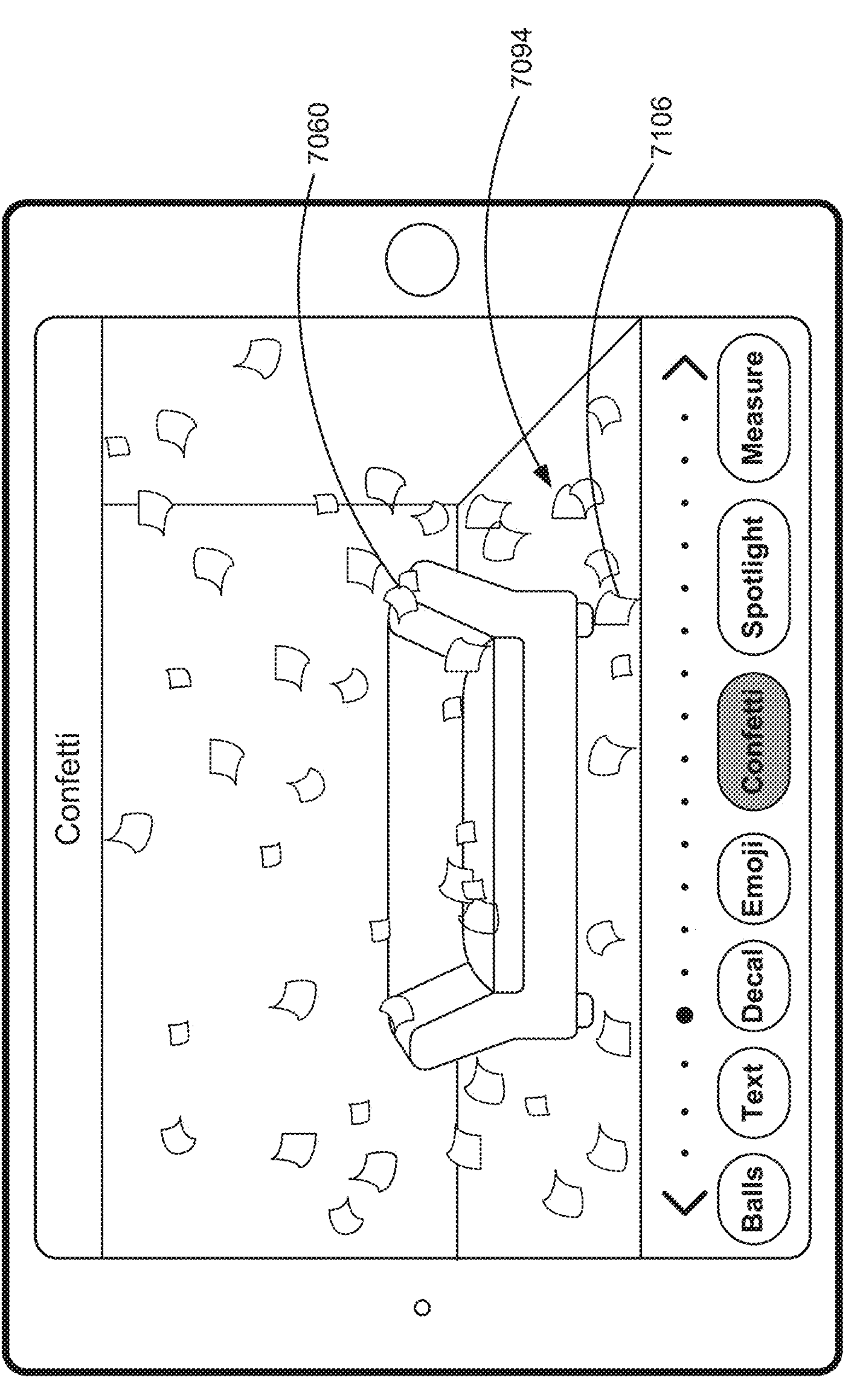
Figure 7A:
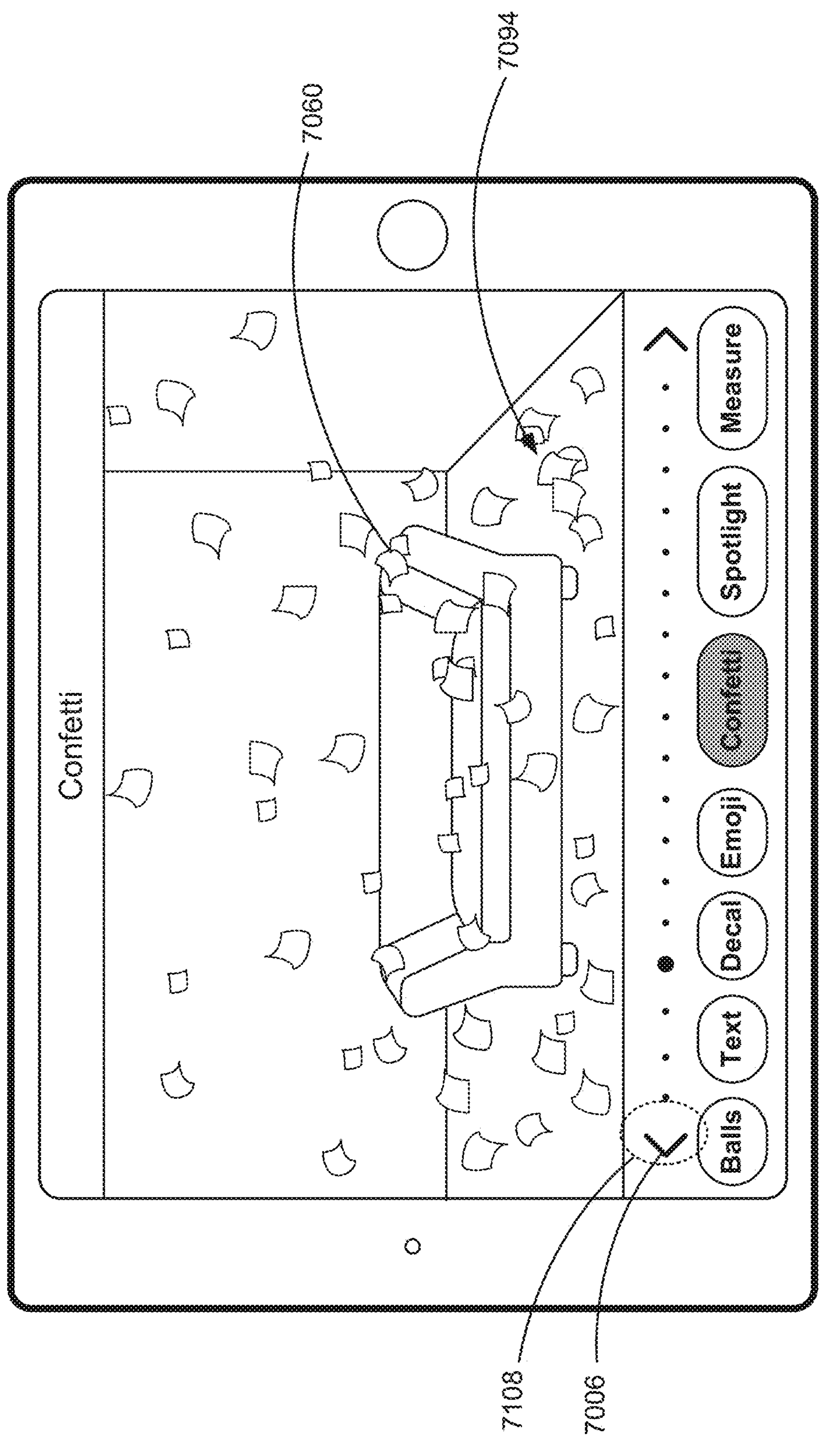
Figure 7A:
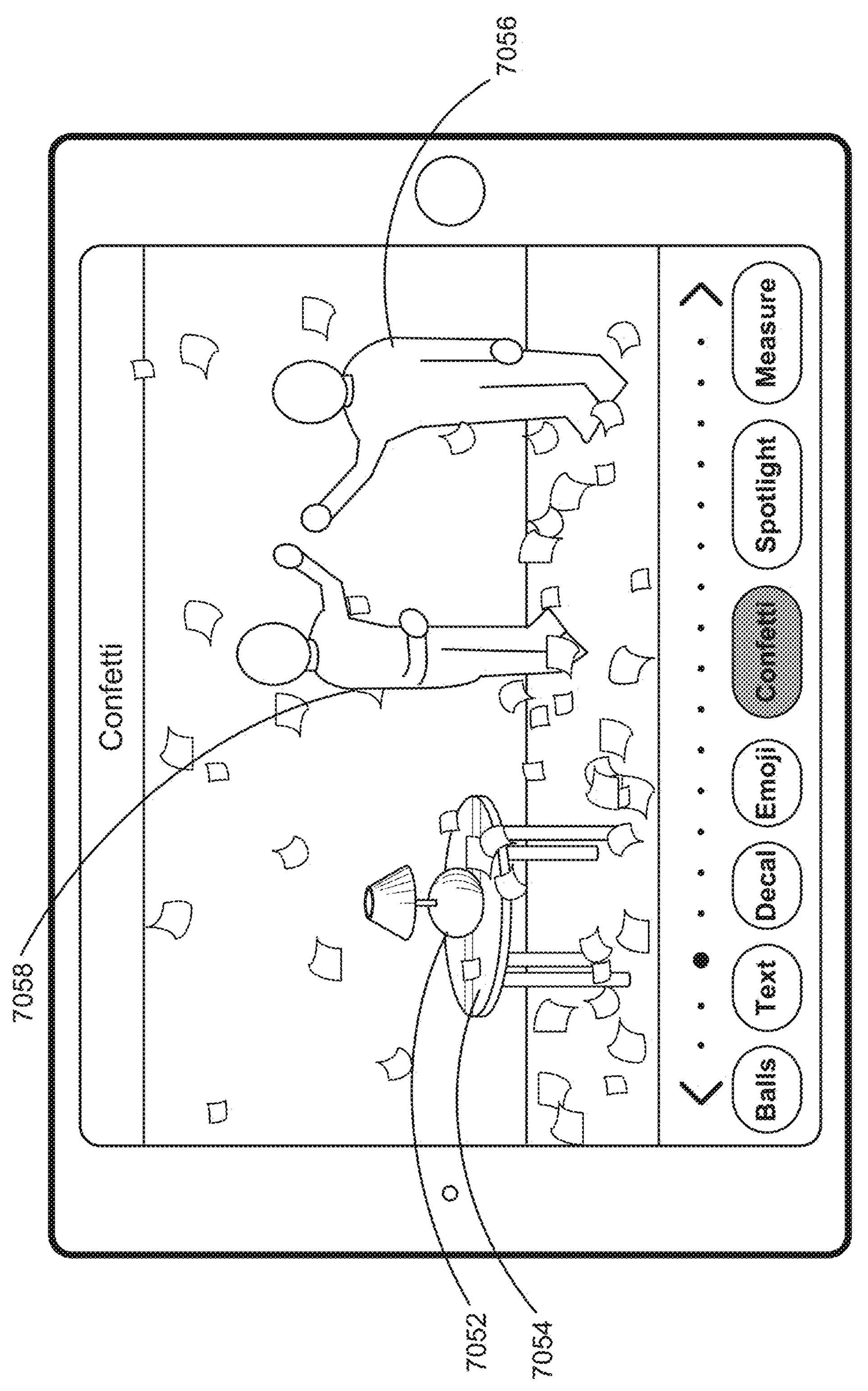
Figure 7A:
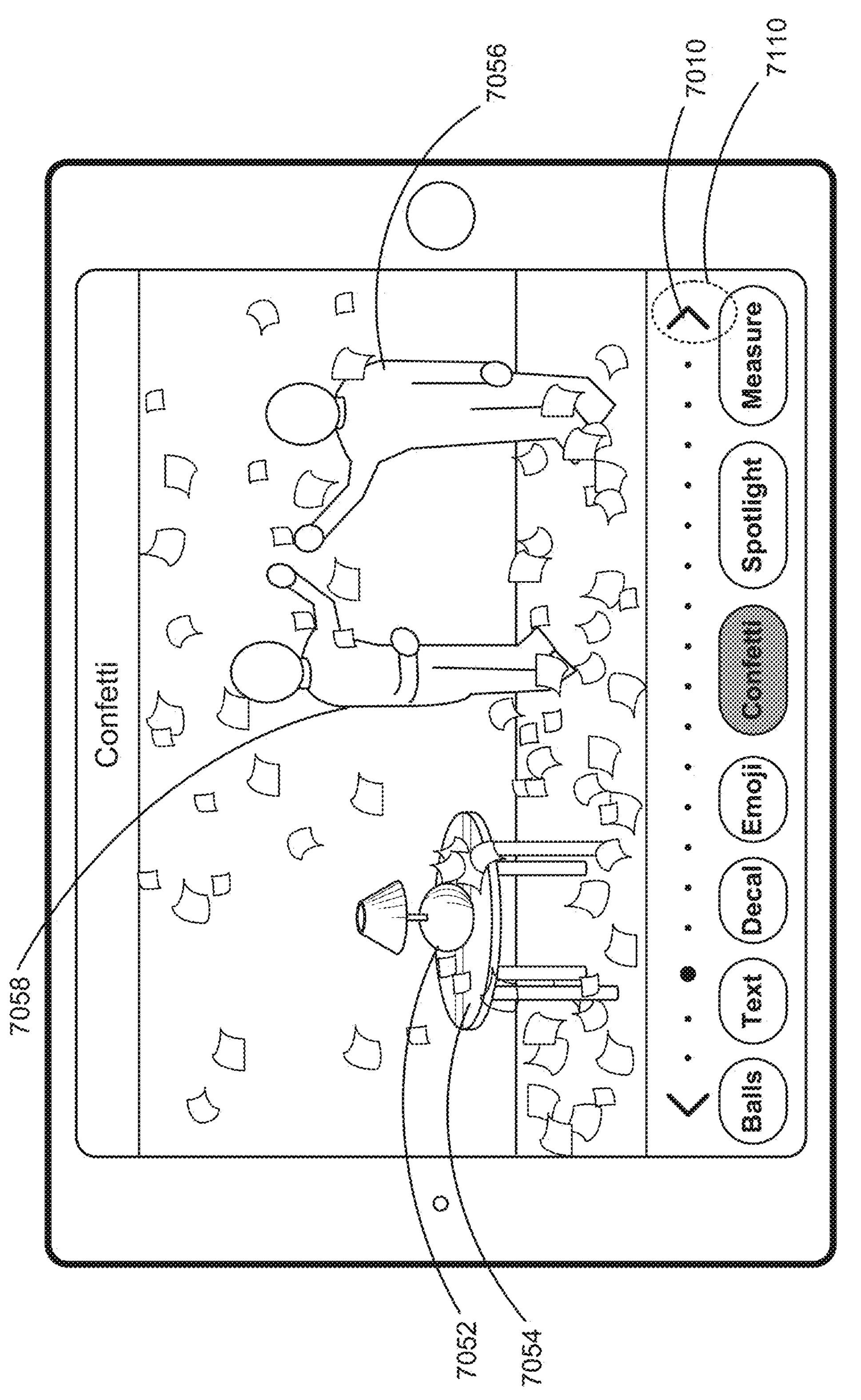
Figure 7A:
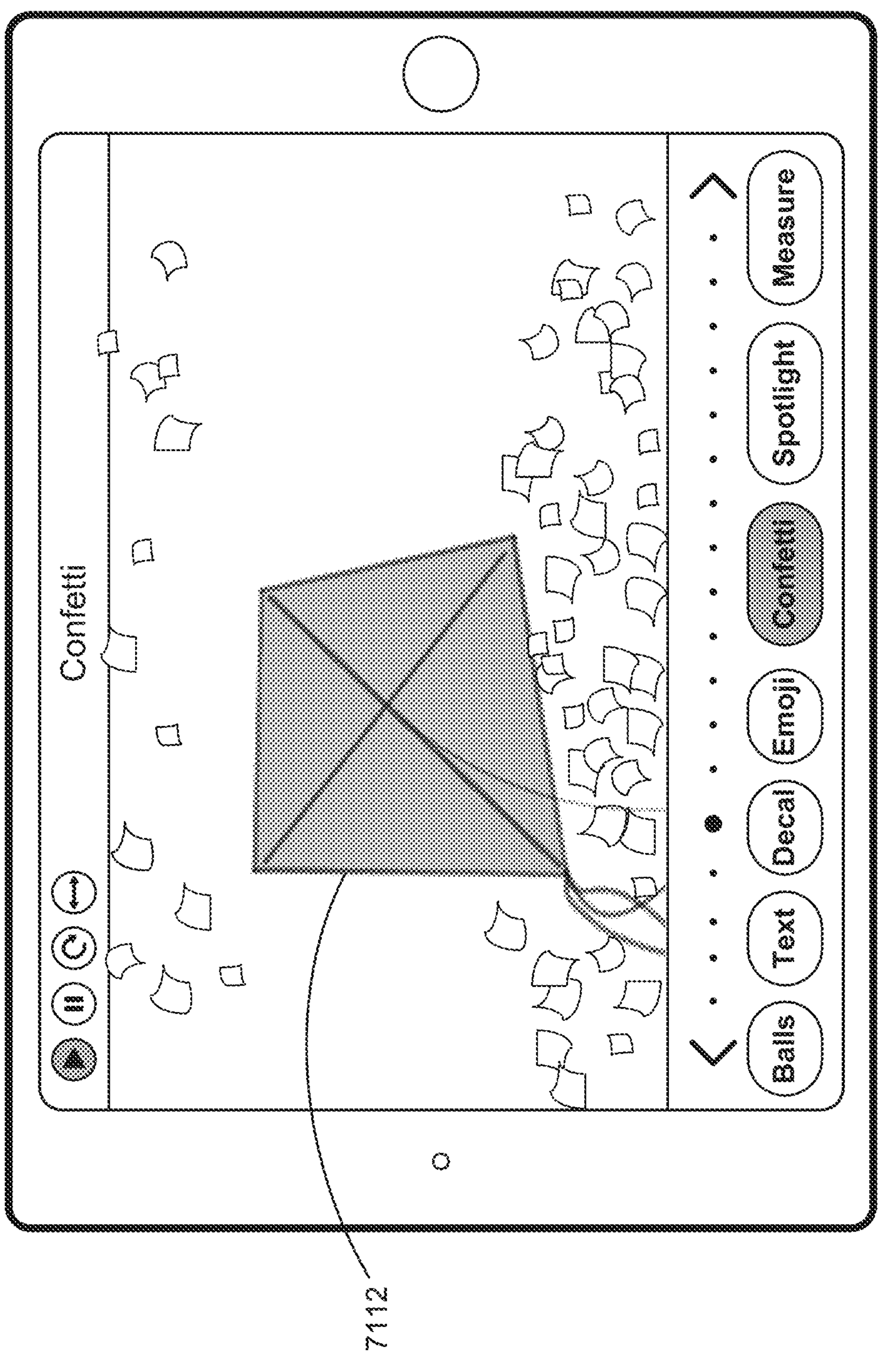
Figure 7A:
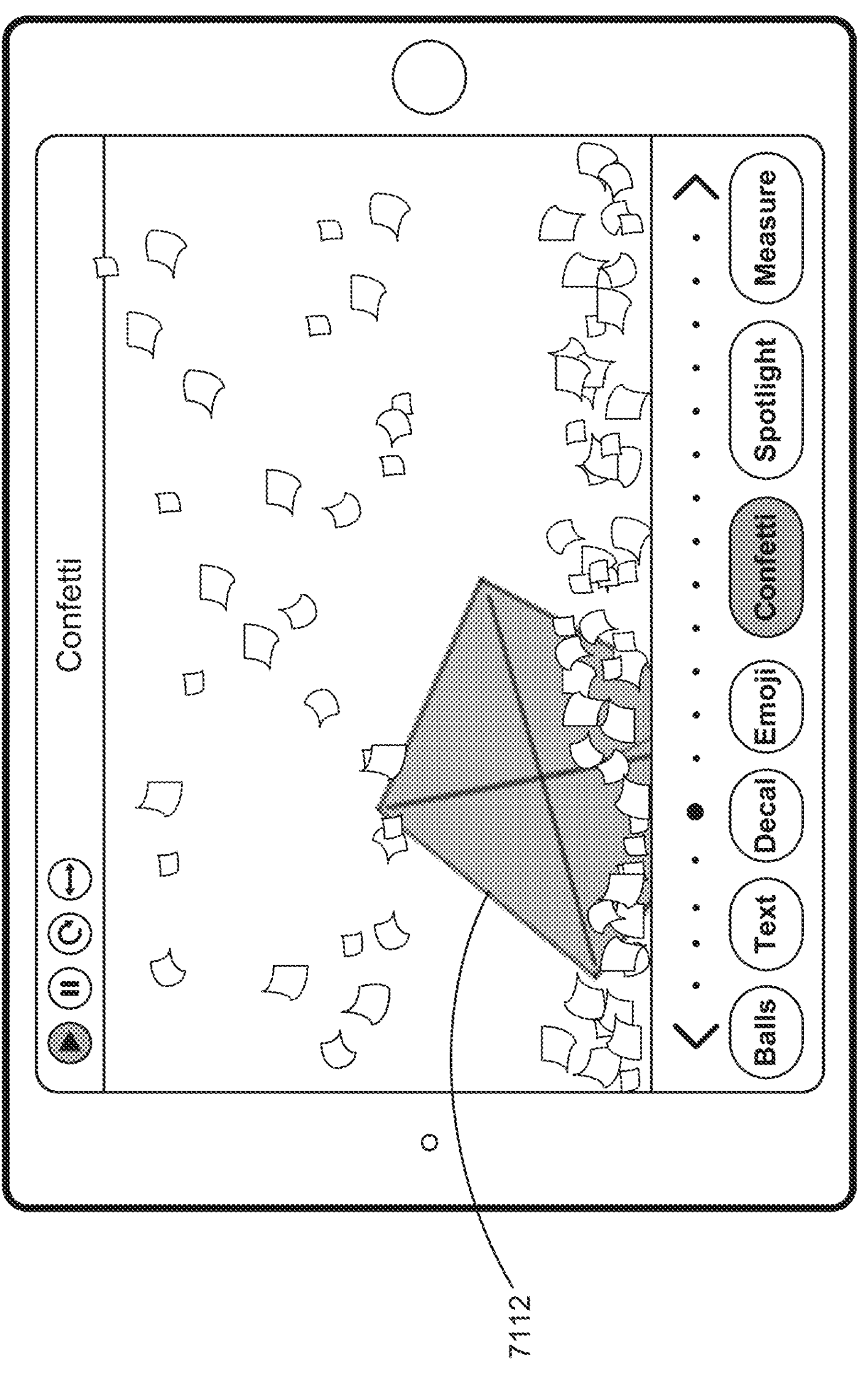
Figure 7A:
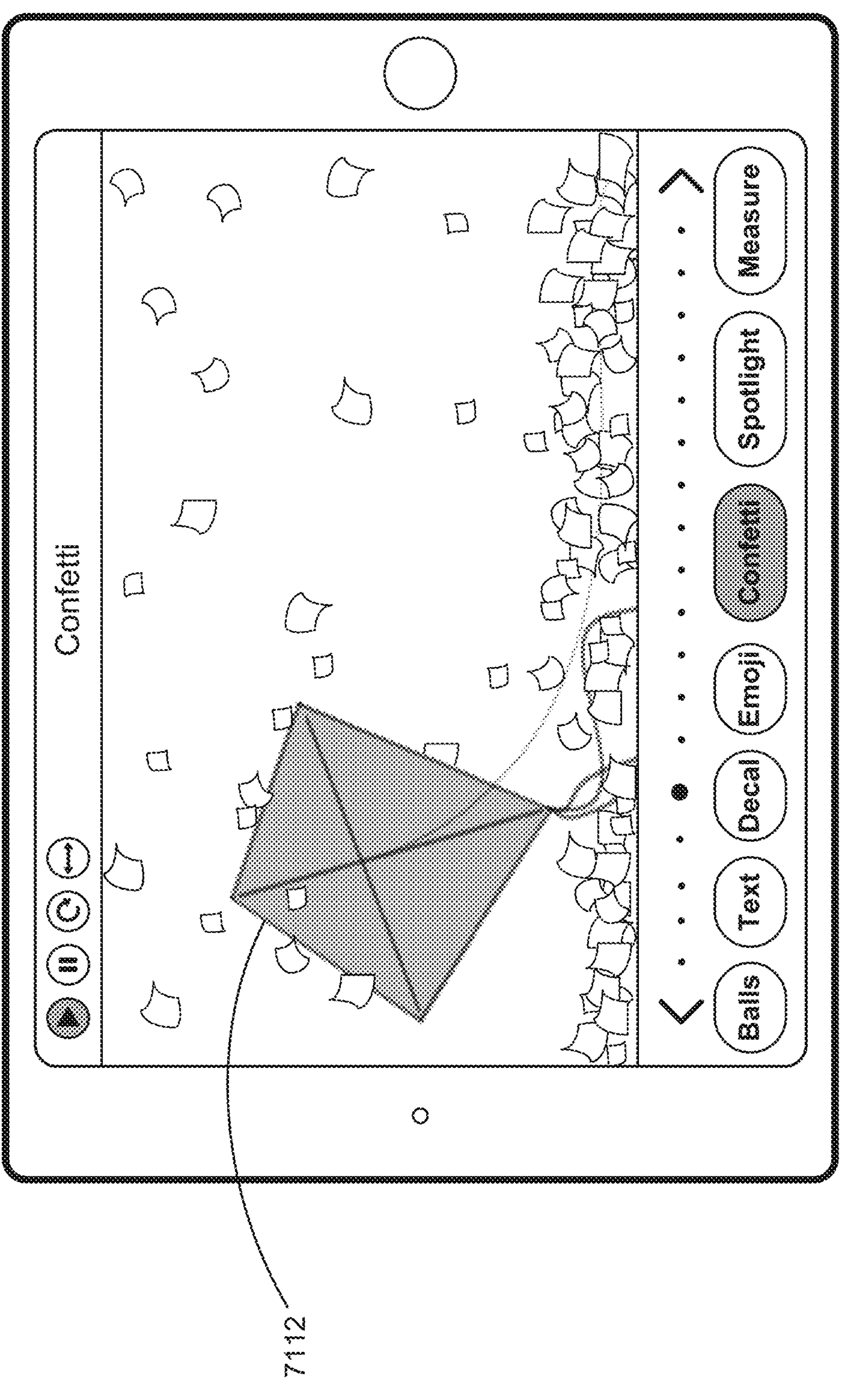
Figure 7A:
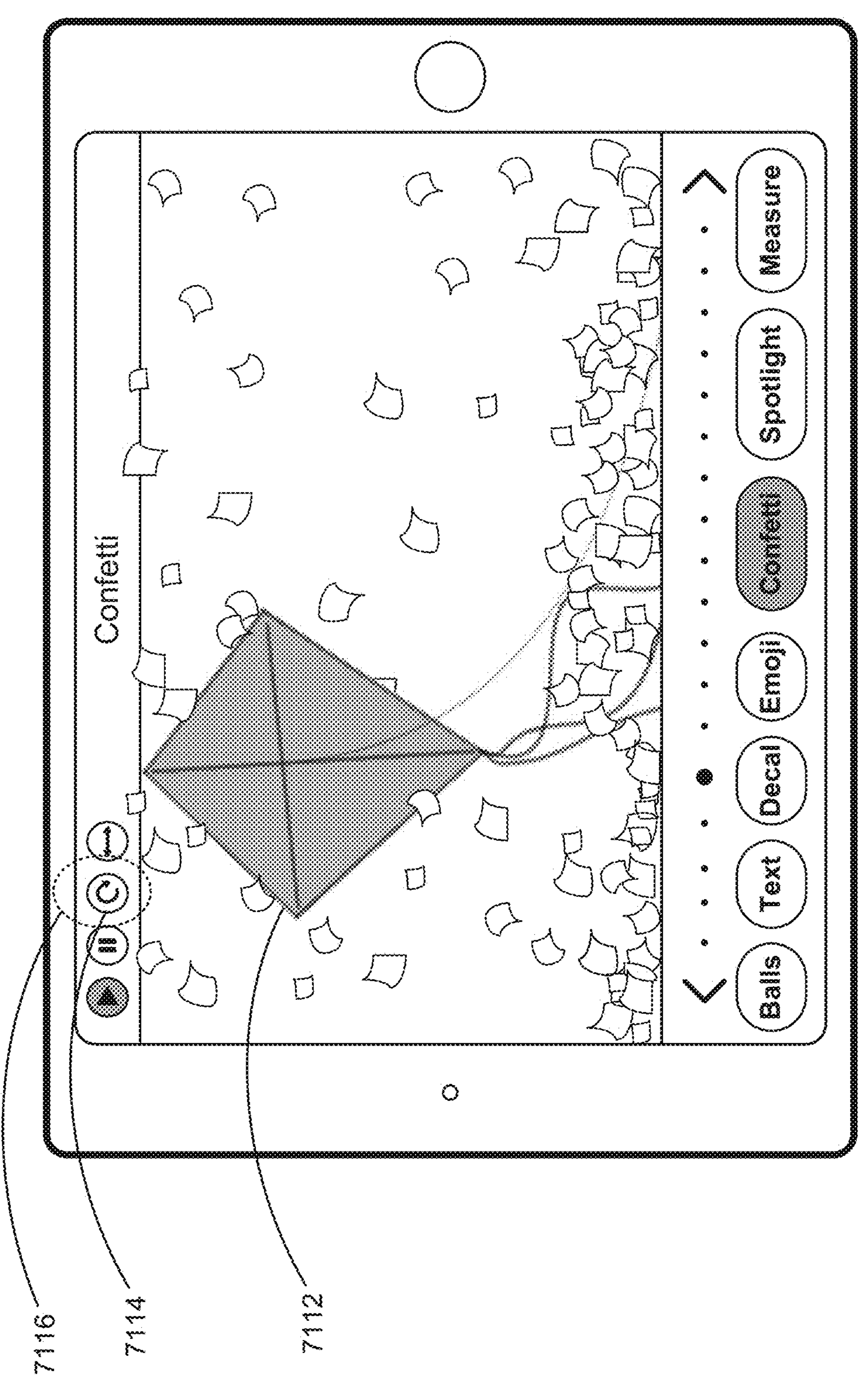
Figure 7A:
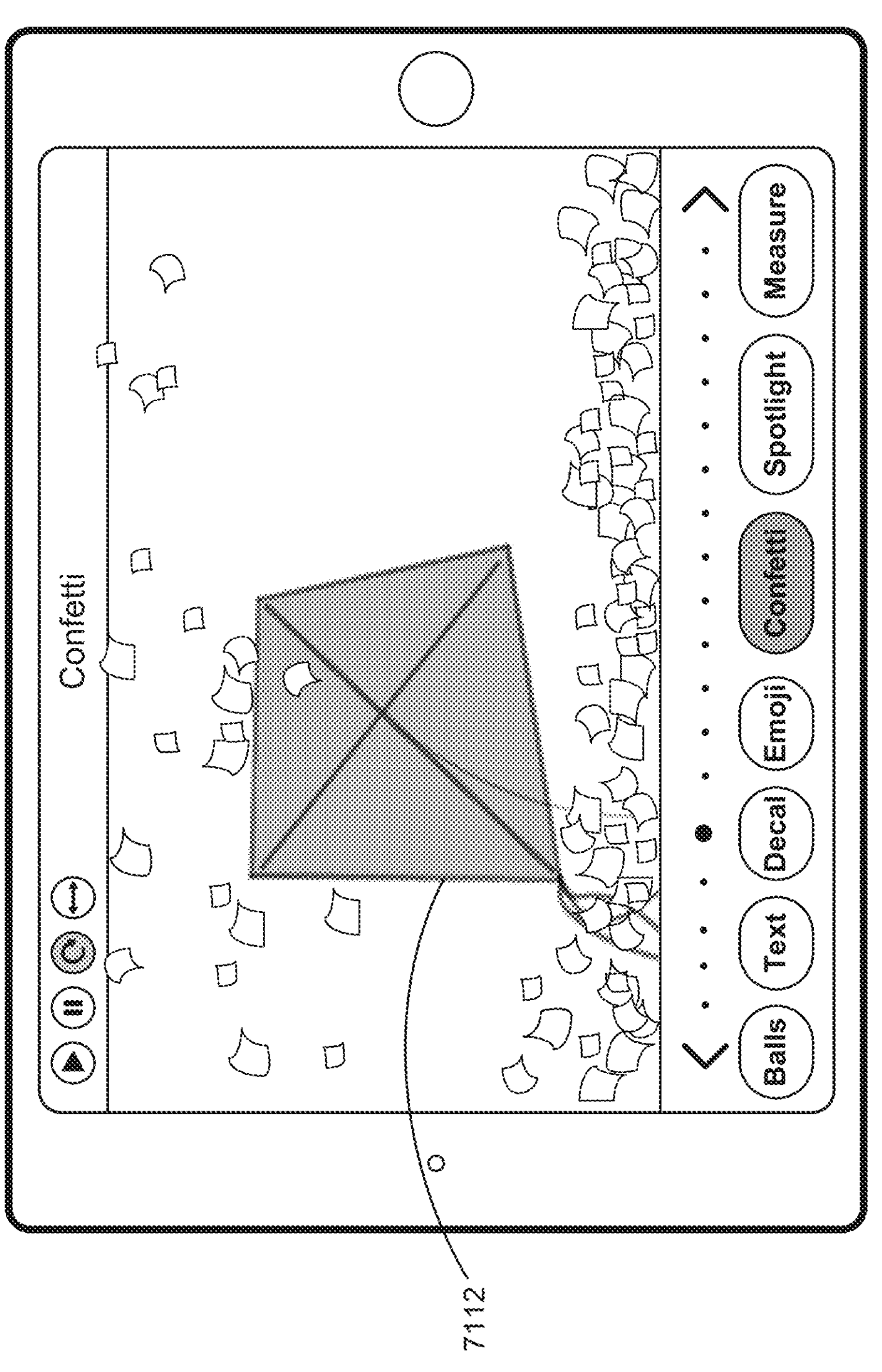
Figure 7A:
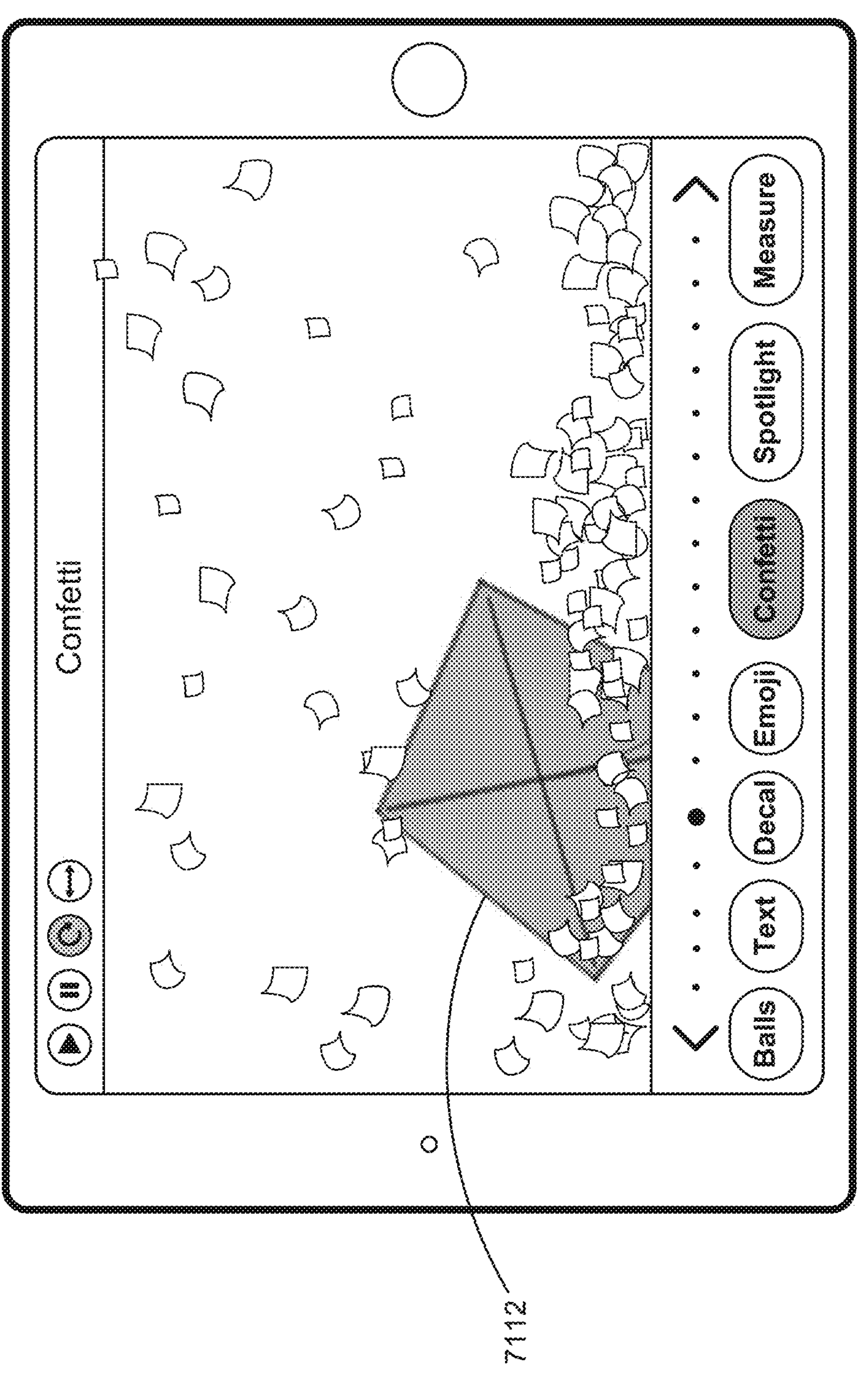
Figure 7A:
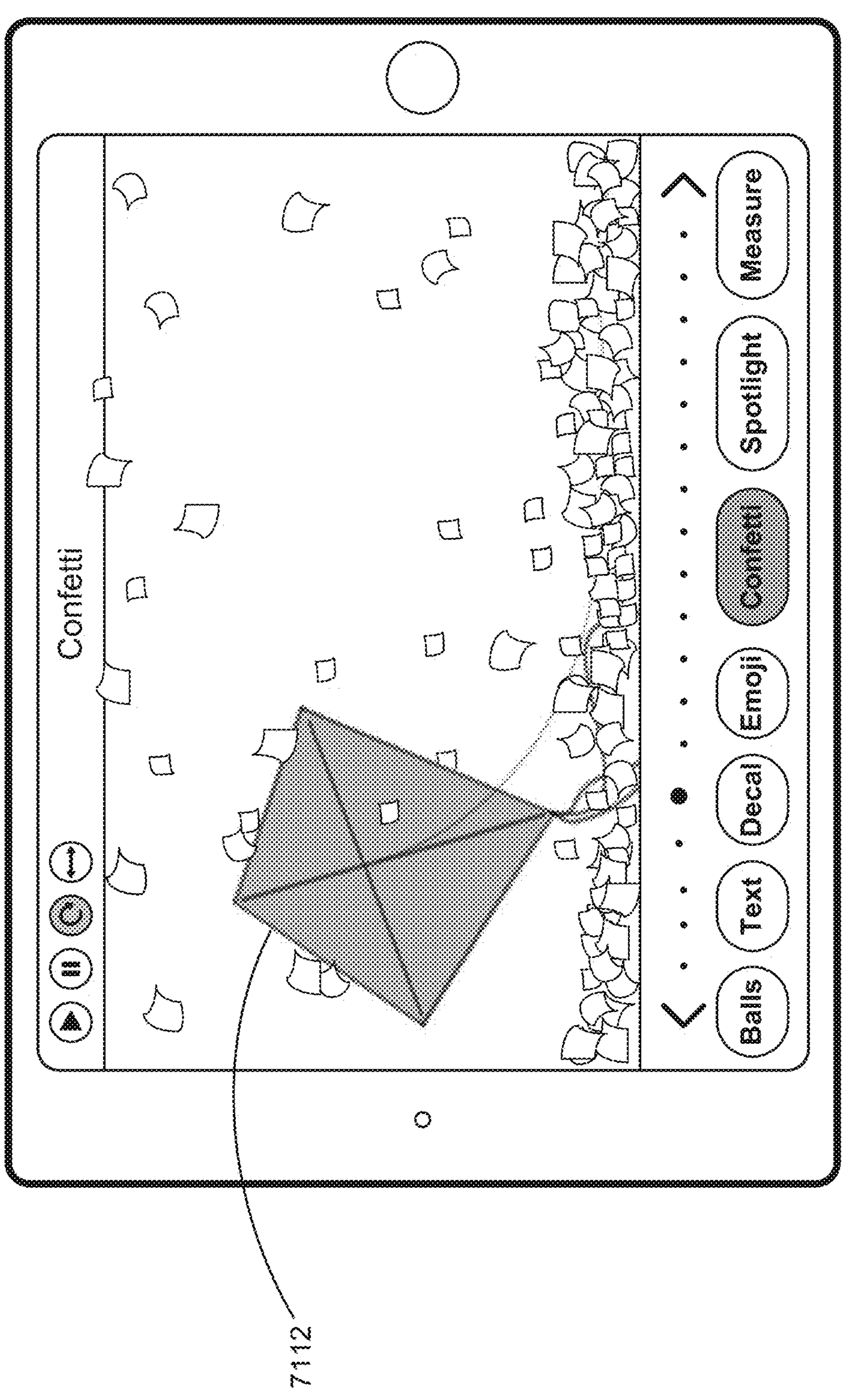
Figure 7A:
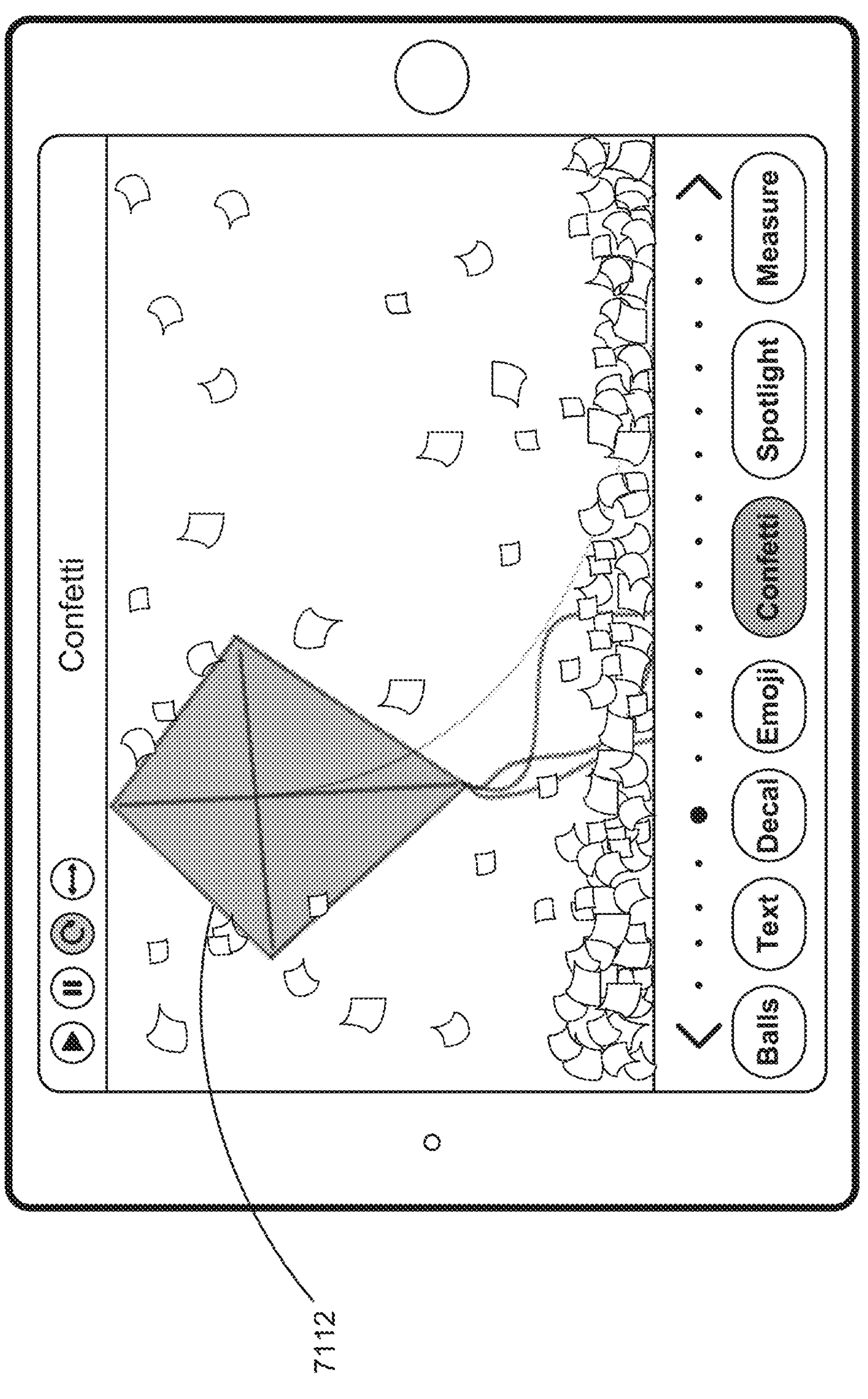
Figure 7A:
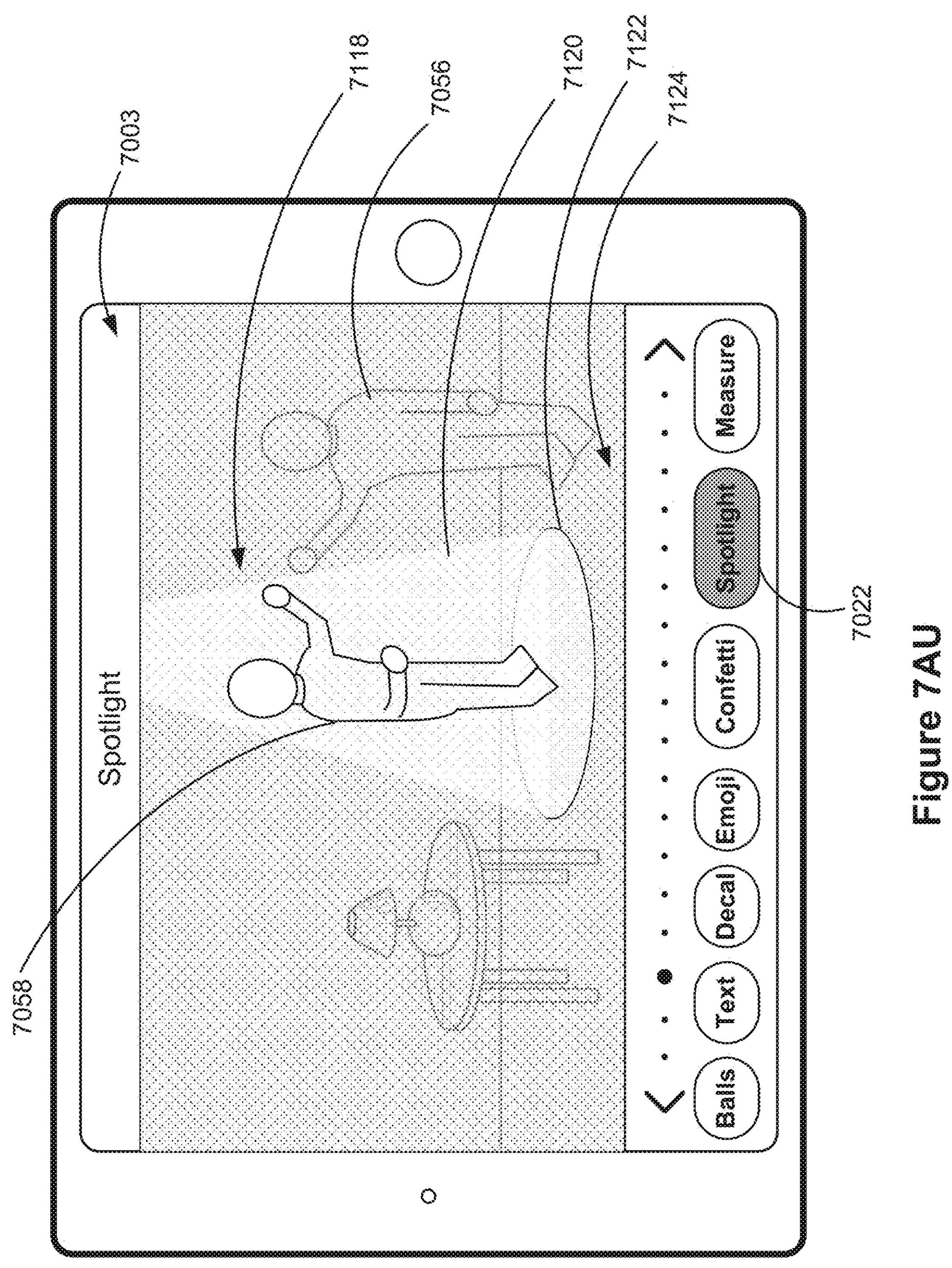
Figure 7A:
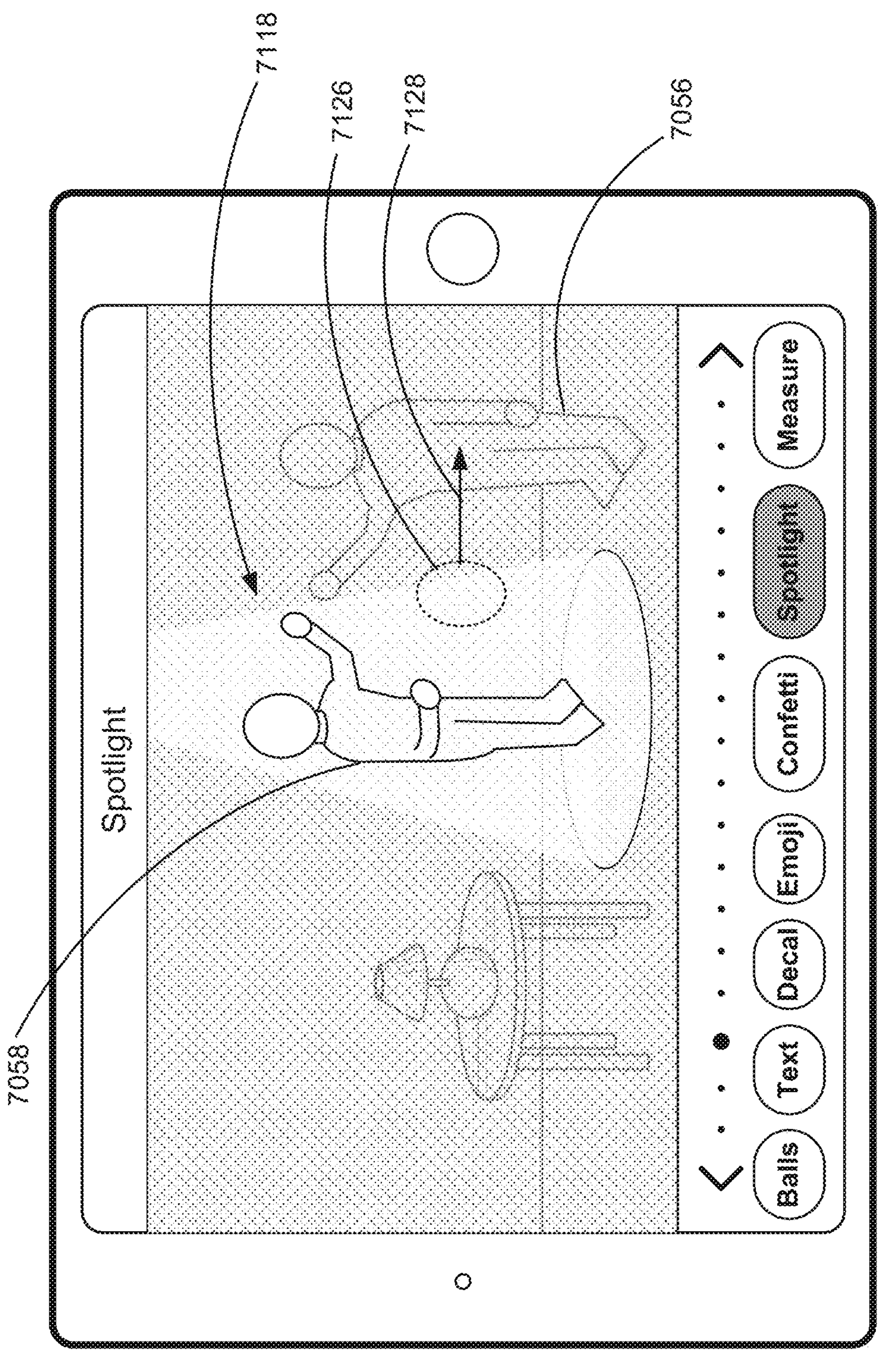
Figure 7A:
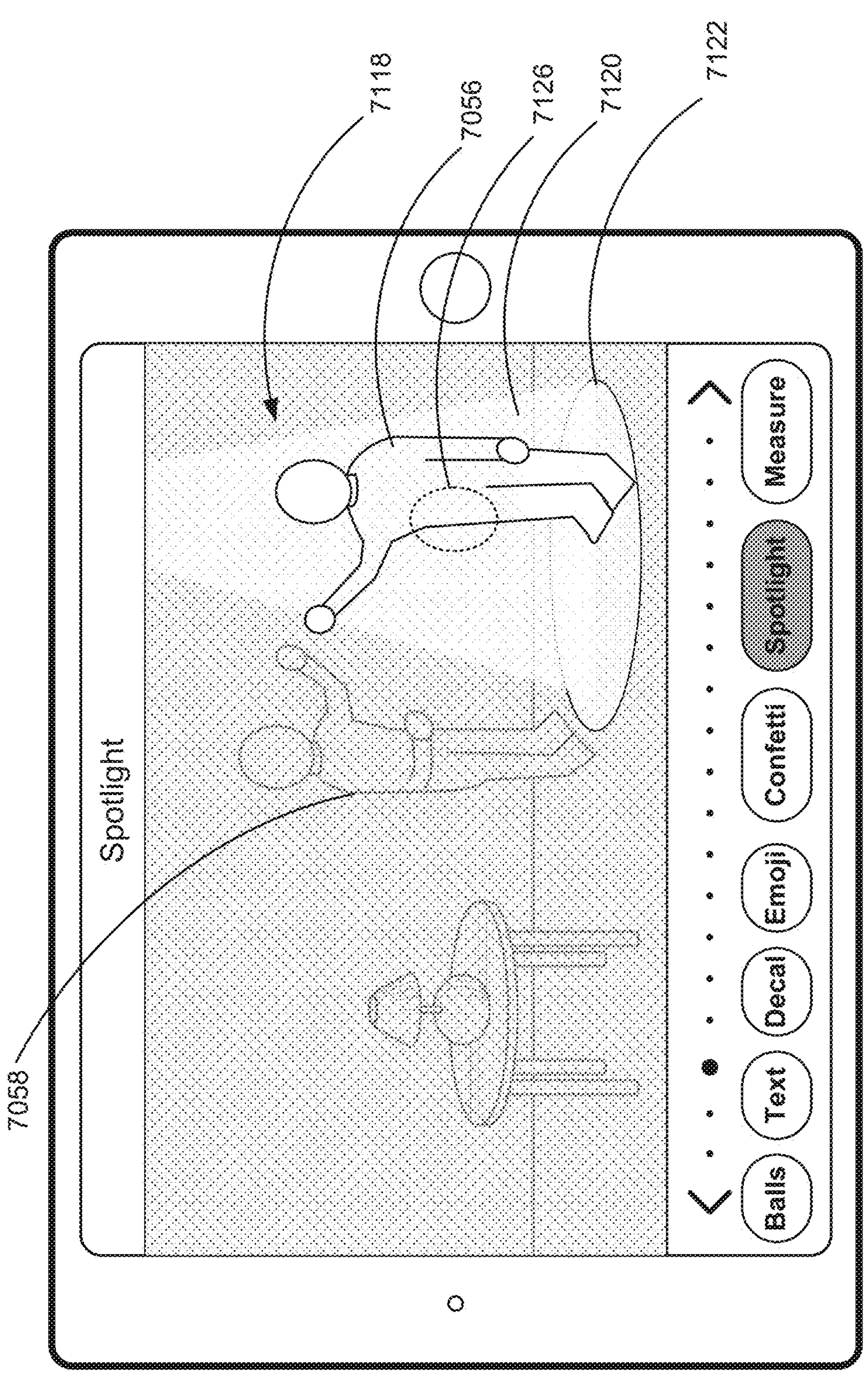
Figure 7A:
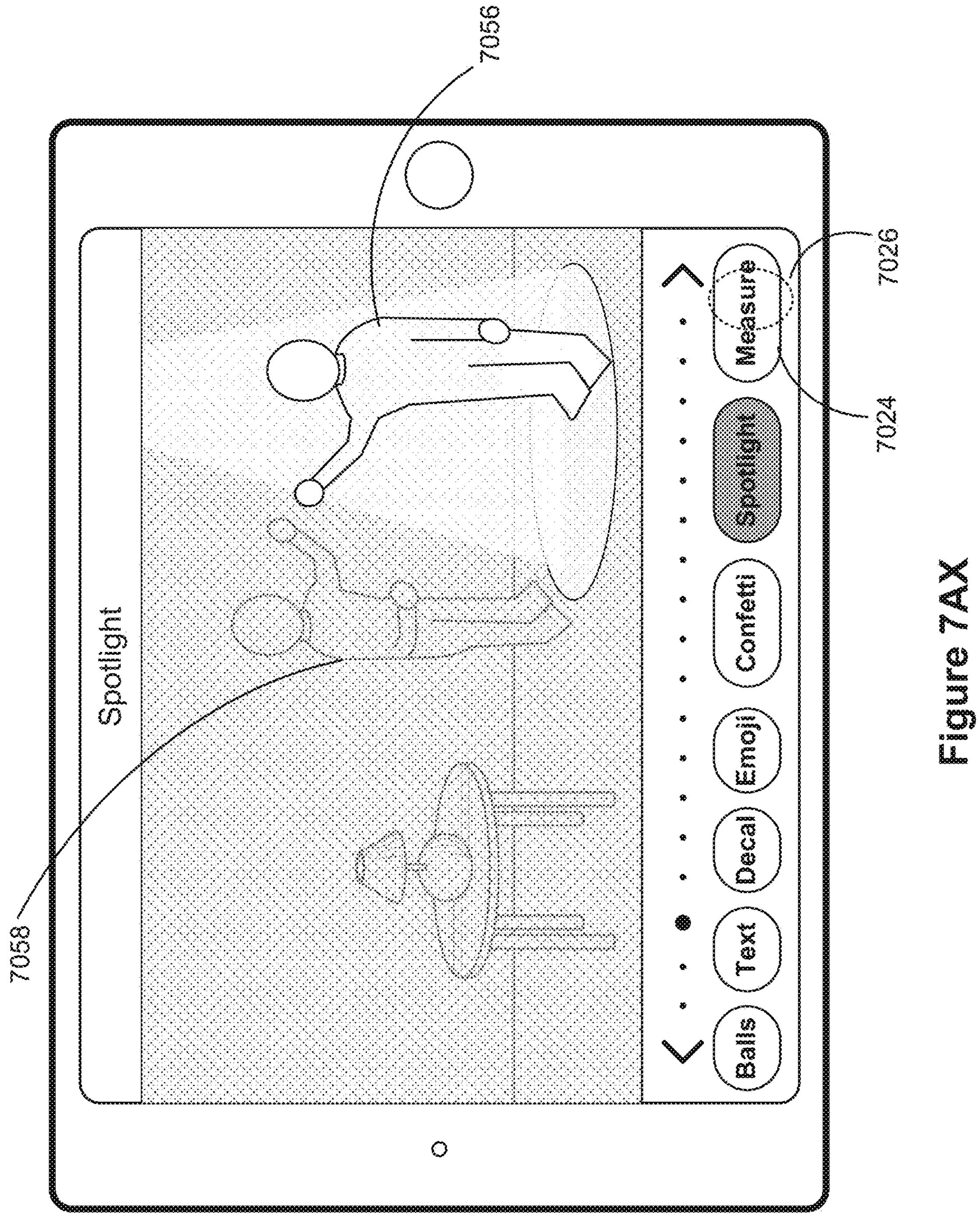
Figure 7A:
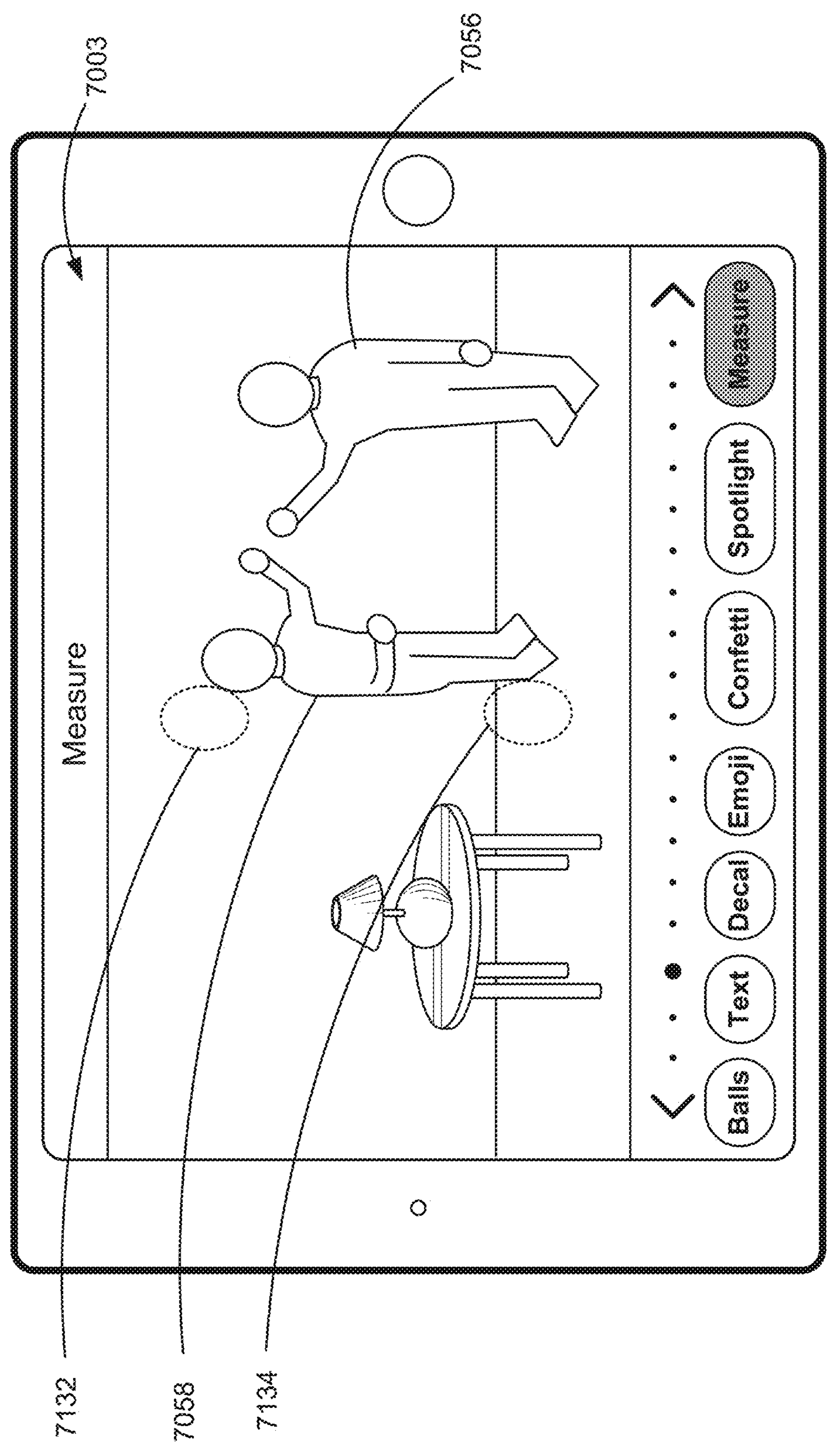
Figure 7A:
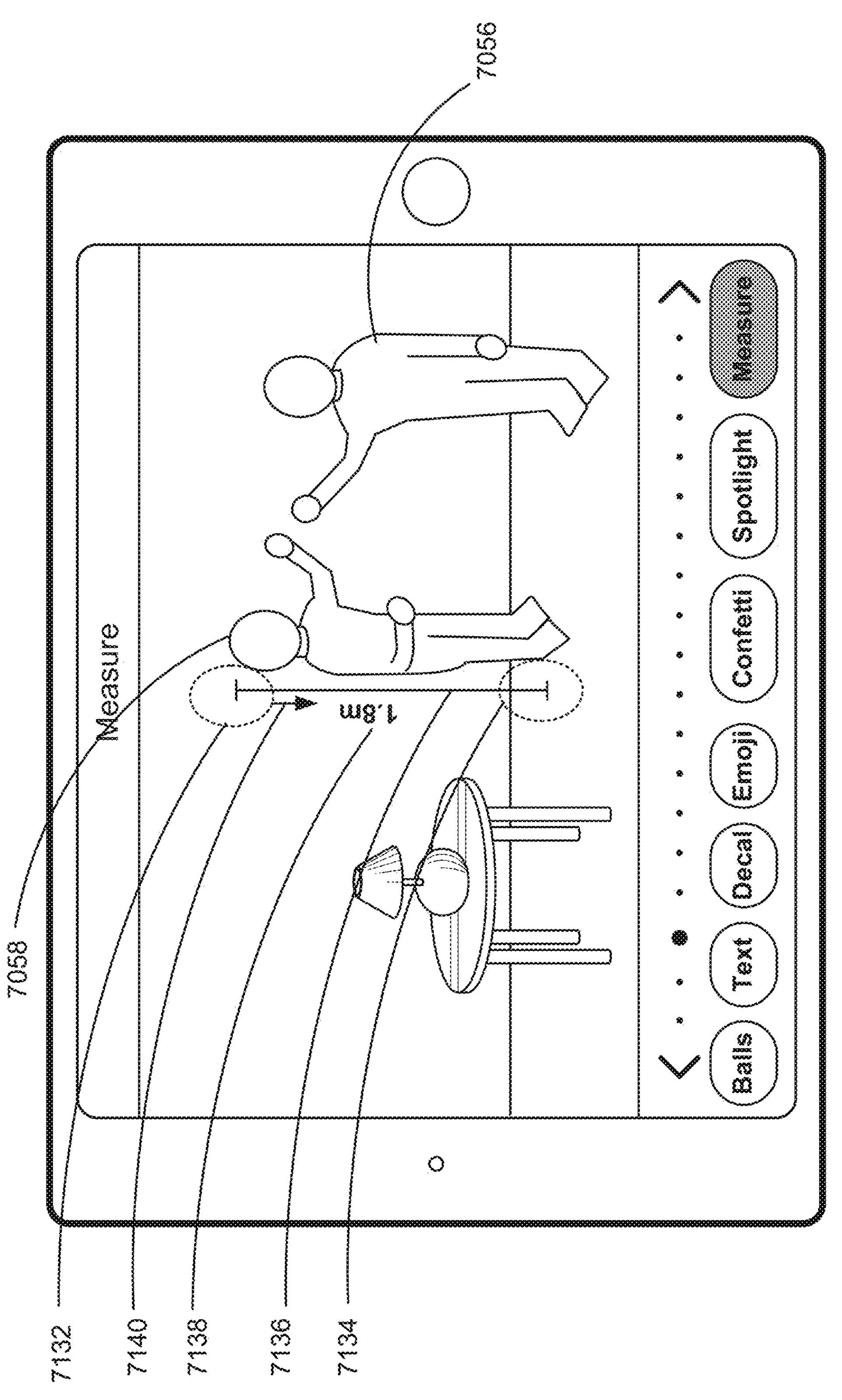
Figure 7B:
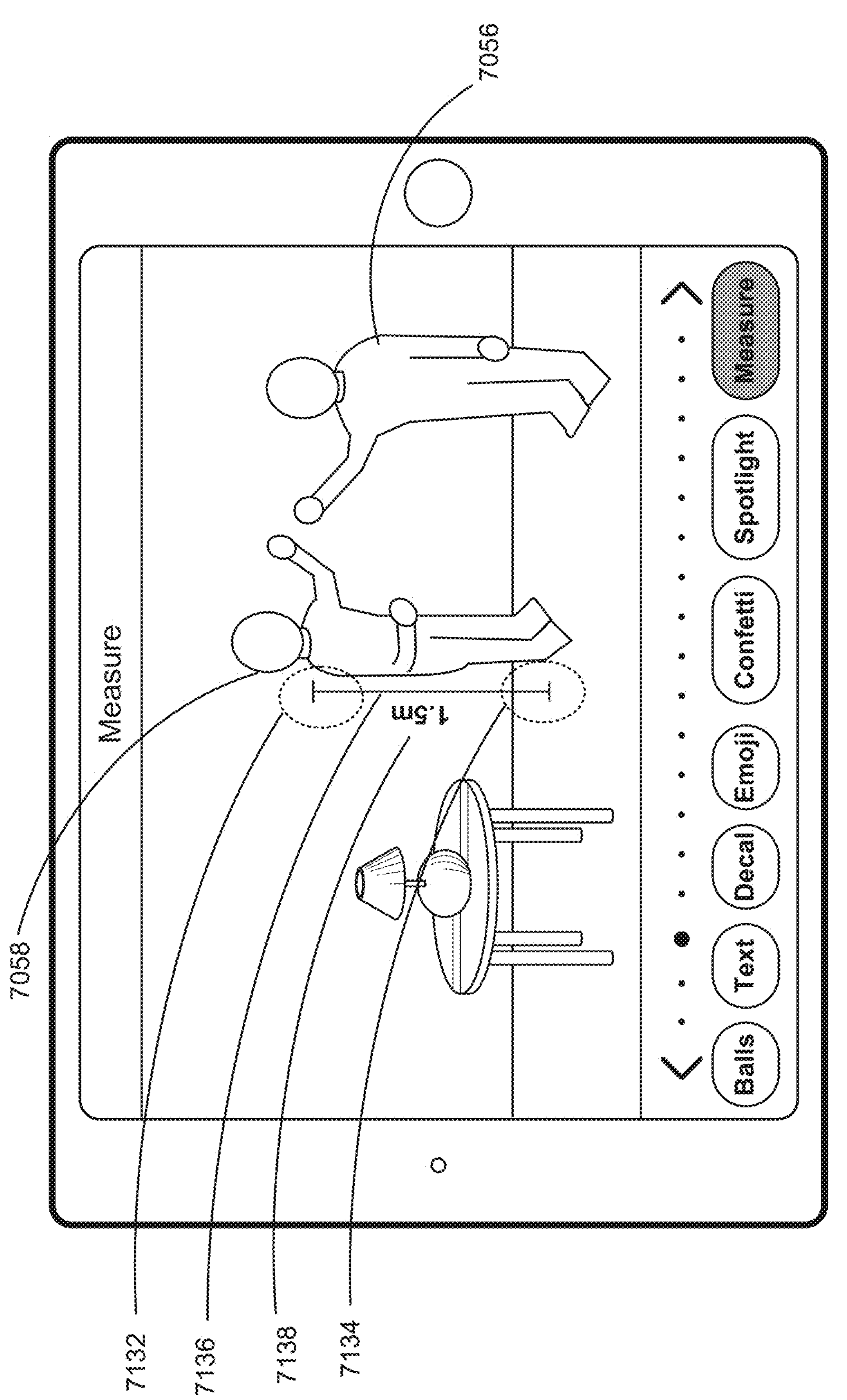
Figure 7B:
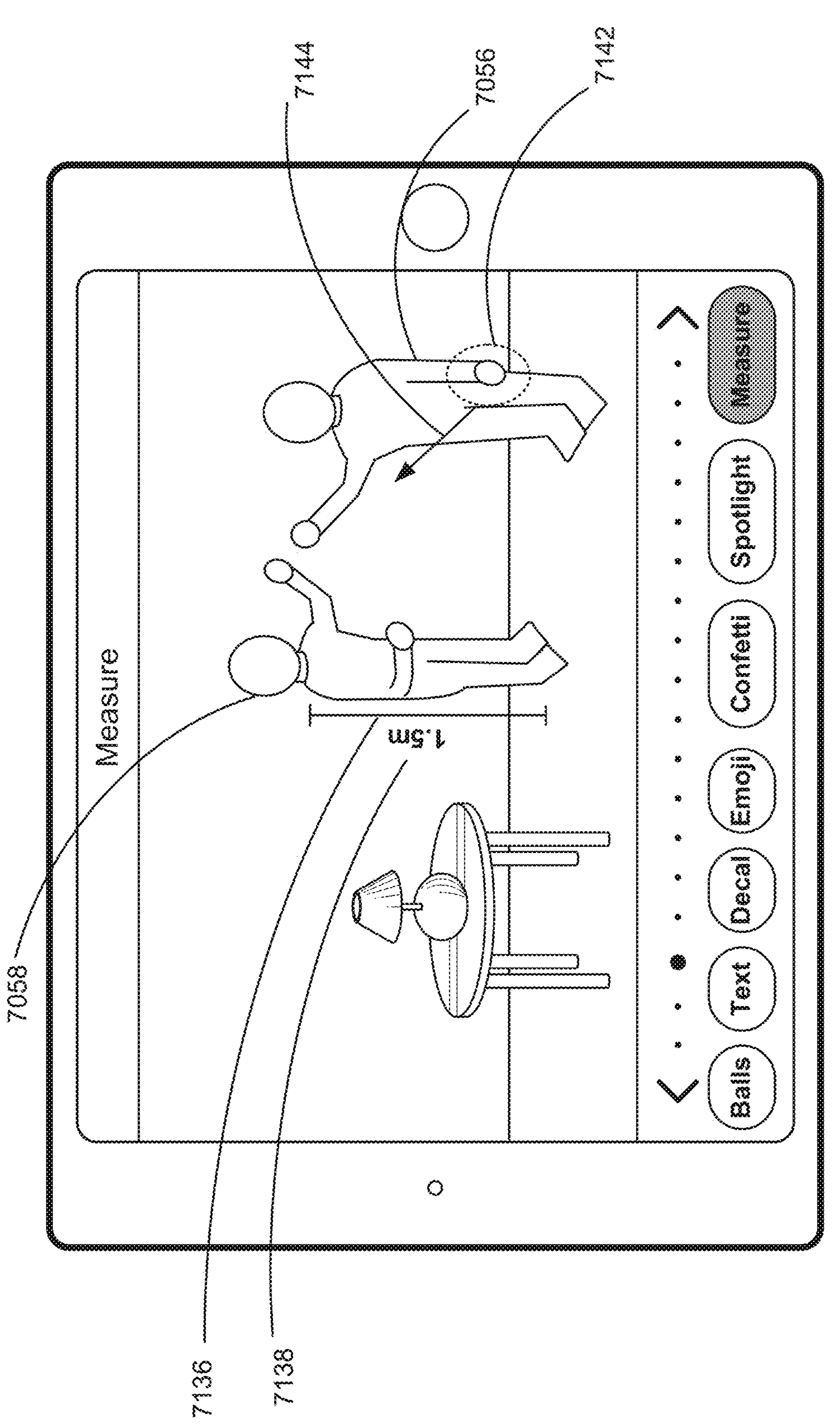
Figure 7B:
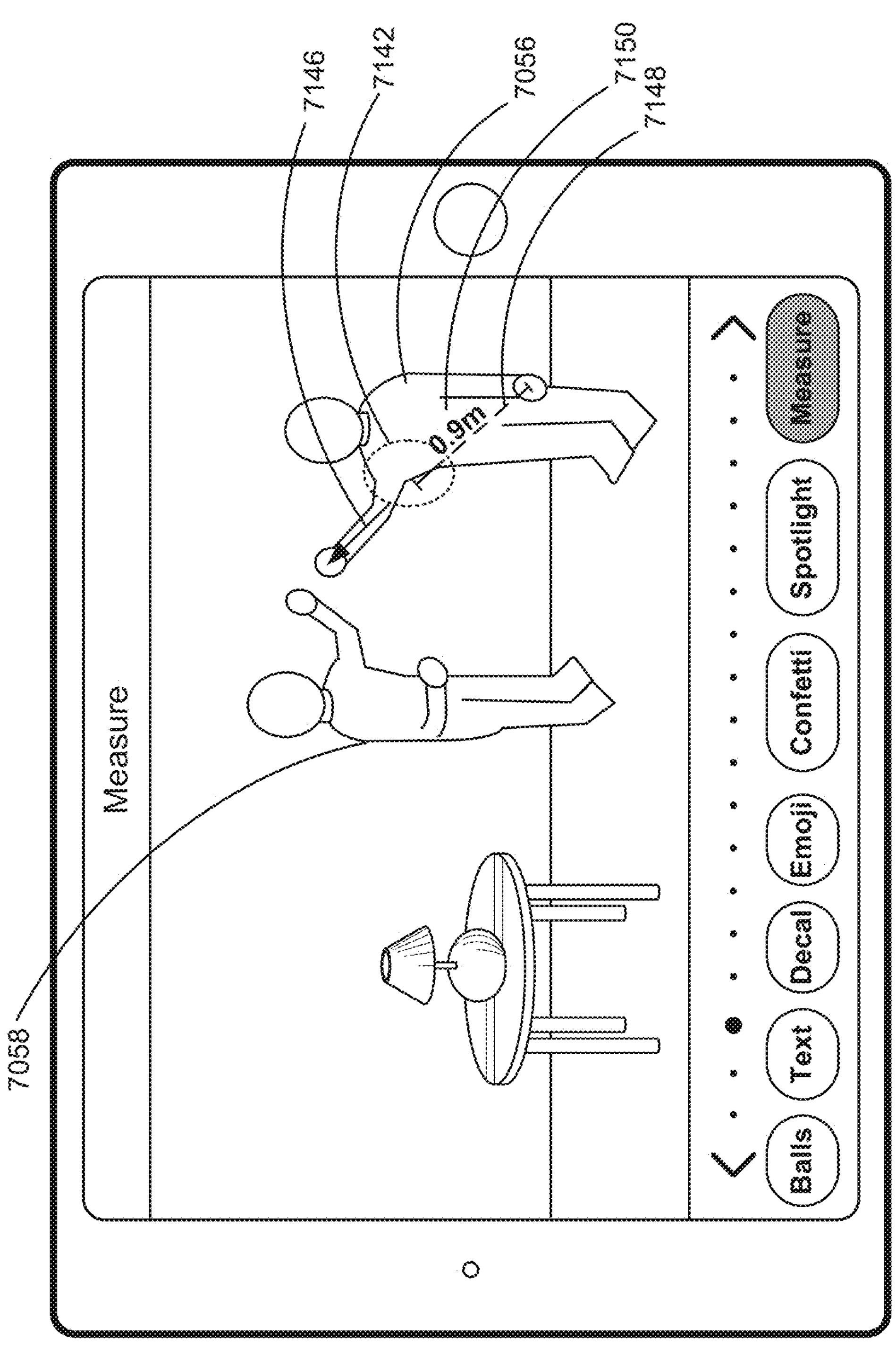
Figure 7B:
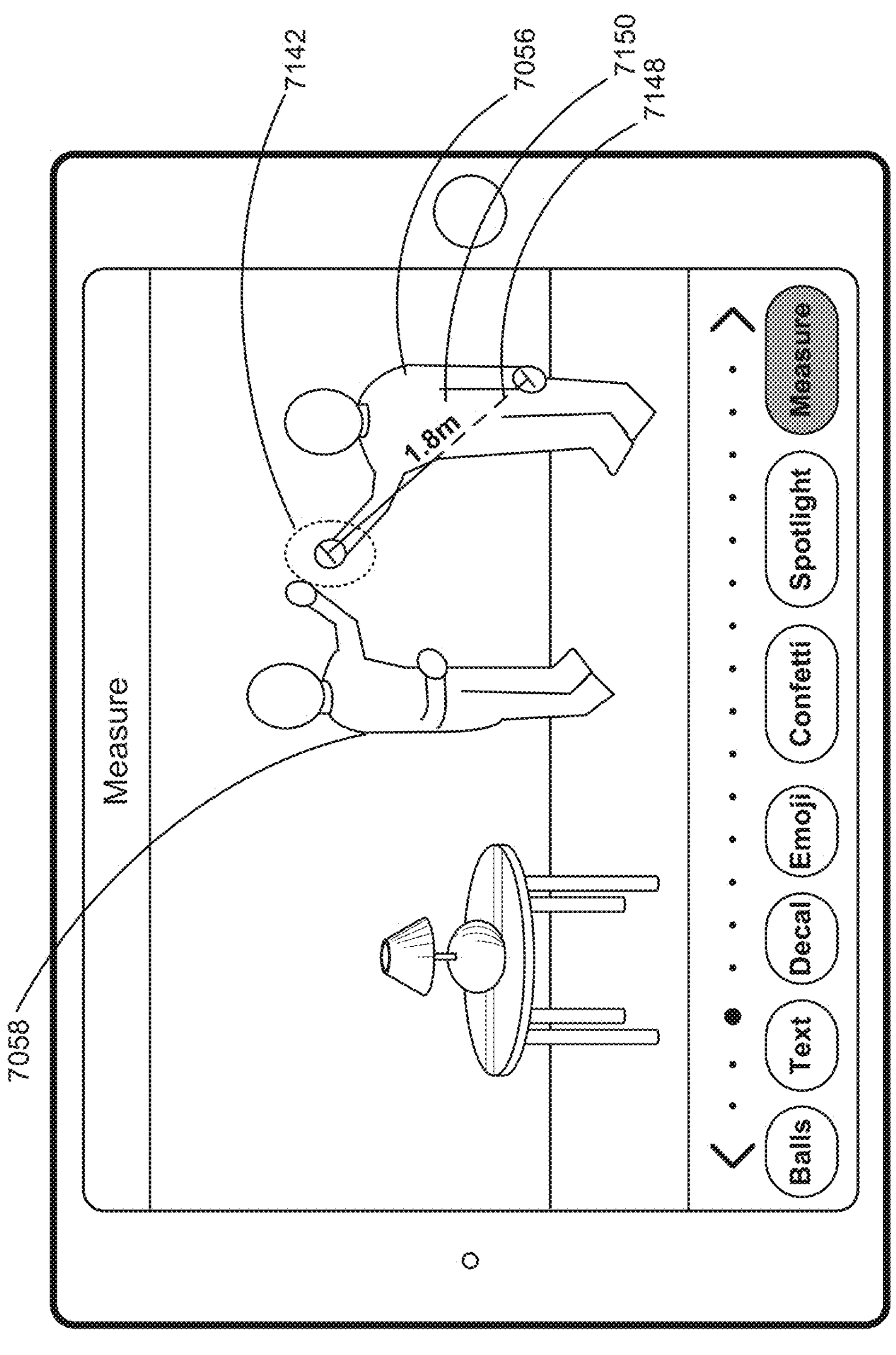
Figure 7B:
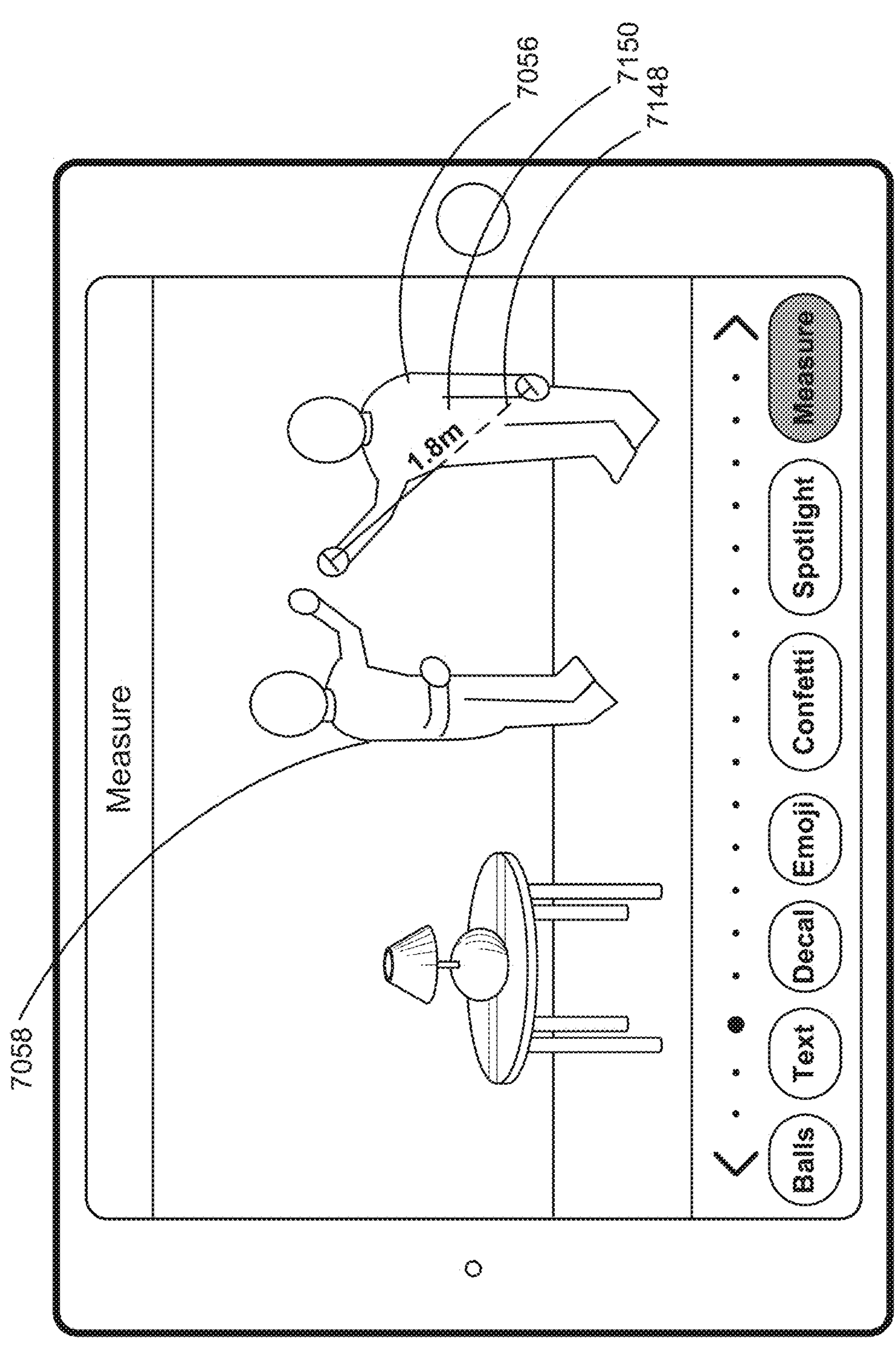
Figure 7B:
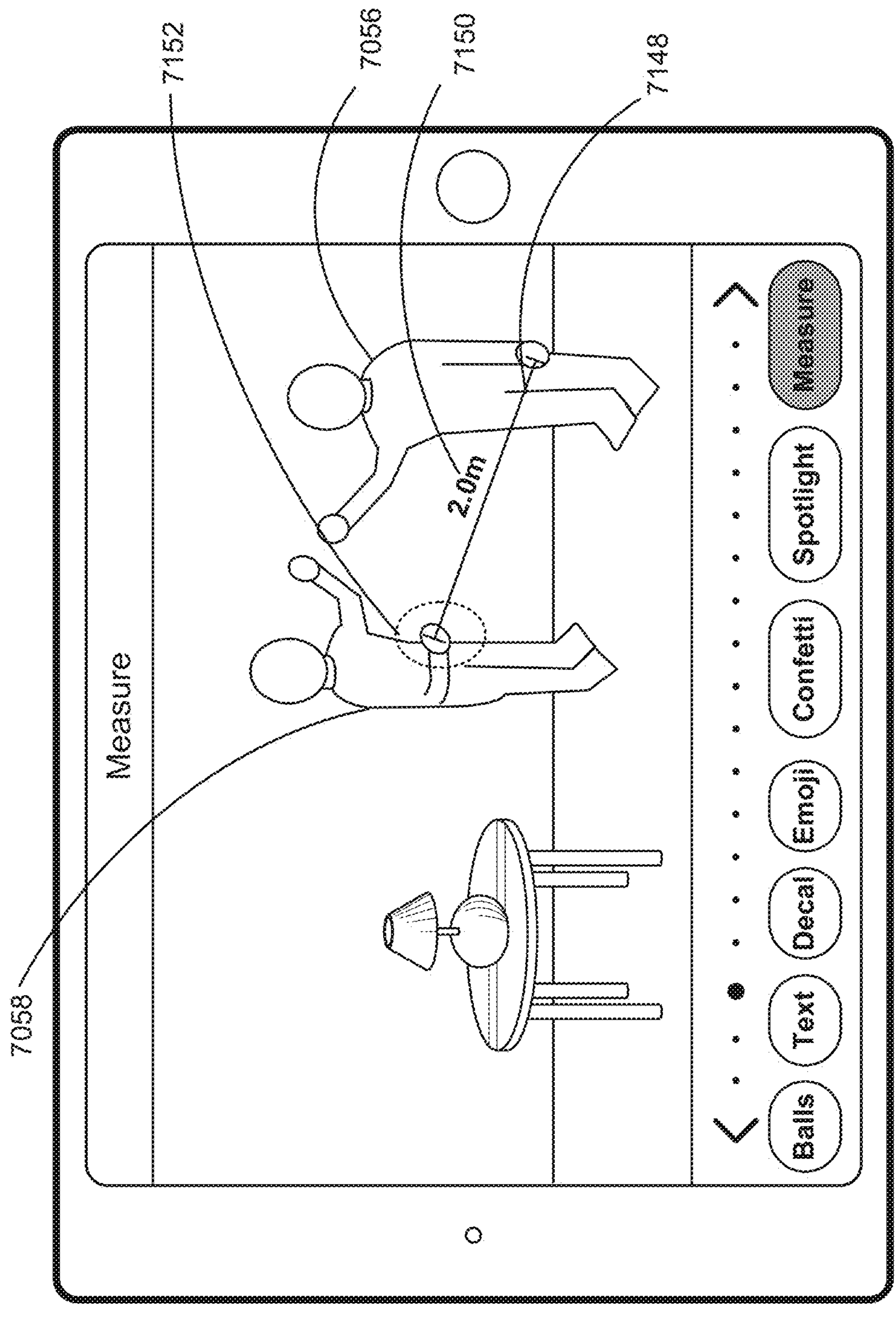

FIGS. 7Z-7AE illustrate how virtual emoji object 7098 interfaces with surfaces of a physical object depicted in a previously captured image displayed in media object display region 7002.

In FIG. 7AA, an input by contact 7100 is detected at a location on touch screen display 112 that corresponds to emoji object 7098. From FIG. 7AA to FIG. 7AB, contact 7100 moves along a path indicated by arrow 7102. As the contact 7100 moves, emoji object 7098 is "dragged" by contact 7100 such that movement of emoji object 7098 corresponds to movement of contact 7100. In FIG. 7AC, contact 7100 has lifted off of touch screen display 112 while emoji object 7098 is suspended in space above the surfaces (e.g., of sofa 7060 and floor 7094) in the third previously captured image. In response to liftoff of contact 7100, emoji object 7098 drops under the influence of simulated gravity, as illustrated in FIGS. 7AC-7AE. In FIG. 7AC, emoji object 7098 encounters physical object sofa 7060, causing the orientation of emoji object 7098 to change as it rolls over the arm of sofa 7060, as illustrated in FIG. 7AD and continues its descent to floor 7094.

In FIG. 7AF, an input (e.g., a tap input) is detected at a location on touch screen display 112 that corresponds to confetti insertion control 7020, as indicated by contact 7104. In response to the input, emoji object 7098 ceases to be displayed and confetti objects (e.g. confetti object 7106) are added to the third previously captured image as shown in FIG. 7AG.

FIGS. 7AG-7AT illustrate how virtual confetti objects interface with surfaces of physical objects depicted in previously captured images and video displayed in media object display region 7002.

In FIGS. 7AG-7AJ, virtual confetti objects are continually added (e.g., as shown in FIGS. 7AH, 7AI, and 7AJ) and fall under the influence of simulated gravity, collecting on detected surfaces in the third previously captured image (e.g., substantially horizontal surfaces, such as the horizontal surfaces of sofa 5060 and on floor 7094).

In FIG. 7AJ, an input (e.g., a tap input) is detected at a location on touch screen display 112 that corresponds to prior media object control 5006, as indicated by contact 7104. In response to the input, display of the third previously captured image shown in FIG. 7AJ is replaced by display of the second previously captured image as shown in FIG. 7AK. The confetti that was added to the third previously captured image displayed in media object display region 7002 is added to the second previously captured image as shown in FIG. 7AK (e.g., displayed at the same position in which the confetti were displayed in FIG. 7AJ).

In FIGS. 7AK-7AL, virtual confetti objects are continually added and fall under the influence of simulated gravity, collecting on detected surfaces in the second previously captured image.

In FIG. 7AJ, an input (e.g., a tap input) is detected at a location on touch screen display 112 that corresponds to prior media object control 5006, as indicated by contact 7104. In response to the input, display of the third previously captured image shown in FIG. 7AJ is replaced by display of the second previously captured image as shown in FIG. 7AK. The confetti that was added to the third previously captured image displayed in media object display region 7002 is added to the second previously captured image as shown in FIG. 7AK (e.g., displayed at the same position in which the confetti were displayed in FIG. 7AJ).

In FIGS. 7AK-7AL, virtual confetti objects are continually added and fall under the influence of simulated gravity, collecting on detected surfaces in the second previously captured image.

In FIG. 7AL, an input (e.g., a tap input) is detected at a location on touch screen display 112 that corresponds to subsequent media object control 7010, as indicated by contact 7110 (e.g., multiple taps are received to advance the currently displayed media object twice). In response to the input, display of the second previously captured image shown in FIG. 7AL is replaced by display of a previously captured video as shown in FIG. 7AM. The confetti that was added to the second previously captured image displayed in media object display region 7002 is added to the video as shown in FIG. 7AM (e.g., displayed at the same position in which the confetti were displayed in FIG. 7AL).

In FIGS. 7AM-7AT, virtual confetti objects are continually added and fall under the influence of simulated gravity, collecting on detected surfaces (e.g., the edges of kite object 7112) in the video. For example, as video playback proceeds in FIGS. 7AN, 7AO, and 7AP, virtual confetti objects are continually added and fall under the influence of simulated gravity, collecting on the edges of kite object 7112 and the lower edge of the video frame.

In FIG. 7AP, an input (e.g., a tap input) is detected at a location on touch screen display 112 that corresponds to replay control 7114, as indicated by contact 7116. In response to the input, playback of the video repeats. The confetti that was added to the video in FIGS. 7AM-7AT is added to the video at the time that replay is initiated in FIG. 7AQ. For example, confetti accumulated on kite object 7112 falls from the positions shown in FIG. 7AP when replay of the video is initiated and kite object 7112 is shown at a different location in the video in Figure AQ.

In FIGS. 7AQ-7AT, virtual confetti objects are continually added and fall under the influence of simulated gravity, collecting on detected surfaces (e.g., the edges of kite object 7112) in the video. For example, as video playback proceeds in FIGS. 7AR, 7AS, and, 7AT, virtual confetti objects are continually added and fall under the influence of simulated gravity, collecting on the edges of kite object 7112 and lower edge of the video frame.

In some embodiments, displayed virtual confetti objects fade from display and/or cease to be displayed (e.g., when an amount of time that has passed since a virtual confetti object was displayed increases above a threshold time).

FIGS. 7AU-7AX illustrate how virtual spotlight object 7118 interfaces with physical objects depicted in a previously captured image displayed in media object display region 7002.

In FIG. 7AU, the second previously captured image is displayed in media object display region 7002 and a spotlight mode has been activated (e.g., in response to input received at spotlight control 7022). In the spotlight mode, a spotlight virtual object 7118 is shown illuminating a portion of the image (e.g., person 7058) and a region of the image beyond the spotlight virtual object 7118 is shown darkened. In this way, spotlight virtual object 7118 allows attention to be drawn to a particular portion of an image. In some embodiments, an initial physical object to be illuminated is automatically selected (e.g. based on a determination of a physical object that is closest to the foreground). Spotlight virtual object 7118 includes a simulated light beam 7122 and a simulated illumination spot 7124 that illuminates a portion of the floor in the previously captured image. In some embodiments, light beam 7122 illuminates at least a portion of a representation of a physical object in the previously captured image. In some embodiments, illumination spot 7124 illuminates a portion of the image that corresponds to a horizontal surface detected in the image, such as floor 7124.

In FIG. 7AV, an input by contact 7128 is detected at a location on touch screen display 112 that corresponds to spotlight object 7118. From FIG. 7AV to FIG. 7AW, contact 7128 moves along a path indicated by arrow 7102. As the contact 7128 moves, spotlight object 7118 is "dragged" by contact 7128 such that movement of spotlight object 7118 corresponds to movement of contact 7128. In FIG. 7AW, the position of spotlight object 7118 has shifted such that person 7056 is illuminated by spotlight object 7118. As the spotlight object 7118 has moved, the size of illumination spot 7124 has changed.

In FIG. 7AX, an input (e.g., a tap input) is detected at a location on touch screen display 112 that corresponds to measurement control 7020, as indicated by contact 7026. In response to the input, spotlight object 7118 ceases to be displayed.

In FIG. 7AY, inputs are detected at locations on touch screen display 112 indicated by contacts 7132 and 7134. In 7AZ, in response to the detection of contacts 7132 and 7134, a virtual measurement object 7136 is displayed at a location that spans the distance between contacts 7132 and 7134 (e.g., corresponding to a height of person 7058). A measurement value indicator 7138 indicates that a distance between the points that correspond to contacts 7132 and 7134 in the physical environment as captured in the image is 1.8 m (e.g., determined using the depth data stored with the previously captured image).

From FIG. 7AZ to 7BA, contact 7132 moves along a path indicated by arrow 7140. As contact 7132 moves, the size of virtual measurement object 7136 is adjusted to span the adjusted distance between contacts 7132 and 7134, and the measurement value indicated by measurement value indicator 7138 is updated.

In FIG. 7BB, contacts 7132 and 7134 have lifted off of touch screen display 112. Virtual measurement object 7136 and measurement value indicator 7138 remain displayed. An input is detected at a location on touch screen display 112 indicated by contact 7142. From FIG. 7BB to 7BC, contact 7142 moves along a path indicated by arrows 7144 and 7146. In response to movement of contact 7142 (e.g., beyond a threshold amount of movement), a virtual measurement object 7148 and a measurement value indicator 7150 are displayed. From FIG. 7BC to 7BD, as contact 7142 continues to move, the size of virtual measurement object 7148 is adjusted, and the measurement value indicated by measurement value indicator 7150 is updated. A dotted line portion of virtual measurement object 7148 indicates a portion of virtual measurement object 7148 that passes through a physical object (e.g., person 7056).

In 7BE, contact 7142 has lifted off of touch screen display 112. Virtual measurement object 7148 and measurement value indicator 7148 remain displayed. In FIG. 7BF, an input is detected at a location on touch screen display 112 indicated by contact 7152. In response to the input, an end of virtual measurement object 7148 (e.g., the end that is the closest to the received input) moves to a position that corresponds to the location of contact 7152.

Figure 8A:
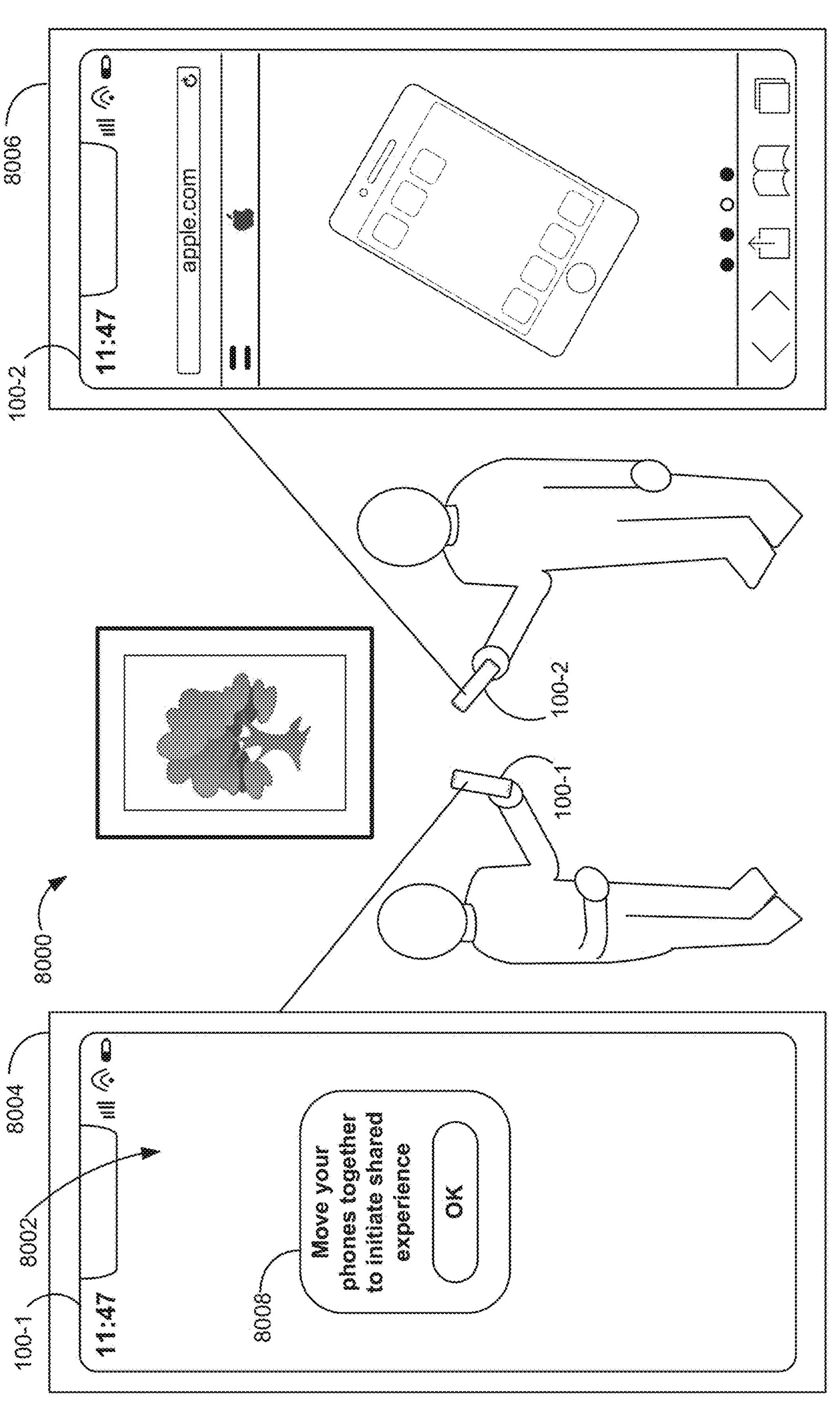
FIGS. 8A-8W illustrate example user interfaces for initiating a shared annotation session, in accordance with some embodiments.
Figure 8B:
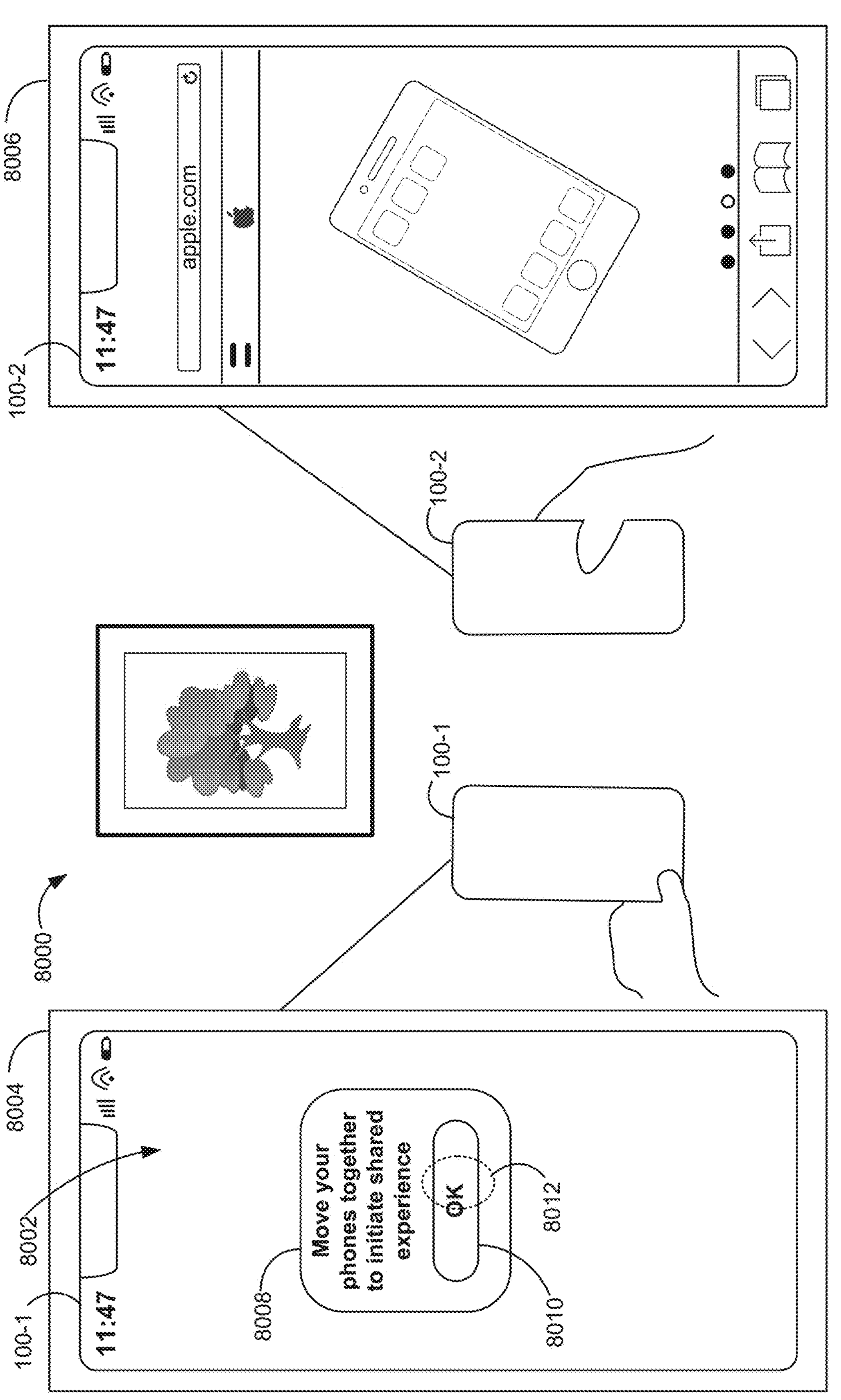
Figure 8C:
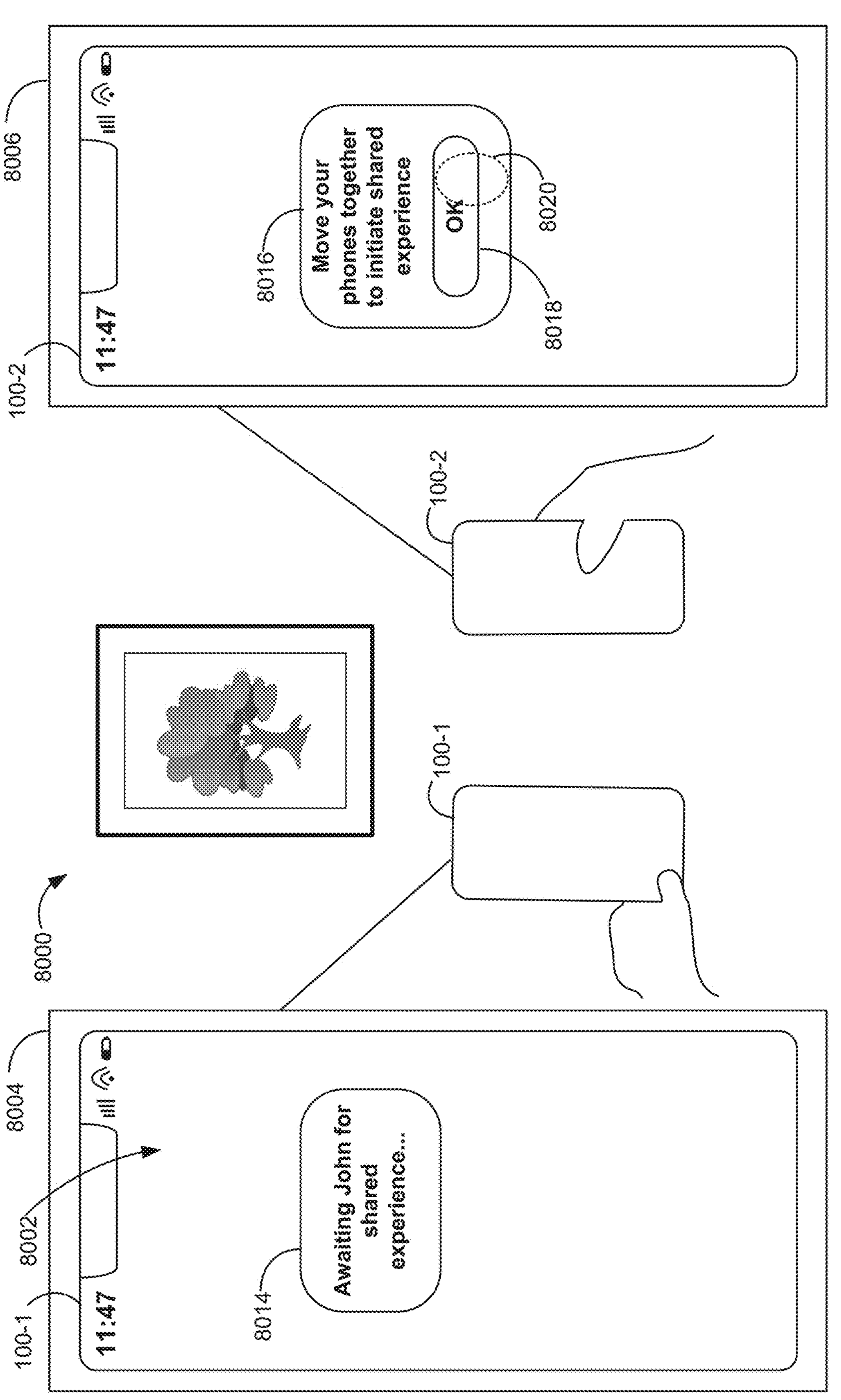
Figure 8D:
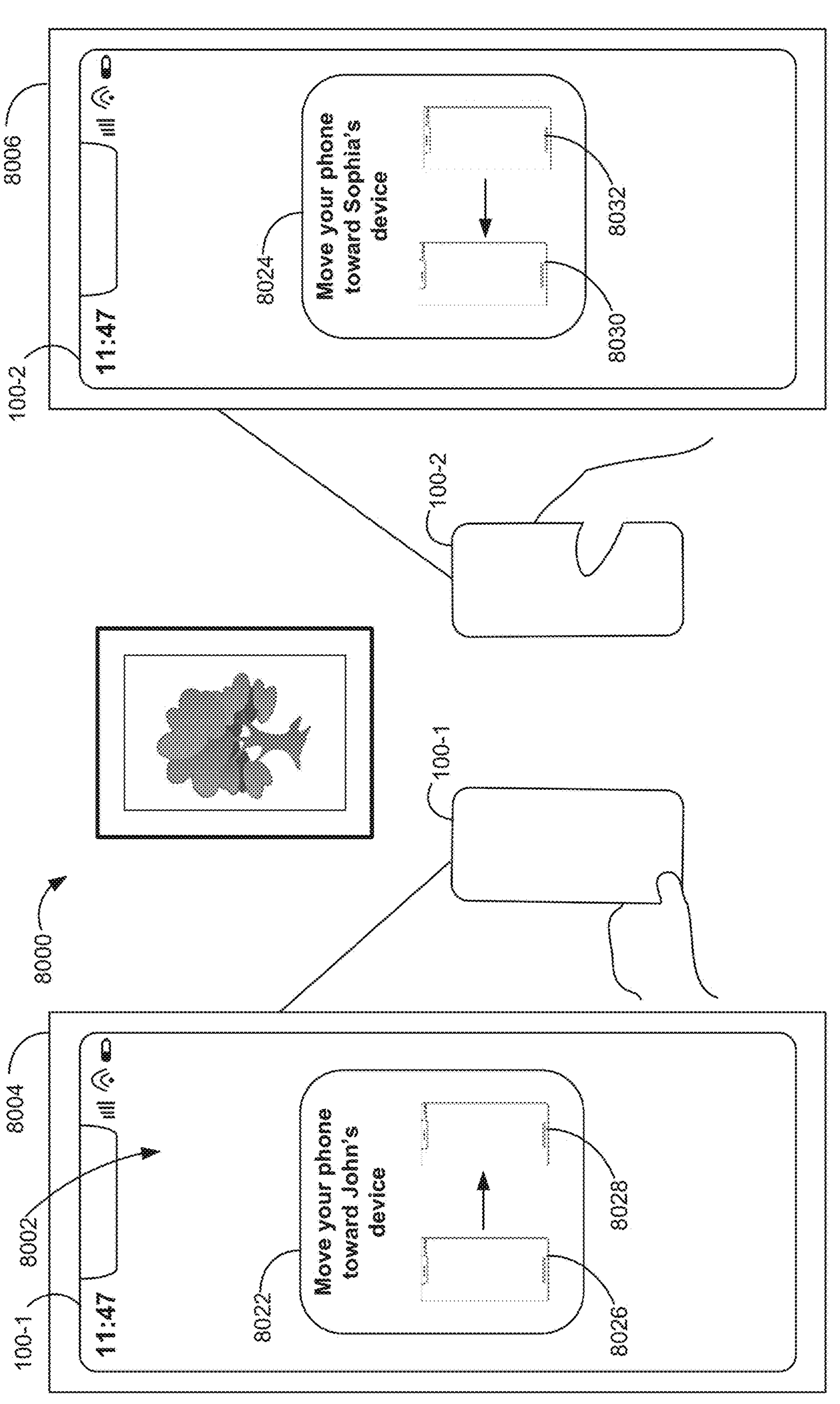
Figure 8E:
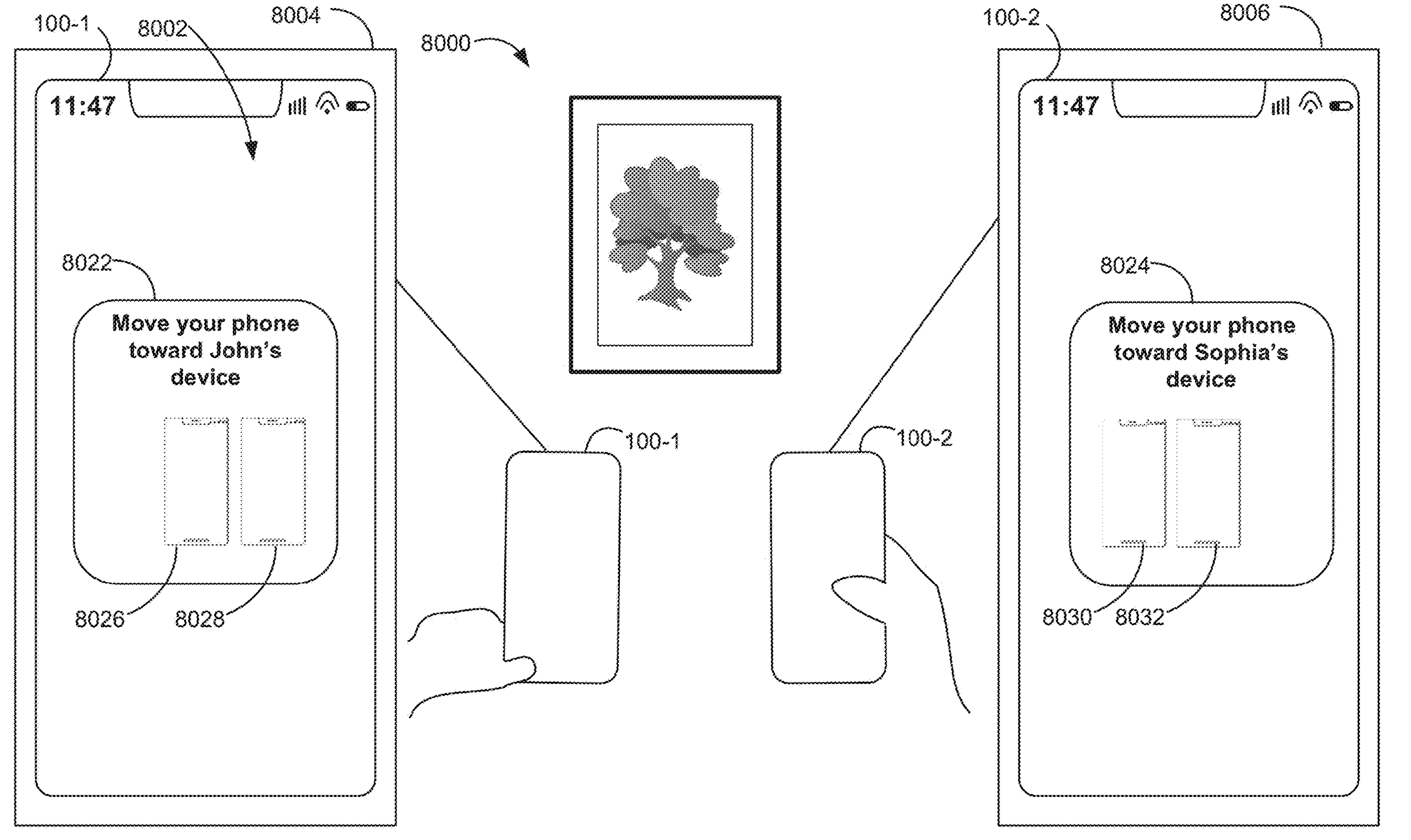
Figure 8F:
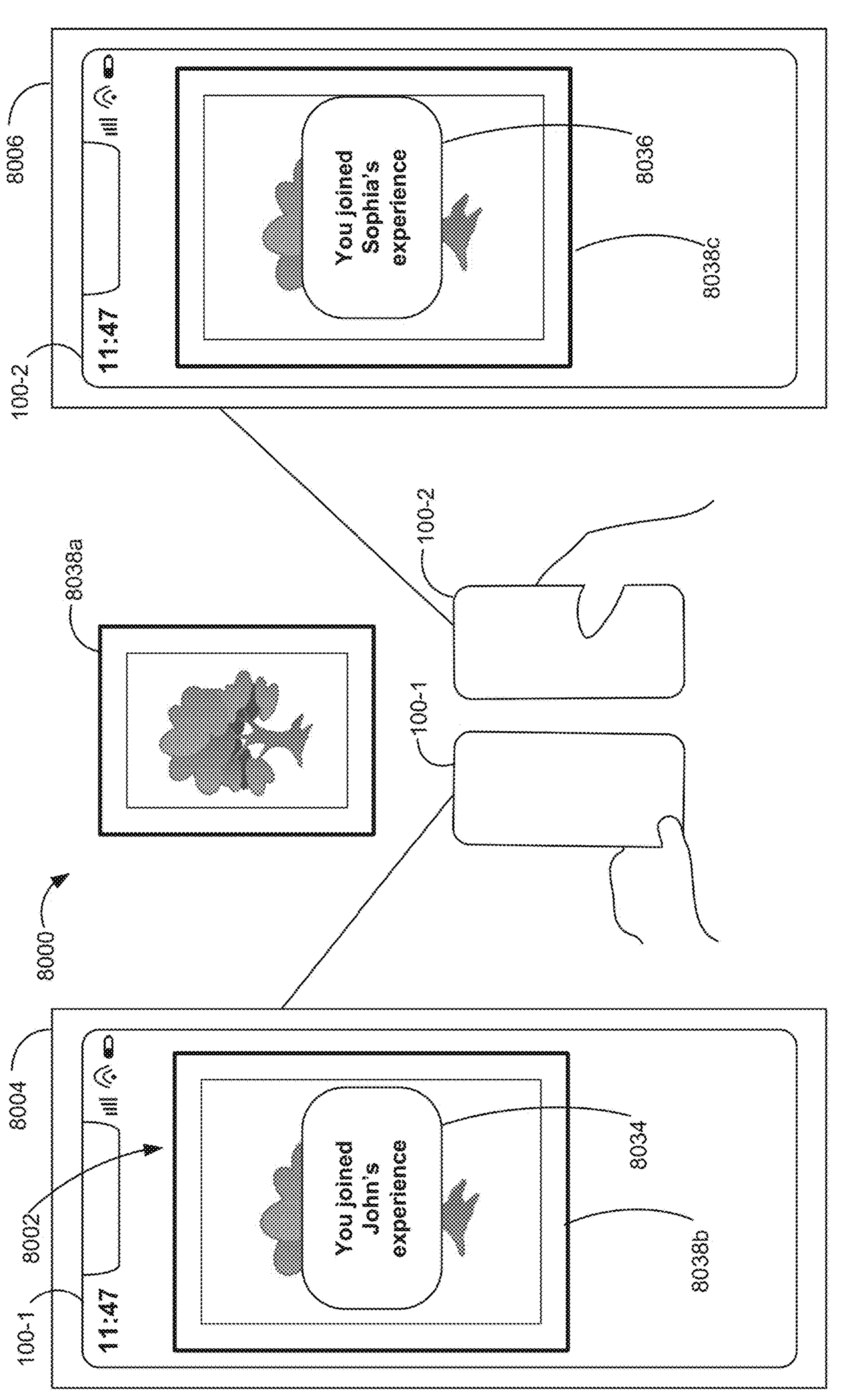
Figure 8G:
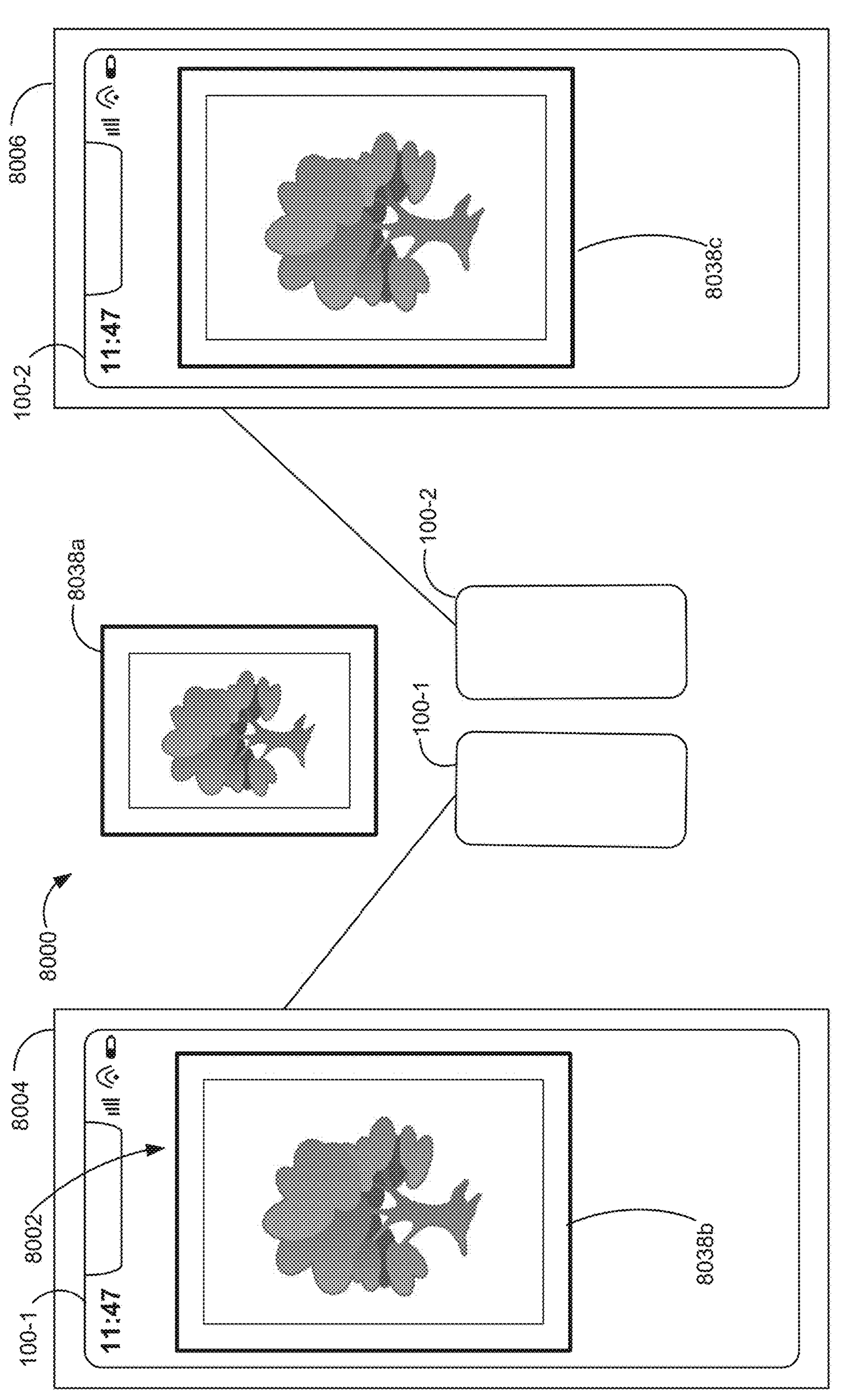
Figure 8H:
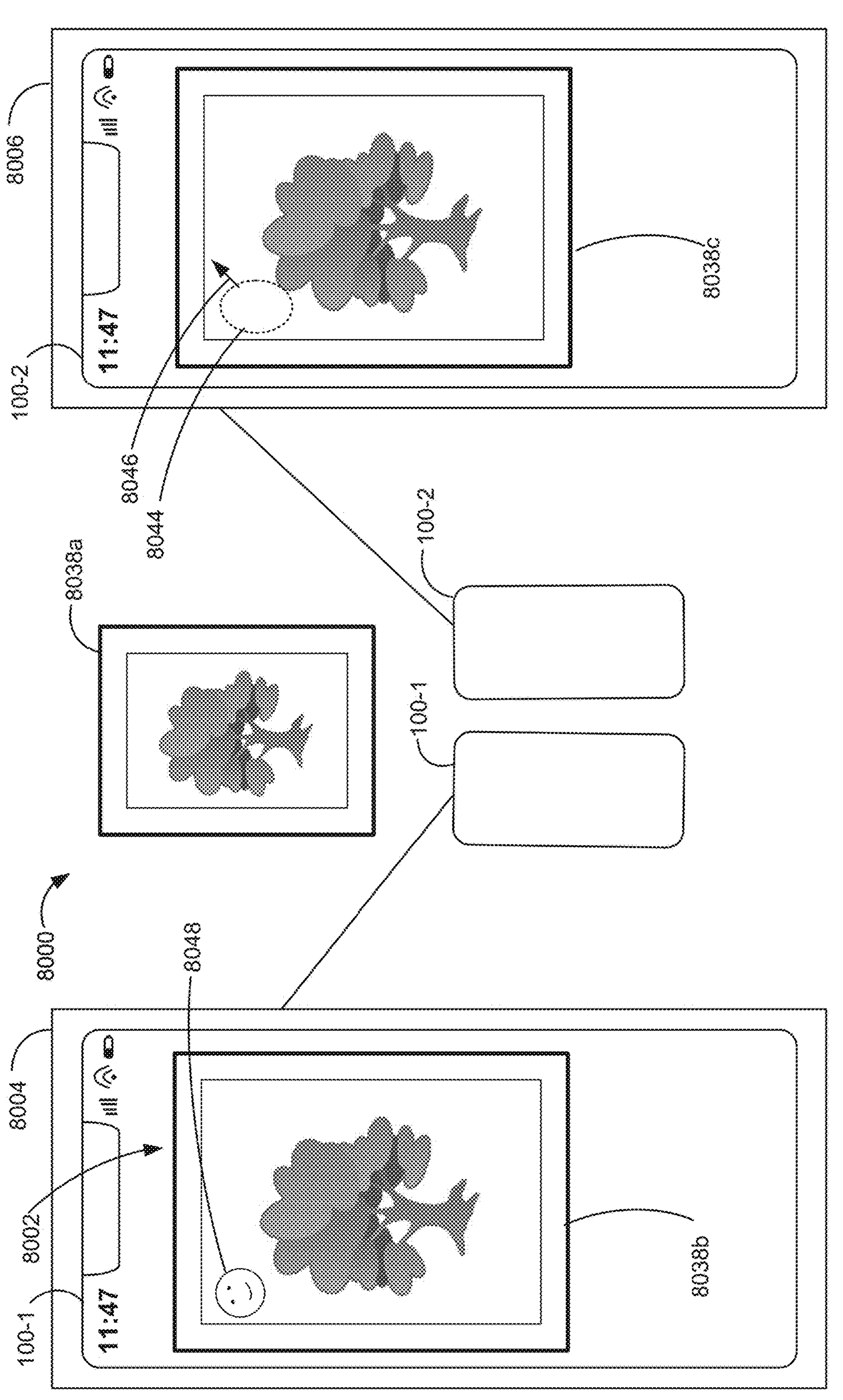
Figure 8I:
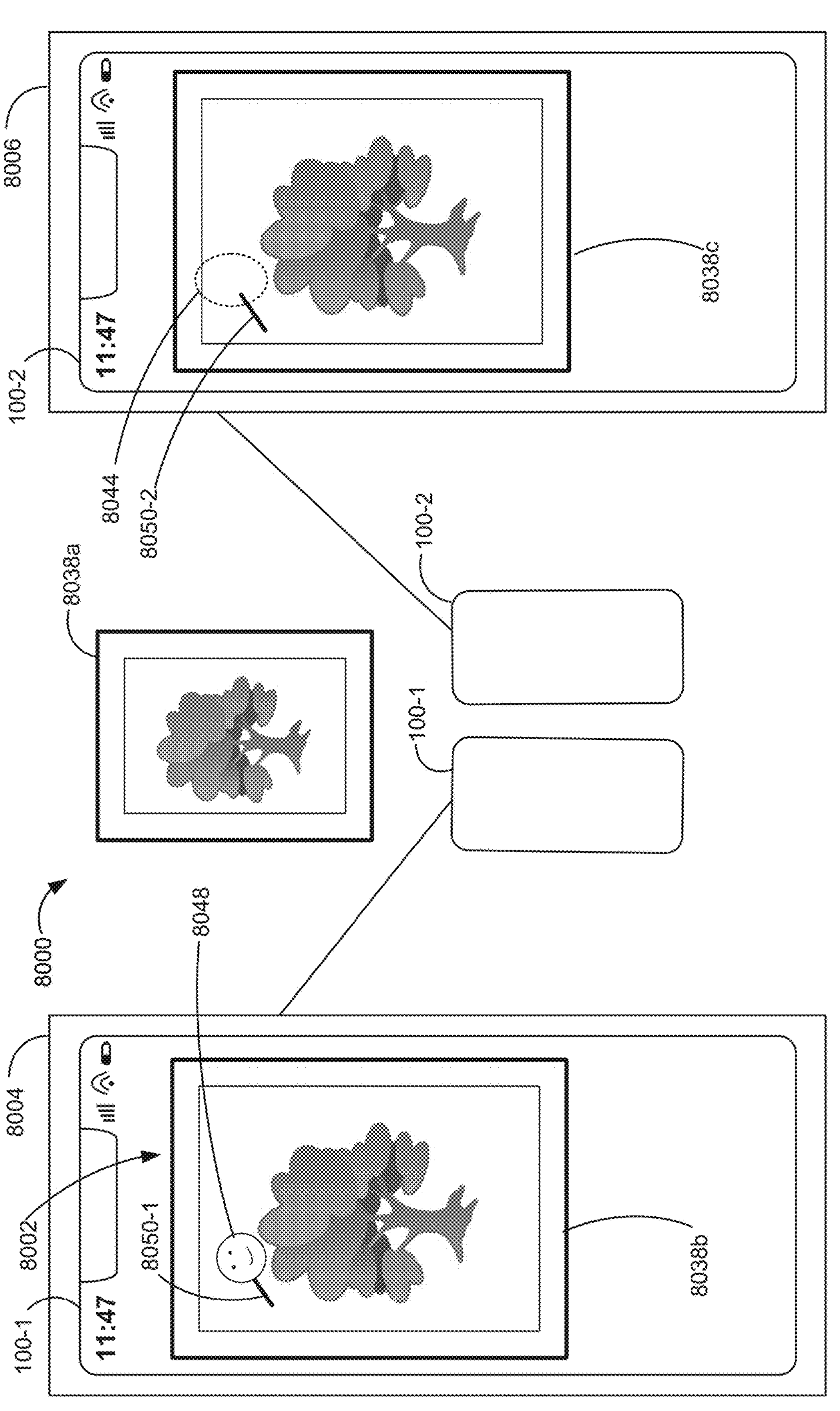
Figure 8J:
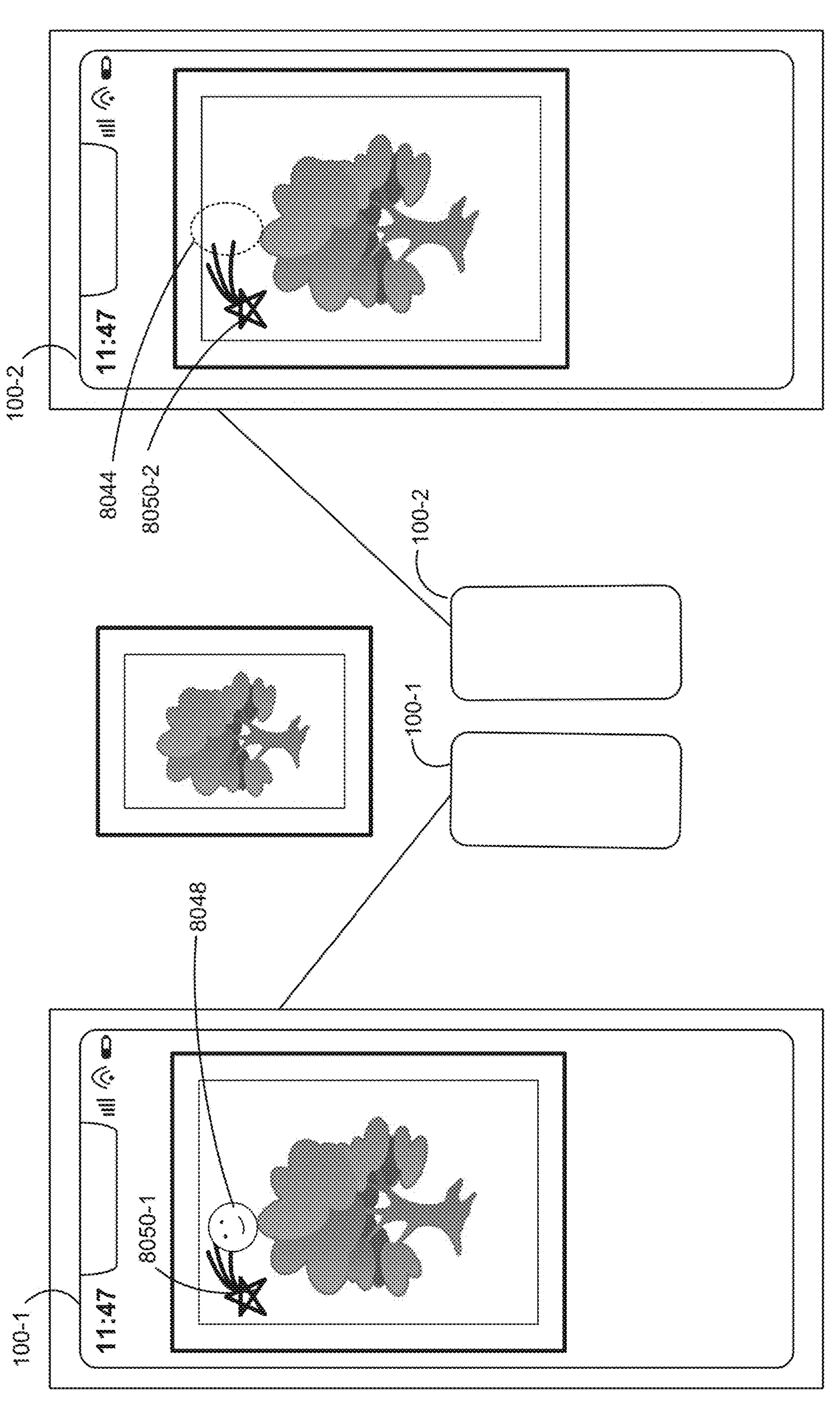
Figure 8K:
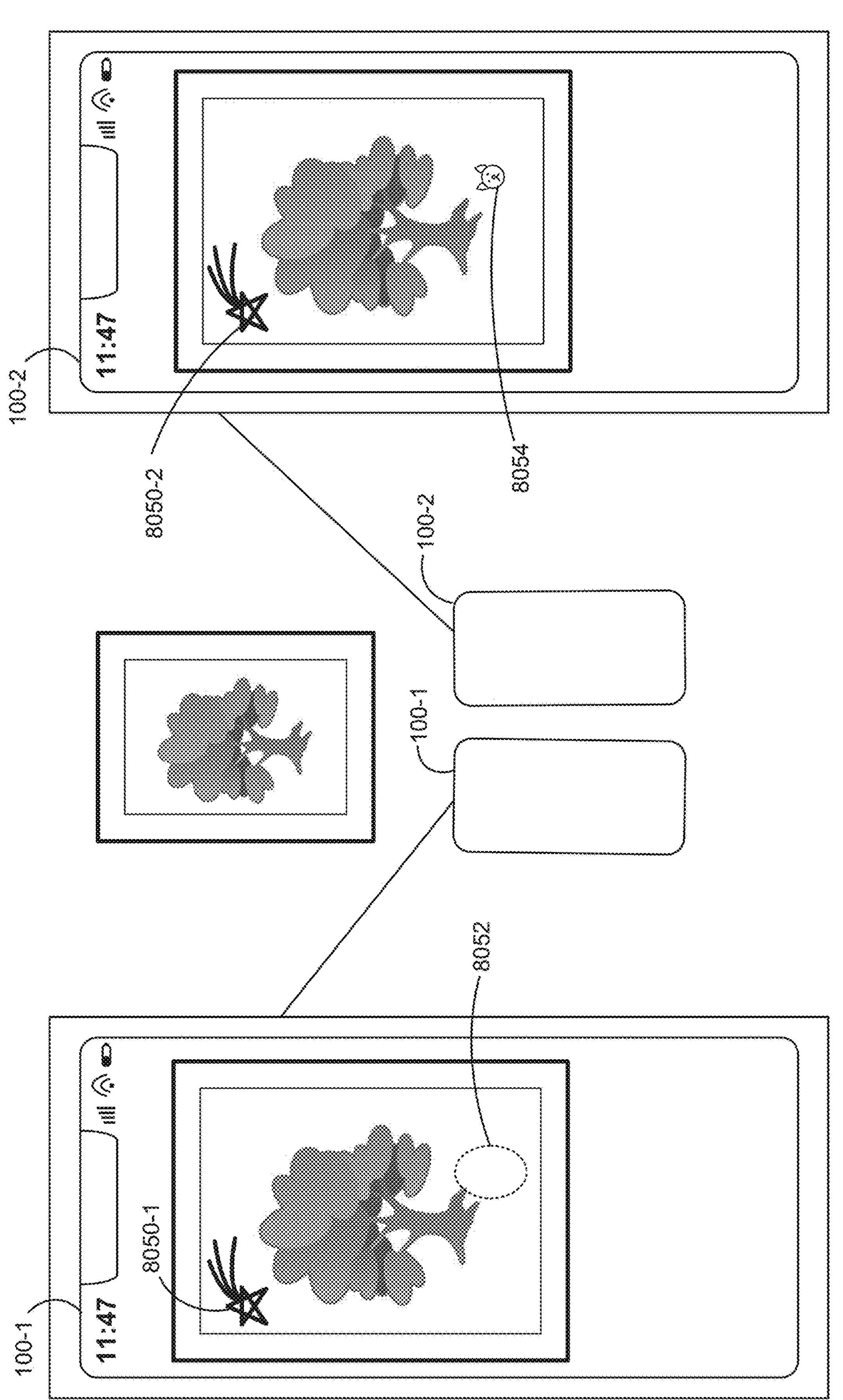
Figure 8L:
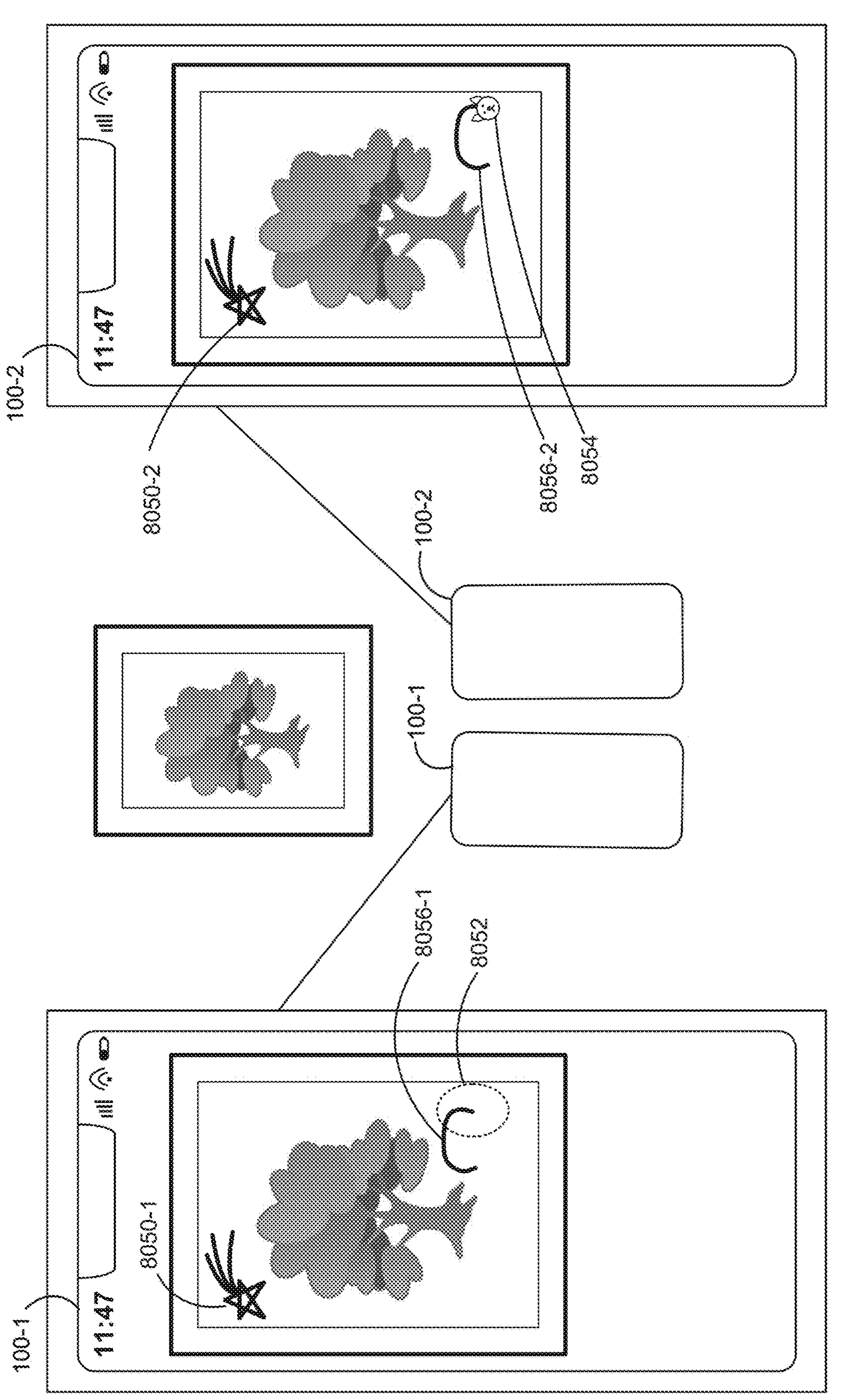
Figure 8M:
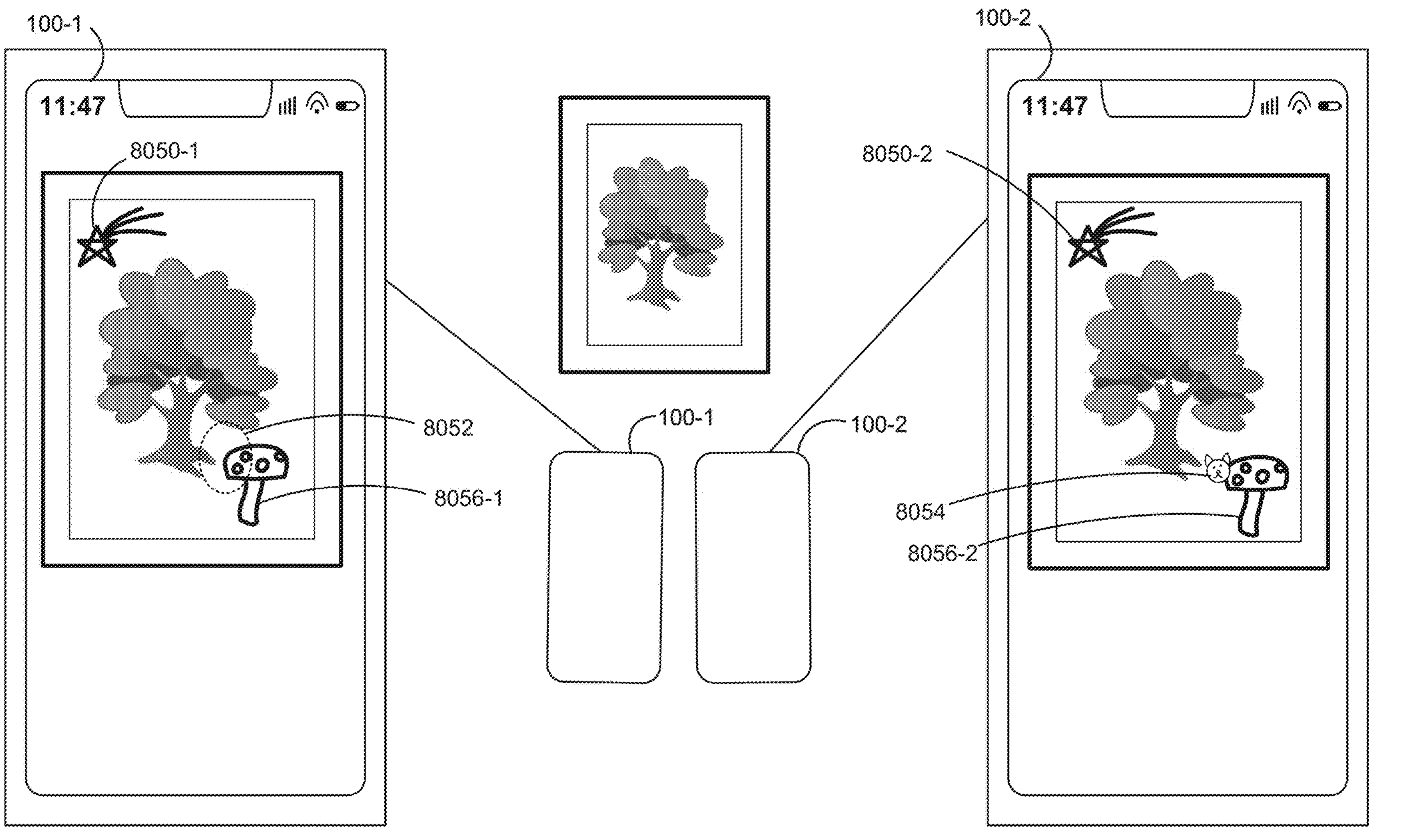
Figure 8N:
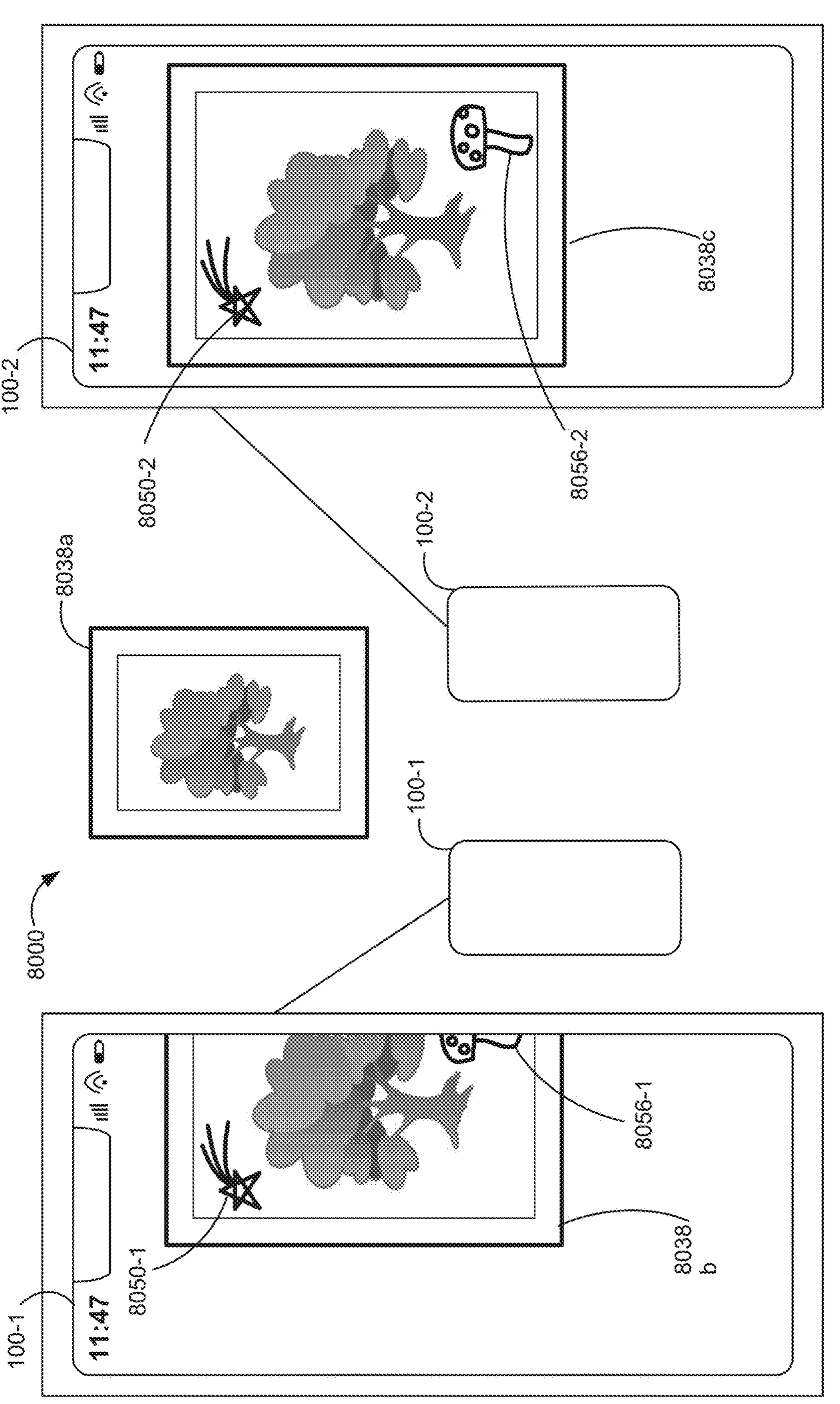
Figure 8O:
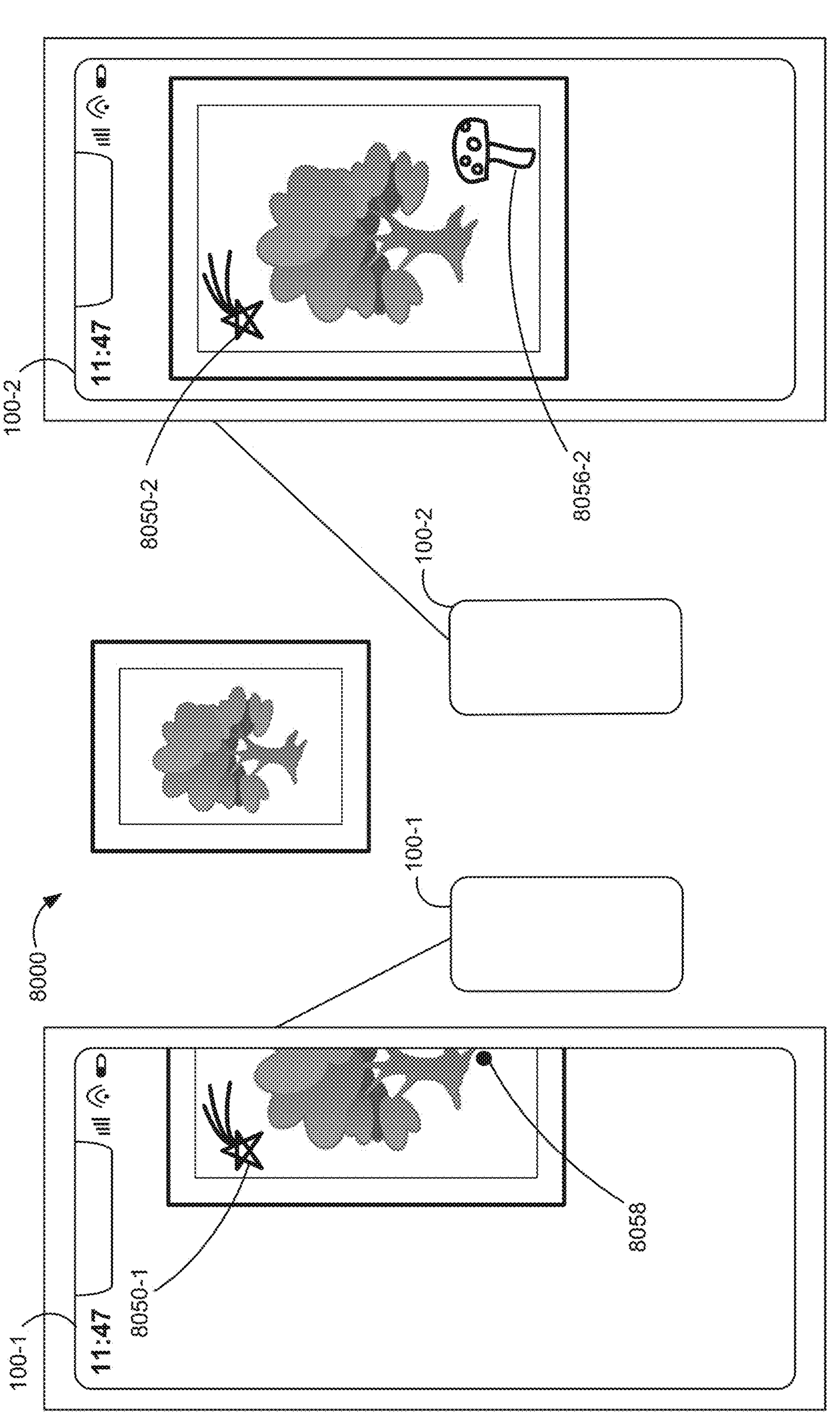
Figure 8P:
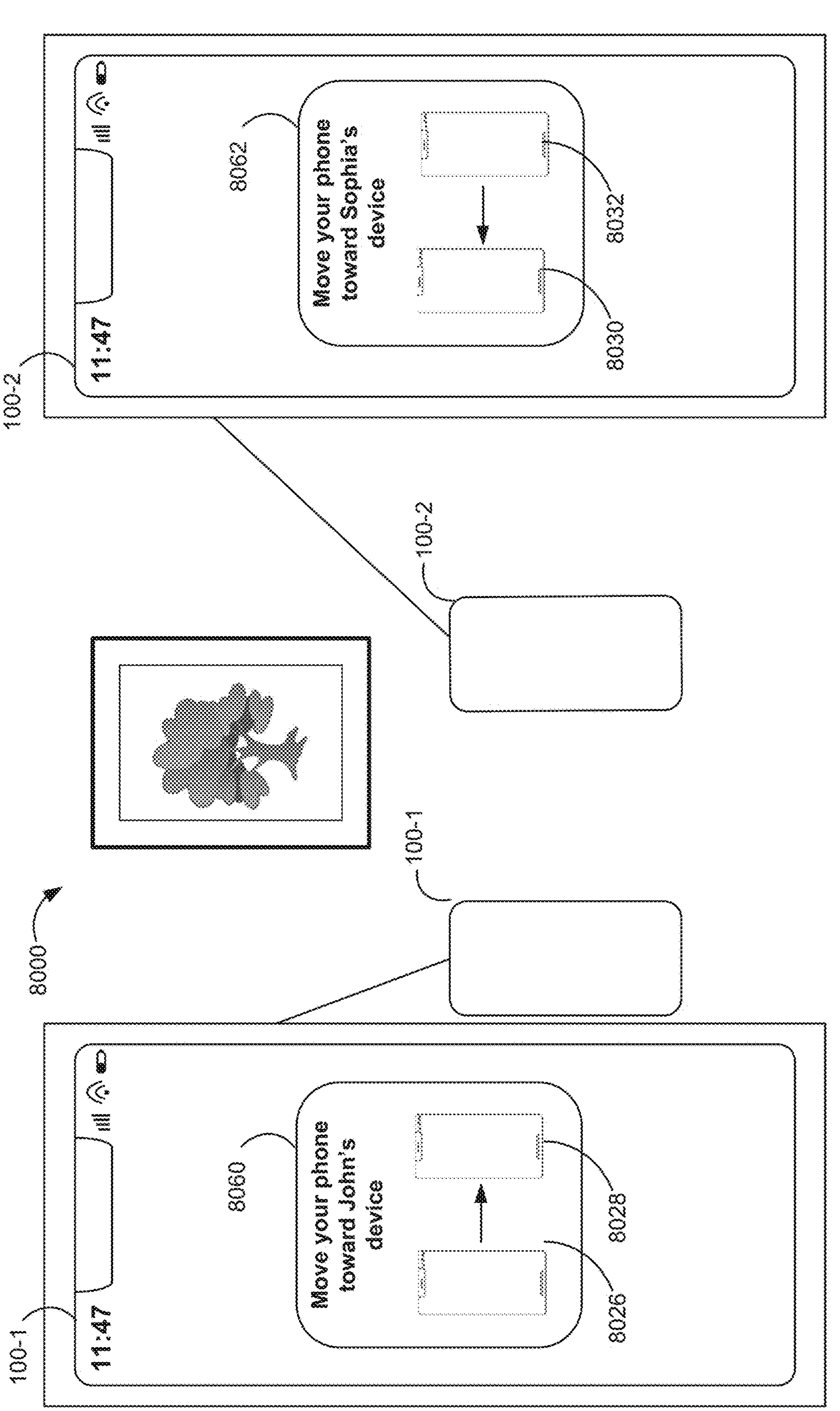
Figure 8Q:
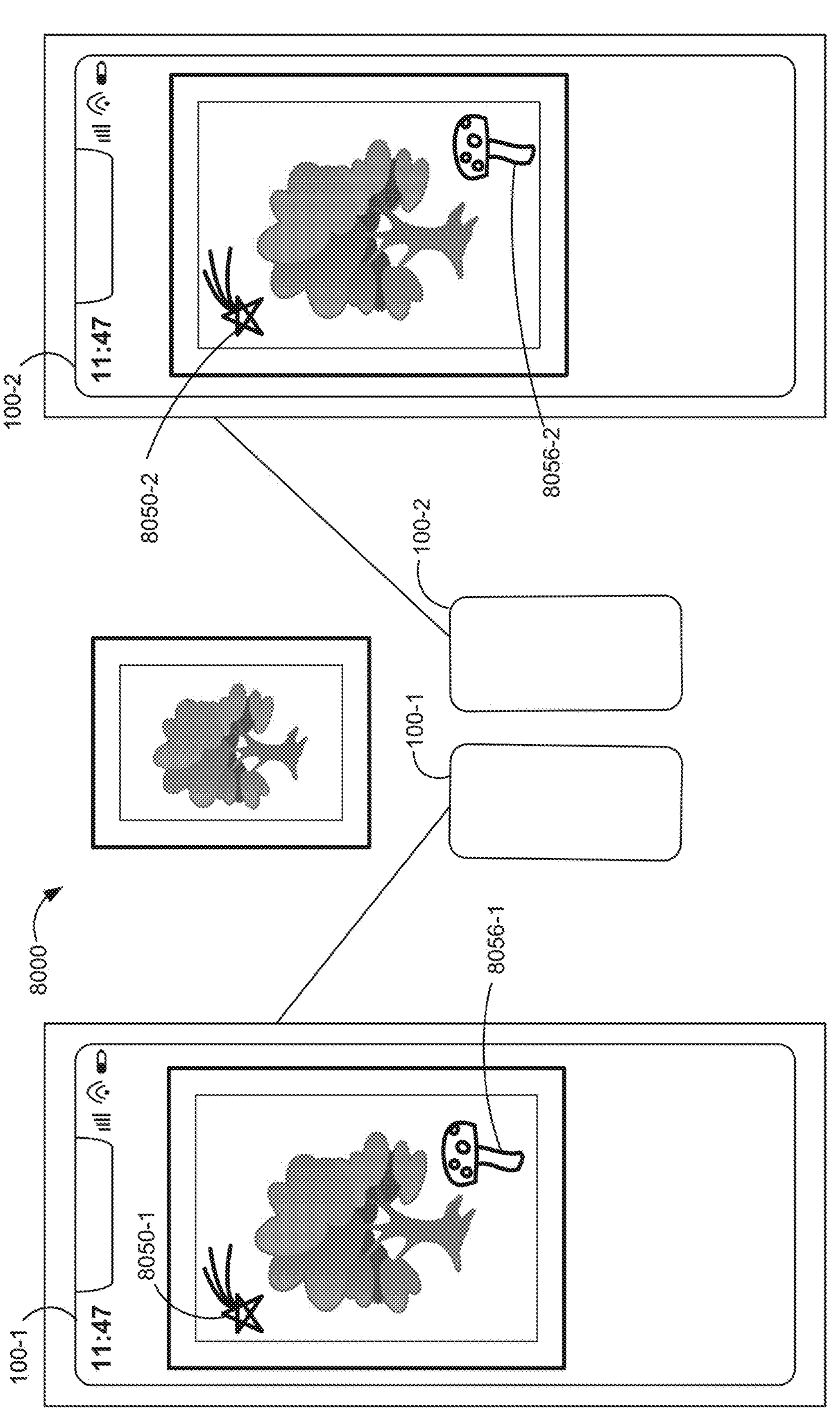
Figure 8R:
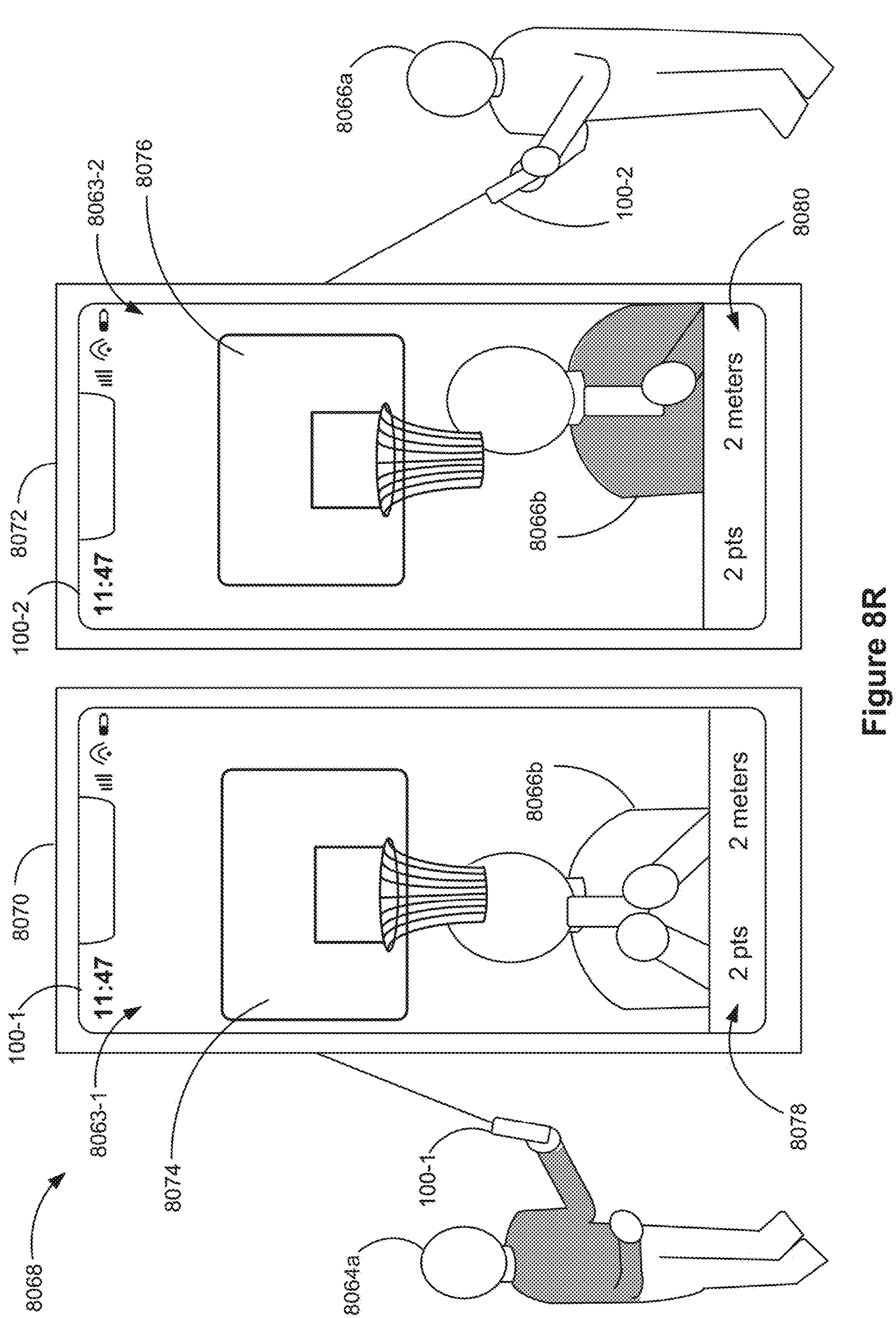
Figure 8S:
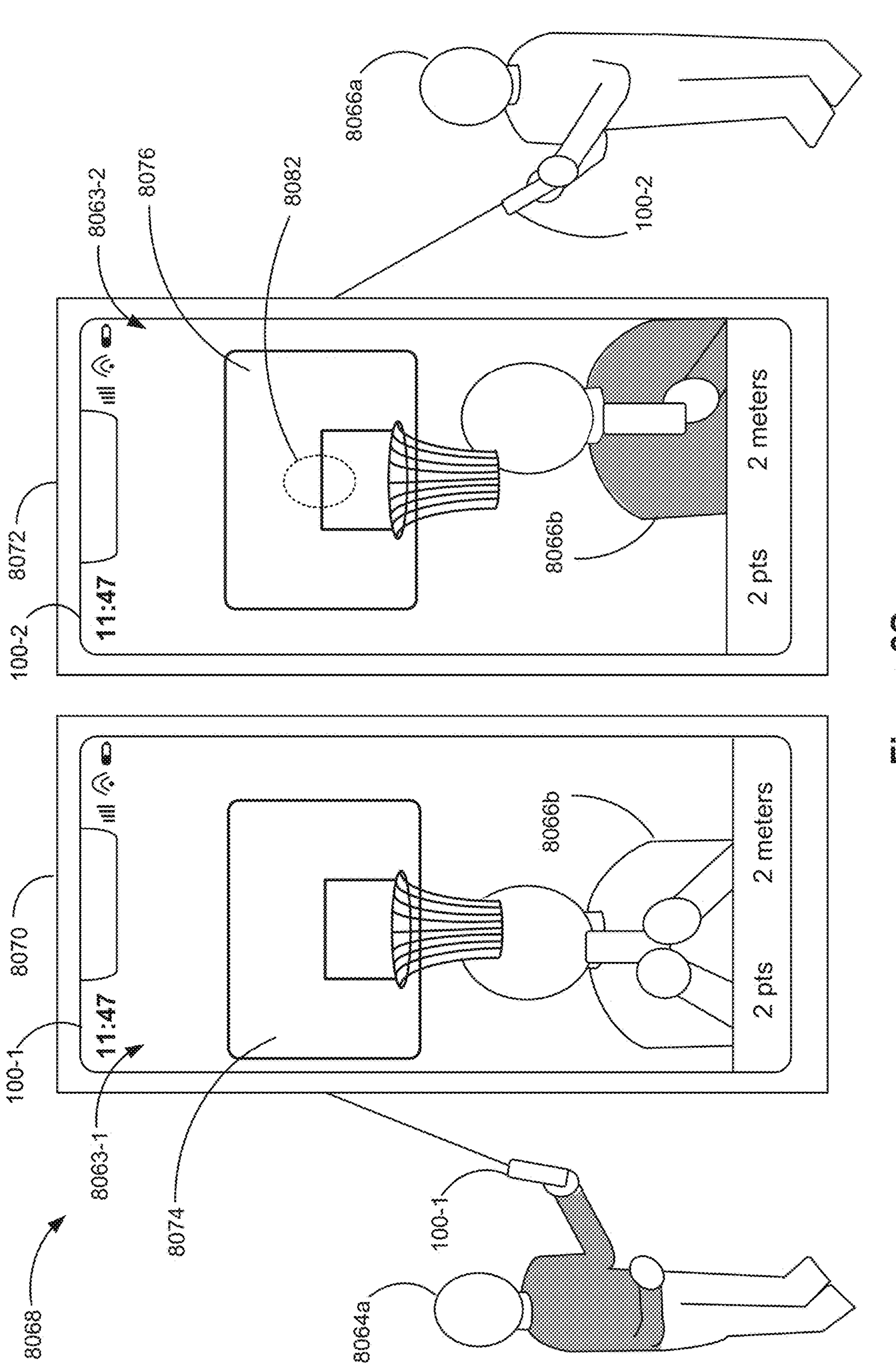
Figure 8T:
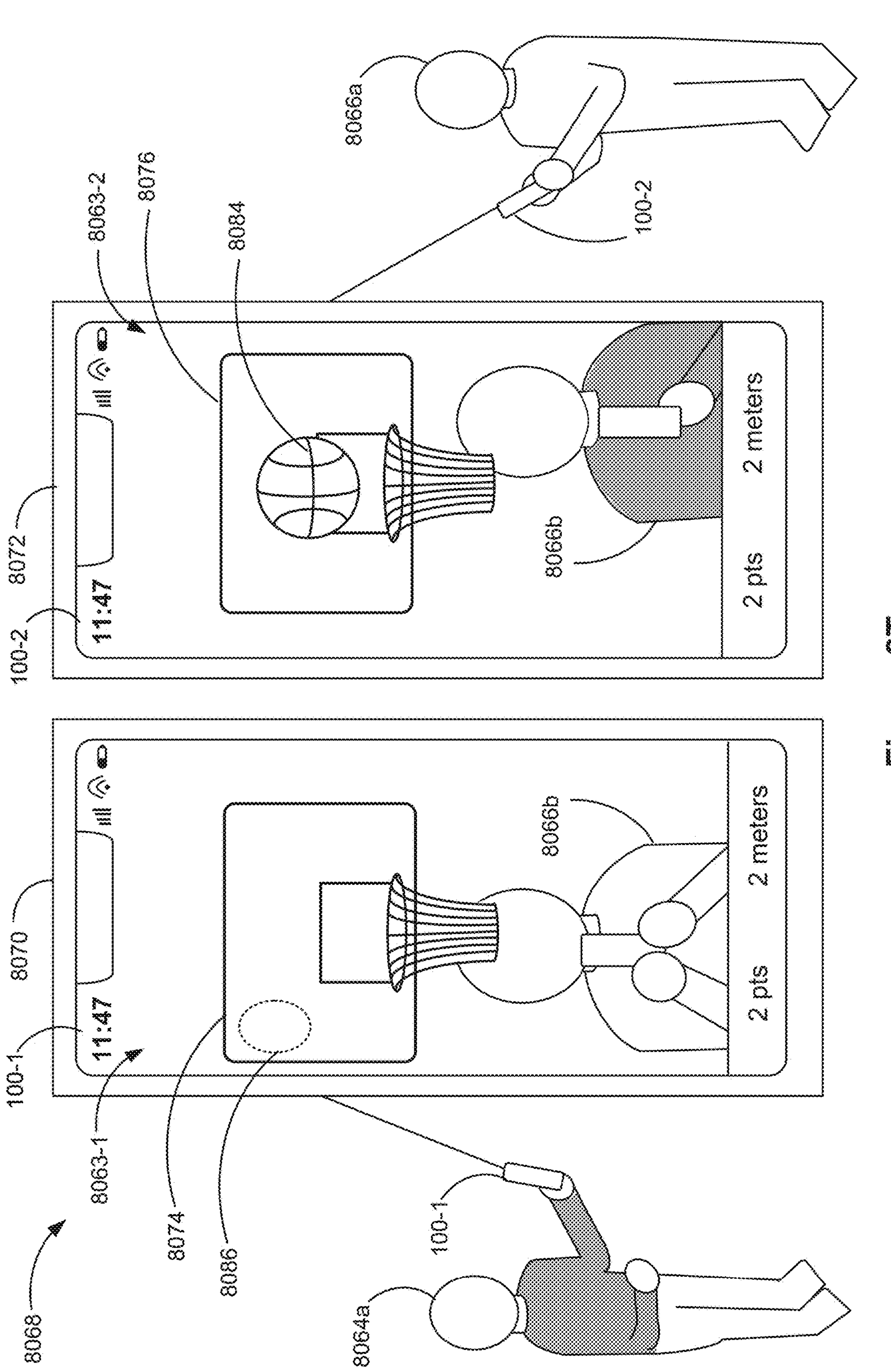
Figure 8U:
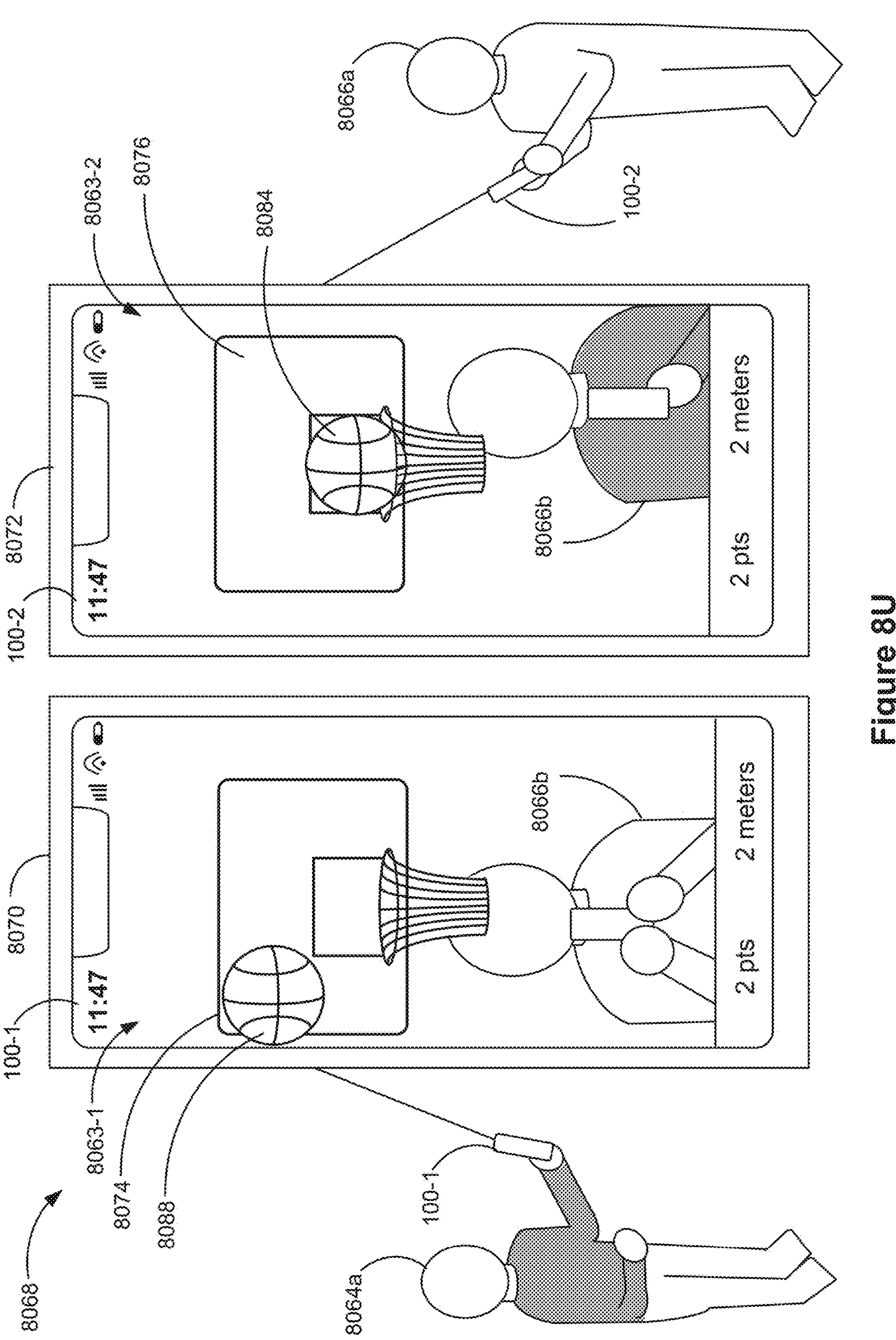
Figure 8V:
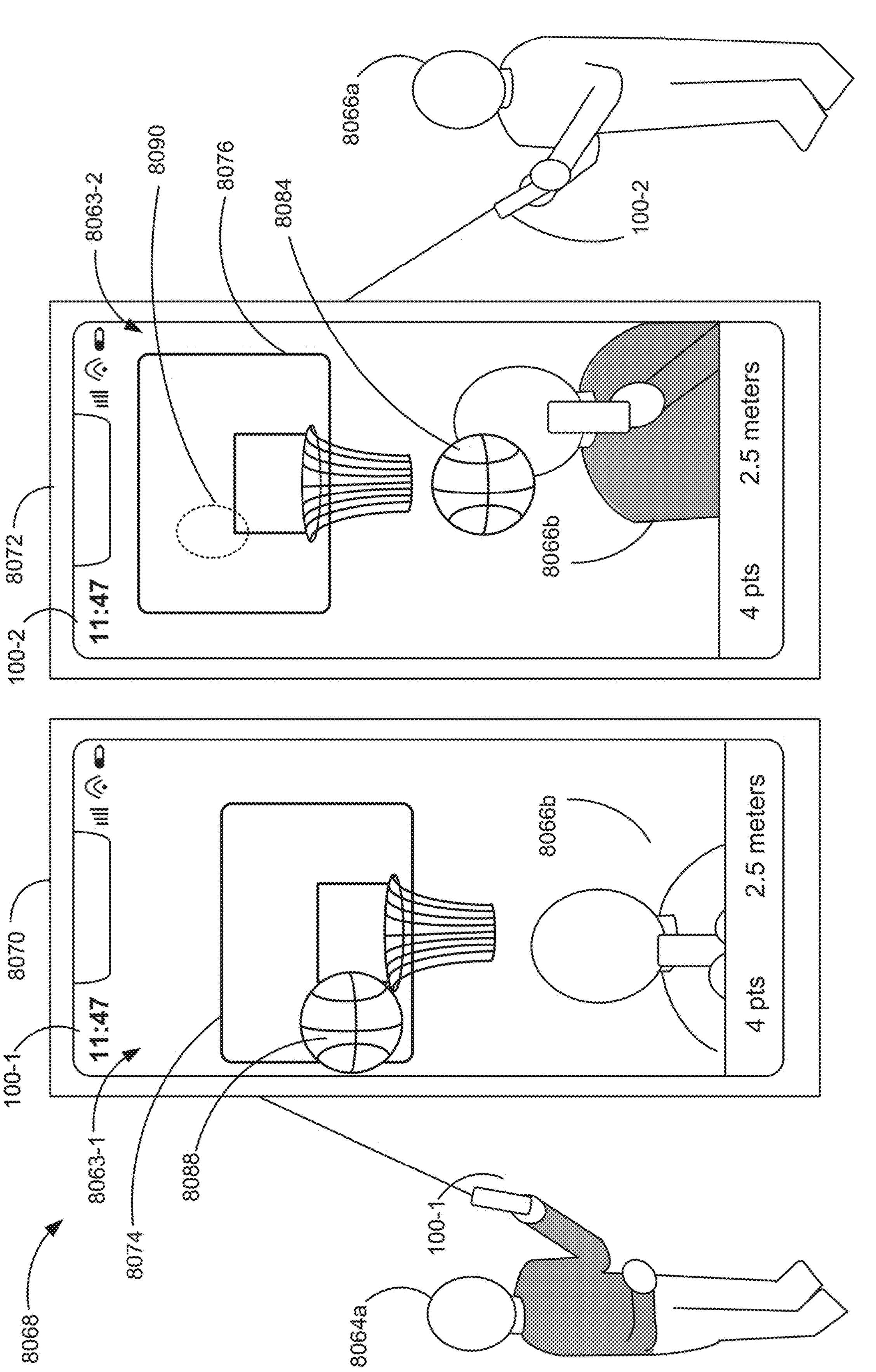
Figure 8W:
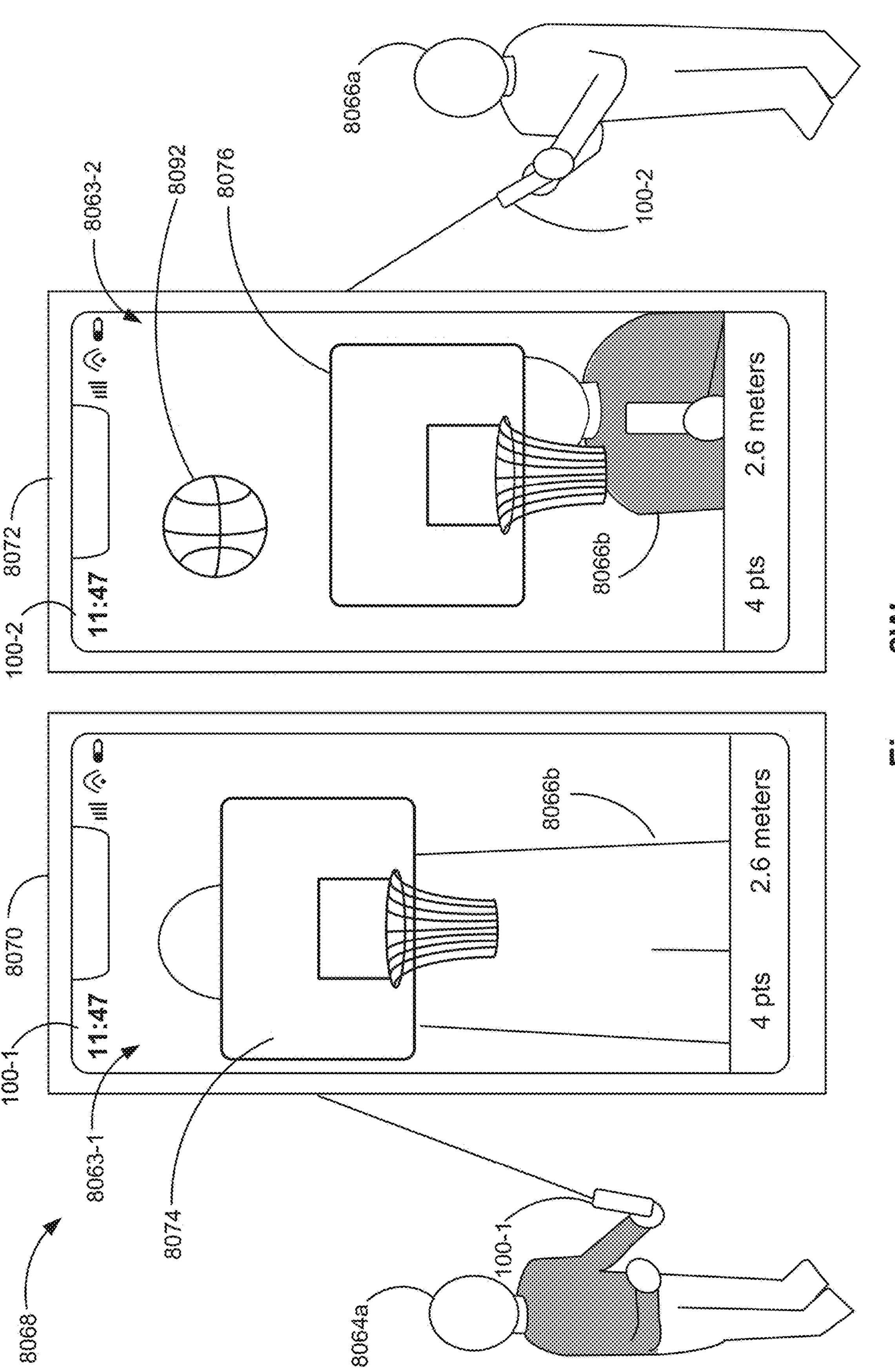

FIGS. 8A-8W illustrate example user interfaces for initiating a shared annotation session, in accordance with some embodiments. The user interfaces in these figures are used to illustrate the processes described below, including the processes in FIGS. 9A-9F, 10A-10B, 11A-11F, and 12A-12D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 8A-8G illustrate establishment of a shared annotation session between two devices.

FIG. 8A illustrates a physical environment 8000 in which a first user operates a first device 100-1 (e.g., a device 100) and a second user operates a second device 100-2 (e.g., a device 100). A collaboration user interface 8002 displayed by device 100-1 is shown in inset 8004 that corresponds to device 100-1. Inset 8006 shows a web browser user interface currently displayed by device 100-2. A prompt 8008 displayed in collaboration user interface 8002 includes instructions for initiating a shared annotation session.

In FIG. 8B, an input by a contact 8012 is received at a location that corresponds to control 8010 displayed by device 100-1 for initiating a shared annotation session. In response to the input, a request is sent from device 100-1 to a remote device (e.g., device 100-2) for initiating a shared annotation session. While a request has been sent and a response indicating acceptance of the request has not been received, a notification 8014 is displayed by device 100-1, as shown in FIG. 8C.

In FIG. 8C, in response to receiving the request for initiating the shared annotation session, device 100-2 displays a prompt 8016 that includes instructions for accepting the request for the shared annotation session. An input by a contact 8020 is received at a location that corresponds to control 8018 displayed by device 100-2 for accepting the request for a shared annotation session. In response to the input, acceptance of the request is sent from device 100-2 to a remote device (e.g., device 100-1).

In FIG. 8D, the indication of acceptance of the request to initiate the shared annotation session has been received by device 100-1. Device 100-1 displays a prompt 8022 including an instruction to move device 100-1 toward device 100-2. Prompt 8022 includes a representation 8026 of device 100-1 and a representation 8028 of device 100-2. Device 100-2 displays a prompt 8024 including an instruction to move device 100-2 toward device 100-1. Prompt 8024 includes a representation 8030 of device 100-1 and a representation 8032 of device 100-2.

FIGS. 8D-8E illustrate an animation displayed in prompts 8022 and 8024. In prompt 8022, representation 8026 of device 100-1 is animated such that it moves toward representation 8028 of device 100-2. In prompt 8024, representation 8032 of device 100-2 is animated such that it moves toward representation 8030 of device 100-1.

In FIG. 8F, connection criteria have been met (e.g., first device 100-1 and second device 100-2 have moved toward each other and/or at least a portion of physical space 8000 captured in the field of view of one or more cameras of first device 100-1 corresponds to at least a portion of physical space 8000 captured in the field of view of one or more cameras of device 100-2. A notification 8034 displayed by first device 100-1 and a notification 8036 displayed by second device 100-2 each include an indication that a shared annotation session has been initiated. First device 100-1 displays (e.g., overlaid by notification 8034) a representation of a field of view of one or more cameras of first device 100-1. Poster 8038*a* in physical environment 8000 is visible in the field of view of one or more cameras of first device 100-1, as indicated by representation 8038*b* of poster 8038*a* displayed by first device 100-1. Second device 100-2 displays (e.g., overlaid by notification 8036) a representation of a field of view of one or more cameras of second device 100-2. Devices 100-1 and 100-2 display a shared field of view (e.g., at least a portion of physical space 8000 captured in the field of view of one or more cameras of first device 100-1 corresponds to at least a portion of physical space 8000 captured in the field of view of one or more cameras of device 100-2). For example, poster 8038*a* in physical environment 8000 is visible in the field of view of one or more cameras of second device 100-2, as indicated by representation 8038*c* of poster 8038*a* displayed by second device 100-2. In FIG. 8G, the respective fields of view of the camera(s) are displayed by first device 100-1 and second device 100-2 without notifications 8034 and 8036 (e.g., notifications 8034 and 8036 have ceased to be displayed).

FIGS. 8H-8M illustrate annotation input received during a shared annotation session. FIGS. 8H-8J illustrate annotation input provided at the second device 100-2. FIGS. 8K-8M illustrate annotation input provided at the first device 100-1.

In FIG. 8H, an input by contact 8044 (e.g., an input received at a touch screen display of second device 100-2) is detected by second device 100-2. While the input is detected by second device 100-2, first device 100-1 displays an avatar 8048 at a location in the shared field of view that corresponds to a location in the shared field of view at which input is received at second device 100-2. As contact 8044 moves along a path indicated by arrow 8046, as shown in FIGS. 8H-8I, an annotation that corresponds to the movement of contact 8044 is displayed by first device 100-1 (as annotation 8050-1) and second device 100-2 (as annotation 8050-2). In FIG. 8J, further annotation input has been provided via further movement of contact 8044.

In FIG. 8K, an input by contact 8052 (e.g., an input received at a touch screen display of first device 100-1) is detected by first device 100-1. While the input is detected by first device 100-1, second device 100-2 displays an avatar 8054 at a location in the shared field of view that corresponds to a location in the shared field of view at which input is received at first device 100-1. As contact 8052 moves, as shown in FIGS. 8K-8M, an annotation that corresponds to the movement of contact 8052 is displayed by first device 100-1 (as annotation 8056-1) and second device 100-2 (as annotation 8056-2).

In FIGS. 8M-8P, movement of first device 100-1 increases the distance between first device 100-1 and second device 100-2. In FIG. 8N, as first device 100-1 moves away from second device 100-2, the representation of the field of view of camera(s) of first device 100-1 as displayed by first device 100-1 is adjusted (e.g., such that the portion of representation 8038*b* of physical poster 8038*a* displayed by first device 100-1 is decreased).

In some embodiments, one or more annotations (e.g., 8050-1, 8050-2, 8056-1, and/or 8056-2) have a fixed spatial relationship relative to a portion of physical environment 8000 (e.g., such that movement of device cameras relative to physical environment 8000 changes the displayed position of the annotation). In FIG. 8O, as first device 100-1 continues to move away from second device 100-2 such that annotation 8056-1 is no longer displayed by first device 100-1, a visual indication 8058 that corresponds to annotation 8056-1 is displayed by first device 100-1 (e.g., to indicate a direction of movement of first device 100-1 required to redisplay annotation 8056-1).

In FIG. 8P, movement of first device 100-1 away from second device 100-2 has increased the distance between first device 100-1 and second device 100-2 to an extent (e.g., above a threshold distance) that caused the shared annotation session to be disconnected. Device 100-1 displays a prompt 8060 including an instruction to move device 100-1 toward device 100-2. Device 100-2 displays a prompt 8062 including an instruction to move device 100-2 toward device 100-1. In some embodiments, prompt 8060 include animated elements (e.g., as described with regard to FIGS. 8D-8E).

From FIG. 8P to FIG. 8Q, movement of first device 100-1 decreases the distance between first device 100-1 and second device 100-2. In FIG. 8Q, the distance between first device 100-1 and second device 100-2 has been sufficiently decreased for the shared annotation session to be restored.

Devices 100-1 and 100-2 have ceased to display respective prompts 8060 and 8062 and the respective fields of view of the respective device cameras are redisplayed.

FIGS. 8R-8W illustrate a game application that uses a shared session between first device 100-1 and second device 100-2 (e.g., a shared session established as described above with regard to FIGS. 8A-8G).

FIG. 8R illustrates a physical environment 8068 in which a first user 8064*a* operates a first device 100-1 (e.g., a device 100) and a second user 8066*a* operates a second device 100-2 (e.g., a device 100). Game application user interface 8063-1 displayed by first device 100-1 is shown in inset 8070 that corresponds to first device 100-1. Game application user interface 8063-2 displayed by second device 100-2 is shown in inset 8072 that corresponds to second device 100-2. User 8064*a* is facing user 8066*a* such that representation 8066*b* of user 8066*a* is visible in a field of view of one or more cameras (e.g., a rear-facing camera) of device 100-1, as shown in user interface 8063-1. Representation 8064*b* of user 8064*a* is likewise visible in a field of view of one or more cameras (e.g., a rear-facing camera) of device 100-2, as shown in user interface 8063-2.

Game application user interfaces 8063-1 and 8063-2 display basketball hoops 8074 and 8076, respectively. By providing input in the respective game application user interfaces, the users launch virtual basketball objects into the displayed representation of the field of view of the respective device cameras in an effort to make baskets in the respective basketball hoops. In some embodiments, the respective basketball hoops are fixed to the spatial positions of the respective devices such that the respective users may move the devices in an effort to create a challenge for the opponent. Game application user interfaces 8063-1 and 8063-2 also display game data regions 8078 and 8080, respectively. Game data displayed in the game data regions include, for example, a tally of points scored by successful baskets and a distance between devices 100-1 and 100-2 (e.g., to use as a basis for assigning a score to a given shot).

In FIG. 8S, an input (e.g., a tap input) by contact 8082 is detected by device 100-2 for launching a virtual basketball object. In response to detecting the input by contact 8082, virtual basketball object 8084 is added to the field of view of the camera(s) of device 100-2 displayed in game application user interface 8063-2, as shown in FIG. 8T. FIG. 8T additionally illustrates an input (e.g., a tap input) by contact 8086 detected by device 100-2 for launching a virtual basketball object. In response to detecting the input by contact 8086, virtual basketball object 8088 is added to the field of view of the camera(s) of device 100-1 displayed in game application user interface 8063-1, as shown in FIG. 8V. In FIG. 8V, an input (e.g., a tap input) by contact 8090 detected by device 100-2 for launching a virtual basketball object. In response to detecting the input by contact 8090, virtual basketball object 8092 is added to the field of view of the camera(s) of device 100-2 displayed in game application user interface 8063-2, as shown in FIG. 8W. From FIG. 8V to FIG. 8W, user 8064*a* has lowered device 100-1 such that the displayed location of hoop 8076 and representation 8064*b* of user 8064 have changed in user interface 8063-2.

FIGS. 9A-9F are flow diagrams illustrating method 900 of relocalizing an annotation, in accordance with some embodiments. Method 900 is performed at an electronic device (e.g., device 300, FIG. 3, or portable multifunction device 100, FIG. 1A) having a display generation component (e.g., a display, a projector, a heads up display or the like), one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), and one or more cameras (e.g., one or more rear-facing cameras on a side of the device opposite from the display and the touch-sensitive surface). In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

The device displays (902), via the display generation component, a first user interface region (e.g., user interface 5003) that includes a representation of a field of view of the one or more cameras that is updated with changes in the field of view of the one or more cameras over time (e.g., the representation of the field of view is continuously updated (e.g., with a preset frame rate such as 24, 48, or 60 fps, etc.) in accordance with changes occurring in the physical environment around the cameras and in accordance with movement of the cameras relative to the physical environment). For example, as shown in FIGS. 5A-5B, a view of physical environment 5000 in the field of view of one or more cameras is updated in accordance with changes in the location of a camera of device 100 as device 100 is moved.

While displaying the first user interface region including the representation of the field of view of the one or more cameras, the device receives (904), via the one or more input devices, a first request to add an annotation (e.g., text or figures produced and/or positioned by movement of a contact (e.g., contact by a finger or stylus) on a touch-sensitive surface) to the displayed representation of the field of view of the one or more cameras (e.g., the first request is an input by a contact that is detected in the first user interface region on a touch-screen display, (e.g., at a location that corresponds to a control to initiate annotation or at a location in the first user interface region (e.g., a location at which the annotation is to be initiated))). For example, a request to add an annotation is an input by a stylus 5012 (e.g., an input to initiate an annotation, as described with regard to FIG. 5C, and/or an input by a contact at a location that corresponds to a control (e.g., control 5004 for toggling between a still image mode and a video mode) as described with regard to FIG. 5H).

In response to the first request to add an annotation to the displayed representation of the field of view of the one or more cameras (e.g., including in response to detecting touch-down or movement of a finger contact or stylus on the touch-sensitive surface at a location corresponding to a portion of the physical environment captured within the representation of the field of view of the cameras, or a user interface object (e.g., a button for activating an AR annotation mode)), the device replaces (906) display of the representation of the field of view of the one or more cameras in the first user interface region with a still image of the field of view of the one or more cameras captured at a time corresponding to the receiving of the first request to add the annotation (e.g., pausing the live feed of the field of view of the one or more cameras (e.g., display a still image of the current field of view, while the field of view continues to change with device movement); and displaying, in the first user interface region, a still image that corresponds to the paused live feed of the field of view of the one or more cameras. For example, in response to an input by a stylus 5012 (e.g., as described with regard to FIG. 5C), a representation of the field of view of the device camera (e.g., as described with regard to FIGS. 5A-5B) is replaced by display of a still image of the field of view of the one or more cameras captured at a time corresponding to the receiving of the first request to add the annotation (e.g., as described with regard to FIGS. 5C-5D).

While displaying the still image in the first user interface region, the device receives (908), via the one or more input devices, a first annotation (e.g., a drawing input) on a first portion of the still image, wherein the first portion of the still image corresponds to a first portion of a physical environment captured in the still image. For example, annotation 5018 is received on a portion of a still image (e.g., a portion that includes representation 5002*b* of a physical mug 5002*a*) that corresponds to a portion of a physical environment captured in the still image (e.g., a portion of physical environment 5000 that includes physical mug 5002*a*) as described with regard to FIGS. 5D-5G. In some embodiments, while displaying the still image and receiving the annotation inputs on the still image, the device continues to track the location of the cameras relative to the surrounding physical environment (e.g., based on the changes in the camera's field of view and inputs from other sensors (e.g., motion sensors, gravity sensors, gyros, etc.)). In some embodiments, the device determines whether a physical location or object corresponds to the location of annotation in the still image has been moved out of the field of view of the cameras; and if so, the device also determines the spatial relationship between the portion of the physical environment currently in the camera's field of view and the physical location or object that is the target of the annotation. For example, mug 5002 is the target of annotation 5018.

While displaying the first annotation on the first portion of the still image in the first user interface region (e.g., after having received the first annotation on the first portion of the still image), the device receives (910), via the one or more input devices, a first request to re-display the representation of the field of view of the one or more cameras in the first user interface region. For example, the request to re-display the representation of the field of view of the one or more cameras in the first user interface region is an input by stylus 5012 at control 5004 for toggling between a still image mode and a video mode, as described with regard to FIG. 5H.

In response to receiving the first request to re-display the representation of the field of view of the one or more cameras in the first user interface region (e.g., including in response to detecting absence of the contact on the touch-sensitive surface for a threshold amount of time (e.g., drawing session is deemed terminated), or detecting a tap on a user interface object (e.g., a button for de-activating the AR annotation mode)) the device (910) replaces display of the still image with the representation of the field of view of the one or more cameras in the first user interface region (e.g., the representation of the field of view is continuously updated with a preset frame rate (e.g., 24, 48, or 60 fps, etc.) in accordance with changes occurring in the physical environment around the cameras and in accordance with movement of the cameras relative to the physical environment). For example, in response to the input by stylus 5012 at control 5004, as described with regard to FIG. 5H, the still image displayed in FIGS. 5C-5H is replaced by a representation of a field of view of one or more cameras in first user interface region 5003, as described with regard to FIGS. 5I-5N. In accordance with a determination that the first portion of the physical environment captured in the still image (e.g., a portion of the physical environment that includes an object relative to which the first annotation was received) is currently outside of the field of view of the one or more cameras (e.g., as a result of device movement that occurred after the live feed of the camera view was paused), the device displays, concurrently with the representation of the field of view of the one or more cameras, an indication of a current spatial relationship of the one or more cameras (e.g., as part of the computing system) relative to the first portion of the physical environment captured in the still image (e.g., displaying a visual indication such as a dot or other shape on an edge of the displayed field of view of the cameras and at a location on the edge that are closest to the first portion of the physical environment on which the annotation was made, or displaying a simplified map of the physical environment concurrently with the representation of the field of view of the cameras and marking the relative locations of the first portion of the physical environment and the device on the map). For example, as described with regard to FIG. 5L, the portion of the physical environment captured in the still image (e.g., including mug 5002 relative to which the annotation 5018 was received) is currently outside of the field of view of the one or more cameras (e.g., in FIGS. 5J-5L, physical mug 5002*a* is outside of the field of view of the camera as displayed in user interface 5003), an indication of a current spatial relationship of the one or more cameras relative to the first portion of the physical environment captured in the still image (e.g., indicator dot 5022) is displayed concurrently with the representation of the field of view of the one or more cameras (e.g., as shown in FIG. 5L). In accordance with a determination that the first portion of the physical environment captured in the still image (e.g., a portion of the physical environment that includes an object relative to which the first annotation was received) is currently within the field of view of the one or more cameras, the device forgoes display of the indication. For example, in response to an input to re-display the field of view of the camera (e.g., an input by stylus 5012 at control 5004 for toggling between a still image mode and a video mode, as described with regard to FIG. 5T), in accordance with a determination that the portion of the physical environment captured in the still image (e.g., including mug 5002 relative to which annotations 5018 and 5028 were received) is currently within of the field of view of the one or more cameras (e.g., in FIGS. 5T, physical mug 5002*a* is visible (as visible representation 5002*b*) in the field of view of the camera as displayed in user interface 5003), no indication of a current spatial relationship of the one or more cameras relative to the first portion of the physical environment captured in the still image is displayed (e.g., as shown in FIG. 5T). Displaying an indication of a current spatial relationship of one or more cameras relative to a portion of a physical environment captured in a still image in accordance with a determination that the portion of the physical environment captured in the still image is currently outside of a view of one or more cameras provides visual feedback to the user (e.g., indicating that movement of the cameras is needed to view the portion of the physical environment that was captured in the still image). Providing improved visual feedback to the user enhances the operability of the device and makes the user-device interface more efficient (e.g., by allowing a user to quickly and precisely locate the portion of the physical environment that corresponds to an annotated portion of the still image), which, additionally, reduces power usage and improves battery life of the device by enabling the user to use the device more quickly and efficiently.

In some embodiments, displaying (912) the indication of the current spatial relationship of the one or more camera relative to the first portion of the physical environment captured in the still image includes: displaying an indicator in proximity to an edge of the representation of the field of view of the one or more cameras and moving the indicator along the edge in accordance with movement of the one or more cameras relative to the physical environment. For example, as described with regard to FIG. 5L, indicator 5022 is displayed in proximity to the left edge of the field of view of the camera as displayed in user interface 5003, and, as described with regard to FIGS. 5L-5M, the indicator is moved along the edge in accordance with movement of the camera of device 100. In some embodiments, for a rectangular representation of the field of view of the one or more cameras, the indicator is a visual indication such as a dot or other shape that moves along the edge of the rectangular representation of the field of view, the visual indication may move along one straight edge in accordance with first movement of the one or more cameras, and the visual indication may also hop from one straight edge to another straight edge in accordance with second movement of the one or more cameras. Moving an indicator along the edge of a camera view provides visual feedback to the user (e.g., indicating the direction of movement of the cameras that is needed to view the portion of the physical environment that was captured in the still image). Providing improved visual feedback to the user enhances the operability of the device and makes the user-device interface more efficient (e.g., by allowing a user to quickly and precisely locate the portion of the physical environment that corresponds to an annotated portion of the still image), which, additionally, reduces power usage and improves battery life of the device by enabling the user to use the device more quickly and efficiently.

In some embodiments, while displaying the indication of the current spatial relationship of the one or more cameras relative to the first portion of the physical environment captured in the still image, the deice detects (914) first movement of the one or more cameras (e.g., as part of the computing system). In response to detecting the first movement of the one or more cameras, the device updates the representation of the field of view of the one or more cameras in accordance with changes in the field of view of the one or more cameras caused by the first movement. In accordance with a determination that the first portion of the physical environment captured in the still image (e.g., a portion of the physical environment that includes an object relative to which the first annotation was received) is currently outside of the field of view of the one or more cameras, the device updates the indication of the current spatial relationship of the one or more cameras (e.g., as part of the computing system) relative to the first portion of the physical environment captured in the still image in accordance with the first movement of the one or more cameras (e.g., moving a visual indication such as a dot or other shape along an edge of the representation of the field of view in accordance with the first movement of the cameras). In accordance with a determination that the first portion of the physical environment captured in the still image (e.g., a portion of the physical environment that includes an object relative to which the first annotation was received) is currently within the field of view of the one or more cameras, the device ceases to display the indication. For example, as the camera of device 100 moves, while a portion of the physical environment captured in the still image is outside the field of view of the cameras (e.g., mug 5002*a* is outside the field of view of the cameras, as described with regard to FIGS. 5L-5M), indication 5022 is updated (e.g., moved upward in user interface 5003), and, when the portion of the physical environment captured in the still image is within the field of view of the cameras, indication 5022 is no longer displayed (e.g., as described with regard to FIG. 5L-5N). In some embodiments, a reduced scale representation of the still image with the first annotation (e.g., reduced scale representation 5020) is displayed adjacent to the location on the edge of the representation of the field of view at which the visual indicator was last displayed the still image view shrinks down and moves toward the location of the first annotation shown in the representation of the field of view of the cameras). In some embodiments, the indication is redisplayed when the first portion of the physical environment moves out of the field of view of the cameras with additional movement of the cameras relative to the physical environment (e.g., as described with regard to FIGS. 5U-5V). Ceasing to display an indication of a current spatial relationship of one or more cameras relative to a portion of a physical environment in accordance with a determination that the first portion of the physical environment captured in the still image is currently within the field of view of the one or more cameras provides visual feedback to the user (e.g., indicating that no further movement is needed to view the portion of the physical environment that was captured in the still image). Providing improved visual feedback to the user enhances the operability of the device and makes the user-device interface more efficient (e.g., by allowing a user to quickly and precisely locate the portion of the physical environment that corresponds to an annotated portion of the still image), which, additionally, reduces power usage and improves battery life of the device by enabling the user to use the device more quickly and efficiently.

In some embodiments, in response to receiving the first request to re-display the representation of the field of view of the one or more cameras in the first user interface region (916): in accordance with the determination that the first portion of the physical environment captured in the still image (e.g., a portion of the physical environment that includes an object relative to which the first annotation was received) is currently within the field of view of the one or more cameras, the device displays the first annotation at the first portion of the physical environment captured within the representation of the field of view of the one or more cameras. For example, as described with regard to FIG. 5N, the device displays annotation 5018 at a portion of the physical environment captured within the representation of the field of view of the one or more cameras (e.g., annotation 5018 is displayed at location that corresponds to visual representation 5002*b* of physical mug 5002*a*) in accordance with a determination that the first portion of the physical environment captured in the still image (e.g., a portion of physical environment 5000 that includes physical mug 5002*a*) is currently within the field of view of the one or more cameras. Displaying an annotation of a portion of the physical environment that was captured in the annotated still image provides visual feedback to the user (e.g., indicating that the portion of the physical environment captured in the still image is currently within the field of view of the one or more cameras). Providing improved visual feedback to the user enhances the operability of the device and makes the user-device interface more efficient (e.g., by allowing a user to quickly and precisely locate the portion of the physical environment that corresponds to an annotated portion of the still image), which, additionally, reduces power usage and improves battery life of the device by enabling the user to use the device more quickly and efficiently.

In some embodiments, the first annotation is displayed as (918) a two-dimensional object (e.g., annotation 5018) on a first depth plane in the first portion of the physical environment captured within the representation of the field of view of the one or more cameras. In some embodiments, the first depth plane is detected in accordance with detection of a physical object (e.g., physical mug 5002*a*) or object feature at the first depth plane in the first portion of the physical environment. Displaying an annotation on a depth plane in the portion of the physical environment in the field of view of the one or more cameras provides improved visual feedback to the user (e.g., indicating that the annotation has a fixed spatial relationship to the physical environment). Providing improved visual feedback to the user enhances the operability of the device and makes the user-device interface more efficient (e.g., by allowing a user to imbue objects in the physical world with additional information contained in an annotation), which, additionally, reduces power usage and improves battery life of the device by enabling the user to use the device more quickly and efficiently.

In some embodiments, the first annotation (e.g., annotation 5018) is displayed (920) at a location in space in the first portion of the physical environment captured within the representation of the field of view of the one or more cameras. In some embodiments, the first annotation floats in space detached from any physical object detected in the first portion of the physical environment. Displaying an annotation at a location in space in the portion of the physical environment captured in the still image provides improved visual feedback to the user (e.g., indicating that the annotation has a fixed spatial relationship to the physical environment). Providing improved visual feedback to the user enhances the operability of the device and makes the user-device interface more efficient (e.g., by allowing a user to imbue objects in the physical world with additional information contained in an annotation), which, additionally, reduces power usage and improves battery life of the device by enabling the user to use the device more quickly and efficiently.

In some embodiments, the first annotation (e.g., annotation 5018) is displayed (922) at a location on a physical object (e.g., physical mug 5002*a*) detected in the first portion of the physical environment captured within the representation of the field of view of the one or more cameras. In some embodiments, the first annotation is attached to a physical object (or a feature of the physical object) detected in the first portion of the physical environment. Displaying an annotation of a portion of the physical environment at a location on a physical object detected in the portion of the physical environment captured in the still image provides improved visual feedback to the user (e.g., indicating that the annotation has a fixed spatial relationship to the physical environment). Providing improved visual feedback to the user enhances the operability of the device and makes the user-device interface more efficient (e.g., by allowing a user to imbue objects in the physical world with additional information contained in an annotation), which, additionally, reduces power usage and improves battery life of the device by enabling the user to use the device more quickly and efficiently.

In some embodiments, in response to receiving the first request to re-display the representation of the field of view of the one or more cameras in the first user interface region (924): in accordance with the determination that the first portion of the physical environment captured in the still image (e.g., a portion of the physical environment that includes an object relative to which the first annotation was received) is not currently within the field of view of the one or more cameras, the device displays a visual representation of the first annotation (e.g., a drawing input) drawn on the first portion of the still image, concurrently with the representation of the field of view of the one or more cameras in the first user interface region (e.g., a reduced scale representation of the still image with the first annotation is displayed adjacent to the location on the edge of the representation of the field of view that is closest to the first portion of the physical space currently represented in the field of view of the cameras). For example, in response to the request to re-display the representation of the field of view of the one or more cameras in the first user interface region (e.g., an input by stylus 5012 at control 5004 for toggling between a still image mode and a video mode, as described with regard to FIG. 5H), in accordance with a determination that the first portion of the physical environment captured in the still image is currently within the field of view of the one or more cameras (the portion of the physical environment captured in the still image (e.g., including mug 5002 relative to which the annotation 5018 was received) is currently within of the field of view of the one or more cameras), the device displays annotation 5018 drawn on the first portion of the still image, concurrently with the representation of the field of view of the one or more cameras in the first user interface region (e.g., as described with regard to FIG. 5N). In some embodiments, in response to receiving the first request to re-display the representation of the field of view of the one or more cameras in the first user interface region: in accordance with the determination that the first portion of the physical environment captured in the still image (e.g., a portion of the physical environment that includes an object relative to which the first annotation was received) is currently outside of the field of view of the one or more cameras, the computing system forgoes displaying the visual representation of the first annotation drawn on the first portion of the still image (e.g., as shown in FIGS. 5L and 5M, annotation 5018 is not displayed). Displaying a visual representation of the annotation of the still image concurrently with the representation of the field of view of the cameras in accordance with a determination that the first portion of the physical environment is not within the field of view of the cameras provides improved visual feedback to the user (e.g., indicating that the indication of current spatial relationship (e.g., a dot) corresponds to a received annotation input). Providing improved visual feedback to the user enhances the operability of the device and makes the user-device interface more efficient (e.g., by allowing a user to quickly and precisely locate the portion of the physical environment that corresponds to an annotated portion of the still image), which, additionally, reduces power usage and improves battery life of the device by enabling the user to use the device more quickly and efficiently.

In some embodiments, the first annotation shown in the representation of the field of view has (926) a first viewing perspective that is based on the current spatial relationship of the one or more cameras (e.g., as part of the computing system) relative to the first portion of the physical environment captured in the still image, and is different from a second viewing perspective of the first annotation shown on the still image (e.g., the perspective of the first annotation shown in the reduced scale representation of the still image that is displayed adjacent to the representation of the field of view). In some embodiments, an animated transition is displayed showing the reduced scale representation of the still image being transformed to the representation of the current field of view. Displaying the annotation with a different viewing perspective from the viewing perspective shown in the still image provides improved visual feedback to the user (e.g., indicating that the annotation is fixed to a portion of the physical environment captured in the still image). FIGS. 5AE and 5AF provide examples of annotation 5018 shown in representations of fields of view with different viewing perspectives. Providing improved visual feedback to the user enhances the operability of the device and makes the user-device interface more efficient (e.g., by allowing a user to quickly and precisely locate the portion of the physical environment that corresponds to an annotated portion of the still image), which, additionally, reduces power usage and improves battery life of the device by enabling the user to use the device more quickly and efficiently.

In some embodiments, in response to receiving the first request to re-display the representation of the field of view of the one or more cameras in the first user interface region (928): in accordance with the determination that the first portion of the physical environment captured in the still image (e.g., a portion of the physical environment that includes an object relative to which the first annotation was received) is currently outside of the field of view of the one or more cameras, displaying a visual representation of the first annotation (e.g., a drawing input) drawn on the first portion of the still image, concurrently with the representation of the field of view of the one or more cameras in the first user interface region (e.g., a reduced scale representation of the still image with the first annotation is displayed adjacent to the location on the edge of the representation of the field of view that is closest to the first portion of the physical space currently represented in the field of view of the cameras), wherein the visual representation of the first annotation drawn on the first portion of the still image (e.g., reduced scale representation 5020) is transformed into the indication (e.g., indication 5022) of the current spatial relationship of the one or more cameras (e.g., as part of the computing system) relative to the first portion of the physical environment captured in the still image (e.g., as described with regard to FIGS. 5I-5L). For example, the indication is a visual indication such as a dot or other shape displayed on an edge of the displayed field of view of the cameras at a location on the edge that are closest to the first portion of the physical environment on which the annotation was made, and before the visual indication is displayed, the miniature view of the still image with the first annotation is displayed at that location and transformed into the visual indication. Transforming the visual representation of the annotation (e.g., the reduced scale representation of the still image) into the indication (e.g., a dot) of the current spatial relationship of the camera(s) relative to the portion of the physical environment captured in the still image provides improved visual feedback to the user (e.g., indicating that the indication (e.g., the dot) and the visual representation of the annotation (e.g., the reduced scale image) are different representations of the same annotation). Providing improved visual feedback to the user enhances the operability of the device and makes the user-device interface more efficient (e.g., by allowing a user to quickly and precisely locate the portion of the physical environment that corresponds to an annotated portion of the still image), which, additionally, reduces power usage and improves battery life of the device by enabling the user to use the device more quickly and efficiently.

In some embodiments, while displaying the first user interface region that includes the representation of the field of view of the one or more cameras, and prior to detecting the first request to add an annotation to the displayed representation of the field of view, the device displays (930) an indication (e.g., indication 5022) of a current spatial relationship of the one or more cameras (e.g., as part of the computing system) relative to a second portion of the physical environment to which a previously received, second annotation previously was added (e.g., displaying a visual indication such as a dot or other shape on an edge of the displayed field of view of the cameras and at a location on the edge that are closest to the second portion of the physical environment on which the second annotation was made, or displaying a simplified map of the physical environment concurrently with the representation of the field of view of the cameras and marking the relative locations of the second portion of the physical environment and the device on the map). In some embodiments, the second annotation was added to the second portion of the physical environment shown in the representation of the field of view of the one or more cameras in the same manner that the first annotation is added to the first portion of the physical environment shown in the representation of the field of view of the cameras. Displaying an indication of a current special relationship of the camera(s) relative to a second portion of the physical environment to which a previously received annotation was added provides improved visual feedback to the user (e.g., indicating that movement of the cameras is needed to view the previously received annotation relative to the portion of the physical environment that was captured in the still image). For example, indication 5022 is displayed prior to detecting a request to add annotation 5028 as described with regard to FIGS. 5P-5R. Providing improved visual feedback to the user enhances the operability of the device and makes the user-device interface more efficient (e.g., by allowing a user to quickly and precisely locate the portion of the physical environment that corresponds to the previously annotated portion of the still image), which, additionally, reduces power usage and improves battery life of the device by enabling the user to use the device more quickly and efficiently.

In some embodiments, after receiving the first request to re-display the representation of the field of view of the one or more cameras in the first user interface region: in accordance with a determination that both the first portion of the physical environment and the second portion of the physical environment are outside of the field of view of the one or more cameras, the device concurrently displays (932) the indication of the current spatial relationship of the one or more cameras relative to the first portion of the physical environment and the indication of the current spatial relationship of the one or more cameras relative to the second portion of the physical environment. For example, when multiple annotations (e.g., annotation 5018 and 5036) have been added to different portions of the physical environment, the indicators (e.g., indicators 5018 and 5040, FIG. 5AA) corresponding to the different annotations are concurrently displayed around the edge of the representation of the field of view of the cameras at respective locations closest to their corresponding portions of the physical environment. Concurrently displaying the indication of the current spatial relationship of the camera(s) relative to the first portion of the physical environment and the indication of the current spatial relationship of the camera(s) relative to the second portion of the physical environment provides improved visual feedback to the user (e.g., indicating a direction of movement of the cameras needed to view one or more of multiple received annotations). Providing improved visual feedback to the user enhances the operability of the device and makes the user-device interface more efficient (e.g., by allowing a user to quickly and precisely locate the portion of the physical environment that corresponds to the previously annotated portion of the still image), which, additionally, reduces power usage and improves battery life of the device by enabling the user to use the device more quickly and efficiently.

In some embodiments, while concurrently displaying the indication of the current spatial relationship of the one or more cameras relative to the first portion of the physical environment and the indication of the current spatial relationship of the one or more cameras relative to the second portion of the physical environment, the device detects (934) second movement of the one or more cameras relative to the physical environment; and in response to detecting the second movement of the one or more cameras relative to the physical environment: in accordance with a determination that both the first portion of the physical environment and the second portion of the physical environment are outside of the field of view of the one or more cameras, the device respectively updates the indications of the current spatial relationships of the one or more cameras relative to the first and second portions of the physical environment (e.g., moving the visual indicators in different directions and/or with different speeds along the edge of the representation of the field of view), in accordance with the second movement of the one or more cameras relative to the physical environment. For example, respective visual indicators corresponding to different annotations directed to different portions of the physical environment are displayed at different locations on the edge of the representation of the field of view of the cameras, and with the movement of the device, the respective visual indicators are moved in different directions and with different speeds in accordance with the changes in the current spatial relationships of their respective annotations relative to the device (e.g., indicators 5018 and 5040 move in accordance with movement of device 100, as described with regard to 5AA-5AD). The visual indicators may move together or apart, and/or move with different speeds, depending on the actual spatial relationships between the different portions of the physical environment that are marked with different annotations. Updating the indications of the current spatial relationships of the camera(s) relative to the first and second portions of the physical environment in accordance with movement of the camera(s) provides improved visual feedback to the user (e.g., indicating whether movement of the camera(s) is bringing the camera(s) closer to or further away from portions of the physical environment that correspond to an annotated portions of the still image). Providing improved visual feedback to the user enhances the operability of the device and makes the user-device interface more efficient (e.g., by allowing a user to quickly and precisely locate the portion of the physical environment that corresponds to the previously annotated portion of the still image), which, additionally, reduces power usage and improves battery life of the device by enabling the user to use the device more quickly and efficiently.

In some embodiments, the indication of the current spatial relationship of the one or more cameras relative to the first portion of the physical environment and the indication of the current spatial relationship of the one or more cameras relative to the second portion of the physical environment are displayed (936) in accordance with a determination that the first portion and second portion of the physical environment are within a predefined range of the one or more cameras. In some embodiments, the user interface provides a method for selecting a subset of annotations from all annotations that have been added to various portions of the physical environment, and only the indications corresponding to the selected subset of annotations are displayed with the representation of the field of view of the cameras. Displaying the indications relative to the first portion of the physical environment and relative to the second portion of the physical environment in accordance with a determination that the first portion and second portion of the physical environment are within a predefined range of the one or more cameras provides improved visual feedback to the user (e.g., by reducing clutter of the user interface with indicators when the first and second portion are outside of the predefined range). Providing improved visual feedback to the user enhances the operability of the device and makes the user-device interface more efficient (e.g., by allowing a user to quickly and precisely locate the portion of the physical environment that corresponds to the previously annotated portion of the still image), which, additionally, reduces power usage and improves battery life of the device by enabling the user to use the device more quickly and efficiently.

It should be understood that the particular order in which the operations in FIGS. 9A-9F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, and 1200) are also applicable in an analogous manner to method 9000 described above with respect to FIGS. 9A-9F. For example, contacts, inputs, annotations, physical objects, user interface regions, fields of view, movements, and/or animations described above with reference to method 9000 optionally have one or more of the characteristics of the contacts, inputs, annotations, physical objects, user interface regions, fields of view, movements, and/or animations described herein with reference to other methods described herein (e.g., methods 1000, 1100, and 1200). For brevity, these details are not repeated here.

FIGS. 10A-10B are flow diagrams illustrating method 1000 of receiving an annotation on a portion of a physical environment captured in a still image that corresponds to a paused position of a video, in accordance with some embodiments. Method 1000 is performed at an electronic device (e.g., device 300, FIG. 3, or portable multifunction device 100, FIG. 1A) having a display generation component (e.g., a display, a projector, a heads up display or the like) and one or more input devices (e.g., a touch-screen display that also serves as the display generation component). In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

The device displays (1002), via the display generation component, a user interface that includes a video playback region. For example, device 100 displays, via touchscreen display 112, a user interface 6000 that includes video playback region 6002, as described with regard to FIG. 6A.

While displaying playback of a first portion of a video in the video playback region, the device receives (1004), via the one or more input devices, a request to add an annotation to the video playback (e.g., the request is an input by a contact that is detected in a video playback user interface on a touch-screen display, (e.g., at a location that corresponds to a control to initiate annotation or at a location in the video playback region (e.g., a location at which the annotation is to be initiated))). For example, a request to add an annotation to the video playback is an input by contact 6024 is detected at a location that corresponds to markup control 6010.

In response to receiving the request to add the annotation, the device (1006): pauses playback of the video at a first position in the video (e.g., identifying the current frame of the video (e.g., the paused position) and stops playback of the video at the current frame).

The device displays (1008) a still image (e.g., a frame of the video) that corresponds to the first, paused position of the video (e.g., displaying the current frame of the video that was shown at the time when the request was received). For example, as described with regard to FIGS. 6C-6D, in response to the input by contact 6024 at the location that corresponds to markup control 6010, playback of the video is paused and a still image that corresponds to the paused position of the video is displayed.

While displaying the still image (e.g., in the video playback region), the device receives (1008), via the one or more input devices, an annotation (e.g., a drawing input by a contact) on a first portion of a physical environment captured in the still image. For example, as described with regard to FIGS. 6E-6F, an annotation 6030 is received on a portion of a physical environment that corresponds to kite object 6028 in the displayed still image. It will be understood that where "physical environment" is referred to herein, a non-physical environment (e.g., a computer generated environment) may be included in a still image. For example, an annotation is received on a portion of an image (e.g., that is part of a computer generated video) that corresponds to a paused position of the video. In some embodiments, a computer generated image includes depth data and/or objects relative to which annotations and/or virtual objects are situated.

After receiving the annotation, the device displays (1010), in the video playback region, a second portion of the video (e.g., during continued playback of the video or while input is received (e.g., on the timeline) to scrub through the video forward or backward) that corresponds to a second position in the video, distinct from the first position in the video (e.g., before or after the paused position in the video), wherein the first portion of the physical environment is captured in the second portion of the video and the annotation is displayed in the second portion of the video. For example, after annotation 6030 is received as described with regard to FIGS. 6E-6F, annotation 6030 is displayed in a second portion of the video (e.g., as described with regard to FIG. 6J). In some embodiments, while the second portion of the video is displayed, the annotation is displayed at a second location in the video playback region that is distinct from a first location of the annotation as received while the still image is displayed (e.g., the annotation is "attached" to a location (e.g., a physical object) in the physical environment captured in the video clip such that the annotation moves while the location (e.g., the physical object) moves as the video progresses). Displaying an annotation in a portion of video that is distinct from a portion of video to which the annotation was applied without requiring further input (e.g., to identify a surface to which the annotation is to be applied) enhances the operability of a device. Performing an operation without requiring further user input enhances the operability of the device and makes the user-device interface more efficient (e.g., by allowing a user to add information to a previously captured video through directly annotation of the video, without a need for re-recording the video or providing the annotation in multiple portions of the video), which, additionally, reduces power usage and improves battery life of the device by enabling the user to use the device more quickly and efficiently.

In some embodiments, the video was captured (1012) by a camera during relative movement of the camera and the physical environment (e.g., during the video capturing, movement data of the camera and depth data of the physical environment are concurrently captured and stored with the image data captured at the same time) and a third portion of the video was captured between the first portion and the second portion of the video, and does not include the first portion of the physical environment, during the relative movement of the camera and the physical environment. In some embodiments, the annotation (e.g., annotation 6030) received on the still image (e.g., as indicated in FIGS. 6E-6F) is directed to a first object (e.g., kite 6028) located in the first portion of the physical environment, and is displayed at a location corresponding to the first object in the second portion of the video (e.g., without the annotation having been made directly on a still image of any frame of the second portion of the video). For example, in FIG. 6J, annotation 6030 is displayed in a second portion of the video at a location that corresponds to kite 6028. In some embodiments, the annotation is not displayed in the third portion of the video that does not include the first object (e.g., the annotation is not persistently displayed, and is only shown when the current frame includes the first object). In some embodiments, the annotation is rotated and scaled such that it appears to be displayed at the location of the first object, in accordance with the distance and viewing perspective of the first object. For example, in FIGS. 6J-6N, annotation 6030 is rotated and scaled such that it appears to be displayed at the location of kite 5026 in the video. In some embodiments, the first, third, and second portions of the video are consecutively captured portions of the video, or the second, third, and first portions of the video are consecutively captured portions of the video. As there is a discontinuity of subject matter captured in the field of view of the camera (e.g., during capturing of the third portion of the video), the first portion of the physical environment as captured in the first portion of the video cannot be recognized as the same first portion of the physical environment as captured in the third portion of the video, based on just the image data of the video alone (e.g., through frame-to-frame comparison to identify tracking points across consecutive frames). Movement of the camera and/or depth data are used (optionally, in conjunction with the image data) to create a three-dimensional or quasi-three-dimensional model of the physical environment captured in the video, such that a particular location in the physical environment can be recognized in each frame of the video, regardless of its appearance or viewing perspective in the frame. Displaying an annotation at a location corresponding to an object to which the annotation was directed and not displaying the annotation in a portion of a video that does not include the object provides improved visual feedback to the user (e.g., by providing an indication that the annotation is fixed at a location that corresponds to the object). Performing an operation without requiring further user input enhances the operability of the device and makes the user-device interface more efficient (e.g., by allowing a user to add information to a video without a need for re-recording the video or providing the annotation in multiple portions of the video), which, additionally, reduces power usage and improves battery life of the device by enabling the user to use the device more quickly and efficiently.

In some embodiments, the device displays (1014) a timeline (e.g., a scrub bar with a position indicator to indicate the position of the currently displayed frame, a scrollable sequence of reduced-scale images of sample frames from consecutive segments of the video with a stationary marker for the currently displayed frame) of the video (e.g., concurrently with display of the video (e.g., during playback of the video, and/or while the video is paused)), wherein displaying the second portion of the video is performed in response to a user input scrubbing through the timeline of the video to the second position in the video (e.g., a user input dragging the position indicator along a scrub bar, or a user input scrolling the sequence of reduced-scale images of sample frames past the stationary marker for currently displayed frame). For example, an input by contact 6038 is received at a location that corresponds to timeline 6004, which includes a sequence of sample frames (e.g., sample frame 6006, as described with regard to FIG. 6A), and the video displayed in video playback region 6002 is rewound in response to the input (e.g., as described with regard to FIGS. 6L-6N). Displaying a timeline for scrubbing through the video without requiring further user input enhances the operability of a device (e.g., by allowing the user to access the annotation displayed in a second portion of the video using an existing scrubbing control without requiring a separate control or input). Performing an operation without requiring further user input enhances the operability of the device and makes the user-device interface more efficient, which, additionally, reduces power usage and improves battery life of the device by enabling the user to use the device more quickly and efficiently.

In some embodiments, displaying the second portion of the video is performed as a result of (1016) rewinding of the video from the first position to the second position (e.g., the second position precedes the first position on the timeline of the video). For example, an input by contact 6038 is received for rewinding the video displayed in video playback region 6002, as described with regard to FIGS. 6L-6N. Displaying an annotation in a portion of video that is distinct from a portion of video to which the annotation was applied in response to a rewinding input without requiring further user input enhances the operability of a device (e.g., by allowing the user to access the annotation displayed in a second portion of the video using an existing scrubbing control without requiring a separate control or input). Performing an operation without requiring further user input makes the user-device interface more efficient, which, additionally, reduces power usage and improves battery life of the device by enabling the user to use the device more quickly and efficiently.

In some embodiments, displaying the second portion of the video is performed as a result of (1018) fast-forwarding of the video from the first position to the second position (e.g., the second portion succeeds the first portion on the timeline of the video and the playback speed is faster than the normal playback speed). Displaying an annotation in a portion of video that is distinct from a portion of video to which the annotation was applied in response to a fast-forwarding input without requiring further user input enhances the operability of a device (e.g., by allowing the user to access the annotation displayed in a second portion of the video using an existing scrubbing control without requiring a separate control or input). Performing an operation without requiring further user input makes the user-device interface more efficient, which, additionally, reduces power usage and improves battery life of the device by enabling the user to use the device more quickly and efficiently.

In some embodiments, displaying the second portion of the video is performed as a result of (1020) normal playback of the video from the first position to the second position (e.g., the second portion succeeds the first portion on the timeline of the video and the playback speed is faster than the normal playback speed). In some embodiments, when the user finishes providing the annotation on the still image, the user exits the annotation mode by selecting a “done” button displayed with the still image (e.g., as described with regard to FIG. 6G); and as a result, the device continues playback of the video from the first position, with the annotation displayed in each subsequent frame that included the first portion of the physical environment, and at the same physical location (e.g., a physical object), even when the first portion of the physical environment is captured at different distances and/or from different perspectives as compared to the still image. Displaying an annotation in a portion of video that is distinct from a portion of video to which the annotation was applied in response to normal playback of the video without requiring further user input enhances the operability of a device (e.g., by allowing the user to access the annotation displayed in a second portion of the video using an existing scrubbing control without requiring a separate control or input). Performing an operation without requiring further user input makes the user-device interface more efficient, which, additionally, reduces power usage and improves battery life of the device by enabling the user to use the device more quickly and efficiently.

In some embodiments, the device displays (1022), via the display generation component, a listing of media content objects, including the video (e.g., displaying a representation of the video in the media library). The device receives an input selecting the video from the listing of media content objects, and, in response to receiving the input selecting the video, displays a user interface object (e.g., a “mark-up” button for adding annotation) with the display of the video in the video playback region, wherein the user interface object is configured to receive a request to add an annotation to the video during playback of the video (e.g., a tap input to activate the button to add annotation). Displaying a user interface object, configured to receive a request to add an annotation to the video during playback of the video provides improved feedback (e.g., indicating an option, during playback of a video, to add an annotation to a portion of that video). In some embodiments, the mark-up button is displayed provides improved feedback (e.g., along with other playback controls) when a touch-input is detected on the video playback region during video playback, and when the mark-up button is activated, the currently displayed frame is shown in a mark-up enabled state, ready to receive drawing annotation directly on the image of the currently displayed frame. Providing enhanced feedback enhances the operability of a device (e.g., by allowing the user to access the annotation displayed in a second portion of the video using an existing scrubbing control without requiring a separate control or input). Performing an operation without requiring further user input makes the user-device interface more efficient, which, additionally, reduces power usage and improves battery life of the device by enabling the user to use the device more quickly and efficiently.

It should be understood that the particular order in which the operations in FIGS. 10A-10B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, and 1200) are also applicable in an analogous manner to method 1000 described above with respect to FIGS. 10A-10B. For example, contacts, inputs, annotations, physical objects, user interface regions, fields of view, movements, and/or animations described above with reference to method 1000 optionally have one or more of the characteristics of the contacts, inputs, annotations, physical objects, user interface regions, fields of view, movements, and/or animations described herein with reference to other methods described herein (e.g., methods 900, 1100, and 1200). For brevity, these details are not repeated here.

FIGS. 11A-11F are flow diagrams illustrating method 1100 of adding a virtual object to a previously captured media object. Method 1100 is performed at an electronic device (e.g., device 300, FIG. 3, or portable multifunction device 100, FIG. 1A) having a display generation component (e.g., a display, a projector, a heads up display or the like) and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands). In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

The device displays (1102), via the display generation component, a first previously captured media object including one or more first images (e.g., a still photo, a live photo, or a video including a sequence of image frames), wherein the first previously captured media object was recorded and stored with first depth data corresponding to a first physical environment captured in each of the one or more first images (e.g., first depth data generated by one or more depth sensors (e.g., an emitter/detector system, such as infrared, sonar, and/or lidar, and/or an image analysis system (e.g., video segment analysis and/or stereo image/video analysis)) of the device, e.g., at a time that corresponds to a time during which the first media object was captured by one or more cameras). For example, as described with regard to FIG. 7A, device 100 displays, by touch screen display 112, a previously captured image in media object display region 7002.

While displaying the first previously captured media object (e.g., displaying a still image, displaying a representative image of a live photo, displaying a frame of the video during playback of the video, or displaying a frame of the video when the video is in a paused or stopped state), the device receives (1104) a first user request, via the one or more input devices, to add a first virtual object (e.g., falling balls, confetti, text, a spotlight, emoji, paint, measurement graphic) to the first previously captured media object. For example, a request to add a virtual object to a previously captured media object is a tap input received on touch screen display 112 for adding a virtual object to a previously captured image, as described with regard to FIG. 7C.

In response to the first user request to add the first virtual object to the first previously captured media object, the device displays (1106) the first virtual object over at least a portion of a respective image in the first previously captured media object, wherein the first virtual object is displayed with at least a first position or orientation (or movement path) that is determined using the first depth data that corresponds to the respective image in the first previously captured media object. For example, as described with regard to FIG. 7C, in response to a tap input received on touch screen display 112, a virtual object (e.g., virtual ball object 7030) is added to a previously captured image. Adding a virtual object to a previously captured media object using depth data from the previously captured media object without requiring user input (e.g., to indicate the location of planes in the media object) enhances the operability of the device. Performing an operation without requiring further user input makes the user-device interface more efficient, which, additionally, reduces power usage and improves battery life of the device by enabling the user to use the device more quickly and efficiently.

In some embodiments, displaying the first virtual object over at least a portion of a respective image in the first previously captured media object includes (1108): after the first virtual object is placed on a respective one of the one or more first images, displaying first movement of the first virtual object relative to a first physical surface captured in the first previously captured media object, wherein the first movement of the first virtual object is constrained by a first simulated surface corresponding to the first physical surface that is determined based on the depth data and a simulated direction of gravity (e.g., the simulated direction of gravity is optionally determined based on the direction of gravity recorded with the depth data at the time the first images were captured, or is the same as the actual direction of gravity relative to the current orientation of the device displaying the respective image). For example, as described with regard to FIG. 7C, virtual ball object 7030 is constrained by a simulated surface corresponding to a physical surface that is determined based on depth data (e.g., floor surface 7040) and by a simulated direction of gravity. In some embodiments, different types of virtual objects have different simulated physical characteristics (e.g., shape, size, weight, elasticity, etc.) that interact with the simulated surface in different ways. In one example, if a still image captures a couch that has curved armrests and a flat seating area, a virtual rubber ball is shown to drop in from the top of the image, land on the curved surface of the armrest, bounce off the curved surface of the armrest, land on the flat seating area, and then roll down onto the floor. In contrast, a piece of confetti is shown to float down from the top of the image, land on the curved surface of the armrest, slide off the curved surface of the armrest, land on the flat seating area, and remain on the flat seating area. In another example, a 3D letter "A" is placed on top of the curved surface of the armrest by the user's finger, the 3D letter "A" falls sideways and lands on the flat surface of the seating area when the user's finger is lifted away from the touch-screen. In some embodiments, a surface mesh corresponding to the physical environment captured in the still image is generated based on the depth data, and virtual objects inserted into the still image are animated during the insertion and/or after the initial placement to show movement and final position/orientation that conform to basic physics, such as laws related to gravity, force, and physical interactions between objects. Moving a virtual object to a physical surface of the previously captured media object (e.g., in accordance with simulated gravity) to indicate the location of planes in the media object) allows the movement of the virtual object to occur automatically without requiring further input (e.g., without requiring the user to provide input directing the path of movement of virtual objects) enhances the operability of the device. Performing an operation without requiring further user input makes the user-device interface more efficient, which, additionally, reduces power usage and improves battery life of the device by enabling the user to use the device more quickly and efficiently.

In some embodiments, displaying the first virtual object over at least a portion of a respective image in the first previously captured media object includes (1110): after the first virtual object is placed on a respective one of the one or more first images, displaying a change in shape of the first virtual object in accordance with a first physical surface captured in the first previously captured media object, wherein the change in shape of the first virtual object is constrained by a first simulated surface corresponding to the first physical surface that is determined based on the first depth data. For example, as described with regard to FIGS. 7U-7X, a shape of a virtual decal object 7084 changes as the object is moved over the surface of sofa 7060 and onto floor 7004 depicted in a previously captured image. In some embodiments, if a still image captures a couch that has curved armrests and a flat seating area, a virtual paint ball is shown to shoot into the image, land on the curved surface of the armrest, the virtual paint splat over the curved surface of the armrest. In contrast, if the virtual paint ball is shown to shoot into the image and land on the flat surface of the seating area, the virtual paint splat over the flat surface of the seating area. In another example, a long virtual streamers dropped over the armrest drapes over the curved surface of the armrest, while a long virtual streamer dropped over the flat seating area lies flat on the flat surface of the seating area. Displaying a change in shape of a virtual object in accordance with a surface in a previously captured media object allows the change in shape of the virtual object to occur automatically without requiring further input (e.g., without requiring the user to provide input directing the change of shape of virtual objects) enhances the operability of the device. Performing an operation without requiring further user input e the user-device interface more efficient, which, additionally, reduces power usage and improves battery life of the device by enabling the user to use the device more quickly and efficiently.

In some embodiments, while displaying the first virtual object over at least a portion of a respective image in the first previously captured media object, the device detects (1112) a second user request to switch from displaying the first previously captured media object to displaying a second previously captured media object (e.g., a horizontal swipe input on the first virtual object to show a previous or next item in a horizontally arranged list of media objects, a vertical swipe on the first virtual object to show a previous or next item in a vertically arranged list of media objects, or a tap on a forward or backward button for switching to the next or previous media object), wherein the second previously captured media object includes one or more second images, and the second previously captured media object was recorded and stored with second depth data corresponding to a second physical environment captured in each of the one or more second images (e.g., second depth data generated by one or more depth sensors (e.g., an emitter/detector system, such as infrared, sonar, and/or lidar, and/or an image analysis system (e.g., video segment analysis and/or stereo image/video analysis)) of the device, e.g., at a time that corresponds to a time during which the second media object was captured by one or more cameras). For example, as described with regard to FIGS. 7E-7F, while virtual ball objects are displayed over a first previously captured image, as shown in FIG. 7E, a request (e.g., an input at subsequent media object control 7010) is detected for switching from displaying a the first previously captured image to displaying a second previously captured image (as shown in FIG. 7F). In response to receiving the second user request to switch from displaying the first previously captured media object to displaying the second previously captured media object: the device replaces display of the first previously captured media object with display of the second previously captured media (e.g., sliding out the first previously captured media object and sliding in the second previously captured media in the direction of the swipe input (e.g., horizontal swipe or vertical swipe input)). For example, in response to an input received as described with regard to FIG. 7E, the device switches from displaying a first previously captured media object in media object display region 7002, as shown in FIG. 7E, to displaying a second previously captured image in media object display region 7002, as shown in FIG. 7F. The device displays the first virtual object over at least a portion of a respective image in the second previously captured media object, wherein the first virtual object is displayed with at least a second position or orientation (or movement path) that is determined based on the first position or orientation (or movement path) of the first virtual object in the respective image of the first previously captured media object, and based on the second depth data that corresponds to the respective image in the second previously captured media object. For example, virtual ball objects 7034 and 7044 that were added to a first previously captured image displayed in FIG. 7E are displayed over a second previously captured image displayed in FIG. 7F. In some embodiments, if the first virtual object is a piece of virtual confetti or a virtual ball that has fallen down in an image of the first previously captured media object and landed on a first surface (e.g., the flat surface of the couch seating area) in the image, when the user switches to display a second image by swiping on the first image horizontally, the second image slides in horizontally, and the virtual confetti or virtual ball starts to move from its location in the first image (e.g., fall downward from the location corresponding to the surface of the couch's seating area) and land on a second surface (e.g., a surface of the floor, or a surface of a cushion on the floor, etc.). In other words, the virtual object persists when switching between media objects, and the position, orientation, and movement path of the virtual object in the next image is affected by its position, orientation, and movement path of the virtual object in the previous image. Switching from displaying a virtual object over a first previously captured media object to displaying the virtual object over a second previously captured media object at a position determined based on a position or orientation of the virtual object in the first previously captured media object without requiring user input (e.g., to indicate a location for the virtual object in the second previously captured media object) enhances the operability of the device. Performing an operation without requiring further user input makes the user-device interface more efficient, which, additionally, reduces power usage and improves battery life of the device by enabling the user to use the device more quickly and efficiently.

In some embodiments, the first user request is (1114) a request to add multiple instances of a first type of virtual objects (e.g., virtual ball objects 7034 and 7044 as described with regard to FIGS. 7C-7E) to the previously captured media object over time (e.g., adding falling virtual confetti or virtual balls to the images over time), and the first virtual object is one of the multiple instances of the first type of virtual objects added to the first previously captured media object. In response to receiving the second user request to switch from displaying the first previously captured media object to displaying the second previously captured media object: the device displays a second virtual object over at least a portion of a respective image in the second previously captured media object, wherein: the second virtual object is an instance of the first type of virtual object that is distinct from the first virtual object and that was not added to the first previously captured media object, and the second virtual object is displayed with at least a third position or orientation (or movement path) that is determined using the second depth data that corresponds to the respective image in the second previously captured media object. For example, in some embodiments, the first user request is a request to add a series of virtual objects of the same type over time (e.g., in a continuous manner) to create an effect on the image, such as falling confetti, rain drops, or fireworks, etc. While the effect is applied to a first image or video (e.g., as multiple instances of the virtual confetti, rain drops, or fireworks are being added to the first image), if the user switches to a next image or video (e.g., by swiping on the first image or video horizontally or vertically), the effect is also automatically applied to the next image or video (e.g., new instances of the virtual confetti, rain drops, or fireworks are also added to the next image) without the user explicitly invoking the effect for the next image or video (e.g., activating the control for that effect). Switching from displaying a first virtual object over a first previously captured media object to displaying a second virtual object over a second previously captured media object at a position determined based on a position or orientation of the virtual object in the first previously captured media object without requiring user input (e.g., to indicate a location for the virtual object in the second previously captured media object) enhances the operability of the device. Performing an operation without requiring further user input makes the user-device interface more efficient, which, additionally, reduces power usage and improves battery life of the device by enabling the user to use the device more quickly and efficiently.

In some embodiments, the first previously captured media object and the second previously captured media object (1116) are two distinct still images (e.g., a first previously captured image as shown in media object display region 7002 of FIG. 7E and a second previously captured image as shown in media object display region 7002 of FIG. 7F) previously recorded and stored with different depth data corresponding to different physical environments and/or different views of the same physical environment. For example, the second still image does not need to have any connection with the first still image in terms of the subject matter that is captured in the images in order to have the same effect (e.g., falling confetti, virtual balls, fireworks, virtual block letters, etc.) continue to be applied to the second still image. Switching from displaying a virtual object over a first previously captured media object to displaying a second virtual object over a second previously captured media object that has different depth data from the first previously captured media object without requiring further user input (e.g., to indicate a location for the virtual object in the second previously captured media object) enhances the operability of the device. Performing an operation without requiring further user input makes the user-device interface more efficient, which, additionally, reduces power usage and improves battery life of the device by enabling the user to use the device more quickly and efficiently.

In some embodiments, the first previously captured media object is a video including a sequence of consecutive image frames (e.g., as described with regard to FIGS. 7AM-7AT), and displaying the first virtual object over at least a portion of a respective image in the first previously captured media object includes: during playback of the first previously captured media object: while displaying a first image frame of the first previously captured media object, displaying (1118) the first virtual object over a first portion of the first image frame, wherein the first virtual object is displayed with a position or orientation (or movement path) that is determined in accordance with a portion of the first depth data that corresponds to the first image frame of the first previously captured media object; and while displaying a second image frame of the first previously captured media object immediately after displaying the first image frame (e.g., the second image frame immediately succeeds the first image frame in the media object in normal or fast-forward playback of the media object, the second image frame immediately precedes the first image frame in the media object in reverse playback of the media object, or the second image is the initial frame of the media object and the first image is the last frame of the media object in looped playback of the media object), displaying the first virtual object over a second portion of the second image frame, wherein the first virtual object is displayed with a position or orientation (or movement path) that is determined in accordance with the position or orientation (or movement path) of the first virtual object in the first image frame and in accordance with a portion of the first depth data that corresponds to the second image frame of the first previously captured media object. For example, if the first virtual object is a piece of virtual confetti or a virtual ball that has fallen down on a surface (e.g., a surface of a moving or stationary object) in a first image frame of a video, when the video continues to play, and the surface is shown in the next image frame, the position and/or orientation and/or movement path of the virtual confetti or virtual ball will change, depending on the position and orientation of the surface in the new image frame. For example, if the surface is a stationary table surface, the virtual confetti will appear to lie at the same location on the stationary table surface and the virtual ball will appear to roll along the stationary table surface, even if the table surface is now viewed with a different perspective and occupied a different area on the second image frame as compared to the first image frame. Similarly, if the surface is the top of a trap door that suddenly gives way in the video, the virtual confetti will start to fall gradually from its resting location on top of the trap door and the virtual ball will appear to drop with acceleration from its location on top of the trap door due to simulated gravity. In some embodiments, the first user request is a request to add a series of virtual objects of the same type over time (e.g., in a continuous manner) to create an effect on the image, such as falling confetti, or fireworks, etc. For example, virtual confetti objects that rest on an edge of physical kite object 7112 are displayed with changed positions, orientations and movement paths as the video playback occurs in FIGS. 7AM-7AT. While the effect is applied to a first image frame (e.g., as multiple instances of the virtual confetti or fireworks are being added to first image frame), as the video playback continues, the effect is also automatically applied to the next image frame (e.g., new instances of the virtual confetti or fireworks are also added to the next image image). In some embodiments, at the end of the video, the virtual objects that are added to the last image frame include virtual objects that were added to multiple earlier image frames and that have settled into their final positions and orientations in the final image frame based on prior interactions with the simulated surfaces corresponding to the physical environments depicted in the earlier image frames and the simulated surfaces corresponding to the physical environment depicted in the last image frame. Displaying a virtual object over a second frame of a video displayed immediately after displaying a first frame of the video, where in the second image frame the position or orientation of the virtual object is determined using depth data from the second image frame, without requiring further input (e.g., without requiring the user to provide input indicating the position of a virtual object in each frame of the video) enhances the operability of the device. Performing an operation without requiring further user input makes the user-device interface more efficient, which, additionally, reduces power usage and improves battery life of the device by enabling the user to use the device more quickly and efficiently.

In some embodiments, displaying the first previously captured media object includes (1120) playing the video in accordance with a first timeline that includes at least one of looping, fast forward, or reversal of the sequence of consecutive image frames; and displaying the first virtual object over at least a portion of a respective image in the first previously captured media object includes: during playback of the video in accordance with the first timeline, displaying changes in position or orientation (or movement path) of the first virtual object in accordance with a forward timeline (e.g., prior positions and orientations of the virtual object in each previously displayed image frame influences the position and orientation of the currently displayed image frame) that is associated with an actual order of the sequence of image frames (e.g., including looping from the end to the beginning of the video, switching frames at an uneven rate during the video playback, playing the video backwards from a later frame to an earlier frame, etc.) displayed during the playback of the video. In other words, the timeline of the movement of the virtual object in the displayed image frames is independent of the timeline according to which the media object is played back. Displaying changes in position or orientation of a virtual object in accordance with a timeline associated with an order of a sequence of image frames, without requiring further input (e.g., without requiring the user to provide input indicating the change in position of a virtual object in each frame of the video) enhances the operability of the device. Performing an operation without requiring further user input makes the user-device interface more efficient, which, additionally, reduces power usage and improves battery life of the device by enabling the user to use the device more quickly and efficiently.

In some embodiments, displaying the first virtual object over at least a portion of a respective image in the first previously captured media object includes (1122): while the first virtual object is placed on a respective one of the one or more first images, displaying a shadow of the first virtual object in accordance with a first physical surface captured in the first previously captured media object, wherein the shadow of the first virtual object is constrained by a first simulated surface corresponding to the first physical surface that is determined based on the first depth data. For example, if a still image captures a couch that has curved armrests and a flat seating area, a virtual letter A that is placed on the curved surface of the armrest and then falls sideways to the flat surface of the seating area will have a shadow with its shape changing in accordance with the surface that the virtual letter A is currently on, and the current orientation of the virtual letter A relative to the surface. In some embodiments, a three-dimensional or quasi-three-dimensional mesh is generated based on the depth data associated with the image or video, the mesh surface exhibits shape characteristics of the physical environment captured in the image or video, the shadow is cast on the mesh surface based on a simulated light source and the position and orientation of the virtual object relative to the mesh surface. Displaying a virtual object with a shadow that is constrained by a simulated surface corresponding to a physical surface based on depth data of a previously captured media object, without requiring further input (e.g., to identify a surface in the previously captured media object) enhances the operability of the device. Performing an operation without requiring further user input makes the user-device interface more efficient, which, additionally, reduces power usage and improves battery life of the device by enabling the user to use the device more quickly and efficiently.

In some embodiments, the first user request is (1124) a user request to place a virtual first textual object at a first location in a respective image in the first previously captured media object. For example, the user request is an input provided at virtual text object 7064 for initiating an editing mode of virtual text object 7064, as described with regard to FIGS. 7Q-7S. The device receives (1126) a user input to update the virtual first textual object, including adding a first virtual letter to the virtual first textual object (e.g., editing a text input area by typing a letter at the end of the existing text input); and in response to receiving the user input, the device displays the first virtual letter at a second location in the respective image in the first previously captured media object adjacent to a preceding virtual letter in the virtual first textual object and in accordance with a portion of the first depth data corresponding to the second location in the respective image. In some embodiments, the text has lighting and shadows that are generated based on the surface mesh of the environment captured in the respective image. Displaying a textual object at a location in a previously captured media object and placing a letter of the textual object in accordance with depth data in the media object, without requiring further input (e.g., to identify depth data in the previously captured media object) enhances the operability of the device. Performing an operation without requiring further user input makes the user-device interface more efficient, which, additionally, reduces power usage and improves battery life of the device by enabling the user to use the device more quickly and efficiently.

In some embodiments, displaying the first virtual object over at least a portion of a respective image in the first previously captured media object includes (1128): in accordance with a determination that a simulated surface proximate to a current location of the first virtual object in the respective image is a horizontal surface, displaying the first virtual object on top of the horizontal surface (e.g., as opposed to under the horizontal surface); and in accordance with a determination that a simulated surface proximate to the current location of the first virtual object in the respective image is a vertical surface, displaying the first virtual object in front of the vertical surface. Displaying a virtual object on top of or in front of a surface proximate to the virtual object, depending on whether the surface is a horizontal surface or a vertical surface, without requiring further input (e.g., to indicate whether a surface is a horizontal surface or a vertical surface) enhances the operability of the device.

Performing an operation without requiring further user input makes the user-device interface more efficient, which, additionally, reduces power usage and improves battery life of the device by enabling the user to use the device more quickly and efficiently.

In some embodiments, displaying the first virtual object over at least a portion of a respective image in the first previously captured media object includes (1130): in accordance with a determination that the respective image includes a first simulated surface (e.g., a foreground object) and a second simulated surface (e.g., a background object) with different depths in proximity to a current location of the first virtual object in the respective image, displaying the first virtual object at a depth between the first simulated surface and the second simulated surface (e.g., with at least a first portion of the first virtual object occluded by the first simulated surface, and with at least a second portion of the first virtual object occluding at least a portion of the second simulated surface; or under an object represented by first simulated surface). For example, as described with regard to FIG. 7G, virtual ball object 7045 is displayed at a depth between a first simulated surface (e.g., the rear wall of the room depicted in the previously captured image) and a second simulated surface (e.g., table 7054). In some embodiments, a complete three-dimensional model of the physical environment cannot be established based on the depth data of the image alone. There is no spatial information regarding the space between the first simulated surface and the second simulated surface. The first virtual object is placed between the first simulated surface and the second simulated surface, irrespective of the absence of the spatial information in the range of depths between the first simulated surface and the second simulated surface. Displaying a virtual object with a depth between a first simulated surface and a second simulated surface, without requiring further input (e.g., to indicate a depth of the virtual object, a depth of the first simulated surface, and/or a depth of the second simulated surface) enhances the operability of the device. Performing an operation without requiring further user input makes the user-device interface more efficient, which, additionally, reduces power usage and improves battery life of the device by enabling the user to use the device more quickly and efficiently.

In some embodiments, the device detects (1132) an object positioning input (e.g., a drag input or a tap input) by a contact on the touch-sensitive surface that is directed to the first virtual object, wherein the object positioning input specifies a placement location for the first virtual object on the respective image corresponding to a final location (and, optionally, final movement speed and direction) of the contact on the touch-sensitive surface. For example, an object positioning input is an input by contact 7066 for positioning a virtual text object 7064 as described with regard to FIG. 7M. In response to detecting the object positioning input, the device places the first virtual object at the placement location on the respective image in accordance with the object positioning input. While the first virtual object is displayed at the placement location on the respective image, the device detects termination of the object positioning input, including detecting lift-off of the contact from the touch-sensitive surface. In response to detecting the termination of the object positioning input, the device moves the first virtual object from the placement location to a final location (e.g., with rotation and/or translation movement) in accordance with the depth data corresponding to a portion of the physical environment surrounding the placement location (e.g., the surface mesh of the physical environment created based on the depth data near the placement location) and in accordance with one or more simulated physical properties (e.g., weight, gravity, elasticity, plasticity, speed, velocity, etc.) of the portion of the physical environment and the first virtual object. Moving a virtual object in accordance with depth data, without requiring further input (e.g., to indicate how movement of a virtual object is to occur and/or to indicate depth data of the previously captured media image) enhances the operability of the device. For example, on liftoff of contact 5066, virtual text object is placed at a final position on a horizontal surface of sofa 7060 in the previously captured image, as described with regard to FIGS. 7M-7P. Performing an operation without requiring further user input makes the user-device interface more efficient, which, additionally, reduces power usage and improves battery life of the device by enabling the user to use the device more quickly and efficiently.

In some embodiments, the first virtual object includes (1134) a simulated spotlight (e.g., virtual spotlight object 7118, as described with regard to FIG. 7AU). Displaying the first virtual object over at least a portion of a respective image in the first previously captured media object includes displaying, in the respective image, a simulated light beam (e.g., light beam 7120) with a simulated three-dimensional shape (e.g., a conical or cylindrical light beam), wherein the simulated three-dimensional shape remains constant with movement of the simulated light beam in the respective image (e.g., the appearance of the shape may be different to the user depending on the viewing perspective of the light beam from the vintage point of the user); and displaying, in the respective image, a simulated illumination spot (e.g., illumination spot 7122) with a two-dimensional shape, wherein the two-dimensional shape changes in accordance with the movement of the simulated light beam in the respective image and in accordance with a relative spatial relationship between the simulated light beam and a simulated intersecting surface corresponding to a physical surface in the physical environment (e.g., a surface (e.g., a curved or flat surface) of a physical object) as determined based on the first depth data. For example, as described with regard to FIGS. 7AV-7AW, the shape of simulated illumination spot 7122 changes as virtual spotlight object 7118 is moved in response to user input. Displaying a simulated illumination spot with a two dimensional shape that changes in accordance with the movement of a simulated light beam and in accordance with a relative spatial relationship between the simulated light beam and a simulated surface corresponding to a surface determined based on depth data, without requiring further input (e.g., to indicate depth data of the previously captured media image) enhances the operability of the device. Performing an operation without requiring further user input makes the user-device interface more efficient, which, additionally, reduces power usage and improves battery life of the device by enabling the user to use the device more quickly and efficiently.

In some embodiments, the first virtual object includes (1136) a graphical object (e.g., a two-dimensional or three-dimensional emoji), and displaying the first virtual object over at least a portion of a respective image in the first previously captured media object includes: displaying the graphical object at a location in the respective image that corresponds to free space in the physical environment (e.g., the emoji floats in the air in the physical environment at a location selected by a user's finger contact). For example, the graphical object is a virtual emoji object 7098 as described with regard to FIG. 7AB. Displaying a graphical object at a location that corresponds to free space in a physical environment (e.g. captured in a media image), without requiring further input (e.g., to indicate the location of free space in the previously captured media image) enhances the operability of the device. Performing an operation without requiring further user input makes the user-device interface more efficient, which, additionally, reduces power usage and improves battery life of the device by enabling the user to use the device more quickly and efficiently.

In some embodiments, the device detects (1138) two concurrent contacts on the touch-sensitive surface and, in response to detecting the two concurrent contacts, the device displays a first measurement object with two respective ends located at respective locations on the respective image corresponding to respective locations of the two concurrent contacts on the touch-sensitive surface. For example, in response to detecting concurrent contacts 7132 and 7134, a virtual measurement object 7136 is displayed with ends at locations that correspond to the locations of the contacts, as described with regard to FIGS. 7AY-7AZ. Displaying a measurement object with ends located at locations on an image corresponding to locations of contacts provides visual feedback to the user (e.g., indicating a portion of the image that corresponds to a measurement). Providing improved visual feedback to the user enhances the operability of the device and makes the user-device interface more efficient (e.g., by allowing a user to quickly and precisely determine and/or adjust the portion of the image that corresponds to a measurement), which, additionally, reduces power usage and improves battery life of the device by enabling the user to use the device more quickly and efficiently.

In some embodiments, displaying the first measurement object includes (1140): in accordance with a determination that the two respective ends of the first measurement object are located on two sides of a simulated foreground surface corresponding to a physical surface captured in the respective image (e.g., the first measure object goes through the simulated foreground surface), displaying a first portion of the first measurement object located on a first side of the simulated foreground surface with a first appearance, and displaying a second portion, distinct from the first portion, of the first measurement object located on a second side, distinct from the first side, of the simulated foreground surface with a second appearance, wherein the second appearance is different from the first appearance (e.g., the first side of the measurement object is foreground and fully visible, and the second side of the measurement object is shielded by the foreground surface and has a shaded appearance). For example, in FIG. 7BD, a first portion of measurement object 7148 (e.g., the dotted-line portion) is located on a first side of a simulated foreground surface and a second portion of measurement object 7148 (e.g., the solid line portion) is located on a second side of the simulated foreground surface. Displaying a first portion of a first measurement object located on a first side of a simulated foreground surface with a first appearance, and displaying a second portion of the first measurement object located on a second side of the simulated foreground surface with a second appearance, provides visual feedback to the user (e.g., indicating that the measurement object spans different sides of a simulated surface that corresponds to a physical surface in a captured image). Providing improved visual feedback to the user enhances the operability of the device and makes the user-device interface more efficient (e.g., by allowing a user to quickly and precisely determine and/or adjust the portion of the image that corresponds to a measurement), which, additionally, reduces power usage and improves battery life of the device by enabling the user to use the device more quickly and efficiently.

In some embodiments, displaying the first measurement object includes (1142): while displaying the first measurement object with a first end and a second end in the respective image, detecting a positioning input by a contact on the touch-sensitive surface, wherein the positioning input specifies a new end location of the first measurement object in the respective image; and in response to detecting the positioning input by the contact, moving one of the first and second ends of the first measurement object that is closer to the new end location in the respective image as specified by the positioning input. For example, a positioning input by contact 7152, as described with regard to FIG. 7BF, specifies a new end location of measurement object 7148 that was previously displayed as described with regard to FIG. 7BB-7BE. Moving one of the first and second ends of the first measurement object to a new end location, without requiring further input (e.g., input to cancel a prior measurement input to provide new measurement input) enhances the operability of a device. Performing an operation without requiring further user input makes the user-device interface more efficient, which, additionally, reduces power usage and improves battery life of the device by enabling the user to use the device more quickly and efficiently.

It should be understood that the particular order in which the operations in FIGS. 11A-11F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, and 1200) are also applicable in an analogous manner to method 1200 described above with respect to FIGS. 11A-11F. For example, contacts, inputs, annotations, virtual objects, physical objects, user interface regions, fields of view, movements, and/or animations described above with reference to method 1100 optionally have one or more of the characteristics of the contacts, inputs, annotations, virtual objects, physical objects, user interface regions, fields of view, movements, and/or animations described herein with reference to other methods described herein (e.g., methods 900, 1000, and 1200). For brevity, these details are not repeated here.

FIGS. 12A-12D are flow diagrams illustrating method 1200 of initiating a shared annotation session. Method 1200 is performed at an electronic device (e.g., device 300, FIG. 3, or portable multifunction device 100, FIG. 1A) having a first display generation component (e.g., a display, a projector, a heads up display or the like), a first set of one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), and a first set of one or more cameras (e.g., one or more rear-facing cameras on a side of the device opposite from the display and the touch-sensitive surface). In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

The device sends (1202) a request (e.g., in response to a user request to enter the shared annotation mode) to a remote device (e.g., a server or a second device) to initiate a shared annotation session with a second device that includes a second display generation component, a second set of one or more input devices, and a second set of one or more cameras. For example, as described with regard to FIG. 8B, a request to initiate a shared annotation session is sent from device 100-1 to second device 100-2 in response to an input received at a control 8010 for initiating a share annotation session. In some embodiments, the request to enter the shared annotation mode includes first input to initiate a shared annotation session and second input to select the second device (e.g., from a list of nearby devices, or from a list of social network contacts) with which to share the annotation session.

In response to sending the request to initiate the shared annotation session with the second device, the device receives (1204) (e.g., from the server or the second device) an indication of acceptance of the request to initiate the shared annotation session In some embodiments, the request is sent to the second device (e.g., directly without going through a server, or via a server), and the second device displays a notification of the request to initiate the shared annotation session with the first device. For example, in FIG. 8C, first device 100-1 has sent a request to initiate the shared annotation session and second device 100-2 displays a notification (e.g., prompt 8016 that includes instructions for accepting the request). A second user provides acceptance input at the second device in response to the notification displayed by the second device. The second device then sends the indication of acceptance to the first device (e.g., directly or via the server).

In response to receiving the indication of acceptance of the request to initiate the shared annotation session, the device displays (1206), via the first display generation component, a first prompt to move the first device toward the second device (e.g., an animation showing representations of the first and second devices moving toward each other). For example, first device 100-1 displays a prompt 8022 including an instruction to move device 100-1 toward a representation of device 100-2, as described with regard to FIG. 8D. In some embodiments, prompt 8022 includes an animation showing a representation of device 100-1 moving toward device 100-2, as described with regard to FIGS. 8D-8E. In some embodiments, a prompt is also displayed at the second device to move the second device toward the first device. In some embodiments, the two devices are moved toward each other and point at the same portion of the physical environment, such that the field of views on the two devices are substantially the same or have significant overlap. For example, second device 100-2 displays a prompt 8024 including an instruction to move device 100-2 toward device 100-1, as described with regard to FIG. 8D. In some embodiments, prompt 8024 includes an animation showing a representation of device 100-2 moving toward a representation of device 100-1, as described with regard to FIGS. 8D-8E.

After displaying the first prompt, in accordance with a determination that connection criteria for the first device and the second device are met (e.g., after movements of the first device and the second device toward each other, and after analysis of the physical space captured in the field of views of the first and second sets of cameras), the device displays (1208) a representation of a field of view of the first set of cameras in the shared annotation session with the second device. For example, as described with regard to FIGS. 8F-8G, accordance with a determination that connection criteria for the first device and the second device are met, device 100-1 displays a representation of a field of view of one or more cameras of device 100-1. In some embodiments, a representation of the field of view of the first set of cameras was already displayed before the shared annotation session is started. In some embodiments, the representation of the field of view in the shared annotation session includes both a live camera view and one or more controls (e.g., user interface objects for various annotation tools) for the shared annotation session. The connection criteria require that at least a portion of the field of view of the first device and a portion of a field of view of the second device correspond to a same portion of physical environment surrounding the first and second devices (e.g., in some embodiments, the connection criteria require that the first device and the second device point at the same portion of the physical environment from substantially the same location in the physical environment (e.g., the devices are side by side with their cameras pointing in the same direction)). During the shared annotation session, one or more first virtual annotations (e.g., annotation 8056-1, as described with regard to FIGS. 8K-8M) correspond to annotation input (e.g., drawings, virtual objects, text, etc.) directed to a respective location in the physical environment (e.g., through direct annotation on a still image of the field of view or directly on the live feed of the field of view of the cameras) by the first device is displayed (e.g., overlaid on a representation of the field of view of the first set of cameras) via the first display generation component and one or more second virtual annotations (e.g., annotation 8050-1, as described with regard to FIGS. 8H-8J) corresponding to annotation input (e.g., drawings, virtual objects, text, etc.) directed to the respective location in the physical environment (e.g., through direct annotation on a still image of the field of view or directly on the live feed of the field of view of the cameras) by the second device is displayed (e.g., overlaid on the representation of the field of view of the first set of cameras) via the first display generation component, provided that the respective location is included in the field of view of the first set of cameras (e.g., in accordance with a determination of such made through analysis of the field of view (e.g., including image and depth data) and the device movement data of the first and/or second devices during the shared annotation session). Displaying, at a first display annotation input directed, by a first device and by a second device, to a location in the physical environment, provided that the location is included in the field of view of the first device provides visual feedback to the user (e.g., indicating that the proximity of the devices is sufficient for a shared annotation session). Providing improved visual feedback to the user enhances the operability of the device and makes the user-device interface more efficient (e.g., by allowing users to collaborate in an annotation session in which annotations by different users appear relative to the same location in space), which, additionally, reduces power usage and improves battery life of the device by enabling the user to use the device more quickly and efficiently.

In some embodiments, during the shared annotation session, the one or more first virtual annotations corresponding to the annotation input (e.g., drawings, virtual objects, text, etc.) directed to the respective location in the physical environment (e.g., through direct annotation on a still image of the field of view or directly on the live feed of the field of view of the cameras) by the first device is displayed (1210) (e.g., overlaid on a representation of the field of view of the second set of cameras) via the second display generation component and the one or more second virtual annotations corresponding to the annotation input (e.g., drawings, virtual objects, text, etc.) directed to the respective location in the physical environment (e.g., through direct annotation on a still image of the field of view or directly on the live feed of the field of view of the cameras) by the second device is displayed (e.g., overlaid on the representation of the field of view of the second set of cameras) via the second display generation component, provided that the respective location is included in the field of view of the second set of cameras (e.g., in accordance with a determination of such made through analysis of the field of view (e.g., including image and depth data) and the device movement data of the first and/or second devices during the shared annotation session). For example, the display of second device 100-2 displays annotation 8050-2 that was input as second device 100-2 and annotation 8056-2 that was input at first device 100-1, as described with regard to FIGS. 8K-8M and 8H-8J. Displaying, at a second display, annotation input directed, by a first device and by a second device, to a location in the physical environment, provided that the location is included in the field of view of the second device provides visual feedback to the user (e.g., indicating that the proximity of the devices is sufficient for a shared annotation session). Providing improved visual feedback to the user enhances the operability of the device and makes the user-device interface more efficient (e.g., by allowing users to collaborate in an annotation session in which annotations by different users appear relative to the same location in space), which, additionally, reduces power usage and improves battery life of the device by enabling the user to use the device more quickly and efficiently.

In some embodiments, during the shared annotation session, the one or more first virtual annotations corresponding to the annotation input (e.g., drawings, virtual objects, text, etc.) directed to the respective location in the physical environment (e.g., through direct annotation on a still image of the field of view or directly on the live feed of the field of view of the cameras) by the first device is displayed (1212) (e.g., overlaid on a representation of the field of view of the second set of cameras) via the second display generation component and not via the first display generation component, provided that the respective location is included in the field of view of the second set of cameras and not included in the field of view of the first set of cameras (e.g., in accordance with a determination of such made through analysis of the field of view (e.g., including image and depth data) and the device movement data of the first and/or second devices during the shared annotation session). For example, annotations 8050-1, 8050-2 and 8056-1, 8056-2 are received as direct annotation input directed to representations 8038*b* and 8038*c* (in a field of view of cameras of devices 101-1 and 101-2, respectively) of physical poster 8038*a*. Displaying, at a second display, the annotation input while the first display does not display the annotation input, provided that the location is included in the field of view of the second device and not included in the field of view of the first device, provides visual feedback to the user (e.g., indicating that the annotation corresponds to a location in the physical environment). Providing improved visual feedback to the user enhances the operability of the device and makes the user-device interface more efficient (e.g., by allowing users to collaborate in an annotation session in which annotations by different users appear relative to the same location in space), which, additionally, reduces power usage and improves battery life of the device by enabling the user to use the device more quickly and efficiently.

In some embodiments, after displaying the first prompt, in accordance with a determination that the connection criteria for the first device and the second device are met (e.g., after movements of the first device and the second device toward each other, and after the analysis of the physical space captured in the field of views of the first and second sets of cameras), the device displays (1214) a notification (e.g., a pop-up or banner notification with an avatar of the second device shown, or appearance of the controls that are provided in the shared annotation session) in the representation of the field of view of the first set of cameras that the shared annotation session with the second device has been established. For example, as described with regard to FIG. 8F, notification 8034 is displayed by first device 100-1 to indicate that the shared annotation session with the second device 100-2 has been established. In some embodiments, the first device displays an indication that the first device is currently displaying annotations made by the second device (e.g., annotations made by the second device are displayed concurrently with an avatar of the second device when shown in the representation of the field of view of the first device at the first device). In some embodiments, the first device displays an indication that annotations made by the first device are currently shown to the second device (e.g., annotations made by the first device that are currently shown in the representation of the field of view of the second device at the second device). Displaying a notification that a shared annotation session has been established, provides visual feedback to the user (e.g., indicating that device proximity is sufficient to establish a shared annotation session). Providing improved visual feedback to the user enhances the operability of the device and makes the user-device interface more efficient (e.g., by allowing users to continue to follow the prompt instructions until a notification is received and to stop following the prompt instructions in response to receiving the notification), which, additionally, reduces power usage and improves battery life of the device by enabling the user to use the device more quickly and efficiently.

In some embodiments, the first prompt includes (1216) an animation illustrating representations of the first and second devices moving toward each other (e.g., as described with regard to FIGS. 8D-8E). After displaying the first prompt, in accordance with a determination that the connection criteria for the first device and the second device are met (e.g., after movements of the first device and the second device toward each other, and after the analysis of the physical space captured in the field of views of the first and second sets of cameras), the device replaces display (1218) of the first prompt with the representation of the field of view of the first set of cameras. For example, as described with regard to FIGS. 8F-8G, in accordance with a determination that the connection criteria for the first device 100-1 and the second device 100-2 are met, a representation of the field of view of the first set of cameras (e.g., including representation 8038*b* of physical poster 8038*a*) is displayed by first device 100-1. In some embodiments, when the first and second devices are moving together causing the overlap between their field of views to exceed a threshold, the animated prompt on both the first and second devices are simultaneously replaced with their respective field of views (which are substantially identical at this time). Replacing display of a prompt with a representation of a view of the camera(s) of the first device in accordance with a determination that connection criteria for the first device and the second device are met provides visual feedback to the user (e.g., indicating that device proximity is sufficient to establish a shared annotation session). Providing improved visual feedback to the user enhances the operability of the device and makes the user-device interface more efficient (e.g., by allowing users to continue to follow the prompt instructions until a camera view is displayed and to stop following the prompt instructions when the camera view is displayed), which, additionally, reduces power usage and improves battery life of the device by enabling the user to use the device more quickly and efficiently.

In some embodiments, during the shared annotation session: while displaying, via the first display generation component, the representation of the field of view of the first set of cameras, in accordance with a determination that a first annotation input directed to a portion of the physical environment captured in the field of view of the first set of cameras is received from the second device, the device displays (1220) an avatar of the second device at a location in the representation of the field of view of the first set of cameras that corresponds to a location to which the first annotation input is directed. For example, as described with regard to FIGS. 8H-8J, as annotation input by contact 8044 is received, an avatar 8048 corresponding to the second device 100-2 is displayed by first device 100-1. In some embodiments, the result of annotation input is reflected in the representation of the field of view of the first set of cameras in real-time (e.g., as the marks are drawn and/or dragged in the AR environment by the user of the second device). Displaying, by the first display, an avatar of the second device at a location that corresponds to a location of the first annotation input provides visual feedback to the user (e.g., indicating that displayed annotation input is being provided via the second device). Providing improved visual feedback to the user enhances the operability of the device and makes the user-device interface more efficient, (e.g., to help the user to distinguish between annotation by the second device and annotation by the first device and thereby avoid conflicting annotation input) which, additionally, reduces power usage and improves battery life of the device by enabling the user to use the device more quickly and efficiently.

In some embodiments, during the shared annotation session: while displaying, via the first display generation component, the representation of the field of view of the first set of cameras, the device displays (1222) a virtual object (e.g., a two-dimensional virtual object or a three-dimensional virtual object (e.g., a virtual basketball hoop, an avatar of the second device or second user) that is linked with the second device) in the representation of the field of view of the first set of cameras with a location (and, optionally, a perspective) that corresponds to a current location of the second device, including: detecting movement of the second device from a first location to a second location in the physical environment; and displaying movement of the virtual object (and optionally, change in viewing perspective of the virtual object) in the representation of the field of view of the first set of cameras that corresponds to the movement of the second device from the first location to the second location in the physical environment, provided that the first location and the second location are within the field of view of the first set of cameras during the movement of the second device from the first location to the second location in the physical environment (e.g., the second device is captured by the first set of cameras in the field of view of the first set of cameras during the movement of the second device from the first location to the second location in the physical environment, and visible on the representation of the field of view of the first set of cameras). For example, as described with regard to FIGS. 8V-8W, first device 100-1 displays virtual basketball hoop 8074 that corresponds to a current location of second device 100-2), and as second device 100-2 moves, the displayed position of virtual basketball hoop 8074 moves. Displaying, by the first display, movement of a virtual object in a view of the first device camera(s) that corresponds to movement of the second device, provides visual feedback to the user (e.g., indicating that the virtual object corresponds to the second device). Providing improved visual feedback to the user enhances the operability of the device and makes the user-device interface more efficient, (e.g., to help the user to distinguish between annotation by the second device and annotation by the first device and thereby avoid annotation mistakes) which, additionally, reduces power usage and improves battery life of the device by enabling the user to use the device more quickly and efficiently.

In some embodiments, during the shared annotation session, the first device displays (1224) the representation of the field of view of the first set of cameras via the first display generation component and the second device displays the representation of the field of view of the first set of cameras via the second display generation component (e.g., the field of view of the first set of cameras is provided to the second device (e.g., directly or via a server), such that the same field of view is presented at both the first and second devices). In some embodiments, the second device has a different field of view from the second set of cameras, but does not display the field of view from the second set of cameras when it is displaying the field of view of the first set of cameras. Displaying, by the first display and the second display, the field of view of the first device camera(s), provides visual feedback to the user (e.g., indicating that the displayed view is a shared view). Providing improved visual feedback to the user enhances the operability of the device and makes the user-device interface more efficient, (e.g., to allow the second device to experience the point of view of the first device) which, additionally, reduces power usage and improves battery life of the device by enabling the user to use the device more quickly and efficiently.

In some embodiments, during the shared annotation session, the first device displays (1226) the representation of the field of view of the first set of cameras via the first display generation component and the second device displays the representation of the field of view of the second set of cameras via the second display generation component (e.g., different field of views are presented at the first and second devices, when the devices are at different locations and/or pointing at different directions in the physical environment). Displaying the field of view of the first device camera(s) at the first display and displaying the field of view of the second device camera(s) at the second display provides visual feedback to the user (e.g., indicating that the displayed view is not a shared view). Providing improved visual feedback to the user enhances the operability of the device and makes the user-device interface more efficient, (e.g., by allowing the first and second device to maintain individual points of reference relative to the physical world) which, additionally, reduces power usage and improves battery life of the device by enabling the user to use the device more quickly and efficiently.

In some embodiments, during the shared annotation session, in accordance with a determination that the connection criteria are no longer met (e.g., after movements of the first device and the second device away from each other, and after the analysis of the physical space captured in the field of views of the first and second sets of cameras), the device terminates (1228) the shared annotation session. For example, as described with regard to FIG. 8P, the shared annotation session is terminated when movement of first device 100-1 away from second device 100-2 exceeds a threshold amount during the shared annotation session. In some embodiments, prior to detecting that the connection criteria are no longer met, in accordance with a determination that the amount of overlap between the portions of physical environment captured in the first and second sets of cameras has reduced to a threshold amount, a warning notification is generated at each of the first and second devices to indicate that the shared annotation session will be ended, if the overlap is not increased within a threshold amount of time. In some embodiments, an affordance is displayed concurrently with the representation of the field of view of the first set of cameras at the first device, which when invoked, causes the first device to terminate the shared annotation session. In some embodiments, the annotations provided by the second device ceases to be displayed in the representation of the field of view of the first set of cameras at the first device, even if the field of view of the first set of cameras includes the portion of physical environment to which the annotations were provided. Terminating a shared annotation session in accordance with a determination that connection criteria are not met provides visual feedback to the user (e.g., indicating that movement of the camera(s) is needed to reinstate the shared annotation session). Providing improved visual feedback to the user enhances the operability of the device and makes the user-device interface more efficient (e.g., by allowing a user to quickly and precisely move the device to enable the shared annotation session), which, additionally, reduces power usage and improves battery life of the device by enabling the user to use the device more quickly and efficiently.

In some embodiments, during the shared annotation session, in accordance with a determination that an amount of overlap between the field of view of the first set of cameras and the field of view of the second set of cameras (or more generally, between the portion of physical environment captured in the field of view of the first set of camera and the portion of the physical environment captured in the field of view of the second set of cameras) is below a first threshold amount (e.g., after movements of the first device and the second device away from each other), the device generates (1230), via the first display generation component, a second prompt to move the first device toward the second device. For example, as described with regard to FIG. 8P, movement of first device 100-1 away from second device 100-2 during the shared annotation session causes a prompt 8060 to be displayed including an instruction to move first device 100-1 toward second device 100-2. Displaying a prompt to move the first device toward the second device in accordance with a determination that the view of the first camera(s) does not overlap by at least a threshold amount from the view of the second camera(s) provides visual feedback to the user (e.g., indicating that movement of the camera(s) is needed to view the shared annotation session). Providing improved visual feedback to the user enhances the operability of the device and makes the user-device interface more efficient (e.g., by allowing a user to quickly and precisely move the device to enable the shared annotation session), which, additionally, reduces power usage and improves battery life of the device by enabling the user to use the device more quickly and efficiently.

In some embodiments, during the shared annotation session, in accordance with a determination that an amount of overlap between the field of view of the first set of cameras and the field of view of the second set of cameras (or more generally, between the portion of physical environment captured in the field of view of the first set of camera and the portion of the physical environment captured in the field of view of the second set of cameras) is below a first threshold amount (e.g., after movements of the first device and the second device away from each other), the device displays (1232), via the first display generation component, an indication of a current relative spatial relationship between the first device and the second device (e.g., a dynamically moving visual indicators on the edge of the representation of the field of view of the first set of cameras, which is concurrently displayed with the second prompt to move the first device toward the second device). Displaying an indication of a current spatial relationship between the first device and the second device in accordance with a determination that the view of the first camera(s) does not overlap by at least a threshold amount from the view of the second camera(s) provides visual feedback to the user (e.g., indicating that movement of the camera(s) is needed to view the shared annotation session). Providing improved visual feedback to the user enhances the operability of the device and makes the user-device interface more efficient (e.g., by allowing a user to quickly and precisely move the device to enable the shared annotation session), which, additionally, reduces power usage and improves battery life of the device by enabling the user to use the device more quickly and efficiently.

It should be understood that the particular order in which the operations in FIGS. 12A-12D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, and 1100) are also applicable in an analogous manner to method 1200 described above with respect to FIGS. 12A-12D. For example, contacts, inputs, annotations, physical objects, user interface regions, fields of view, movements, and/or animations described above with reference to method 1200 optionally have one or more of the characteristics of the contacts, inputs, annotations, physical objects, user interface regions, fields of view, movements, and/or animations described herein with reference to other methods described herein (e.g., methods 900, 1000, and 1100). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at a computer system that is in communication with a display generation component and one or more input devices for detecting user inputs:

receiving, via the one or more input devices, a request to display a first user interface that includes a first virtual object overlaying a first media object, wherein the first media object includes at least a first image that captures at least a first physical object in a physical environment; and in response to receiving the request to display the first user interface that includes the first virtual object overlaying the first media object, displaying the first virtual object at a respective position relative to a respective portion of the first image that corresponds to the first physical object, wherein:

while the first virtual object has a first spatial position relative to the respective portion of the first image that corresponds to first physical object, the first virtual object has a first depth relative to the respective portion of the first image that corresponds to the first physical object in the first user interface.

2. The method of claim 1, wherein:

while the first virtual object has a second spatial position, different from the first spatial position, relative to the respective portion of the first image that corresponds to the first physical object, the first virtual object has a second depth, different from the first depth, relative to the respective portion of the first image that corresponds to the first physical object in the first user interface.

3. The method of claim 1, wherein the first media object includes a first previously captured media object including one or more images, wherein the first previously captured media object was recorded and stored with first depth data corresponding to the physical environment and the first physical object.

4. The method of claim 1, wherein the first virtual object includes a first textual annotation.

5. The method of claim 4, wherein the first textual annotation is displayed with a first orientation that is determined in accordance with first depths data corresponding to the physical environment and the first physical object.

6. The method of claim 4, including:

after the first textual annotation is displayed at a first position relative to a first portion of the first image that corresponds to a first portion of the physical environment, displaying first movement of the first textual annotation relative to a first physical surface captured in the first media object, wherein the first movement of the first textual annotation is constrained by a first simulated surface corresponding to the first physical surface captured in the first media object.

7. The method of claim 4, including:

after the first textual annotation is displayed at a first position relative to a first portion of the first image that corresponds to a first portion of the physical environment, displaying a change in shape of the first textual annotation in accordance with a first physical surface captured in the first media object, wherein the change in shape of the first textual annotation is constrained by a first simulated surface corresponding to the first physical surface captured in the first media object.

8. The method of claim 4, including:

while displaying the first textual annotation overlaying the first media object, detecting a user input that corresponds to a request to edit the first textual annotation; and in response to detecting the user input, enabling editing of the first textual annotation at a current location of the first textual annotation overlaying the first media object.

9. The method of claim 1, wherein:

the first media object is a video including a sequence of consecutive image frames, and displaying the first virtual object at the respective position relative to the respective portion of the first image that corresponds to the first physical object includes:

while displaying a first image frame of the sequence of consecutive image frames, displaying the first virtual object over a first portion of the first image frame, wherein the first portion of the first image frame corresponds to a first portion of the physical environment located at a first depth; and while displaying a second image frame of the sequence of consecutive image frames, displaying the first virtual object over a second portion of the second image frame, wherein the second portion of the second image frame corresponds to the first portion of the physical environment located at a second depth different from the first depth.

10. The method of claim 1, including:

displaying a shadow of the first virtual object in accordance with a first simulated surface corresponding to a first physical surface that is captured in the first media object.

11. The method of claim 1, wherein the request to display the first user interface that includes the first virtual object overlaying the first media object is a user request to place a first textual object at a first location in a respective image in the first media object, and the method includes:

receiving a user input to update the first textual object, including adding a first letter to the first textual object; and in response to receiving the user input, displaying the first letter at a second location in the respective image in the first media object adjacent to a preceding letter in the first textual object and in accordance with depth data corresponding to the second location in the respective image.

12. The method of claim 1, wherein displaying the first virtual object at the respective position relative to the respective portion of the first image includes:

in accordance with a determination that a simulated surface proximate to a current location of the first virtual object in the first image is a horizontal surface, displaying the first virtual object on top of the horizontal surface; and in accordance with a determination that the simulated surface proximate to the current location of the first virtual object in the first image is a vertical surface, displaying the first virtual object in front of the vertical surface.

13. The method of claim 1, wherein displaying the first virtual object at the respective position relative to the respective portion of the first image includes:

in accordance with a determination that the first image includes a first simulated surface and a second simulated surface with different depths in proximity to a current location of the first virtual object in the first image, displaying the first virtual object at a depth between the first simulated surface and the second simulated surface.

14. The method of claim 1, including:

detecting an object positioning input that is directed to the first virtual object, the object positioning input specifies a placement location for the first virtual object on the first image;

in response to detecting the object positioning input, placing the first virtual object at the placement location on the first image in accordance with the object positioning input;

while the first virtual object is displayed at the placement location on the first image, detecting termination of the object positioning input; and in response to detecting the termination of the object positioning input, moving the first virtual object from the placement location to a new location in accordance with depth data corresponding to a portion of the physical environment surrounding the placement location and in accordance with one or more simulated physical properties of the portion of the physical environment and the first virtual object.

15. A computer system, comprising:

a display generation component;

one or more input devices;

one or more processors; and memory storing one or more programs, wherein the one or more programs are configured to be executed by the one or more processors, the one or more programs including instructions for:

receiving, via the one or more input devices, a request to display a first user interface that includes a first virtual object overlaying a first media object, wherein the first media object includes at least a first image that captures at least a first physical object in a physical environment; and in response to receiving the request to display the first user interface that includes the first virtual object overlaying the first media object, displaying the first virtual object at a respective position relative to a respective portion of the first image that corresponds to the first physical object, wherein:

while the first virtual object has a first spatial position relative to the respective portion of the first image that corresponds to first physical object, the first virtual object has a first depth relative to the respective portion of the first image that corresponds to the first physical object in the first user interface.

16. A non-transitory computer readable storage medium storing one or more programs, the one or more programs comprising instructions, which, when executed by a computer system with a display generation component and one or more input devices, cause the computer system to:

receive, via the one or more input devices, a request to display a first user interface that includes a first virtual object overlaying a first media object, wherein the first media object includes at least a first image that captures at least a first physical object in a physical environment; and in response to receiving the request to display the first user interface that includes the first virtual object overlaying the first media object, display the first virtual object at a respective position relative to a respective portion of the first image that corresponds to the first physical object, wherein:

while the first virtual object has a first spatial position relative to the respective portion of the first image that corresponds to first physical object, the first virtual object has a first depth relative to the respective portion of the first image that corresponds to the first physical object in the first user interface.

17. The non-transitory computer readable storage medium of claim 16, wherein:

while the first virtual object has a second spatial position, different from the first spatial position, relative to the respective portion of the first image that corresponds to the first physical object, the first virtual object has a second depth, different from the first depth, relative to the respective portion of the first image that corresponds to the first physical object in the first user interface.

18. The non-transitory computer readable storage medium of claim 16, wherein the first media object includes a first previously captured media object including one or more images, wherein the first previously captured media object was recorded and stored with first depth data corresponding to the physical environment and the first physical object.

19. The non-transitory computer readable storage medium of claim 16, wherein the first virtual object includes a first textual annotation.

20. The non-transitory computer readable storage medium of claim 16, wherein:

the first media object is a video including a sequence of consecutive image frames, and displaying the first virtual object at the respective position relative to the respective portion of the first image that corresponds to the first physical object includes:

while displaying a first image frame of the sequence of consecutive image frames, displaying the first virtual object over a first portion of the first image frame, wherein the first portion of the first image frame corresponds to a first portion of the physical environment located at a first depth; and while displaying a second image frame of the sequence of consecutive image frames, displaying the first virtual object over a second portion of the second image frame, wherein the second portion of the second image frame corresponds to the first portion of the physical environment located at a second depth different from the first depth.

21. The non-transitory computer readable storage medium of claim 16, the one or more programs comprising instructions, which, when executed by the computer system, cause the computer system to:

display a shadow of the first virtual object in accordance with a first simulated surface corresponding to a first physical surface that is captured in the first media object.

22. The non-transitory computer readable storage medium of claim 16, wherein the request to display the first user interface that includes the first virtual object overlaying the first media object is a user request to place a first textual object at a first location in a respective image in the first media object, and the one or more programs include instructions, which, when executed by the computer system, cause the computer system to:

receive a user input to update the first textual object, including adding a first letter to the first textual object; and in response to receiving the user input, display the first letter at a second location in the respective image in the first media object adjacent to a preceding letter in the first textual object and in accordance with depth data corresponding to the second location in the respective image.

23. The non-transitory computer readable storage medium of claim 16, wherein displaying the first virtual object at the respective position relative to the respective portion of the first image includes:

in accordance with a determination that a simulated surface proximate to a current location of the first virtual object in the first image is a horizontal surface, displaying the first virtual object on top of the horizontal surface; and in accordance with a determination that the simulated surface proximate to the current location of the first virtual object in the first image is a vertical surface, displaying the first virtual object in front of the vertical surface.

24. The non-transitory computer readable storage medium of claim 16, wherein displaying the first virtual object at the respective position relative to the respective portion of the first image includes:

in accordance with a determination that the first image includes a first simulated surface and a second simulated surface with different depths in proximity to a current location of the first virtual object in the first image, displaying the first virtual object at a depth between the first simulated surface and the second simulated surface.

25. The non-transitory computer readable storage medium of claim 16, the one or more programs comprising instructions, which, when executed by the computer system, cause the computer system to:

detect an object positioning input that is directed to the first virtual object, the object positioning input specifies a placement location for the first virtual object on the first image;

in response to detecting the object positioning input, place the first virtual object at the placement location on the first image in accordance with the object positioning input;

while the first virtual object is displayed at the placement location on the first image, detect termination of the object positioning input; and in response to detecting the termination of the object positioning input, move the first virtual object from the placement location to a new location in accordance with depth data corresponding to a portion of the physical environment surrounding the placement location and in accordance with one or more simulated physical properties of the portion of the physical environment and the first virtual object.

26. The computer system of claim 15, wherein:

while the first virtual object has a second spatial position, different from the first spatial position, relative to the respective portion of the first image that corresponds to the first physical object, the first virtual object has a second depth, different from the first depth, relative to the respective portion of the first image that corresponds to the first physical object in the first user interface.

27. The computer system of claim 15, wherein the first media object includes a first previously captured media object including one or more images, wherein the first previously captured media object was recorded and stored with first depth data corresponding to the physical environment and the first physical object.

28. The computer system of claim 15, wherein the first virtual object includes a first textual annotation.

29. The computer system of claim 15, wherein:

the first media object is a video including a sequence of consecutive image frames, and the instructions for displaying the first virtual object at the respective position relative to the respective portion of the first image that corresponds to the first physical object include instructions for:

while displaying a first image frame of the sequence of consecutive image frames, displaying the first virtual object over a first portion of the first image frame, wherein the first portion of the first image frame corresponds to a first portion of the physical environment located at a first depth; and while displaying a second image frame of the sequence of consecutive image frames, displaying the first virtual object over a second portion of the second image frame, wherein the second portion of the second image frame corresponds to the first portion of the physical environment located at a second depth different from the first depth.

30. The computer system of claim 15, the one or more programs further including instructions for:

displaying a shadow of the first virtual object in accordance with a first simulated surface corresponding to a first physical surface that is captured in the first media object.

31. The computer system of claim 15, wherein the request to display the first user interface that includes the first virtual object overlaying the first media object is a user request to place a first textual object at a first location in a respective image in the first media object, and the one or more programs further include instructions for:

receiving a user input to update the first textual object, including adding a first letter to the first textual object; and in response to receiving the user input, displaying the first letter at a second location in the respective image in the first media object adjacent to a preceding letter in the first textual object and in accordance with depth data corresponding to the second location in the respective image.

32. The computer system of claim 15, wherein the instructions for displaying the first virtual object at the respective position relative to the respective portion of the first image include instructions for:

in accordance with a determination that a simulated surface proximate to a current location of the first virtual object in the first image is a horizontal surface, displaying the first virtual object on top of the horizontal surface; and in accordance with a determination that the simulated surface proximate to the current location of the first virtual object in the first image is a vertical surface, displaying the first virtual object in front of the vertical surface.

33. The computer system of claim 15, wherein the instructions for displaying the first virtual object at the respective position relative to the respective portion of the first image include instructions for:

in accordance with a determination that the first image includes a first simulated surface and a second simulated surface with different depths in proximity to a current location of the first virtual object in the first image, displaying the first virtual object at a depth between the first simulated surface and the second simulated surface.

34. The computer system of claim 15, the one or more programs further including instructions for:

detecting an object positioning input that is directed to the first virtual object, the object positioning input specifies a placement location for the first virtual object on the first image;

in response to detecting the object positioning input, placing the first virtual object at the placement location on the first image in accordance with the object positioning input;

while the first virtual object is displayed at the placement location on the first image, detecting termination of the object positioning input; and in response to detecting the termination of the object positioning input, moving the first virtual object from the placement location to a new location in accordance with depth data corresponding to a portion of the physical environment surrounding the placement location and in accordance with one or more simulated physical properties of the portion of the physical environment and the first virtual object.

* * * * *